(12) United States Patent
Henrichs

(10) Patent No.: US 6,266,712 B1
(45) Date of Patent: Jul. 24, 2001

(54) OPTICAL DATA STORAGE FIXED HARD DISK DRIVE USING STATIONARY MAGNETO-OPTICAL MICROHEAD ARRAY CHIPS IN PLACE OF FLYING-HEADS AND ROTARY VOICE-COIL ACTUATORS

(76) Inventor: Joseph Reid Henrichs, 14505 Craig Ave., Grandview, MO (US) 64030

( * ) Notice: Subject to any disclaimer, the term of this patent is extended or adjusted under 35 U.S.C. 154(b) by 0 days.

(21) Appl. No.: 09/277,242

(22) Filed: Mar. 27, 1999

(51) Int. Cl.[7] .................................................. G06F 13/00
(52) U.S. Cl. .................................................. 710/8; 360/97.1
(58) Field of Search ............................ 360/97.01, 121, 360/244, 246.6; 710/8, 62–74

(56) References Cited

U.S. PATENT DOCUMENTS

| | | | |
|---|---|---|---|
| 4,439,793 | * 3/1984 | Nater | 360/121 |
| 5,086,362 | * 2/1992 | Maurice | 360/121 |
| 5,227,938 | * 7/1993 | Colineau et al. | 360/114 |
| 5,293,282 | * 3/1994 | Squires et al. | 360/77.08 |
| 5,325,342 | * 6/1994 | Vo-Dinh | 369/13 |
| 5,606,474 | * 2/1997 | Ketchersid, III | 360/98.01 |
| 5,909,150 | * 6/1999 | Kostelnik et al. | 331/34 |
| 5,983,485 | * 11/1999 | Misso | 29/603.03 |
| 6,078,471 | * 6/2000 | Fiske | 360/104 |
| 6,115,215 | * 9/2000 | Adams et al. | 360/106 |

* cited by examiner

Primary Examiner—Christopher B. Shin

(57) ABSTRACT

An optical data-storage hard disk drive, which uses stationary Magneto-Optical Microhead Array Chips in place of conventional Flying-Heads, Rotary Voice-Coil Actuators and other similar types of Servo-Tracking mechanisms to transcribe or retrieve digital information to or from at least one non-volatile memory medium's data-surface, using an optical magnetic process of recording and reading data. The Magneto-Optical Microhead Array Chip Hard Disk Drives will have at least one storage disk-platter with two disk-platter data-surfaces containing a multiplicity of concentric data-tracks that rotates at a substantially constant angular velocity. Every Magneto-Optical Microhead Array Chip will comprise a (VCSEL) "Vertical Cavity Surface Emitting Laser" microhead array having a minimum of one thousand or a maximum of four billion individually addressable VCSELs. Each Magneto-Optical Microhead Array Chip is placed into a stationary position above each disk platter data-surface using a chip-positioning circuit board. While the number of cylinder/tracks available to each Magneto-Optical Microhead Array Chip is determined by the number of VCSEL microheads contained within a Magneto-Optical Microhead Array Chip's microhead array (e.g., "325,000" vertical cavity surface emitting laser microheads would therefore equal "325,000" corresponding cylinder/tracks).

21 Claims, 93 Drawing Sheets

*RD — Redirected point-to-point (-CS) or "Chip Select" line.

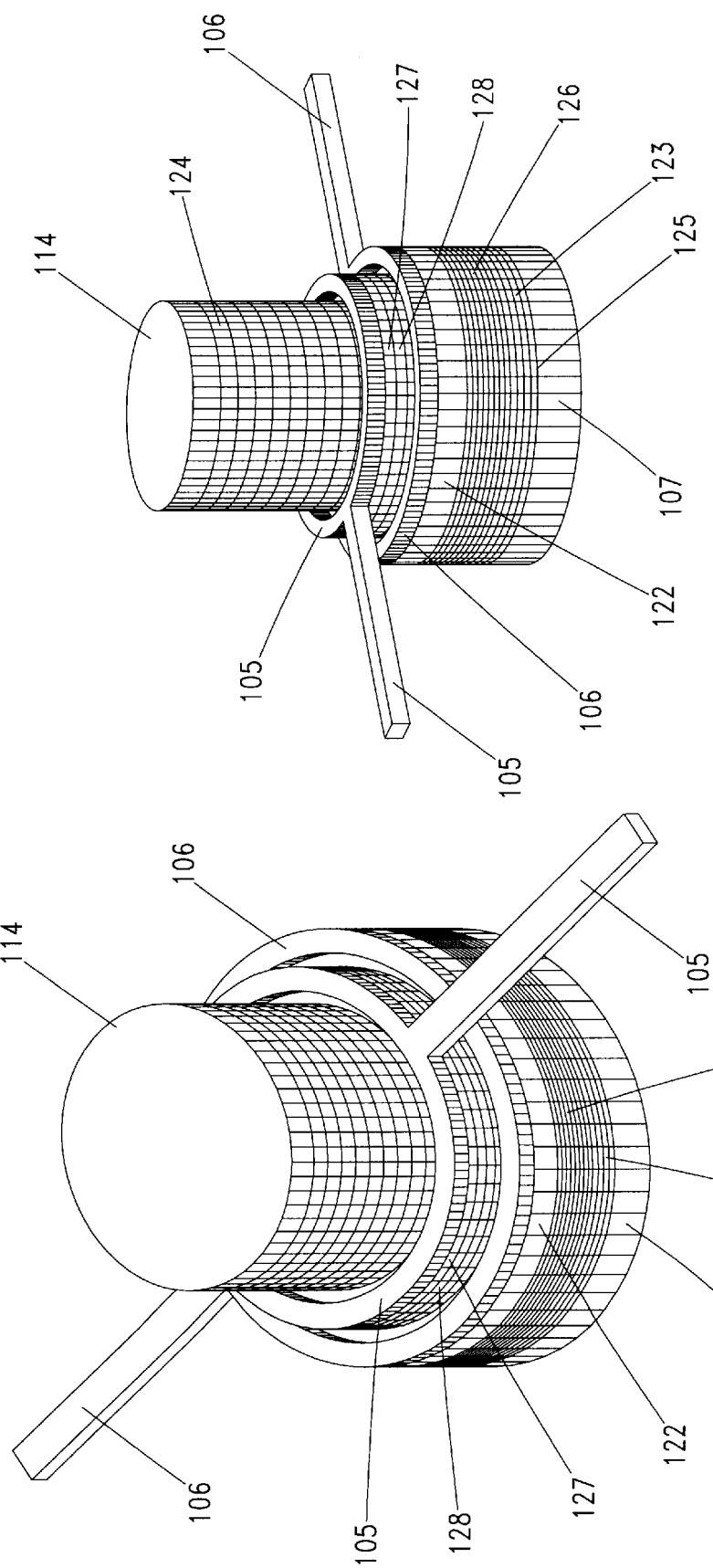

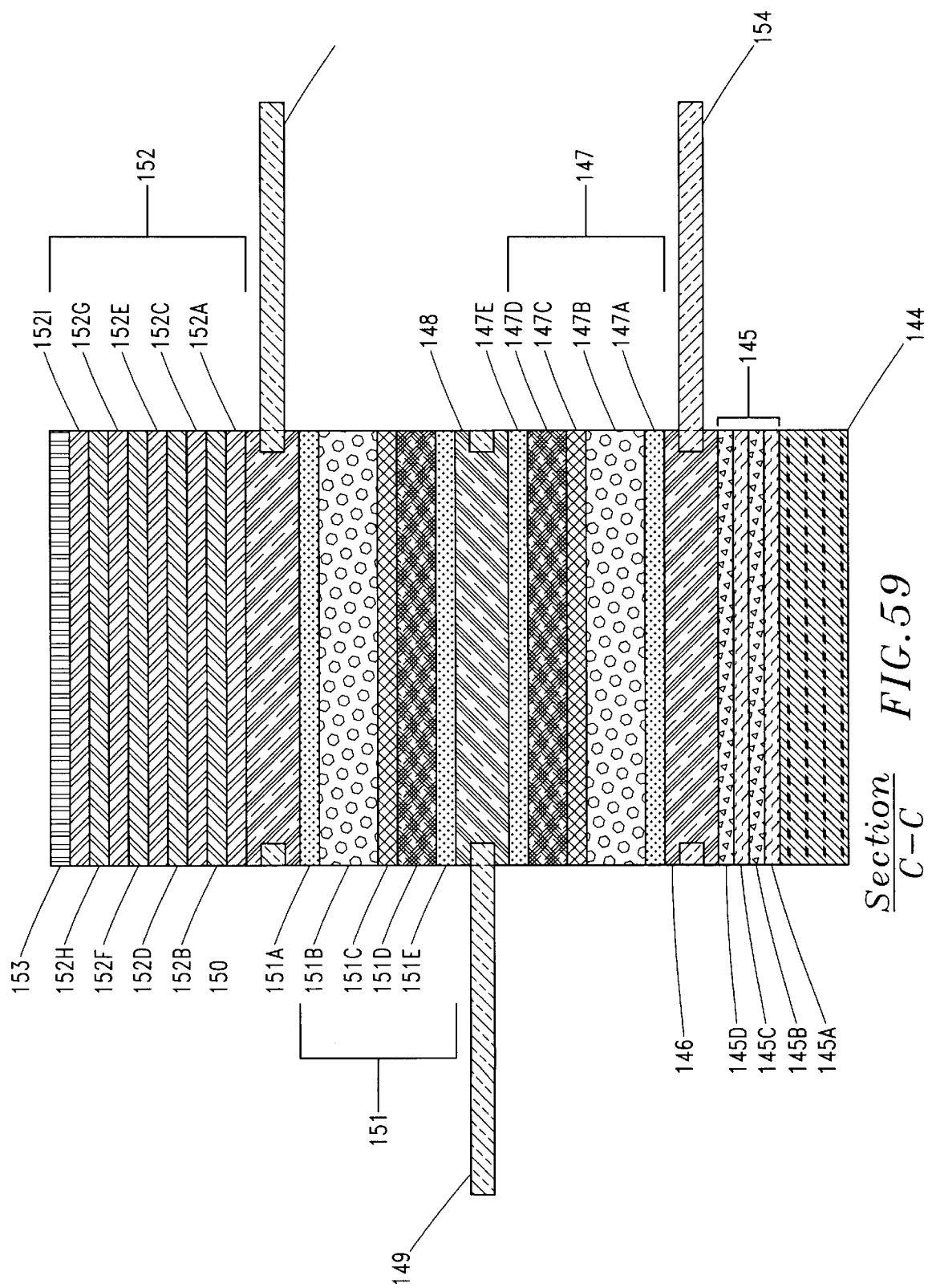
Section C-C    FIG.59

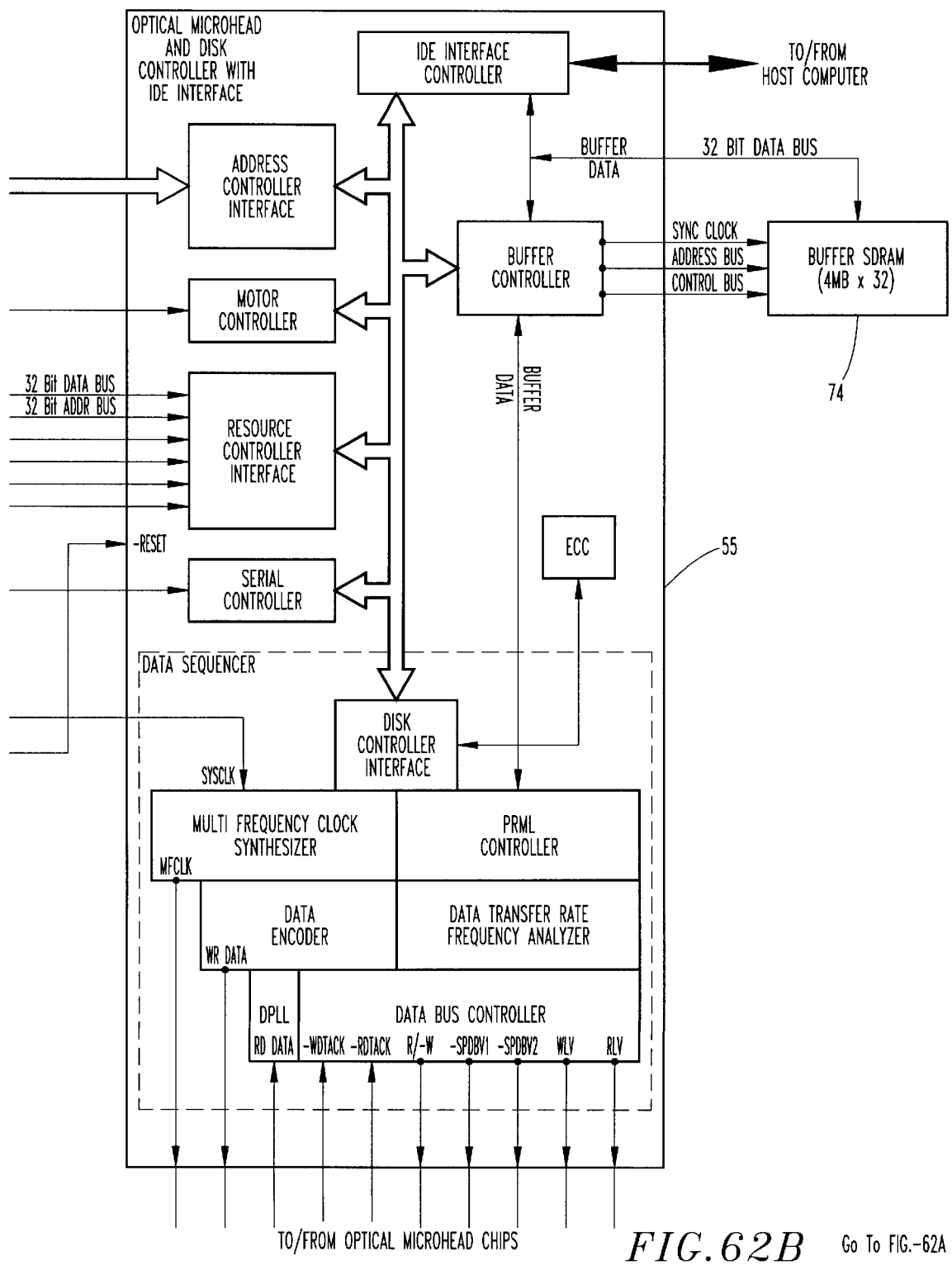
FIG. 62B   Go To FIG.-62A

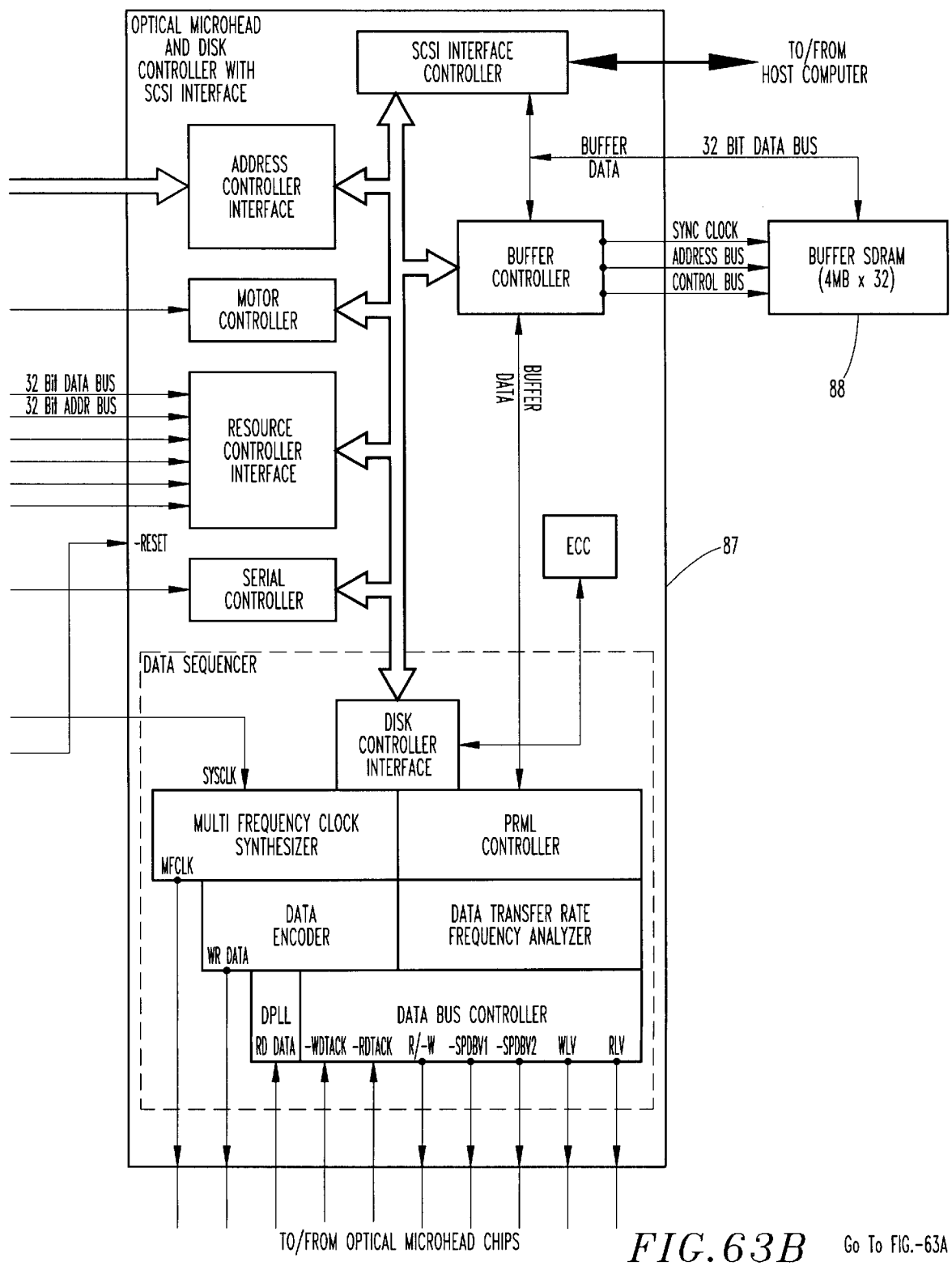
FIG. 63B  Go To FIG.-63A

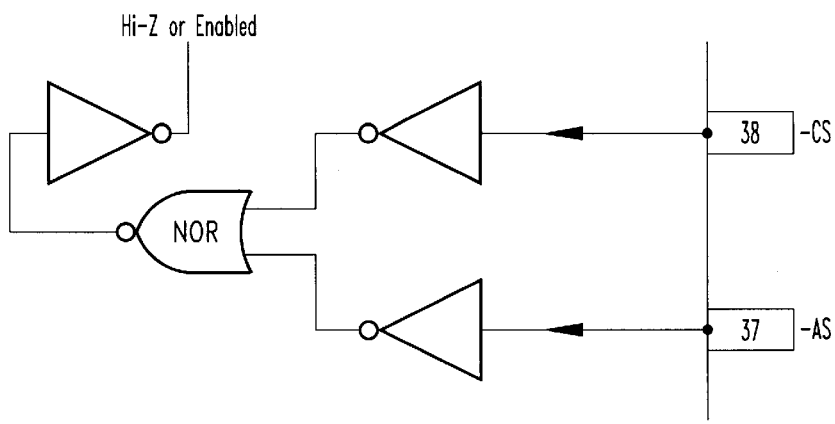
FIG.65
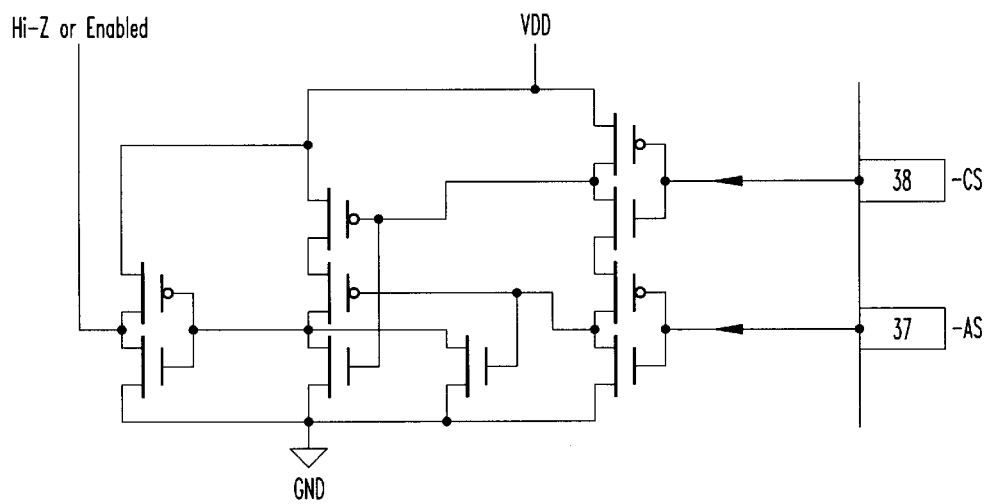
FIG.66
| Conversions |
|---|
| Hi-Z=+0.9V/+2.3V |
| VDD=+5V=True |
| GND=0V=False |
FIG.68
TRUTH TABLE
| Inputs | | Outputs |
|---|---|---|
| 37 | 38 | Hi-Z or Enabled |
| True | True | Hi-Z |
| True | False | Hi-Z |
| False | True | Hi-Z |
| False | False | Enabled |
FIG.67

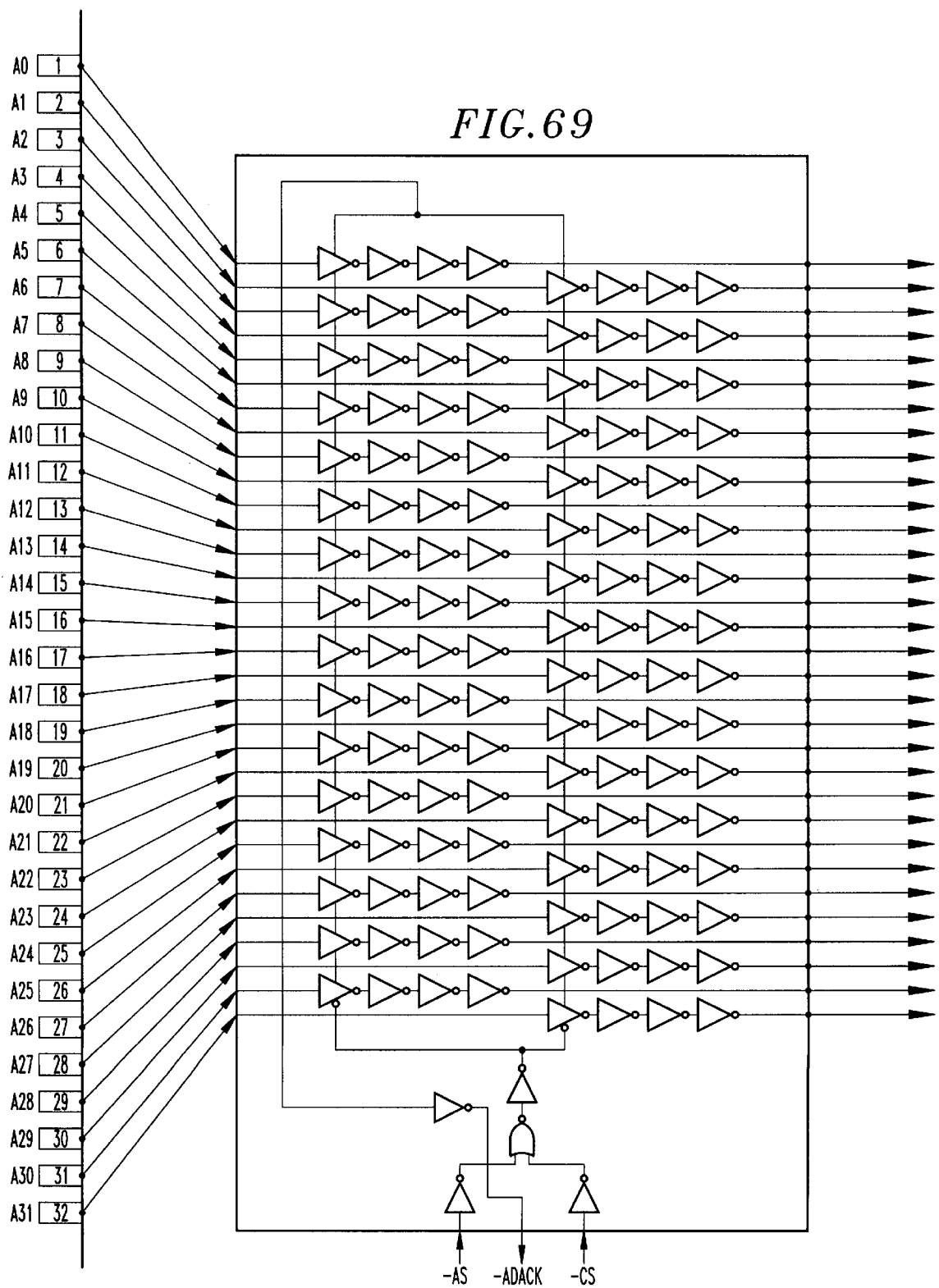

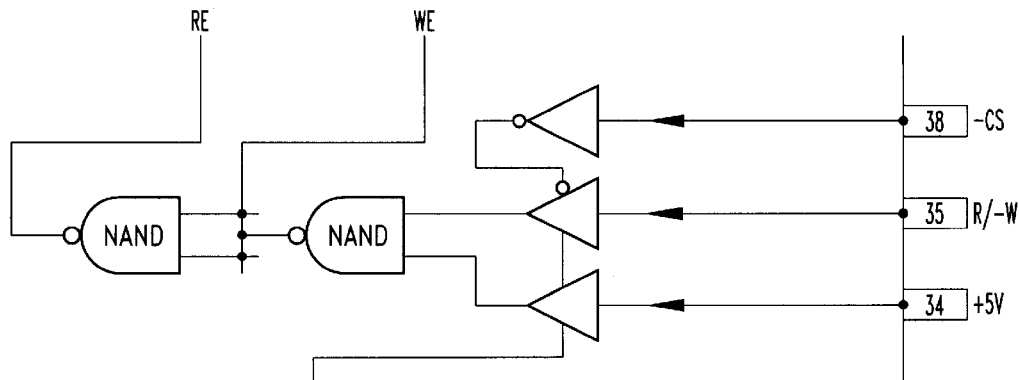
FIG.87
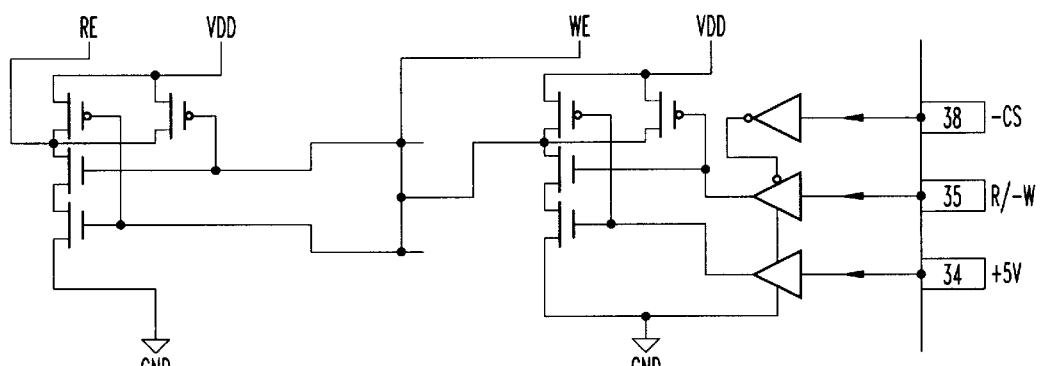
FIG.88
| Conversions |
|---|
| Hi-Z=+0.9V/+2.3V |
| VDD=+5V=True |
| GND=0V=False |
FIG.90
TRUTH TABLE
| Inputs | | | Outputs | |
|---|---|---|---|---|
| 34 | 35 | 38 | WE | RE |
| True | True | False | Hi-Z | Enabled |
| True | False | False | Enabled | Hi-Z |
FIG.89

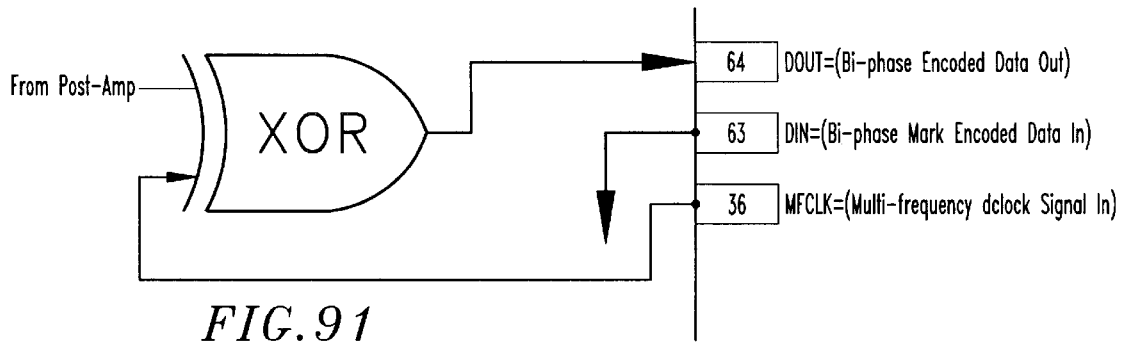
FIG.91
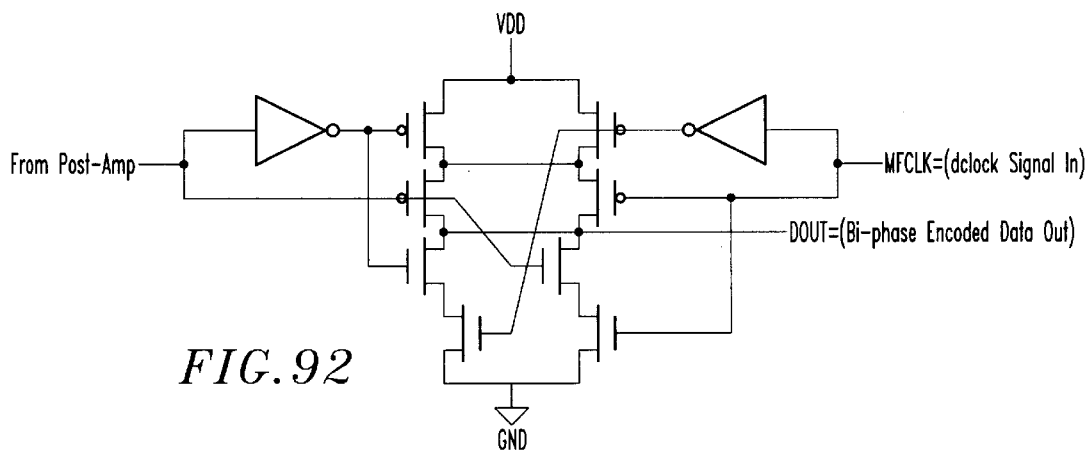
FIG.92
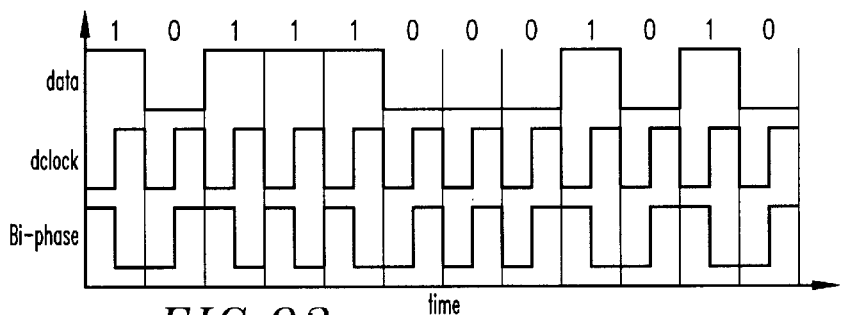
FIG.93
| Conversions |
|---|
| Hi-Z=+0.9V/+2.3V |
| VDD=+5V=True |
| GND=0V=False |
FIG.95
TRUTH TABLE
| Inputs | | Output |
|---|---|---|
| A | B | A ⊕ B |
| False | False | False |
| False | True | True |
| True | False | True |
| True | True | False |
FIG.94

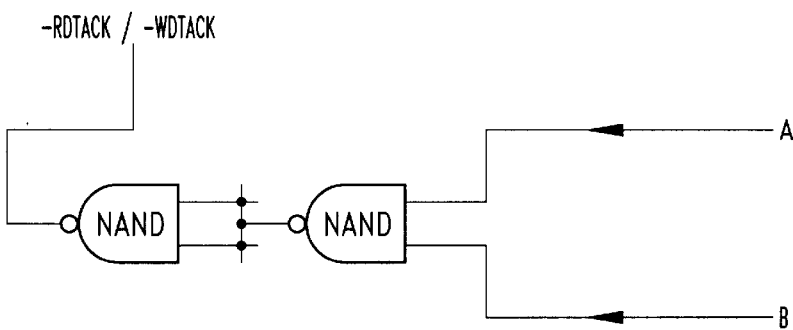
*FIG.102*
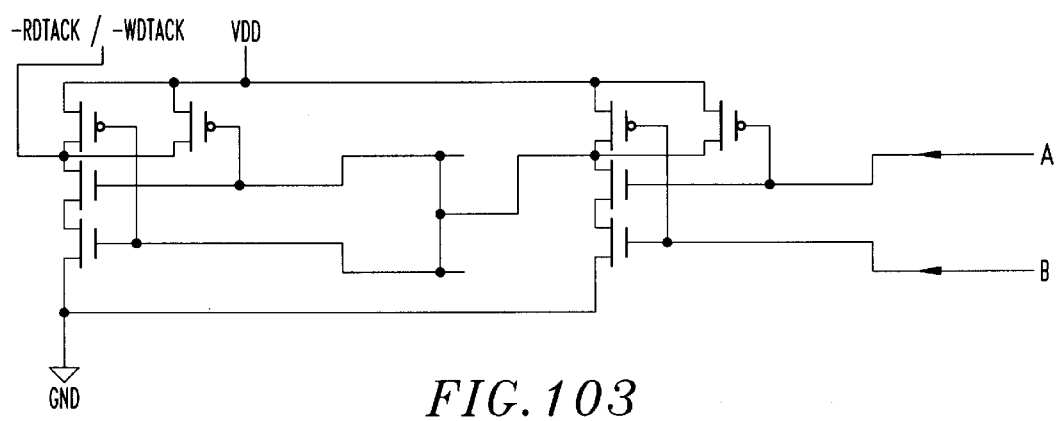
*FIG.103*
| Conversions |
|---|
| Hi-Z=+0.9V/+2.3V |
| VDD=+5V=True |
| GND=0V=False |
*FIG.105*
| TRUTH TABLE | | |
|---|---|---|
| Inputs | | Outputs |
| A | B | -RDTACK/-WDTACK |
| True | True | Hi-Z |
| False | False | Enabled |
*FIG.104*

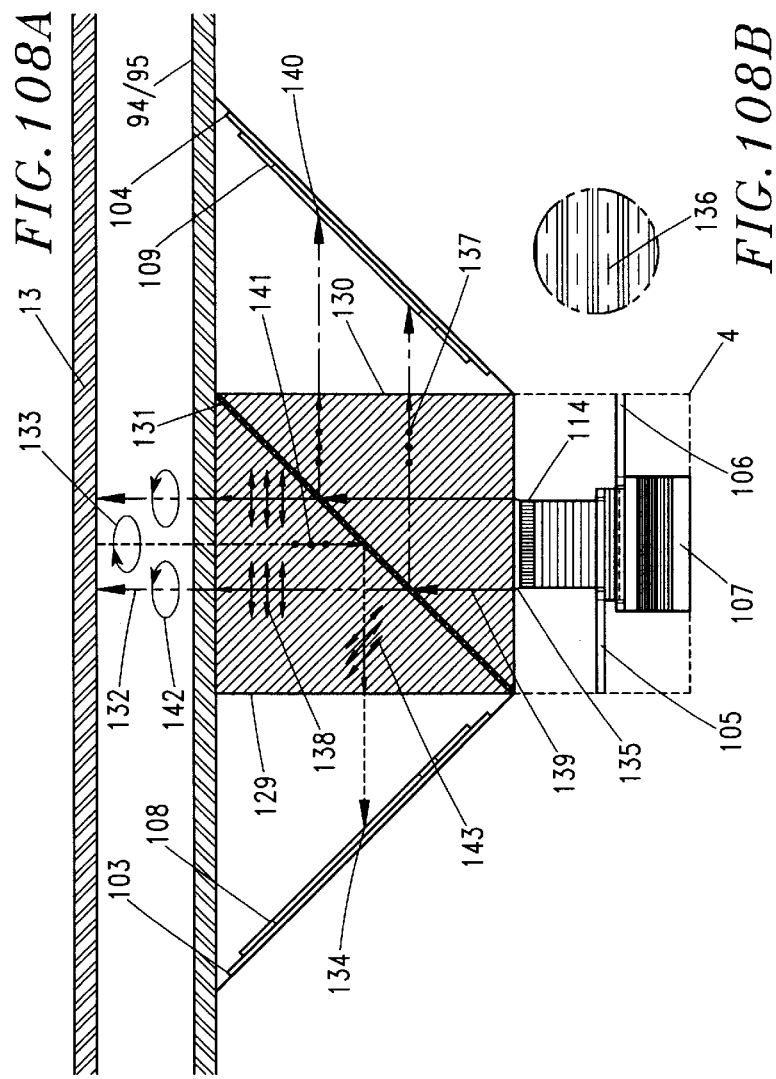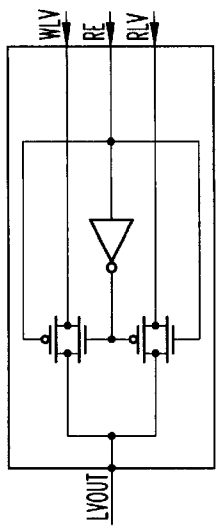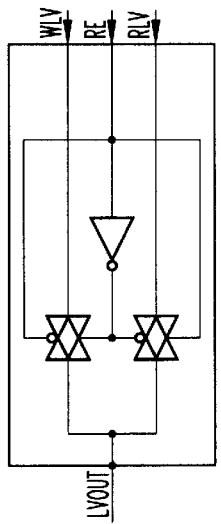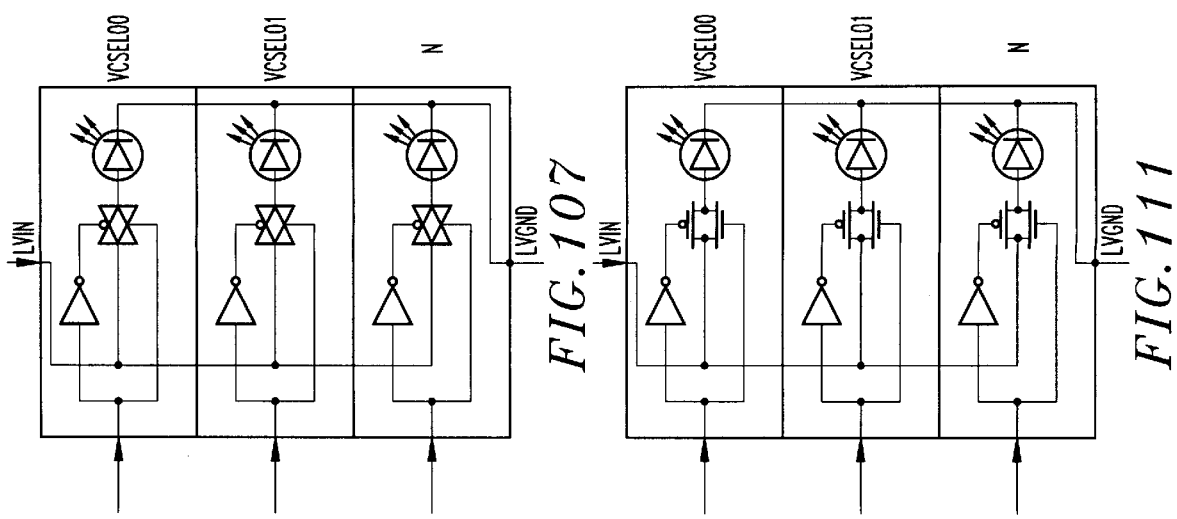

OPTICAL DATA STORAGE FIXED HARD DISK DRIVE USING STATIONARY MAGNETO-OPTICAL MICROHEAD ARRAY CHIPS IN PLACE OF FLYING-HEADS AND ROTARY VOICE-COIL ACTUATORS

CROSS-REFERENCE TO RELATED APPLICATIONS

Not Available

BACKGROUND—FIELD OF THE INVENTION

This invention is an optical data-storage hard disk drive that uses stationary Magneto-Optical Microhead Array Chips in place of conventional "Flying-Heads", "Rotary Voice-Coil Actuators", and other similar types of "Servo-Tracking" mechanisms. Furthermore, each Magneto-Optical Microhead Array Chip Hard Disk Drive will consist of at least, but not confined too, one disk-platter having two data-surfaces; wherein, the aforesaid data-surface will contain a multiplicity of concentric data-tracks that are rotated at a substantially constant angular velocity. In addition, each Magneto-Optical Microhead Array Chip is to be placed into a stationary position above each disk platter data-surface by a chip-positioning circuit board; wherein, the number of cylinder/tracks available to each Magneto-Optical Microhead Array Chip is determined by the number of (VCSEL) "Vertical Cavity Surface Emitting Laser" microheads contained within a Magneto-Optical Microhead Array Chip's microhead array (e.g., "325,000" vertical cavity surface emitting laser microheads would therefore equal "325,000" corresponding cylinder/tracks).

Moreover, each Magneto-Optical Microhead Array Chip will contain, within a single chip device, a VCSEL microhead array (e.g., an array containing a minimum of one thousand or a maximum of four billion individually addressable VCSEL microheads individually used as a light source during a read-data or write-data disk-operation), a microhead "Address Latch And Chip Select Circuit", a microhead "Address Decoder Circuit", a microhead "Address Buffer Circuit", a "VCSEL Microhead Power Control Circuit", a "Read Preamp Circuit", a "Read Decision Circuit", a "Read Buffer Circuit", a "Planar Induction Coil Control Circuit", a "Write Driver Circuit", a "Write Preamp Circuit", a "R/W Control Circuit", two reversed-biased "Semiconductor Photo-Conductor" linear position-sensing "Cadmium-Sulfide" photocell-array read-elements, or as an optional embodiment two reversed-biased "Semiconductor Silicon Photo-Diode" photocell-array read-elements (e.g., providing a optical read-data reference signal-voltage output and an optical read-data read signal-voltage output during read-data disk-operations), and two (BIMPICs) "Bi-Metal Planar Induction Coils" (e.g., used to vertically magnetize thermally confined disk-surface magnetic data-domains during write-data disk-operations).

Furthermore, and, with the exception of the beforementioned semiconductor photocell arrays, and (BIMPICs) "Bi-Metal Planar Induction Coils", each aforesaid Magneto-Optical Microhead Array Chip will have its various photonic and electronic semiconductor components constructed from a single "Silicon-Oxide" wafer; moreover, using conventional manufacturing methods, like (MBE) Molecular Beam Epitaxy, lithography, and chemically etching. In addition, if the beforementioned Magneto-Optical Microhead Array Chip contains a microhead array of three hundred and twenty-five thousand individual VCSEL microheads; wherein, each microhead within said microhead array has a diameter of 200-nm (i.e., "200" nanometers), the aforesaid Magneto-Optical Microhead Array Chip would measure "2.358" inches in length. And, furthermore, if a "2.358" inch Magneto-Optical Microhead Array Chip were used in a Magneto-Optical Microhead Array Chip Hard Disk Drive design, the beforementioned hard disk drive's form-factor would be a standard "3.5" inches. Every Magneto-Optical Microhead Array Chip installed into a hard disk drive's unit-assembly is assembled into one stationary fixed position; wherein, one Magneto-Optical Microhead Array Chip is positioned approximately one-micron above and perpendicular to every disk-platter data-surface used in a hard disk drive's unit-assembly. Furthermore, the individual VCSEL microheads contained within a microhead array have an emitter centerline to emitter centerline dimension of 300-nm; wherein, each VCSEL microhead emitter's top-surface has an elliptical dimension of "200"×"210" nanometers. Furthermore, these VCSEL dimensions are a-typical for any Magneto-Optical Microhead Array Chip installed into a hard disk drive unit-assembly.

In addition, the use of standard semiconductor lithography, etching, and masking techniques are used to manufacture a Magneto-Optical Microhead Array Chip's two (SPD) "Semiconductor Photo-Diode" photocell array circuits, microhead-address latch-decoder circuits, Chip-Selection chip-control circuits, data I/O circuits, pre-amplification circuits, data encoding/decoding circuits, and digital-signal processing circuits, along with a Magneto-Optical Microhead Array Chip's address, data, and control-bus circuits. In addition, the VCSEL microhead arrays contained within the Previously Mentioned Magneto-Optical Microhead Array Chips are created using (MBE) "Molecular Beam Epitaxy", or (MOVPE) "Metal-Organic Vapor-Phase Epitaxy"; moreover, two methods used in electro-optic manufacturing.

As demonstrated, within prior art, conventional flying-head assemblies (i.e., what are sometimes called "head stack assemblies") are simultaneously moved, as a group, to or from cylinder/track locations during a host-requested read-data or write-data disk-operation. As defined, data-tracks are closed concentric circles of sectored digital-data, which begin at the center of a disk-platter's data-surface and radiate out away from that center, one concentric circle after another, toward a hard disk drive disk-platter's outer-most circumference. Moreover, conventional prior art technologies use a Rotary Voice-Coil Actuator or (i.e., what is sometimes called a "Rotary Positioner") to accomplish track-to-track head-stack movements (i.e., the movement of a head-stack across a hard disk drive disk-platter's data surface from one concentric circle of sectored data to another).

However, during host-requested Magneto-Optical Microhead Array Chip Hard Disk Drive's disk-operations mechanical movements of the beforementioned Magneto-Optical Microhead Array Chips' VCSEL microheads, from one concentric cylinder/track to another, is unnecessary. Moreover, the beforementioned Magneto-Optical Microhead Array Chips, while containing a multitude of stationary VCSEL microheads, would already have, ready for use, one of its stationary VCSEL microheads positioned at a host-requested cylinder/track location. Therefore, unlike conventional electromechanical Rotary Voice-Coil head switching, and head stack positioning, the Magneto-Optical Microhead Array Chips electronically switch from one VCSEL microhead to another, digitally.

Furthermore, a Magneto-Optical Microhead Array Chip Hard Disk Drive's cylinder/track addressing numbers, and the beforementioned VCSEL microheads positioned above them, have the same address number locations. For example, during a host-requested disk-operation; wherein, a Magneto-Optical Microhead Array Chip Hard Disk Drive Disk Controller will address a single stationary VCSEL microhead; contained within a chip-selected Magneto-Optical Microhead Array Chip's microhead array; wherein, the aforesaid Disk Controller is also selecting a cylinder/track location, which is directly underneath the beforementioned microhead's fixed stationary position. Therefore, a cylinder/track location, and the beforementioned VCSEL microhead positioned above it, would consequently have the same addressing number and location. Furthermore, during a read or write-data disk-operation, a Magneto-Optical Microhead Array Chip Hard Disk Drive's Disk Controller will receive from a host computer, a request, to either read or write data at a particular disk-platter's data-surface and data-sector location and, therefore would contain:

(i) A data-head selection number (e.g., head number five, but sent as a binary code signal, like 00000101)*, which is translated and used by the aforesaid Disk Controller to select one particular stationary Magneto-Optical Microhead Array Chip that is located above a corresponding disk-platter, and, therein, data-surface, (ii) A cylinder/track locating address number (e.g., cylinder/track number fifty-four, but sent as a binary code signal, like 00110110)*, which is translated and used by the aforesaid Disk Controller to locate a VCSEL microhead, which is also located above a cylinder/track location having the same address number, moreover, a cylinder/track location that also contains the system requested data-sector's data or data-sector's data-less data-areas, (iii) A data-sector number (e.g., data-sector number twelve, but sent as a binary code signal, like 00001100) *, which is translated and used during a read-data or write-data disk-operation by the beforementioned Disk Controller to activate an address selected VCSEL microhead, and at a time when the data-sectors containing the system requested data is rotated into a position that is directly underneath an address selected VCSEL microhead, where a read-data or write-data disk-operation will occur. Note: * "0"=low-voltage electrical signals, while "1"=high-voltage electrical signals.

Furthermore, a Disk Controller that is used in a Magneto-Optical Microhead Array Chip Hard Disk Drive design will forward all system supplied microhead location address numbers to a Disk Controller's PCB located "Asynchronous Optical Microhead Address Controller" for translation. Wherein, the newly translated microhead location addressing number is to be forwarded to a chip-selected Magneto-Optical Microhead Array Chip, from the Asynchronous Optical Microhead Address Controller's (MAB) "Microhead Address Bus", as thirty-two low and/or high binary-signals. Therein, a chip-selected Magneto-Optical Microhead Array Chip will respond to these bus supplied binary-signals, by first latching the aforesaid thirty-two low and/or high binary-signals into its internally located "Address Latch And CSC" circuit; wherein, the decoding of said thirty-two low and/or high binary-signals can proceed.

Furthermore, the decoding of a VCSEL microhead's location addressing number will cause a single selection line leading to said VCSEL microhead to change from a logic-low voltage-signal to a logic-high voltage-signal, which will select the aforesaid VCSEL microhead, by giving it access to the (WLV) "Write Laser Voltage", and (RLV) "Read Laser Voltage" bus-line bus-signals, which are in turn used to activate a selected VCSEL microhead's laser-emissions. Consequently, a selected VCSEL microhead will have the same physical-location and address-number as a host-requested cylinder/track location; containing a data-sector(s) of requested read-data, during a read-data disk-operation, or an empty data-sector(s), during a write-data disk-operation. Consequently, its only after the selection of a stationary VCSEL microhead located over the requested cylinder/track location has been successfully accomplished, is the host-requested read-data or write-data disk-operation finally executed.

Furthermore, because the Magneto-Optical Microhead Array Chips are designed to be fully-integrated semiconductor devices; thereby, allowing the Magneto-Optical Microhead Array Chips to accomplish 200-ns (i.e., 200 nanosecond) "track-to-track" switching times or (i.e., what is sometimes called in conventional hard disk drive design "average seek times"). In addition, a Magneto-Optical Microhead Array Chip Hard Disk Drive design will use an "ID-less" sector-locating and tracking system.

Moreover, an ID-less sector-locating and tracking system has several advantages over the conventional "ID After Wedge" or "ID Before Sector" methods of sector locating and tracking. For example, the lack of an ID or "Identifier Field" written to a hard disk drive's disk-platters' data-surfaces, will regain approximately 4% of the beforementioned disk-platters' data-surfaces real estate, for end-user data-storage. Furthermore, in case of errors a "Sector-ID" is neither read nor corrected, during a read-data or write-data disk-operation, the overall data throughput for the beforementioned hard disk drive is also increased.

BACKGROUND—DESCRIPTION OF PRIOR ART

Magnetic and Magneto-Optical data-storage disk drives, particularly fixed hard disk drives, are valued because of several factors. Including, the disk drive's overall size (i.e., or what is sometimes referred to as "form factor"), data storage capacity, random access times (i.e., or what is sometimes referred to as "access time" or "average access time"), cost per data-byte stored, and (MTBF) "Mean Time Before Failure". Furthermore, when data-tracks are arranged as concentric-circles on a circular storage disk-platter, its outermost tracks or concentric track-circles are longer; therefore, having greater numbers of magnetic-storage data cell domains available than on a disk-platter's shorter innermost tracks of concentric track-circles. Furthermore, when data-storage disk-platters are rotated at a constant angular velocity the data transducers' head-sliders will fly at a faster and somewhat higher altitude above the beforementioned disk-platters outermost tracks, where relative head to disk velocity is greatest. On the flip side, however, when data-storage disks are rotated at a constant angular velocity the data transducers' head-sliders will fly at a slower and somewhat lower altitude above the beforementioned disk-platter's innermost tracks, where relative head to disk velocity is at a minimum.

Therefore, one known way to increase data-storage capacity of a fixed disk drive is to divide the data-storage surface into radial data-zones (i.e., sometimes called data-sectors) of concentric and circular data-tracks, and optimize the associated data-transfer rates to the smallest track (i.e., innermost data-track) within each particular radial data-zone (i.e., this is sometimes called zoned data recording). Typically, the number of data-sectors or data-fields within each concentric track may vary from data-zone to data-zone. Therefore, in order to switch from one data-zone to a different data-zone, it is necessary for a hard disk drive to adapt itself in real-time to a different number of data-sectors and a new data-rate for the switched to and different data-zone. Other known ways to increase data storage capacity, include a varying of disk rotation in function of the radial position of an optical-data transducer-head, while maintaining a data-transfer frequency-rate that is substantially constant, as in optical "Compact Disk" technologies, or varying a data-transfer frequency-rate with each data-track in function of the radial position of a magnetic-data transducer-head, while maintaining a disk-rotation as substantially constant, as in conventional magnetic, and non-conventional magneto-optical flying-head technologies.

Furthermore, another issue confronting the designer of a hard disk drive system is data-head positioning, and data-block transfer-rates. Typically, hard disk drive head positioning is carried out with a "Head Positioner" or "Rotary Voice-Coil Actuator", and normally involves track seeking operations for moving a hard disk drive's "Head-Stack" assembly from a departure data-track to a different destination data-track. Typically, this is done throughout the radial-extents of a disk-platter's data-surface storage area, while using various data-track following operations for causing a hard disk drive's head-stack to follow precisely one particular data-track, during data-block read-data or data-block write-data disk-operations. Therefore, to provide precise head-stack positioning, during a data-track seeking and following operation, some servo information must be provided to a Rotary Voice-Coil Actuator's tracking mechanism.

Furthermore, this servo information may be contained on a special data-surface written exclusively with servo-information (i.e., sometimes called a "dedicated servo surface"), or may be externally supplied by an "Optical Encoder" coupled to a head-stack assembly's positioning arm, or may be supplied from servo-information interspersed and embedded among the data-fields within each circular concentric data-track. In addition, one other approach not mentioned before is provided by the "Open Loop Stepper-Motor" head-stack positioning servo technique; wherein, the positional stability of a data-head at any selected data-track location is provided by the electromagnetic detents of a hard disk drive's Stepper-Motor. Consequently, when servo-information is embedded on a data-surface formatted for Zoned-Data-Recording, several complications may arise in the reliably of providing robust servo-head positioning information. Therefore, there must be sufficient embedded information to provide stability to the "Servo-Loop" and to provide positional responses during the high-speed portions of track-seeking and track-following operations, so that velocity or position profiles may be adjusted on the fly, based on present head-velocity or head-position at the time of servo-sampling. Typically, if the servo-information is recorded at the same data-rate and in positional relationship with the recorded data-blocks, as has been conventionally employed in prior art; servo-architecture is normally complex enough to switch data-rates and servo-positions.

However, if regularly spaced servo-information were radially placed across data-storage disk-platter data-surfaces, while splitting some of the data-fields, located on the aforementioned data-surfaces, into segments, data-zones, when crossed-over, could cause serious complications to arise when trying to read each "Split Data Field" as a single data-block. Furthermore, the beforementioned disk-platter's rotational velocity must be constantly monitored and carefully maintained at a predetermined constant angular velocity for the aforesaid "Split Data Field" scheme to function properly; therefore, adding additional complexity to the servo-tracking system. In addition, data-fields are conventionally managed by what is normally called a "Data Sequencer"; wherein, a Disk Controller's Data Sequencer may include an "Encoder and Decoder" unit, which is used to transform (NRZ) "Non-Return to Zero" data-streams, into other, more manageable, data-formats. For example, as in, a three-to-two 1,7 (RLL) "Run Length-Limited" code; moreover, used to achieve a compression of data relative to the "Flux-Transition Density" on a disk-platter's data-surface (i.e., 1,7 RLL coding is based upon three code-bits or groups for two non-encoded data-bits, but results in a four-to-three overall data compression rate permitting more data to be recorded on a disk-platter's data-surface, per the number of flux-transitions that may be contained within a disk-platter's magnetic domain-cells).

Furthermore, a Disk Controller's Data Sequencer conventionally performs the task of decoding "Data Sector Overhead" information in order to locate a desired data-sector storage location, and to obtain information relating to the correctness or validity of the data being read back from a particular data-sector storage location. Typically, a Data Sequencer is implemented as a state-machine that will conventionally monitor all incoming data-flow in order to locate a particular data-ID "Preamble-Field", a particular data-ID "Address Mark", a particular data-ID "Sector-Field", a particular data-ID "Data-Field", and a small number of "Error Correction Syndrome" bytes appended to the end of said data-ID "Data-Field".

Moreover, the aforementioned Data Sequencer will cause the appropriate action to be taken as each of the aforementioned fields are identified and located. For example, if a data-block contained within a "Data-Field" of a particular cylinder/track's data-sector location being sought after, the aforementioned Data Sequencer will compare incoming data-ID "Sector-Field" information with the sought after data-sector information stored in a particular register. Moreover, when a positive comparison occurs a Disk Controller's Data Sequencer will cause the data-block read from the data-ID Data-Field, via a magnetic-transducer data-head and hard disk drive read-channel; moreover, to be sent to a Buffer Controller's "block buffer memory" location; wherein, its "Error Correction Syndrome" remainder-bytes are checked, and if there are no detected errors within the read data-block, as determined by analyzing the (ECC) "Error Correction Code" remainder-bytes, the data-block is sent from the Buffer Controller's block buffer memory location to the host-system computer through a suitable interface, such as the (SCSI) "Small Computer System Interface", or the (IDE/ATA-2) "Integrated Drive Electronics/AT Attachment" interface.

Moreover, in conventional magnetic and non-conventional magneto-optical hard disk drive designs, each data-sector is individually handled in response to a specific-input from a supervisory microcontroller. Furthermore, as a particular data-sector is read, the aforementioned supervisory microcontroller will inform a Disk Controller's Data Sequencer, whether to read, or not to read, the next contiguous data-sector into a Disk Controller's buffer cache memory; moreover, causing a supervisory microcontroller's intervention to occur for every data-sector being processed. Typically, this is done with a programmable "Sector Counter", which is preset by a supervisory microcontroller to a desired sector count; wherein, a Data Sequencer can process data-sectors sequentially until the count in the aforementioned "Sector Counter" is reached. However, some hard disk drive designs do not use, or normally include within their designs, the complication of Zoned Data-Recording and Split Data-Fields. Therefore, head-stack positioner stability in some hard disk drive designs is provided by an "Optical Encoder"; coupled between a rotary head-stack positioner and its drive-base, which foregoes the use of "Embedded Servo-Sectors", as is conventional within some prior art.

Furthermore, while split-data recording schemes have been proposed in prior art, recent proposals have appointed the supervisory microcontroller with the responsibility of managing each Split Data-Field layout in "real-time". However, this leads to a tremendous level of bus-traffic control between a supervisory microcontroller and a Disk Controller's Data Sequencer, during a hard disk drive's read-data or write-data disk-operations. Therefore, precluding the aforementioned supervisory microcontroller from performing other useful tasks, such as head-positioning servo-supervision, error-correction, and command-status exchanges with the host computer system, which are communicated over a hard disk drive's interfacing bus-structure. Furthermore, to function effectively the beforementioned supervisory microcontroller approach would require a separate supervisory microcontroller for data-transference; meaning that at least two supervisory microprocessors would be required to implement a hard disk drive's command architecture and overall disk-operation.

SUMMARY OF THE INVENTION

In accordance with the present invention a magneto-optical hard disk drive that uses stationary Magneto-Optical Microhead Array Chips instead of conventional Flying-Head technologies, like Rotary Voice-Coil Actuators or Rotary Positioners, to execute track seeking operations throughout the radial-extent of the data-platters of a Magneto-Optical Microhead Array Chip Hard Disk Drive, using an electronically controlled data-track switching operation that causes one optical microhead located above one particular data-track location to switch off, while another optical microhead located above a different data-track location is switched on.

Objects and Advantages

Accordingly, besides the objects and advantages of the Microhead Array Chip Hard Disk Drive described in my patent above, several objects and advantages of the present invention are:

(a) A general object of the present invention is to provide a fixed disk magneto-optical data storage device that overcomes several limitations and drawbacks present in the prior art previously disclose;

(b) to provide a magneto-optical hard disk drive that uses a dedicated head-to-track system. Where each installed Magneto-Optical Microhead Array Chip could have a minimum of one-thousand or maximum of four-billion stationary, individual, and addressable read and write VCSELs constructed into each Magneto-Optical Microhead Array Chip's microhead array;

(c) to provide "average access times", or the amount of time it takes to find requested data by moving the head stack assemblies from one data-track to another data-track as described in the prior art, but for the Magneto-Optical Microhead Array Chip Hard Disk Drive the average access time is about "150" nanoseconds in duration.

Further objects and advantages are to provide stationary Magneto-Optical Microhead Array Chips instead of Head Sliders, Air-Bearings, and Rotary Voice-Coil Actuators (i.e., sometimes called "Rotary Positioners"); conventional flying-head technologies, presently used in prior art hard disk drive design. Therefore, a Magneto-Optical Microhead Array Chip Hard Disk Drive is primarily a dedicated VCSEL microhead to data-track information storage system. Wherein, each beforementioned Magneto-Optical Microhead Array Chip will have a minimum of one thousand or the maximum of four billion stationary, individual, and addressable read/write VCSEL microheads, which are constructed into every Magneto-Optical Microhead Array Chips' microhead array.

Furthermore, data-track access times or what is normally called "the average seek time", which is the amount of time it takes to find a requested data-track by moving a hard disk drive's head-stack assembly from one data-track location to another, as described in prior art; moreover, is a principle benchmark used in rating the performance of a hard disk drive's system of data access. Therefore, if the "average seek times" as described above were decreased in any way for any particular hard disk drive design; moreover, this would demonstrate a marked improvement for that particular hard disk drive's design. Typically, conventional flying-head hard disk drive designs have their "average access times" normally measured in "milliseconds" or thousandths of a second.

Therefore, when using milliseconds as the unit of measure, a typical "average seek time" of 8.5-milliseconds is to be considered normal for conventional flying-head hard disk drive designs. However, a hard disk drive design based upon the Magneto-Optical Microhead Array Chip Hard Disk Drive design, while having at least one Magneto-Optical Microhead Array Chip positioned for and over each data-surface located within a Magneto-Optical Microhead Array Chip Hard Disk Drive's unit-assembly. Wherein, VCSEL microhead array's, containing individual microheads, are located into stationary positions over every concentric data-track circle, located on every disk-platter data-surface; moreover, individual microheads ready to read or write data-blocks to or from the previously mentioned concentric data-track circle data-sectors.

Consequently, the "average seek time" bench-mark ratings for any flying-head (i.e., Magneto-Optical or conventional magnetic) hard disk drive design is easily challenged when using a Magneto-Optical Microhead Array Chip's approach to hard disk drive design. Because, unlike the slow mechanical track-to-track switching that is used by conventional "Rotary Positioned" flying-head technologies, the high speed data-track switching from one data-track location to another; occurs, for a Magneto-Optical Microhead Array Chip Hard Disk Drive design, electronically, inside said Magneto-Optical Microhead Array Chip. Therefore, instead of using "milliseconds", or thousandths of one second to measure "average seek time" time periods, "nanoseconds", or billionths of one second, are instead, used to measure the high speed "average seek time" and "full stroke seek time" time periods occurring within a Magneto-Optical Microhead Array Chip Hard Disk Drive.

Therefore, by using semiconductor-based transmission-gates to execute a process of selection and switching-on for any particular VCSEL microhead; present within a beforementioned microhead array; new high-speed "average-seek-time" benchmark ratings have been made possible. Typically, semiconductor transmission-gates have their operational-speeds measured in nanoseconds (i.e., a single CMOS transmission-gate can change its electrical state at around 5.0-nanoseconds). Therefore, a Magneto-Optical Microhead Array Chip's "average seek times" or its "track to track average seeks"; moreover, is in reality the amount of time it takes, to switch-off a previously used selection line to switching-on a new selection line that leads to a particular VCSEL microhead that is located in a stationary position over a host-requested cylinder/track location.

Furthermore, by calculating the amount of time it takes for a chip-selected Magneto-Optical Microhead Array Chip's "Asynchronous Optical Microhead Address Controller" to receive a new thirty-two bit microhead-location-address from a Magneto-Optical Microhead Array Chip Hard Disk Drive's Disk Controller, adding in the time it takes for a single microhead selection line to become high-enabled, an "average seek time" of around "200 ns" (i.e., 200 nanoseconds) can be determined. Moreover, if using CMOS transmission-gates, this new "average seek time is calculated to be about two thousand times faster than the "average seek times" or "full stroke seek times" for any flying-head hard disk drive design in existence today. Consequently, this demonstrates, over prior art, an incredible increase in the "average seek time" performance ratings for the Magneto-Optical Microhead Array Chip Hard Disk Drive design.

Furthermore, the Magneto-Optical Microhead Array Chip Hard Disk Drive design approach will also improve the (MTBF) "Mean Time Before Failure", or useful life benchmark rating normally used by hard disk drive designers to predicate a particular hard disk drive design's usefulness before said hard disk drive design has a failure. This, improvement in the (MTBF) "Mean Time Before Failure", or useful life benchmark rating, is accomplished, by eliminating, from the Magneto-Optical Microhead Array Chip Hard Disk Drive design, the head-stack and rotary voice-coil assemblies normally used in conventional flying-head hard disk drive designs.

Furthermore, about "60%" of all conventional flying-head hard disk drive fatal-error crashes are the direct result of rotary voice-coil and/or Spindle-Motor mechanical malfunctions or failures. When, examining this further, we find that flying-heads, in striving to maintain a designed flying-height distance of "0.5" to "2.5" microns above disk-platter data-surfaces, on what is sometimes called an "air-bearing", the beforementioned flying-heads are therefore never meant to make physical contact with said disk-platter data-surfaces, as they do, during fatal-error hard disk drive crashes, which always results in data loss. Typically, the production of an air bearing is accomplished through the aerodynamic design of flying-head head-sliders. In fact, within a conventional rotary positioned flying-head hard disk drive design, a head-slider's flight distance, which is normally "0.5" to "2.5" microns, would be difficult, if not impossible to achieve, were it not for the aerodynamic design of conventional flying-head head-sliders, and the air-bearings that they produce.

Furthermore, fatal-error hard disk drive crashes most often occur when a Spindle-Motor's power supply fails, or the hard disk drive, during a read-data or write-data disk-operation, is suddenly shaken or dropped, while the hard disk drive's head-stack assembly has not been properly repositioned into an innermost disk-platter area (i.e., sometimes called the head-stack parking area), but merely located over a data-surface when any of the malfunctions mentioned occurs. Consequently, during a power-supply failure a hard disk drive's Spindle-Motor will lose its momentum and begin to spin down; wherein, the head-slider air-bearings will begin to decay, and no longer maintain necessary aerodynamic lift for the beforementioned head-sliders.

Therefore, a conventional flying-head hard disk drive's head-stack assembly, not being repositioned into said head-stack parking area, and being subject too complete loss of head-slider air-bearings, the beforementioned hard disk drive flying-heads will make physical contact with the beforementioned disk-platter data-surfaces; ultimately, crashing into the data-sector areas located on the aforesaid hard disk drive's data-surfaces; moreover, destroying any previously recorded data therein. Typically, this kind of failure is normally referred to as a "hard disk crash" or "hard disk fatal-error crash" and accounts for about "60%" of all conventional flying-head hard disk drive failures.

Furthermore, the root-cause behind many hard disk drive failures is a Disk Controller's failed BIOS system or BIOS system-chip, or a Spindle-Motor's power-supply malfunctioning. Nevertheless, whatever the root-cause might be, the end-result is always the same, hard disk drive crashes and severe data-loss. In the event a Magneto-Optical Microhead Array Chip Hard Disk Drive should suffer a hard disk fatal-error crash, the severe data-loss that is normally associated with these hard disk drive fatal-error crashes, because of a Magneto-Optical Microhead Array Chip Hard Disk Drive's stationary microhead design, will not ever occur. Although, a Magneto-Optical Microhead Array Chip Hard Disk Drive's Spindle-Motor should fail or if there is some kind of Disk Controller (BIOS) "Basic-In-Out System" system-chip failure, the Magneto-Optical Microhead Array Chips, which contain the VCSEL microhead arrays are stationary; positioned by chip-positioning circuit boards about "1.0" micron above the hard disk drive disk-platter data-surfaces. Therefore, unless a Magneto-Optical Microhead Array Chip itself fails or malfunctions the Magneto-Optical Microhead Array Chips are never moved, or repositioned in any way, once installed into a Magneto-Optical Microhead Array Chip Hard Disk Drive unit-assembly. Consequently, by using the stationary Magneto-Optical Microhead Array Chip approach to hard disk drive design, we have eliminated the need for any head-sliders, air-bearings, and rotary voice coils along with their potential for hard disk drive fatal-error crashes. Ultimately, this will double the MTBF benchmark rating for any hard disk drive design that uses the Magneto-Optical Microhead Array Chip Hard Disk Drive design approach.

Another specific object of the present invention is the use of two (BIMPICs) "Bi-Metal Planar Induction Coils", which are positioned at the top-center of every Magneto-Optical Microhead Array Chip device, and surrounding an embedded VCSEL microhead array; wherein, the beforementioned BIMPICs will be wound together as two core-less induction coils with two independent positive-pole inputs and two independent negative pole outputs, and having twenty-five horizontal coil-winding turns for each of the two BIMPIC coils. Moreover, the use of two BIMPICs will improve a VCSEL microhead array's ability to write "magnetic-flux transitions" to disk-platter data-surfaces. However, an increase in the BIMPIC's coil-winding turns has an inherent design-flaw, which occurs in all induction coil designs, and that flaw is sometimes called "reactance distortion". Although, an increase in the number of coil-winding turns used in a BIMPIC device increases the strength of its "magnetic flux transitions" proportionally with every extra coil-winding turn. This will, however, also decrease a BIMPIC coils ability to respond to the fast current-reversals that are necessary in an induction coil data-head design used by today's high-speed data-storage systems. Furthermore, "reactance-distortion" is why conventional high-frequency flying-head designs use no more than five induction coil coil-winding turns per flying-head yoke-core. In addition, this low coil-winding turn approach to induction coil data-head design is why conventional flying-head head-sliders are now being flown at "1.0" microns, or less, above hard disk drive disk-platter data-surfaces. Typically, in (AC) "Alternating Current" circuits, inductors and capacitors will build up voltages that oppose the directional flow of current; moreover, this opposition is referred to as "reactance".

Furthermore, the "reactance-distortion" produced by inductance is proportional to the frequency of an alternating current; whereas, the "reactance-distortion" produced by capacitance is inversely proportional to the frequency of an alternating current. However, the "reactance-distortion" that is responsible for poor high-frequency responses within a high-turn induction coil's analog-signal can now be circumvented. Moreover, and, unlike conventional single induction coil flying-head designs, the Magneto-Optical Microhead Array Chips will use two twenty-five coil-winding turns per BIMPIC coil used within its design. Furthermore, every Magneto-Optical Microhead Array Chip will have an "Alpha" BIMPIC coil that is dedicated to binary "1" data-bits, and a "Beta" BIMPIC coil that is dedicated to binary "0" data-bits. Ultimately, the effect of "reactance-distortion" will still occur in the high-turn BIMPIC's used in the Magneto-Optical Microhead Array Chips, but because each BIMPIC coil is dedicated to and used only by its particular current direction and logic bit-state; current-reversals within a Magneto-Optical Microhead Array Chip's "Alpha" and "Beta" BIMPIC coil's will simply never occur.

In addition, the coil switching and rotation of use between the beforementioned Magneto-Optical Microhead Array Chip's "Alpha" and "Beta" BIMPIC coil's will replace the conventional single induction coil current reversals normally used by prior art hard disk drives during write-data disk-operations. Therefore, high-frequency analog-signals can now be used in high-turn induction coils to write-data to a disk-platter data-surface without the interference and distortion caused by "reactance".

Moreover, during a host-requested write-data disk-operation a "Rotate Toggle" or induction coil selection-switching between the beforementioned two BIMPIC coils used in a Magneto-Optical Microhead Array Chip; moreover, will occur, for every modulated data-bit's recording period. Moreover, the previously mentioned induction coil selection-switching between the beforementioned two BIMPIC coils is controlled by a data demodulation signal that is supplied by a Disk Controller's Data Sequencer; moreover, a demodulation signal, which is sent down the beforementioned hard disk drive's data-bus to all the Magneto-Optical Microhead Array Chips installed into a Magneto-Optical Microhead Array Chip Hard Disk Drive's unit-assembly, but will effect only one Magneto-Optical Microhead Array Chip; chip-selected through a particular (CS) "Chip-Select" control line, while all other Magneto-Optical Microhead Array Chips are consequently ignored.

Furthermore, during a host-requested read-data disk-operation, a chip-selected Magneto-Optical Microhead Array Chip's "Alpha" and "Beta" BIMPIC coils are simultaneously "Switch-Toggled Off", during a read-data disk-operation, by a logic-low control signal; called the (-WE) "Write Disable" control signal. Furthermore, the (-WE) "Write Disable" logic-low control signals, coming from a "R/W Control Circuit" located within every Magneto-Optical Microhead Array Chip, will enter the internal (WE) inputs of four write-channel I/O data circuits, including the (PICCC) "Planar Induction Coil Control Circuit"; wherein, this will disable a Magneto-Optical Microhead Array Chip's write-channel, during a read-data disk-operation. Simultaneously, the (RE) "Read Enable" logic-high control signals, coming from a beforementioned "R/W Control Circuit" located within every Magneto-Optical Microhead Array Chip, will enter the internal (RE) inputs of four read-channel I/O data circuits; wherein, they will enable a Magneto-Optical Microhead Array Chip's read-channel, during a read-data disk-operation.

Furthermore, the beforementioned "Switch Toggled Off" machine-state of a chip-selected Magneto-Optical Microhead Array Chip's two BIMPIC coils, during a read-data disk-operation, is done because, the beforementioned two BIMPIC coils are only used for writing data, during a write-data disk-operation, but not for reading data, during a read-data disk-operation. However, during a host-requested write-data disk-operation, a chip-selected Magneto-Optical Microhead Array Chip's "Alpha" and "Beta" BIMPIC coils are simultaneously "Switch-Toggled On", during a write-data disk-operation, by a logic-high control signal; called the (WE) "Write Enable" control signal.

Furthermore, the (WE) "Write Enable" logic-high control signals, coming from a "R/W Control Circuit" located within every Magneto-Optical Microhead Array Chip, will enter the internal (WE) inputs of four write-channel I/O data circuits, including the (PICCC) "Planar Induction Coil Control Circuit"; wherein, they will enable a Magneto-Optical Microhead Array Chip's write-channel, during a write-data disk-operation. Simultaneously, the (-RE) "Read Disable" logic-low control signals, coming from a "R/W Control Circuit" located within every Magneto-Optical Microhead Array Chip, will enter the (RE) inputs of four read-channel I/O data circuits; wherein, they will disable the Magneto-Optical Microhead Array Chip's read-channel, during a write-data disk-operation. Moreover, a chip-selected Magneto-Optical Microhead Array Chip's "Alpha" and "Beta" BIMPIC coils are simultaneously "Switch-Toggled On", and "Rotate-Toggled", during read-data disk-operations.

Furthermore, during a host-requested write-data disk-operation a Disk Controller's Data Sequencer will send an encoded and modulated data-stream signal via the data-bus to all of the installed Magneto-Optical Microhead Array Chip's (DIN) "Data-In" input-contacts, which are located on all of the installed Magneto-Optical Microhead Array Chips at pin-number "63". Moreover, the beforementioned encoded data-stream signal, after entering the DIN input-contact at pin-number "63" at all of the installed Magneto-Optical Microhead Array Chips, is rerouted internally to two different Magneto-Optical Microhead Array Chip data-modulating circuit areas. Furthermore, the first rerouted encoded data-stream signal is sent to a (DMOD1) "Data Modulation 1" input of a one (WDC) "Write Driver Circuit", which is internally located within a chip-selected Magneto-Optical Microhead Array Chip device.

In addition, the second rerouted encoded data-stream signal is sent to a (DMOD2) "Data Modulation 2" input of a one (PICCC) "Planar Induction Coil Control Circuit", which is also internally located within a chip-selected Magneto-Optical Microhead Array Chip device.

Furthermore, the beforementioned second encoded data-stream signal, which is re-routed to an input of a flip-flop circuit located within the aforesaid (PICCC) "Planar Induction Coil Control Circuit"; wherein, the beforementioned second encoded data-stream signal is split into two temporally overlapping control-signal outputs, by the aforesaid flip-flop circuit; wherein, the beforementioned, and simultaneously created control-signal outputs, will have a signal-state that is opposite from one-another, during every data-modulation time period occurring within the aforesaid flip-flop circuit.

Furthermore, these temporally opposing flip-flop control-signal outputs used to "Rotate Toggle" (i.e., to switch on and off) the eight transmission-gates, which are responsible for toggling on and off the beforementioned "Alpha" and "Beta" BIMPIC coil's accessibility to the data-modulated (WDC) "Write Driver Circuit's" continuously powered data-writing bus-line. Furthermore, the beforementioned flip-flop circuit's control-signal "01" is placed upon output-line line-number "01", which will connect to four transmission-gate control inputs that control the "Alpha" BIMPIC coil's access to the continuously powered data-writing bus-line, and at the same time the beforementioned flip-flop circuit's control-signal "02" is placed upon output-line line-number "02", which will connect to four other transmission-gate control inputs that control the "Beta" BIMPIC coil's access to the continuously powered data-writing bus-line. For example, when the aforesaid flip-flop circuit's DMOD2 input receives a modulated logic-high control-signal, the beforementioned flip-flop circuit's output-line line-number "01" will itself go high, opening the "Alpha" BIMPIC coil's access to the continuously powered data-writing bus-line, while at the same time the aforesaid flip-flop circuit's output-line line-number "02" will itself go low, closing the "Beta" BIMPIC coil's access to the continuously powered data-writing bus-line. However, when the aforesaid flip-flop circuit's DMOD2 input receives a modulated logic-low control-signal, the beforementioned flip-flop circuit's output-line line-number "01" will itself go low, closing the beforementioned "Alpha" BIMPIC coil's access to the aforesaid continuously powered data-writing bus-line, while at the same time the aforesaid flip-flop circuit's output-line line-number "02" will itself go high, opening the beforementioned "Beta" BIMPIC coil's access to the aforesaid continuously powered data-writing bus-line.

Another specific object of the present invention is the chip-positioning circuit board design for the Magneto-Optical Microhead Array Chip Hard Disk Drive. Furthermore, a Magneto-Optical Microhead Array Chip Hard Disk Drive unit-assembly having at least one data-storage disk-platter with two data-surfaces; containing a multiplicity of concentric and circular data-tracks; rotated at a substantially constant angular velocity; moreover, with a stationary Magneto-Optical Microhead Array Chip positioned by an aforesaid and specially designed circuit board; positioned over every disk-platter data-surface installed into a particular Magneto-Optical Microhead Array Chip Hard Disk Drive unit-assembly.

Furthermore, the beforementioned chip-positioning circuit boards are designed to be very rigid, non-flexible, and lightweight. A non-flexible chip-positioning circuit board design is important because of a critical distance maintained between the VCSEL microheads and the Magneto-Optical Microhead Array Chip Hard Disk Drive disk-platter data-surfaces. Moreover, in order to achieve the maximum rigid support for the Magneto-Optical Microhead Array Chips the beforementioned chip-positioning circuit boards must not exhibit any flexible surface areas. Consequently, said chip-positioning circuit boards'core structures must be fabricated from a lightweight and rigid material, for example, a material like "Titanium" or a "Carbon-Graphite Composite" material. Furthermore, the outer surfaces of the chip-positioning circuit boards'core structures will need to be coated with several layers of insulating fiberglass. The purpose of fiberglass layers is to contain, and insulate; the copper circuit-traces that connect the Magneto-Optical Microhead Array Chips surface mounted chip-socket circuit-board contacts to the chip-positioning circuit boards' "Polymer Flex-Cable Connector" circuit-board contacts.

Another specific object of the present invention is how a Magneto-Optical Microhead Array Chip Hard Disk Drive uses a "Bi-Phase Data Encoding" scheme (i.e., sometimes called "Bi-Phase-L" or "Manchester NRZ") to resolve the data-transfer frequency-rates for any particular data-zone, during a host-requested read-data disk-operation, instead of "Preamble-Fields", which contain the predetermined sync-patterns typically read by a Disk Controller's analog (PLL) "Phased-Locked Loop" circuit, and stored in a Disk Controller's "Data Sequencer" to resolve data-transfer rates, during read-data disk-operations, as shown in prior art. However, the "Data Sequencer" used in a Magneto-Optical Microhead Array Chip Hard Disk Drive design has within itself a "Data-transfer frequency-rate Frequency-Analyzer" circuit, which calculates the optimal data-transfer frequency-rates for any data-zone a host-computer system has requested read-data.

Moreover, the "Data Sequencer" used in a Magneto-Optical Microhead Array Chip Hard Disk Drive design sends this data-transfer frequency-rate calculation to its Disk Controller's "Multi Frequency Clock Synthesizer" circuit, which in turn will generate a clock-synthesized "dclock-signal" at the data-transfer frequency-rate that was pre-calculated for the host-computer system's requested data-zone. In addition, said Disk Controller's "Multi Frequency Clock Synthesizer" circuit will send the "dclock-signal" to a chip-selected Magneto-Optical Microhead Array Chip that is positioned over disk-platter data-surface containing the host-computer system's requested read-data. Furthermore, a Disk Controller's "Multi Frequency Clock Synthesizer" generated "divided clock" or "dclock-signal" is sent via a Magneto-Optical Microhead Array Chip Hard Disk Drive's control-bus to a chip-selected Magneto-Optical Microhead Array Chip's "dclock-signal" input contact, which is located on every Magneto-Optical Microhead Array Chip as pin-number "36", the Magneto-Optical Microhead Array Chip's (CLK) "Clock" dclock-signal input.

Furthermore, within every Magneto-Optical Microhead Array Chip a Disk Controller's "Multi Frequency Clock Synthesizer" generated "dclock-signal", and a chip-selected Magneto-Optical Microhead Array Chip's post-amplified (NRZ) "None Return to Zero" read-channel output data-stream signals, are simultaneously rerouted to a chip-selected Magneto-Optical Microhead Array Chip read-channel's (XOR) "Exclusive OR" circuit's two inputs for data-encoding. Moreover, a chip-selected Magneto-Optical Microhead Array Chip read-channel's XOR circuit will average the beforementioned two re-routed input signals; producing therefrom a "Bi-Phase Encoded Data Stream" (NRZ) "None Return to Zero" data-stream output signal at pre-calculated data-transfer frequency-rates, which is sent to a Magneto-Optical Microhead Array Chip's (Dout) "Data-Out" output contact, which is located on every Magneto-Optical Microhead Array Chip as pin-number "64", the Magneto-Optical Microhead Array Chip's (Dout) "Data-Out" signal output.

In addition, the beforementioned "Bi-Phase Encoded Data Stream" (NRZ) "None Return to Zero" data-stream output signal is re-routed from a Magneto-Optical Microhead Array Chip's (Dout) "Data-Out" output, through a Magneto-Optical Microhead Array Chip Hard Disk Drive's data-bus flex-cable, to a Data Sequencer's (RD DATA) "Read Data" circuit input; wherein, it is re-routed to a Data Sequencer's (DPLL) "Digital Phased-Locked Loop" for processing. Moreover, a Data Sequencer's (DPLL) "Digital Phased-Locked Loop" circuit, which is located within a Disk Controller's "Data Sequencer" will perform recovery of the beforementioned "dclock-signal"; contained in a chip-selected Magneto-Optical Microhead Array Chip's "Bi-Phase Encoded Data Stream" output signal.

Furthermore, during a host-requested read-data disk-operation a recovered "delock-signal" is used by a Data Sequencer's "Data Transfer Rate Frequency Analyzer" and "Multi Frequency Clock Synthesizer" circuit to resolve data-transfer frequency-rates for any data-zone needing to be read. In addition, the beforementioned Data Sequencer will accomplish "data-signal synchronization" between a hard disk drive's Disk Controller and the hard disk drive's Magneto-Optical Microhead Array Chips; moreover, by doing various on-the-fly data-transfer frequency-rate comparisons as read-data is being read, during a read-data disk-operation.

Moreover, the beforementioned Data Sequencer's "Data Transfer Rate Frequency Analyzer" will first do a frequency-rate comparison between the aforesaid bi-phase encoded data stream's recovered "dclock-signal" and the data-transfer frequency-rates of the "Multi Frequency Clock Synthesizer" circuit's "dclock-signal" originally sent to a chip-selected Magneto-Optical Microhead Array Chip read-channel XOR's pre-DPLL circuit, at the beginning of the aforesaid host-system requested read-data disk-operation. Furthermore, the beforementioned synchronization is electronic; therefore, will recover more of a Magneto-Optical Microhead Array Chip Hard Disk Drive's overall disk real estate, by eliminating the "data rate preamble sync marks"; normally placed on prior art hard disk drive disk-platter data-surfaces; using disk space that an end-user could use for their own data-storage needs.

Furthermore, the data-transfer frequency-rates determined by data-rate preamble sync-mark read processes can also be affected by "Spindle Motor" rotational fluctuations; resulting in rotational speed-variances, which could cause read-errors or even data-loss, during a data-transfer disk-operation. Moreover, by recovering the "dclock-signal" from a chip-selected Magneto-Optical Microhead Array Chip read-channel's bi-phase encoded data-stream output signal for a data-zone being read; moreover, a Disk Controller's Data Sequencer can easily resolve any data-transfer frequency-rate that might be needed for a host-requested read-data disk-operation. Furthermore, the bi-phase data encoding scheme will also make it possible for a Disk Controller's Data Sequencer to convert the incoming bi-phase encoded data-stream signals into NRZ data-stream digital signals by a Data Sequencer's (DPLL) "Digital Phased-Locked Loop" circuit.

In addition, the beforementioned (NRZ) "None Return to Zero" data stream digital-signals are then re-routed to a Disk Controller's internal "Buffer Controller" to be converted into double-word data-packets for buffer-to-interface data-transfer operations. In addition, the bi-phase data encoding scheme for a chip-selected Magneto-Optical Microhead Array Chip read-channel's output signals, will also make it possible for the beforementioned Data Sequencer's DPLL circuit to quickly achieve, and with greater accuracy, a digital phased locked-loop with an incoming bi-phase encoded data stream signal. Furthermore, by using a bi-phase data encoding scheme to encode raw read-data the use of parity bits, or the act of placing an "odd-parity bit" at the end of every eight-bit word, to eliminate any possibility of all eight-bits from being high making the beforementioned eight-bit word incompatible with any phased locked-loop, is eliminated.

In addition, a Magneto-Optical Microhead Array Chip read-channel XOR's bi-phase data encoding scheme, used in concert with a Data Sequencer's DPLL circuit, will ensure greater accuracy, when determining an optimal data-transfer frequency-rate for any particular data-zone needed to be read by the host-computer. Furthermore, this design approach will also promote faster phased locked-loops for quicker data-transfer synchronization between a Disk Controller and a Magneto-Optical Microhead Array Chip Hard Disk Drive's installed Magneto-Optical Microhead Array chips.

Another specific object of the present invention is its Disk Controller's "Asynchronous Optical Microhead Address Controller"; moreover, an (ASIC) "Application-Specific Integrated Circuit" processor design that is based upon an asynchronous pipeline architecture, which can simultaneously execute the Magneto-Optical Microhead Array Chips microhead-addressing and microhead chip-controlling internal processes through "address pre-fetching", "instruction overlapping", and "multitasking". Moreover, an Asynchronous Optical Microhead Address Controller's function is to provide, via bus lines, the (-CS) "Chip Select" for Chip-Selection, (-AS) "Address Strobe" for address latching, and (-ADACK) "Address Acknowledge" for address latch acknowledgment control signals, which are all sent to every Magneto-Optical Microhead Array Chip installed into a Magneto-Optical Microhead Array Chip Hard Disk Drive's unit-assembly.

Furthermore, a Disk Controller's "Asynchronous Optical Microhead Address Controller" also functions as an interface between the hard disk drive interfacing architectures of today (i.e., IDE ATA-2 "Integrated Drive Electronic AT Attachment rev. 2", and SCSI-2 "Small Computer System Interface rev. 2"), and the Magneto-Optical Microhead Array Chip Hard Disk Drive's stationary Magneto-Optical Microhead Array Chips. Moreover, when a Magneto-Optical Microhead Array Chip Hard Disk Drive's Disk Controller receives a requested data-location from a host-computer system, the beforementioned Disk Controller forwards the beforementioned requests to a translator circuit called the "Address Translator", which is located within a Disk Controller's "Asynchronous Optical Microhead Address Controller" circuit; wherein, the beforementioned Asynchronous Optical Microhead Address Controller's "Address Translator" will translate, then store in a "translation register", the beforementioned requested data-location, for the duration of a read-data or write-data disk-operation. In addition, the beforementioned "Asynchronous Optical Microhead Address Controller" circuit will use the information stored within its Address Translator's "translation register" to execute a (-CS) "Chip-Select" control-bus Chip-Selection and a VCSEL address-bus microhead selection, during the beforementioned host-requested read-data or write-data disk-operation.

Moreover, when an Asynchronous Optical Microhead Address Controller's "Address Translator" circuit has translated and stored a host-requested data-location in its "translation register, the beforementioned Asynchronous Optical Microhead Address Controller will send all of the necessary Microhead-Addressing, Chip-Selection, and control-signals to all of the Magneto-Optical Microhead Array Chips that are connected to the address, data, and control bus lines installed within a Magneto-Optical Microhead Array Chip Hard Disk Drive's unit-assembly. For example, when a Disk Controller forwards a conventional read-data at such-n-such address location to an Asynchronous Optical Microhead Address Controller's Address Translator circuit for translation, the beforementioned data-request would look something like: "Retrieve data from cylinder location: 54, using head: 8, at sectors: 42,43,44,45".

Furthermore, the beforementioned host-computer's requested data-location, after it is successfully translated, will essentially tell an Asynchronous Optical Microhead Address Controller to "Retrieve the host-requested data from a data-area that is located under microhead: 54, at cylinder/track: 54, using Magneto-Optical Microhead Array Chip: 8, at data-sectors: 42,43,44,45"; wherein, the beforementioned Asynchronous Optical Microhead Address Controller will execute the selection and activation of specific hardware through control signals sent via a Magneto-Optical Microhead Array Chip Hard Disk Drive's bus line system as a series of control commands, comprising of steps:

i. (-CS7) "Chip Select" bus-line number "8", will first have its logic-high control-signal changed to a logic-low control-signal; therein, causing a Chip-Selection of Magneto-Optical Microhead Array Chip number "8" to occur; wherein, Magneto-Optical Microhead Array Chip number "8" will become the only Magneto-Optical Microhead Array Chip affected by any future chip-control bus-line signals; moreover, Magneto-Optical Microhead Array Chip number "8" is selected because it is the only circuit-board positioned Magneto-Optical Microhead Array Chip; positioned over disk-platter number "4", data-surface number "8", which is where the host-requested data or data areas have their location.

ii. VCSEL microhead number "54", which is located in a stationary position above concentric cylinder/track number "54", is selected next when the beforementioned Asynchronous Optical Microhead Address Controller sends out a "32" bit signal, representing microhead address number "54", down a Magneto-Optical Microhead Array Chip Hard Disk Drive's 32-bit Microhead-Addressing bus-line, which connects to every Magneto-Optical Microhead Array Chip that is installed into a Magneto-Optical Microhead Array Chip Hard Disk Drive's unit-assembly, affecting only Magneto-Optical Microhead Array Chip number "8"; moreover, the only chip-selected Magneto-Optical Microhead Array Chip connected to a Magneto-Optical Microhead Array Chip Hard Disk Drive's bus system.

iii. (-AS) "Address Strobe", a microhead address control bus-signal, after having its logic-high control-signal changed to a logic-low control-signal, is sent down a single bus-line that connects to every Magneto-Optical Microhead Array Chip that is installed into a Magneto-Optical Microhead Array Chip Hard Disk Drive's unit-assembly; wherein, an execution of a strobed latching of the beforementioned, and simultaneously sent "32" bit microhead address control bus-signal, into a (-CS) "Chip Selected" Magneto-Optical Microhead Array Chip's address-latch storage circuit.

iv. Hereinafter, the beforementioned "32" bit microhead address bus-signal being simultaneously sent down its "32" bit microhead address bus-line will execute a selection and enabling of a single VCSEL microhead that is located in a stationary position above data-track number "54", which in-turn contains data-sector locations "42,43,44,45"; moreover, the physical locations, which in fact mirror the beforementioned host-computer system's previously requested data locations.

Therefore, the beforementioned and chip-selected Magneto-Optical Microhead Array Chip number "8" will be the only Magneto-Optical Microhead Array Chip that is connected to a Magneto-Optical Microhead Array Chip Hard Disk Drive's address bus, data bus, and control bus system, to have its (-CS7) "Chip Select" Chip-Selection number "8" bus-line, and its (-AS) "Address Strobe" address strobbing bus-line, simultaneously enabled with logic-low chip control bus-signals; wherein, Magneto-Optical Microhead Array Chip number "8" is selected to latch, into its normally tri-stated "Address Latch And Chip Select Circuit", the beforementioned "32" bit microhead address signal already being sent down a Magneto-Optical Microhead Array Chip Hard Disk Drive's "32" bit microhead address bus-line.

Furthermore, after successful latching of the beforementioned "32" bit address signal has been completed, a chip-selected Magneto-Optical Microhead Array Chip number "8" will send next the beforementioned latched "32" bit address signal to a Magneto-Optical Microhead Array Chip's "Address Decoder Circuit" to be decoded, which in turn will execute a selection and enabling of VCSEL microhead "54". Furthermore, and simultaneous to the latching of the beforementioned "32" bit address signal, is Magneto-Optical Microhead Array Chip number "8", itself sending a logic-low control bus-signal down the Magneto-Optical Microhead Array Chips'(-ADACK) "Address Acknowledge" control-signal bus-line to an Asynchronous Optical Microhead Address Controller's (-ADACK) "Address Acknowledge" input terminal; wherein, the beforementioned (-ADACK) "Address Acknowledge" control-signal will communicate to an Asynchronous Optical Microhead Address Controller that the beforementioned "32" bit address signal is now latched and being sent to the beforementioned "Address Decoder Circuit" to be decoded. Furthermore, after the successful selection of VCSEL microhead "54" the beforementioned Disk Controller can now read or host-requested data to or from a Magneto-Optical Microhead Array Chip Hard Disk Drive's disk-platter number "4", data-surface number "8", data-sectors or data-sector areas "42,43,44,45" into or from a Disk Controller's Data Sequencer.

Another specific object of the present invention is that each Magneto-Optical Microhead Array Chip will contain, within a single chip device, a VCSEL microhead array (e.g., an array containing a minimum of one thousand or a maximum of four billion individually addressable VCSEL microheads individually used as a light source during a read-data or write-data disk-operation), a microhead "Address Latch And Chip Select Circuit", a microhead "Address Decoder Circuit", a microhead "Address Buffer Circuit", a "VCSEL Microhead Power Control Circuit", a "Read Preamp Circuit", a "Read Decision Circuit", a "Read Buffer Circuit', a "Planar Induction Coil Control Circuit", a "Write Driver Circuit", a "Write Preamp Circuit", a "R/W Control Circuit", two reversed-biased "Semiconductor Photo-Conductor" linear position-sensing "Cadmium-Sulfide" photocell-array read-elements, or as an optional embodiment two reversed-biased "Semiconductor Silicon Photo-Diode" photocell-array read-elements (e.g., providing a optical read-data reference signal-voltage output and an optical read-data read signal-voltage output during read-data disk-operations), and two (BIMPICs) "Bi-Metal Planar Induction Coils" (e.g., used to vertically magnetize thermally confined disk-surface magnetic data-domains during write-data disk-operations).

Furthermore, a VCSEL microhead array (e.g., an array containing a minimum of one thousand or a maximum of four billion individually addressable VCSEL microheads individually used as a light source during a read-data or write-data disk-operation), a microhead "Address Latch And Chip Select Circuit", a microhead "Address Decoder Circuit", a microhead "Address Buffer Circuit", a "VCSEL Microhead Power Control Circuit", a "Read Preamp Circuit", a "Read Decision Circuit", a "Read Buffer Circuit", a "Planar Induction Coil Control Circuit", a "Write Driver Circuit", a "Write Preamp Circuit", a "R/W Control Circuit" will comprise the same semiconductor substrate. While the beforementioned two reversed-biased "Semiconductor Photo-Conductor" linear position-sensing "Cadmium-Sulfide" photocell-array read-elements, or as an optional embodiment two reversed-biased "Semiconductor Silicon Photo-Diode" photocell-array read-elements (e.g., providing a optical read-data reference signal-voltage output and an optical read-data read signal-voltage output during read-data disk-operations), and two (BIMPICs) "Bi-Metal Planar Induction Coils" (e.g., used to vertically magnetize thermally confined disk-surface magnetic data-domains during write-data disk-operations) will comprise different semiconductor substrates from the earlier disclosed circuitry.

Another specific object of the present invention is found in the (BIMPIC) "Bi-Metal Planar Induction Coil" design; wherein, the BIMPIC design will increase a magnetic field's flux density; moreover, improving a VCSEL microhead array's ability to write "magnetic-flux transitions" to a disk-platter's magnetic-data domain cells. Moreover, the two inter-layered BIMPIC coils are positioned at the top-center of each Magneto-Optical Microhead Array Chip, surrounding a VCSEL microhead array with two BIMPIC coils; wherein, each coil has twenty-five coil winding-turns making-up its structure.

Furthermore, the (BIMPIC) "Bi-Metal Planar Induction Coil" design used in the Magneto-Optical Microhead Array Chips is by necessity based upon a core-less induction coil design (i.e., sometimes called an "Air Core Induction Coil" design). Moreover, the VCSEL microhead arrays used in the Magneto-Optical Microhead Array Chips are to be surrounded by two BIMPIC air core induction coils; leaving no room at the center of the BIMPIC for the "Nickel-Ferrite" solid core structures normally used in prior art induction coil designs.

Therefore, the two BIMPIC air core induction coils used in the Magneto-Optical Microhead Array Chips; however, solves this problem, by constructing a planar flat-wire out of two different metallic materials and having one-half of the beforementioned planar flat-wire coils constructed from an electron conducting material like "Aluminum" or "Copper", while the other-half of the beforementioned planar flat-wire coils are constructed from a magnetic-field producing non-permanent magnetic ferrite material, like "Ni—Zn Ferrite". Therefore, when the beforementioned bi-metal planar induction flat wires are wound into BIMPIC air core induction coils a non-permanent magnetic ferrite material like "Ni—Zn Ferrite" is pressed between layers of an electron conducting material like "Aluminum" or "Copper"; forming a non-magnetic multi-layered multi-cylinder shaped air core induction coil core.

Furthermore, because this core has a multi-layered multi-cylinder shape a VCSEL microhead array of the Magneto-Optical Microhead Array Chip design can now be located within the Bi-Metal Planar Induction Coil's center, where during a write-data disk-operation its VCSEL laser's can thermally confine via curie-point manipulation any disk-surface magnetic-data bit domain cell surrounded and effected by the Bi-Metal Planar Induction Coil's vertical magnetic fields. Furthermore, this approach can be modified to utilize ordinary conductive wire in place of the Bi-Metal Planar Induction Coil's flat and vertical planar wire, by placing ordinary conductive "Aluminum" or "Copper" round wire in-between alternating layers of non-permanent magnetic Ferrite material like "Ni—Zn Ferrite" to form a planar induction coil with a core, while maintaining it hollow center.

Another specific object of the present invention is found in a Magneto-Optical Microhead Array Chip's combination of a VCSEL microhead array, two (BIMPIC) "Bi-Metal Planar Induction Coil" air-core induction coils, two reversed-biased (SPC) "Semiconductor Photo-Conductor" linear position-sensing (CdS) "Cadmium Sulfide" semiconductor photo-detector devices, or alternatively two reversed-biased (SPD) "Semiconductor Photo-Diode" photocell (Si) "Silicon" semiconductor photo-detector arrays, one Ahrens birefringent calcite light-polarizing analyzer that contains a half-mirror beam-spliter, and one quarter-wave laser-light polarizing calcite crystal quarterwave plate.

DRAWING FIGURES

In the drawings, closely related figures have the same number but different alphabetic suffixes:

FIG. 55 is a 3D drawing showing a 45-degree right-side close-up view of one Magneto-Optical Microhead Array Chip VCSEL microhead, while displaying minute structural details for said Magneto-Optical Microhead Array Chip VCSEL microhead.

FIG. 56 is a 3D drawing showing a 10-degree left-side close-up view of one Magneto-Optical Microhead Array Chip VCSEL microhead, while displaying minute structural details for said Magneto-Optical Microhead Array Chip VCSEL microhead.

FIG. 59 is an orthographic side-view close-up of a Magneto-Optical Microhead Array Chip's n-p-n junction ultra-violet fluorescing VCSEL microhead, displaying section C—C.

FIG. 62B is an enlarged block-diagram drawing showing details of internal component configurations for the ATA-2 IDE Disk Controller used in the Magneto-Optical Microhead Array Chip Hard Disk Drive design, which displays an enlarged block-diagram showing details of the block-diagram illustrated in FIG. 62A.

FIG. 63B is an enlarged block-diagram drawing showing details of internal component configurations for the SCSI Disk Controller used in the Magneto-Optical Microhead Array Chip Hard Disk Drive design, which displays an enlarged block-diagram drawing showing details of the block-diagram illustrated in FIG. 63A.

Figure 64A:
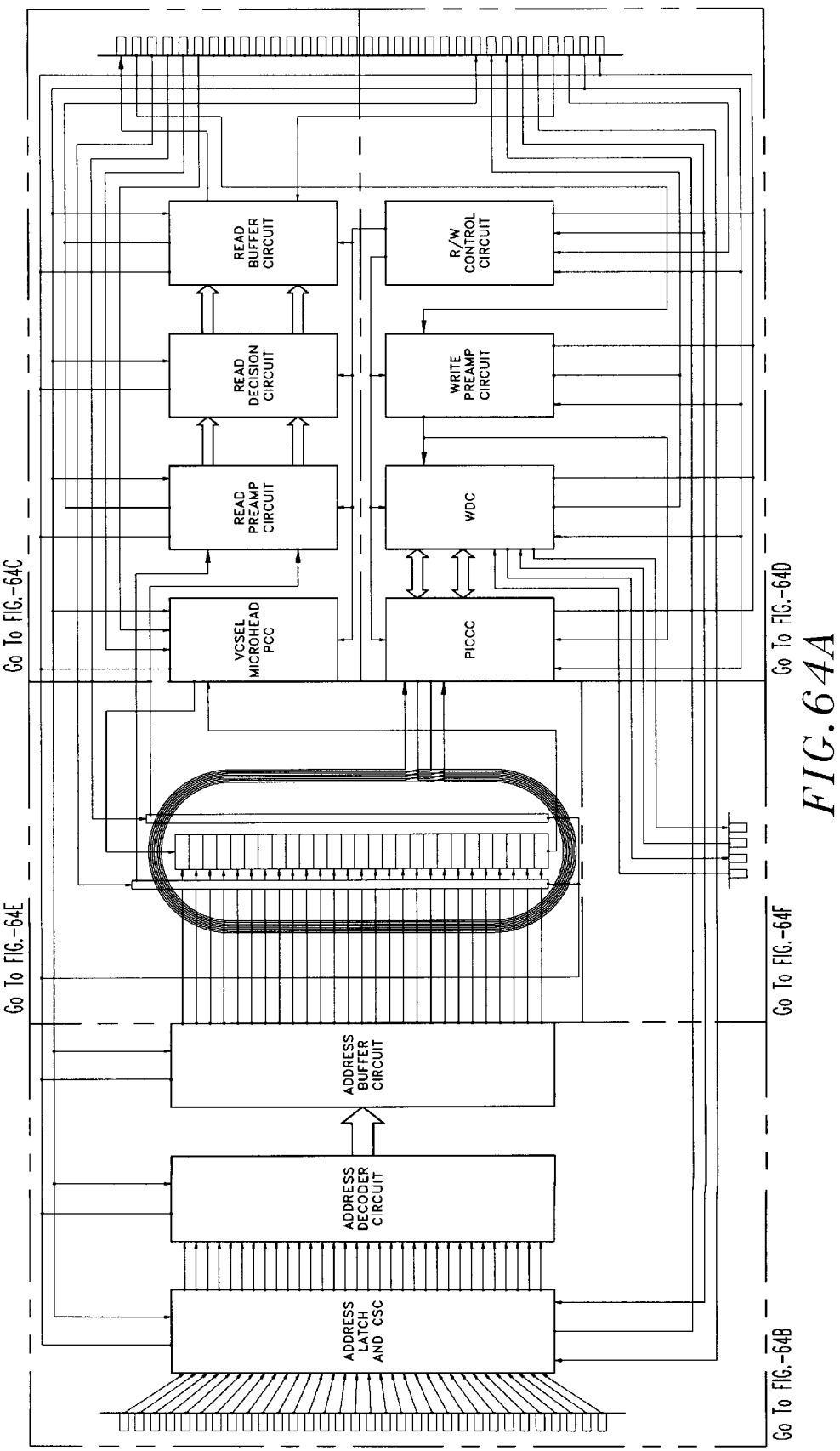
FIG. 64A is a block-diagram drawing of the Magneto-Optical Microhead Array Chip design used in the Magneto-Optical Microhead Array Chip Hard Disk Drive, which displays areas within FIG. 64A that were copied to separate drawing files as block-diagram drawing figures containing enlarged versions of block-diagram 64A's various areas.
Figure 64B:
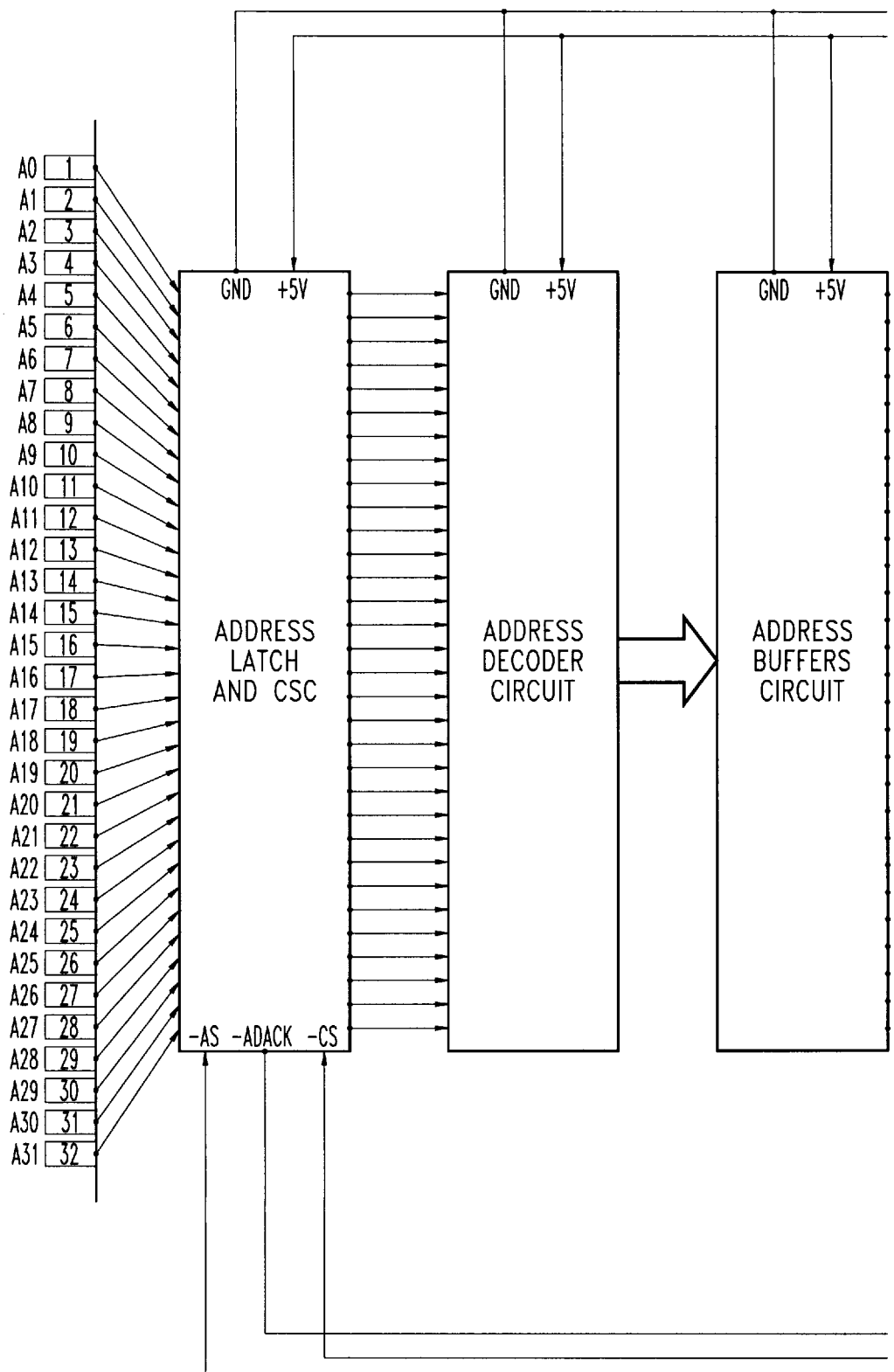
FIG. 64B is an enlarged block-diagram drawing of the Magneto-Optical Microhead Array Chip design used in the Magneto-Optical Microhead Array Chip Hard Disk Drive, which displays an enlarged block-diagram drawing showing details of the Microhead-Addressing and Chip-Selection circuits illustrated in block-diagram FIG. 64A.
Figure 64C:
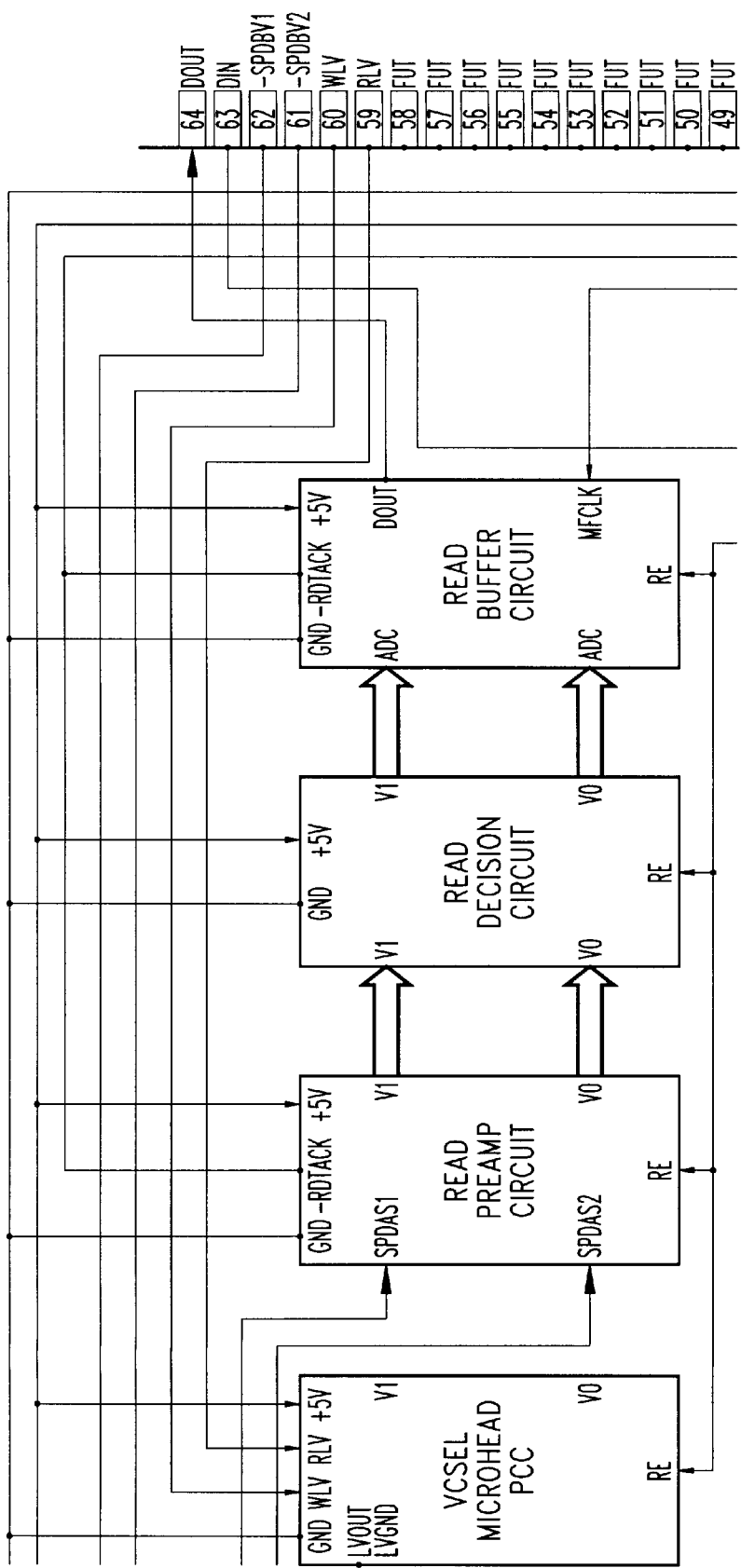
FIG. 64C is an enlarged block-diagram drawing of the Magneto-Optical Microhead Array Chip design used in the Magneto-Optical Microhead Array Chip Hard Disk Drive, which displays an enlarged block-diagram drawing showing details of the Data Read-Channel and the Data-Acknowledgment circuits illustrated in block-diagram FIG. 64A.
Figure 64D:
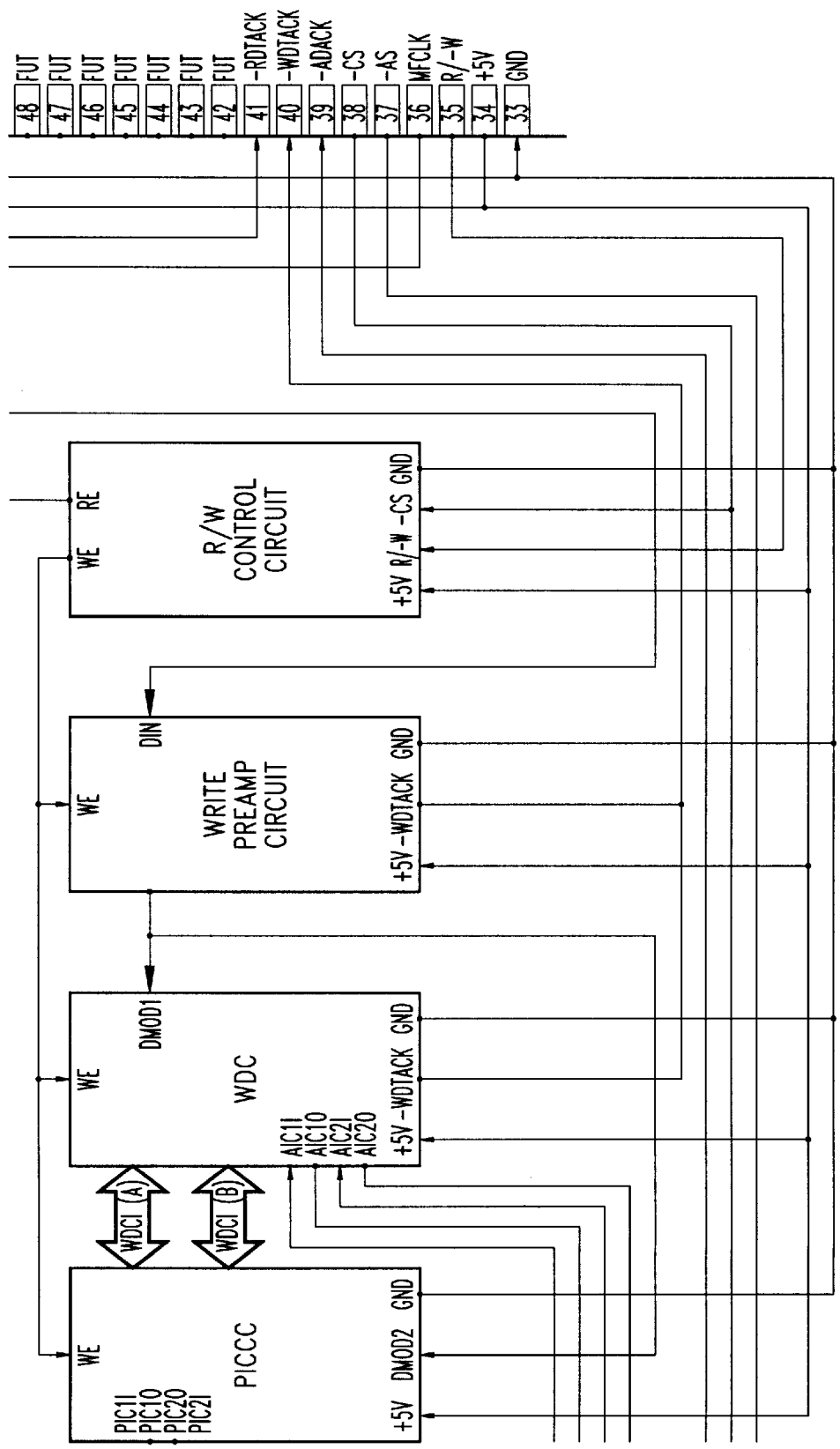
FIG. 64D is an enlarged block-diagram drawing of the Magneto-Optical Microhead Array Chip design used in the Magneto-Optical Microhead Array Chip Hard Disk Drive, which displays an enlarged block-diagram drawing showing details of the Data Write-Channel and the Data-Acknowledgment circuits illustrated in block-diagram FIG. 64A.
Figure 64H:
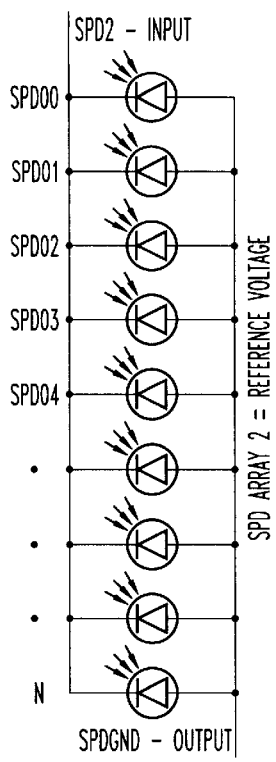
Figure 64G:
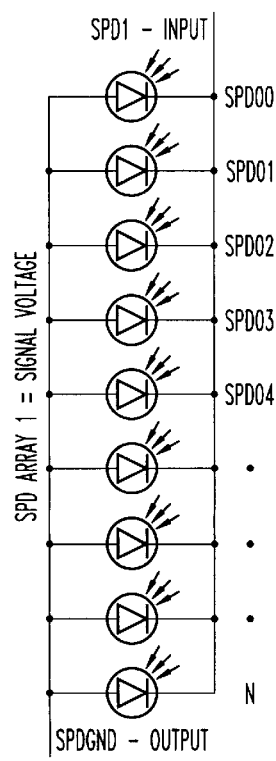
Figure 64F:
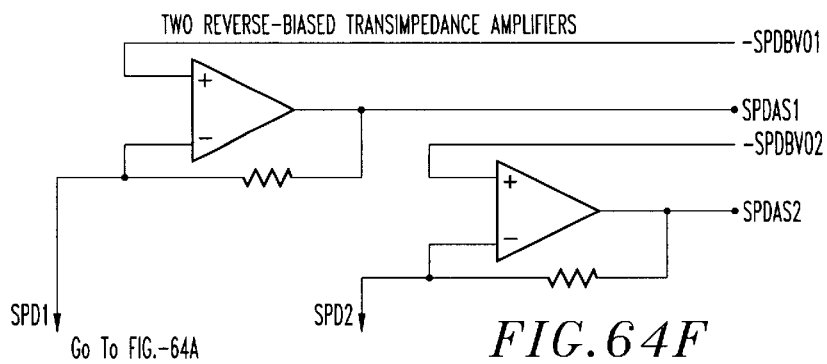
Figure 64E:
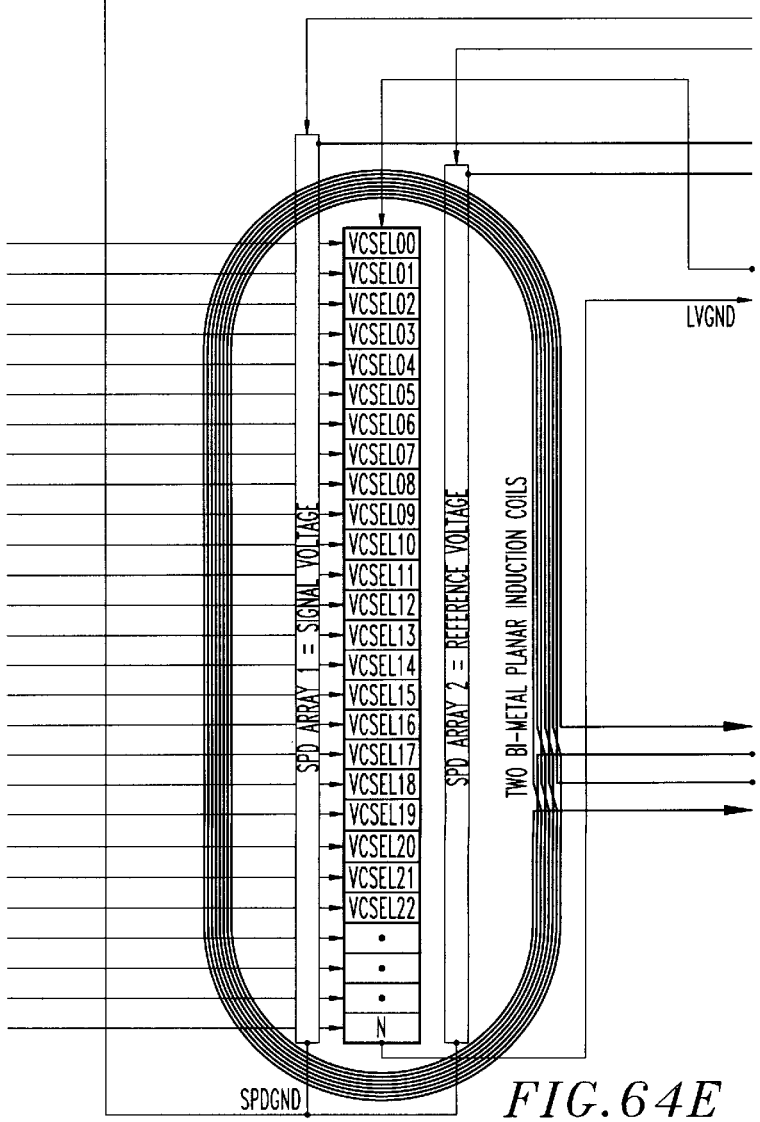

FIG. 64E is an enlarged block-diagram drawing of the Magneto-Optical Microhead Array Chip design used in the Magneto-Optical Microhead Array Chip Hard Disk Drive, which displays an enlarged block-diagram drawing showing details of two Bi-Metal Planar Induction Coils, the VCSEL Microhead Array with Microhead Control-Lines, two (SPC) "Semiconductor Photo-Conductor" devices, and the Read and Write Bus circuits illustrated in block-diagram FIG. 64A.

FIG. 64F is an auxiliary block-diagram drawing, which displays details of the reverse-biased transimpedence amplifier circuits used by the Magneto-Optical Microhead Array Chip read-channel's two (SPC) "Semiconductor Photo-Conductor" devices.

FIG. 64G is an auxiliary block-diagram drawing, which displays details of the reversed-biased (SPD) "Semiconductor Photo-Diode" photocell semiconductor array labeled as "SPD Array 1" circuit.

FIG. 64H is an auxiliary block-diagram drawing, which displays details of the reversed-biased (SPD) "Semiconductor Photo-Diode" photocell semiconductor array labeled as "SPD Array 2" circuit.

Figure 64I:
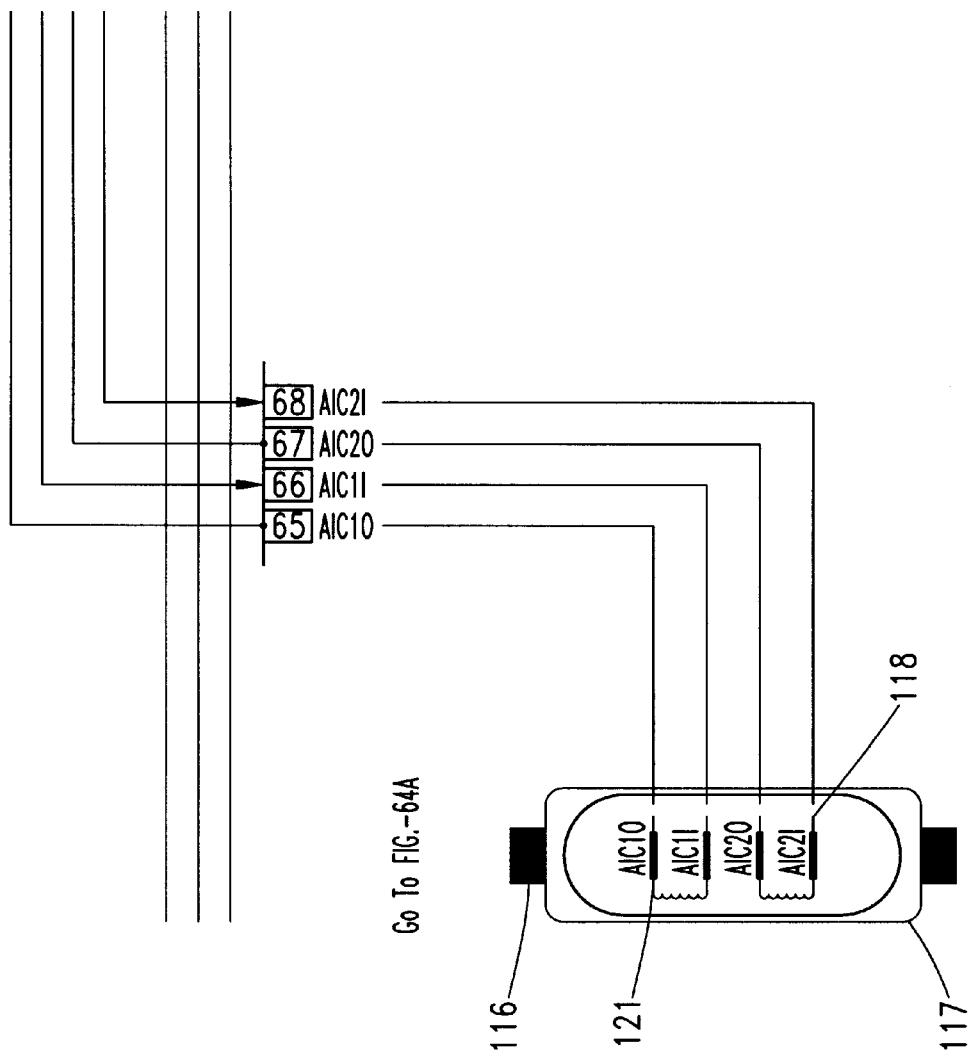

FIG. 64I is an enlarged block-diagram drawing of the Magneto-Optical Microhead Array Chip design used in the Magneto-Optical Microhead Array Chip Hard Disk Drive, which displays an enlarged block-diagram drawing showing details of the Data Modulated Auxiliary Load Induction Coils and the pin assignments illustrated in FIG. 64A.

FIG. 65 is a logic-diagram drawing of the Address-Strobe And Chip-Select circuit.

FIG. 66 is a circuit-diagram drawing of the Address-Strobe And Chip-Select circuit.

FIG. 67 is a truth-table diagram drawing for the Address-Strobe and Chip-Select circuit.

FIG. 68 is a conversion-table diagram drawing for the Address-Strobe and Chip-Select circuit.

FIG. 69 is a logic-diagram drawing of the "32" bit Address Latch And Chip-Select circuit used in the Magneto-Optical Microhead Array Chip design, which displays a Chip-Select circuit's connectivity within the Magneto-Optical Microhead Array Chips.

Figures 70A, 70B:
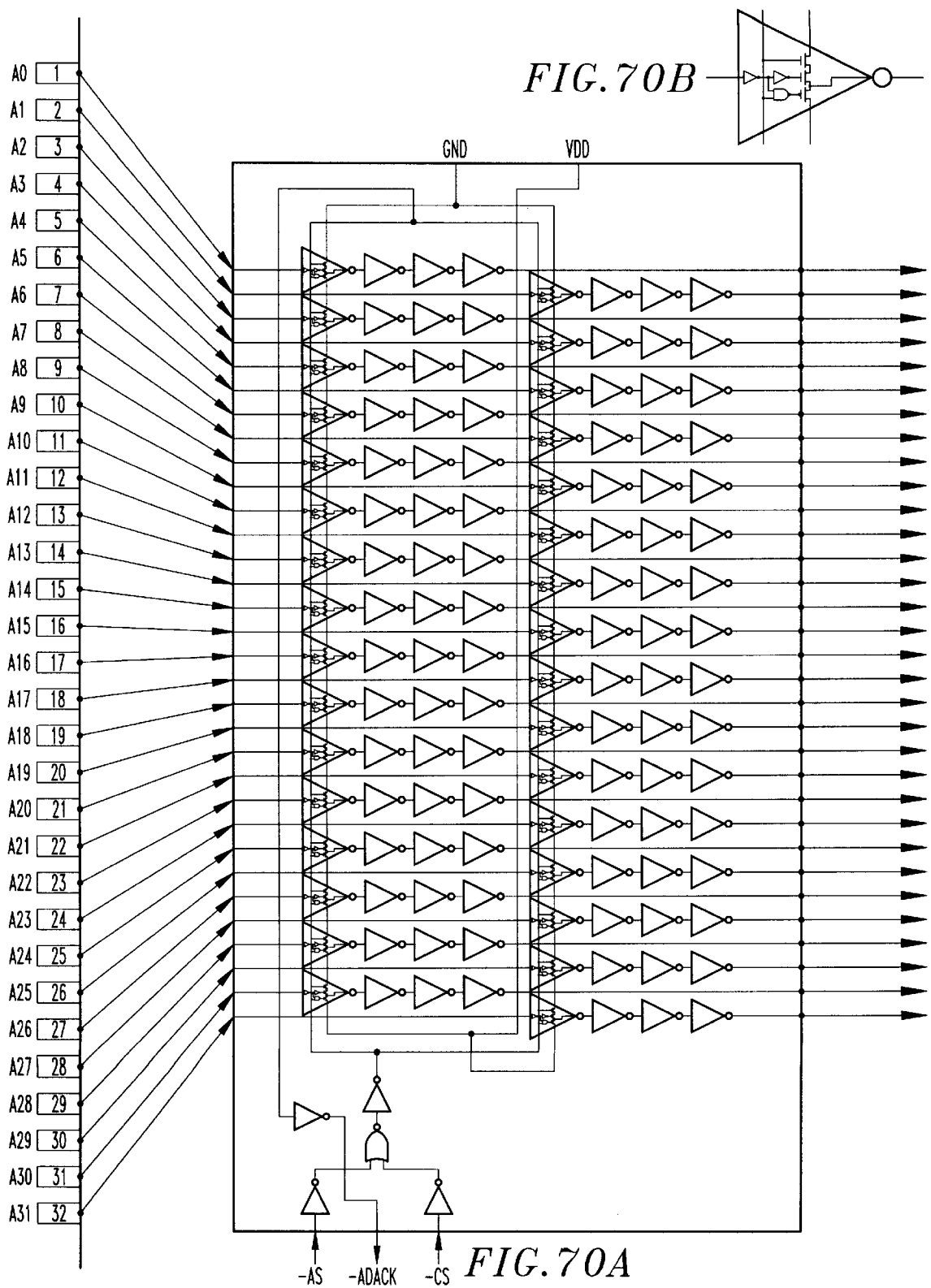

FIG. 70A is a circuit-diagram drawing of the "32" bit Address-Latch And Chip-Select circuit used in the Magneto-Optical Microhead Array Chip design, which displays circuit configurations of the Address-Latch And Chip-Select circuit.

FIG. 70B is an auxiliary circuit-diagram drawing showing circuit details of the buffers used in the Address-Latch circuit.

Figure 71:
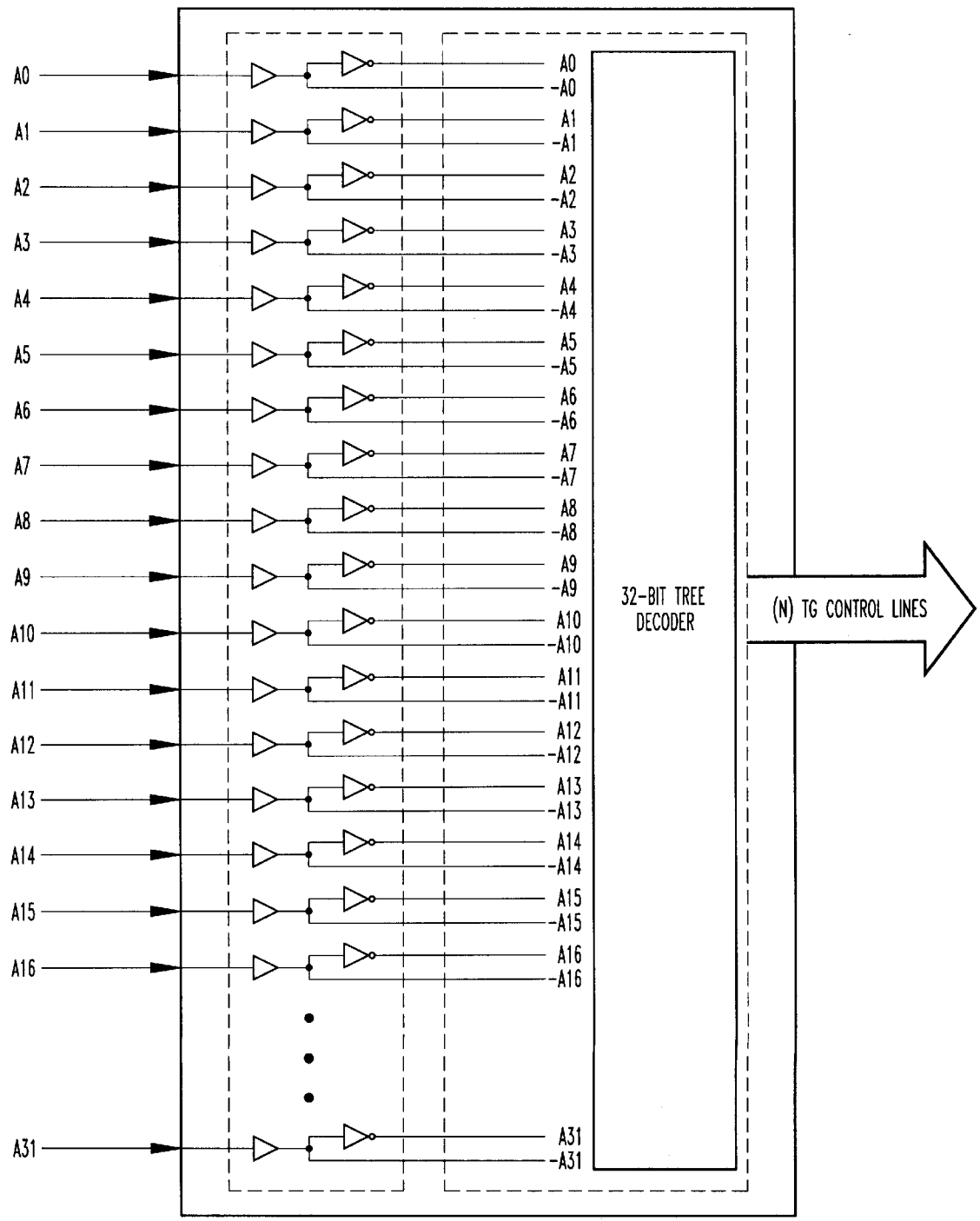

FIG. 71 is a logic-diagram drawing of the "32" bit Address-Decoder circuit.

Figure 72:
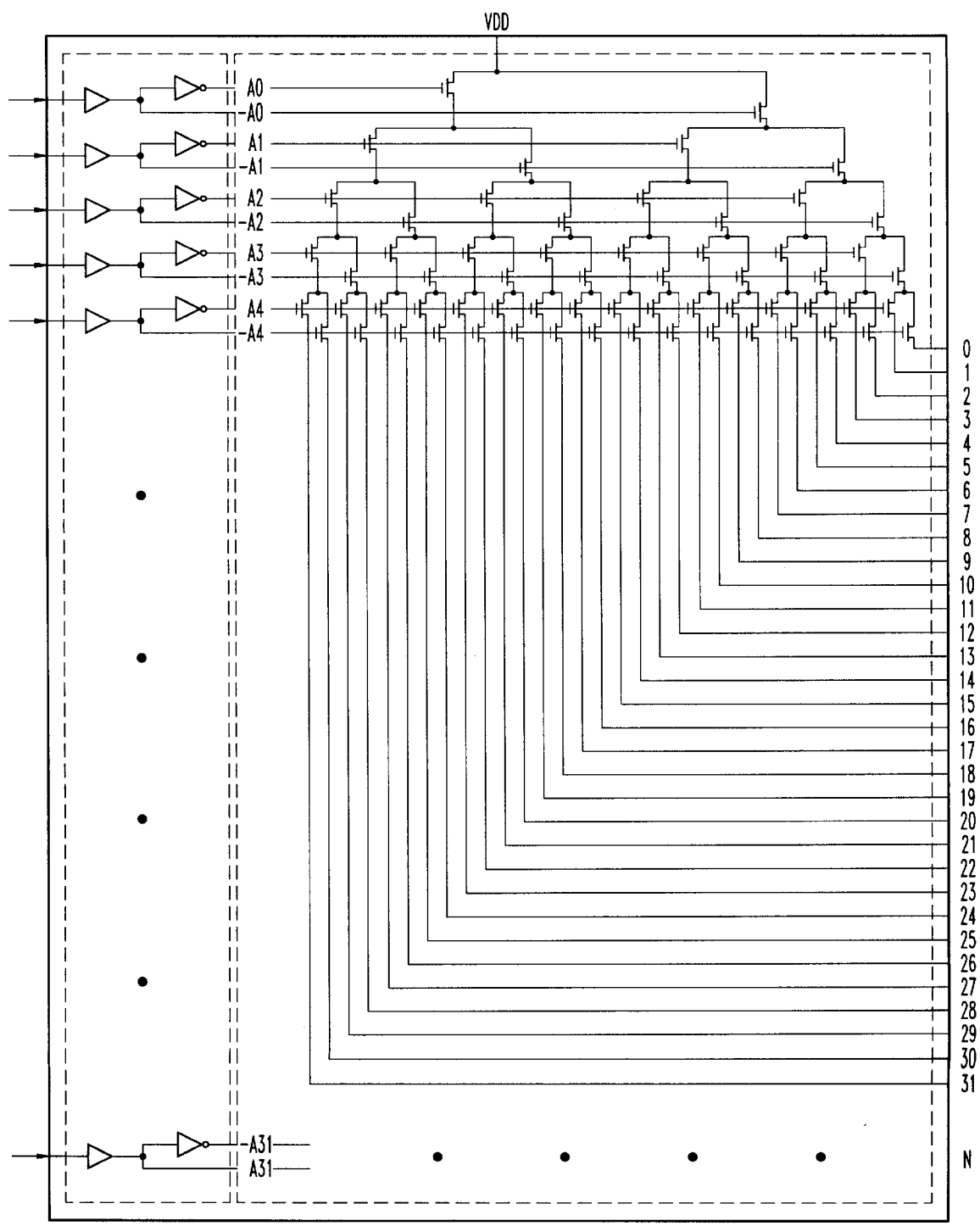

FIG. 72 is a circuit-diagram drawing showing circuit details of the "32" bit Address-Decoder circuit.

Figure 73:
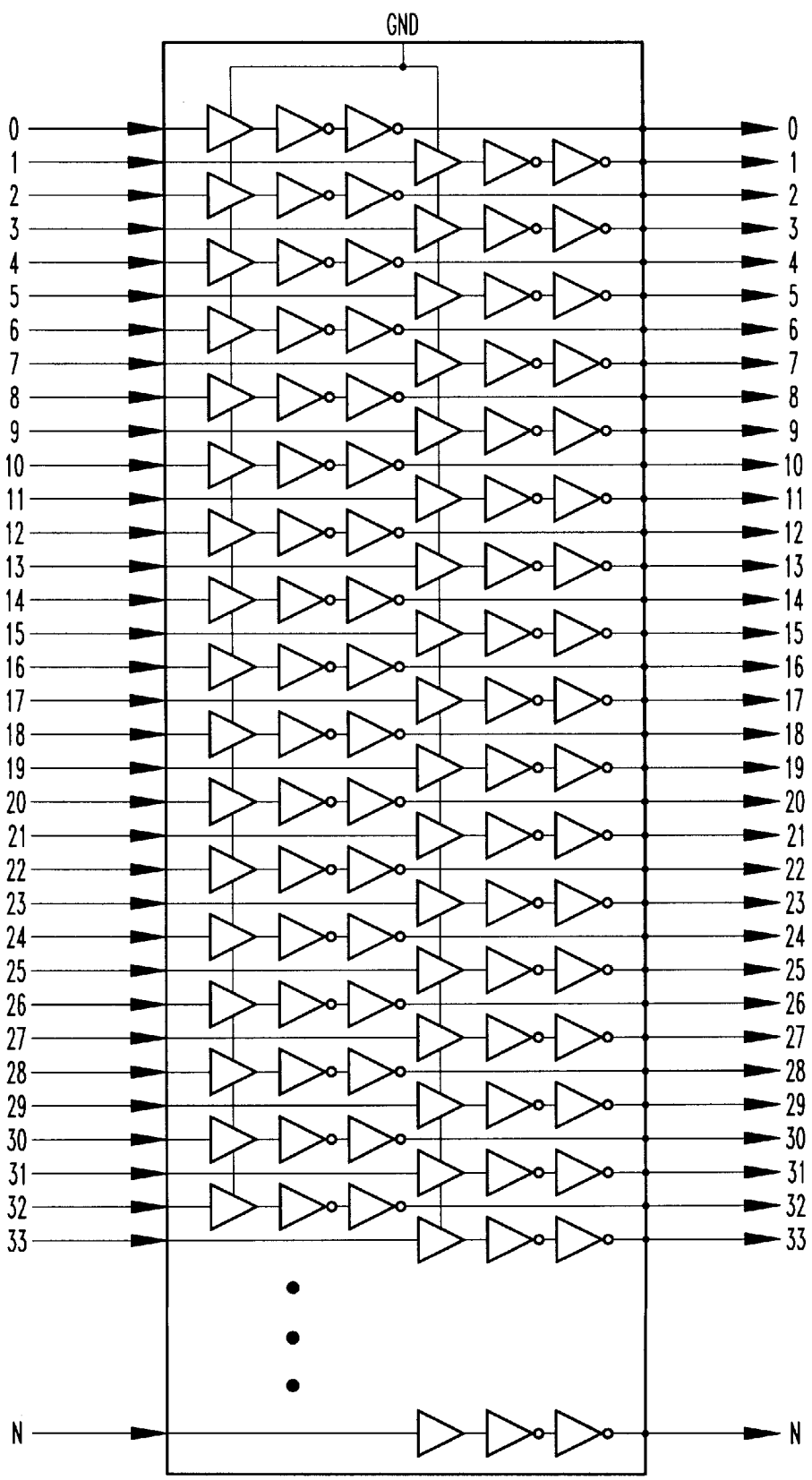

FIG. 73 is a logic-diagram drawing of the Address-Buffers circuit used in the Magneto-Optical Microhead Array Chip design, which displays the digital logic behind the operation of a address-decoder selected microhead's line-buffer.

Figure 74:
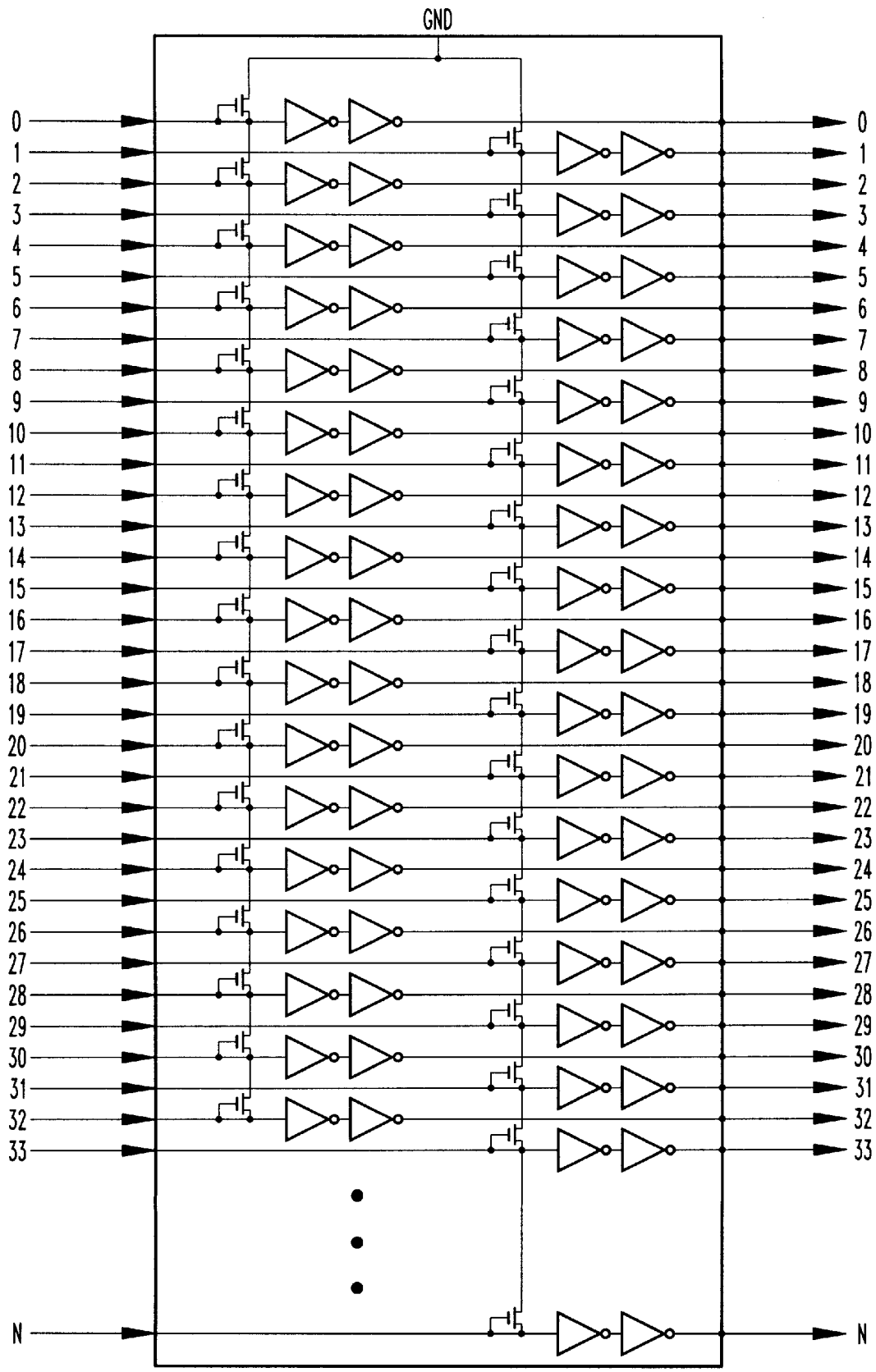

FIG. 74 is a circuit-diagram drawing of the Address-Buffers circuit used in the Magneto-Optical Microhead Array Chip design, which displays the circuit details behind a address-decoder selected microhead's line-buffer, while displaying how the un-selected microhead selection lines are pull-to-ground using Long-L inverter line-buffer circuits.

Figure 75:
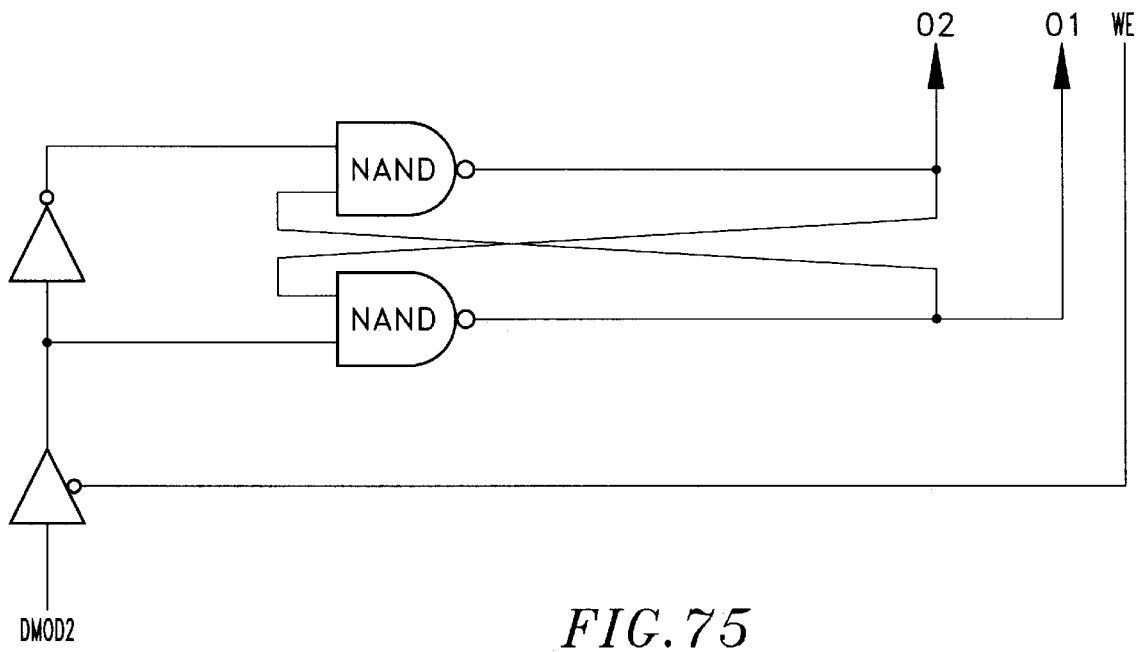

FIG. 75 is a logic-diagram drawing of the Flip-Flop, Coil Selection, and Coil Rotation control circuits.

Figure 76:
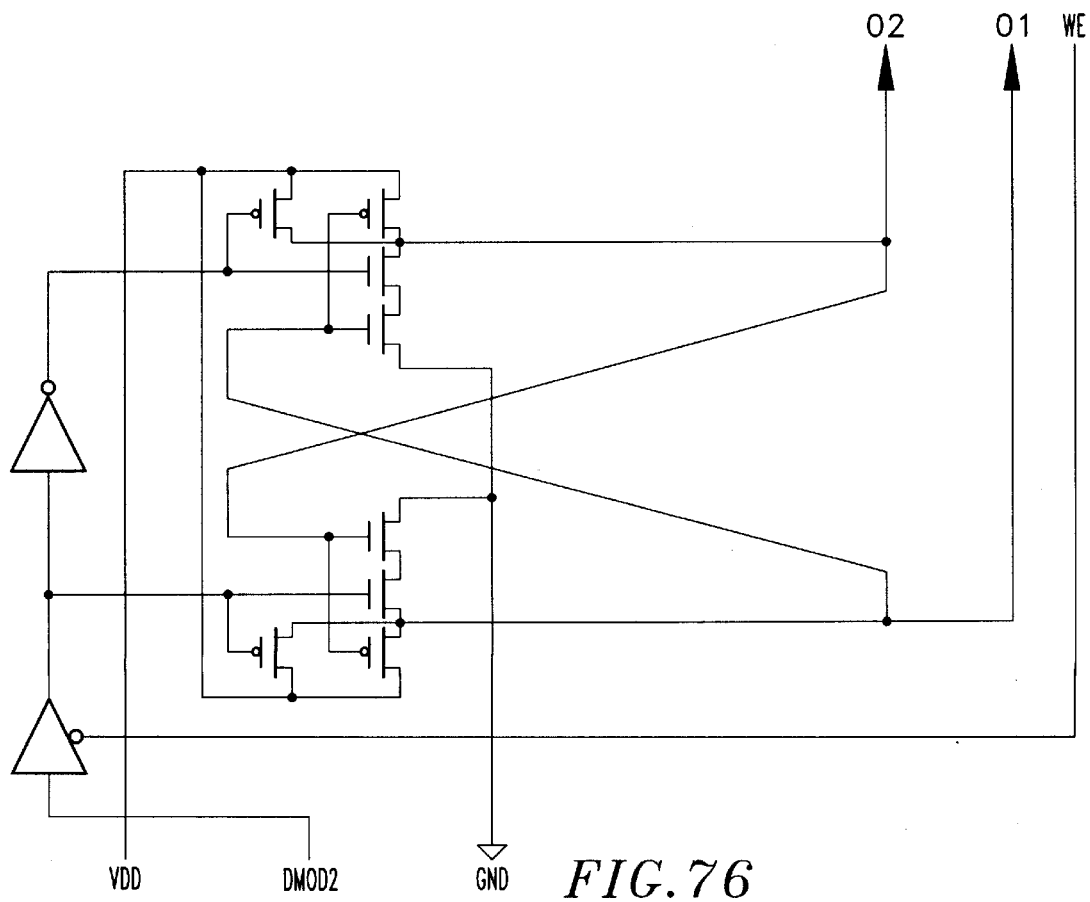

FIG. 76 is a circuit-diagram drawing showing circuit details of the Flip-Flop, Coil Selection, and Coil Rotation control circuits.

Figure 77:
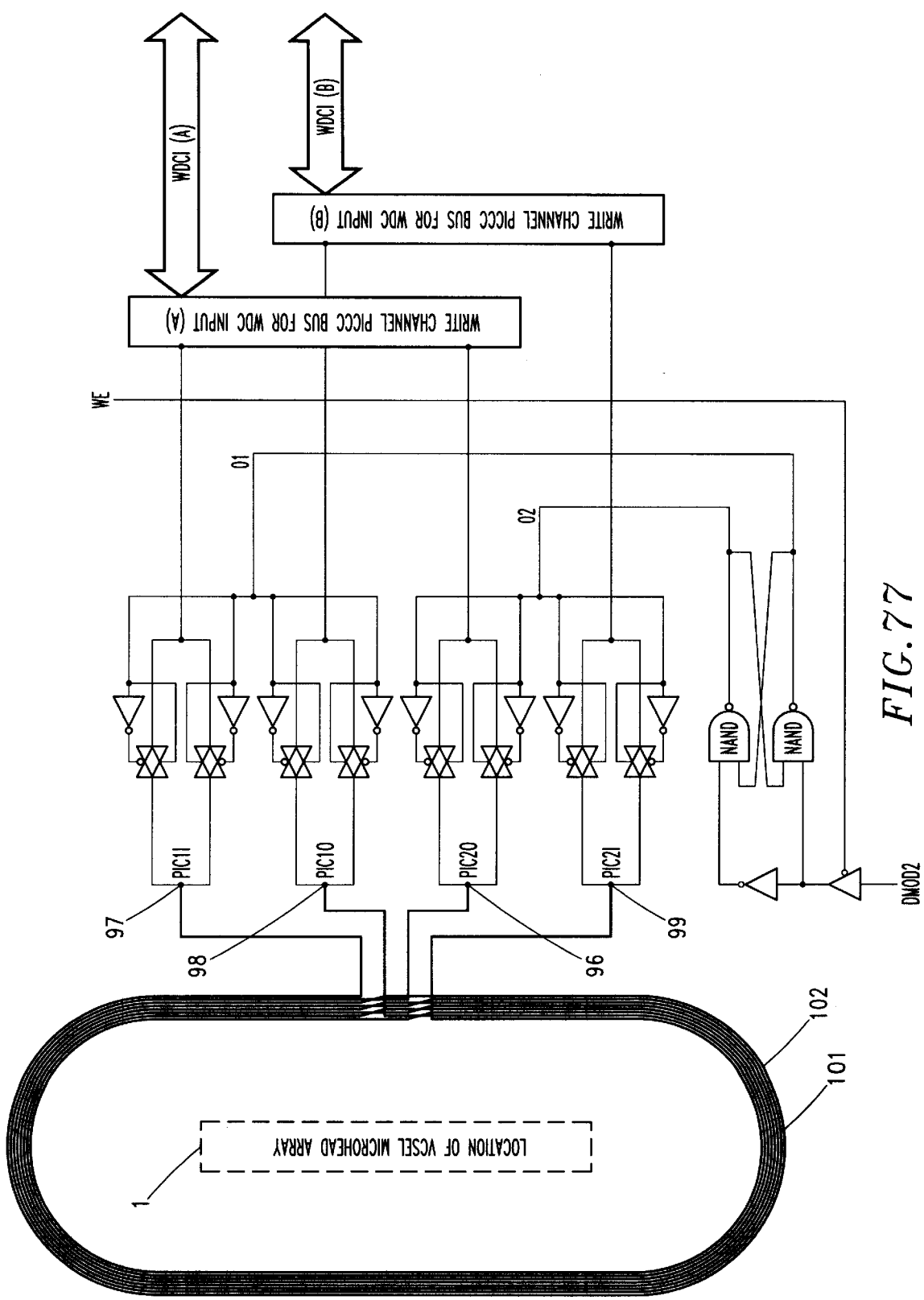

FIG. 77 is a logic-diagram drawing showing the digital logic behind the control over Bi-Metal Planar Induction Coil data-heads used in the Magneto-Optical Microhead Array Chip design, while displaying the digital logic behind the transmission-gates controlling coil-selection control line access to the Write Driver Circuit's two power providing bridge buses, which are labeled as WDCI (A) and WDCI (B).

Figure 78:
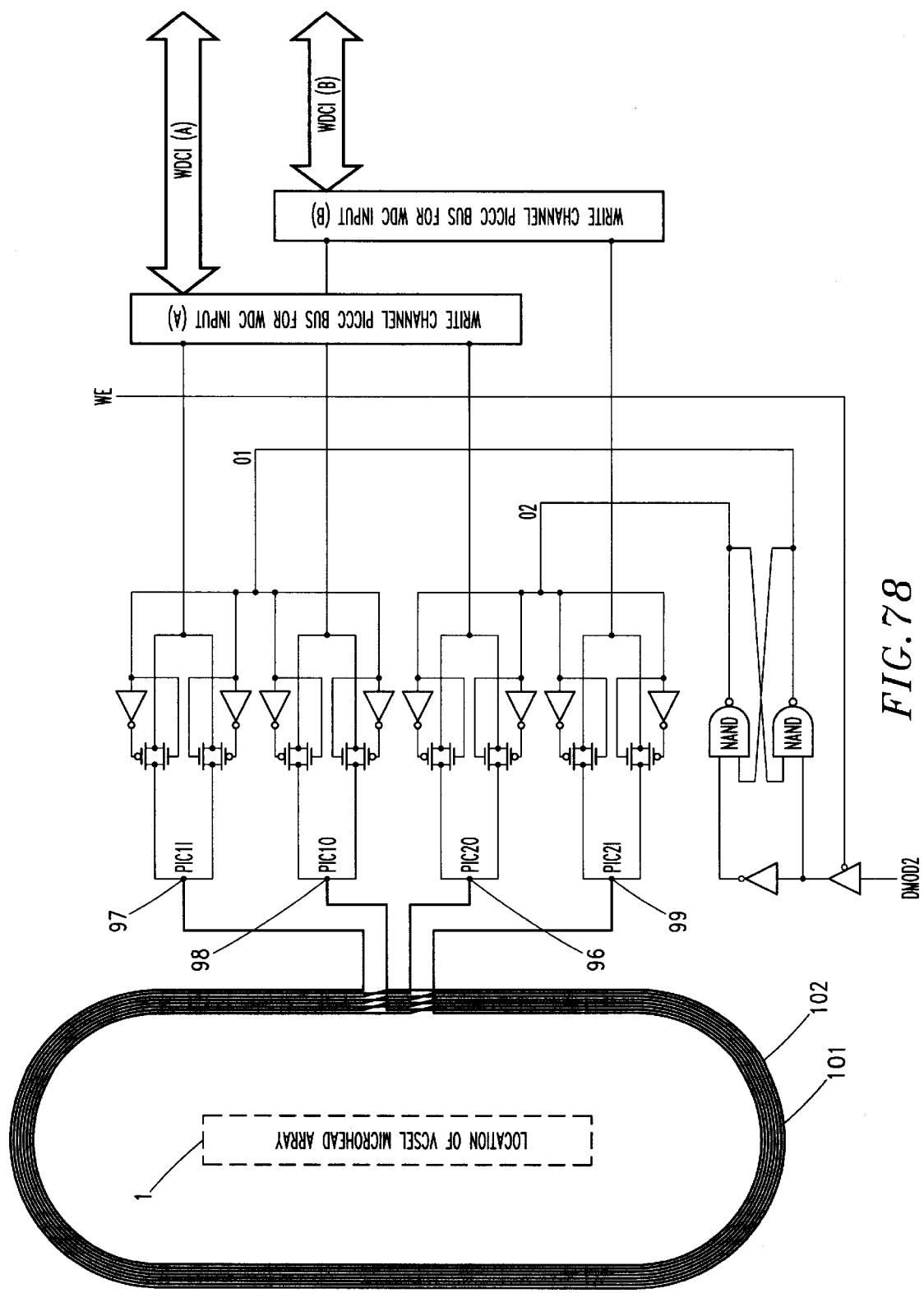

FIG. 78 is a circuit-diagram drawing showing the circuit configurations behind the Bi-Metal Planar Induction Coil data-head design used in the Magneto-Optical Microhead Array Chips, while displaying circuit details of the transmission-gate circuits controlling coil-selection control line access to the Write Driver Circuit's two power busing bridge circuits, which are labeled as WDCI (A) and WDCI (B).

Figure 79:
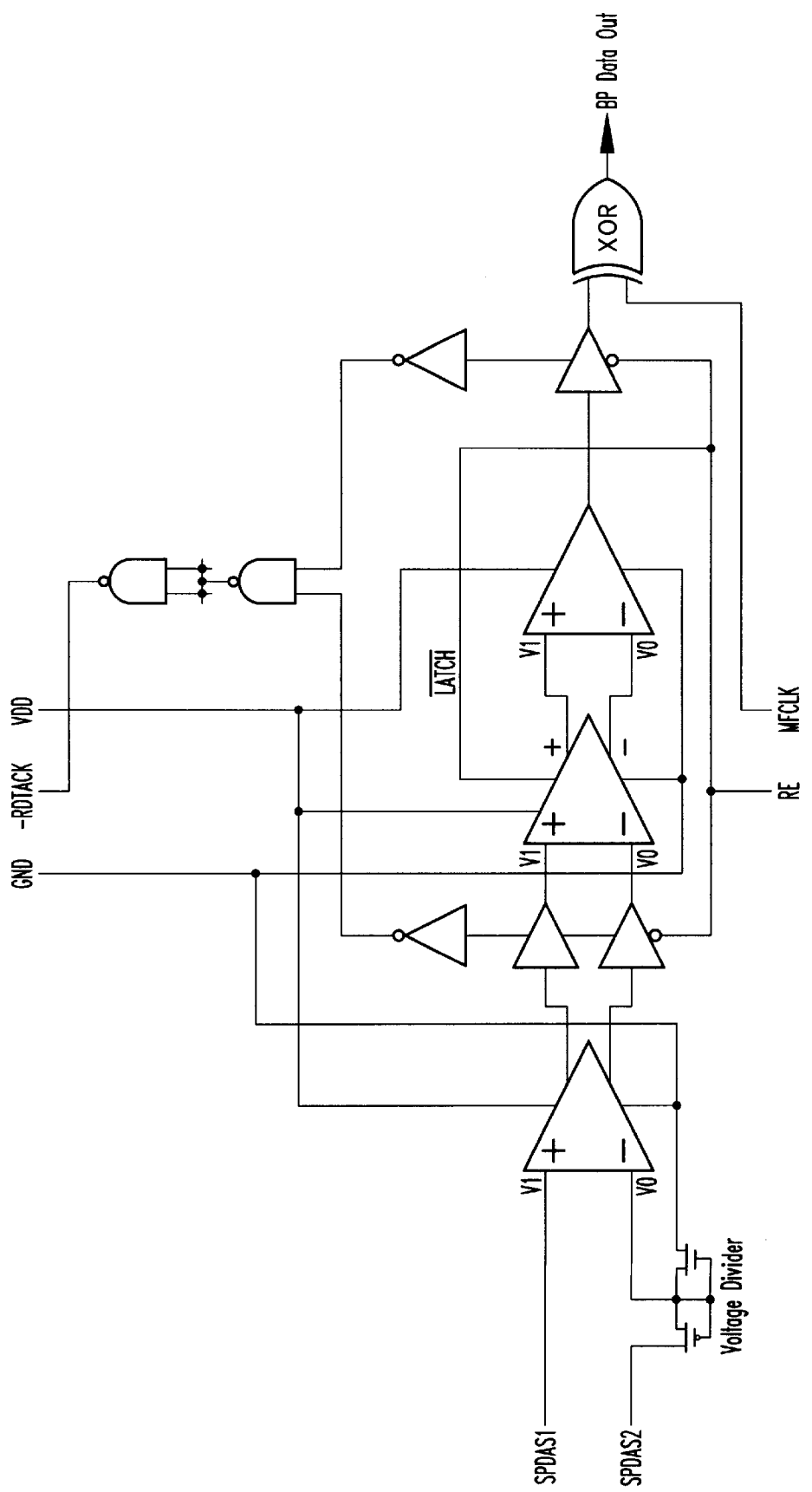

FIG. 79 is a logic-diagram drawing showing the digital logic behind the operation of the read-channels used in the Magneto-Optical Microhead Array Chips, while displaying the digital logic behind the operation of the Voltage Dividers, the Analog/Digital Comparators, the Pre-Amps, and the XOR bi-phase data-stream encoders.

Figure 80:
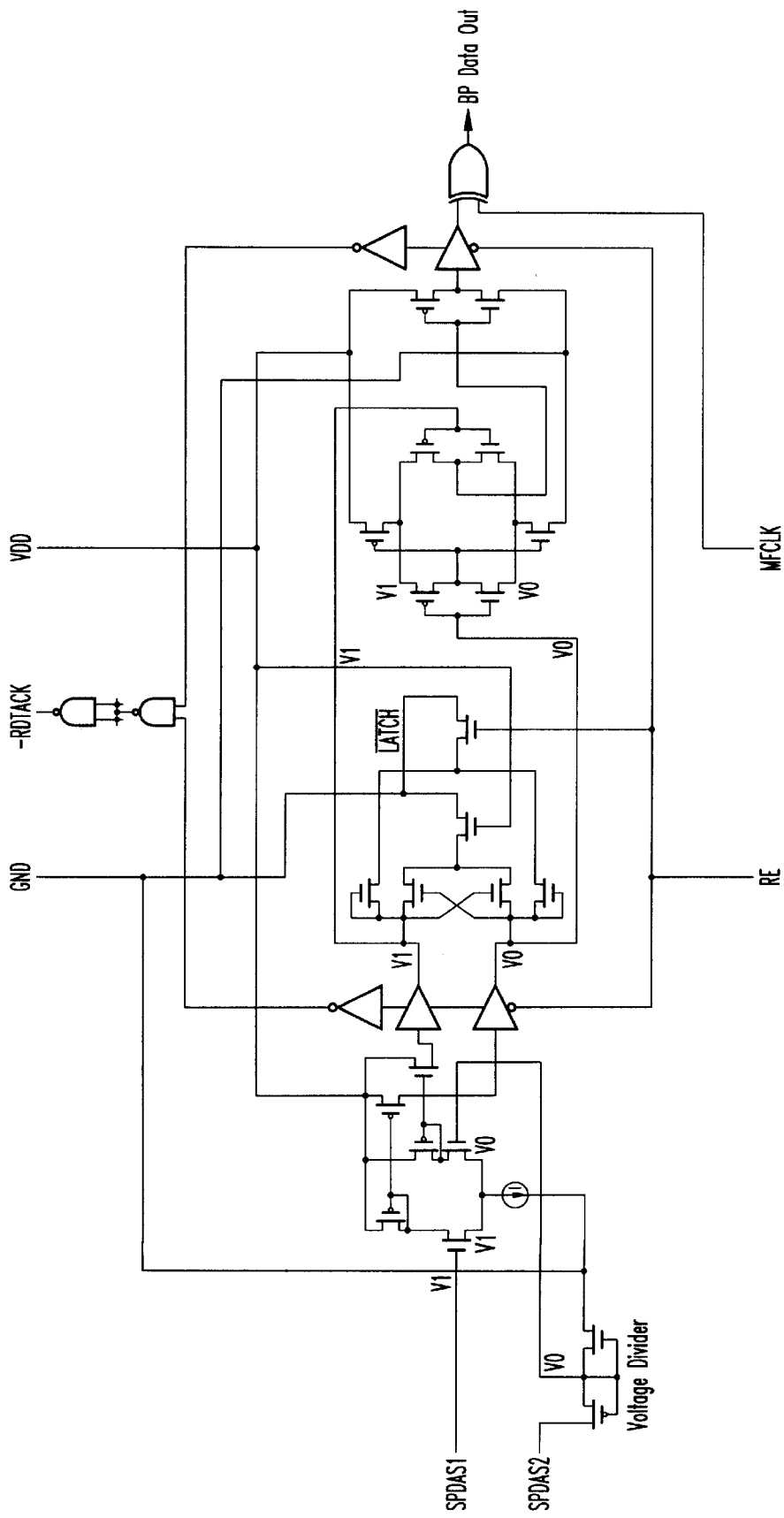

FIG. 80 is a circuit-diagram drawing showing the circuit configurations behind the operation of the read-channels used in the Magneto-Optical Microhead Array Chips, while displaying circuit configurations behind the operation of the Voltage Dividers, the Analog/Digital Comparators, the Pre-Amps, and the XOR bi-phase data-stream encoders.

Figure 81:
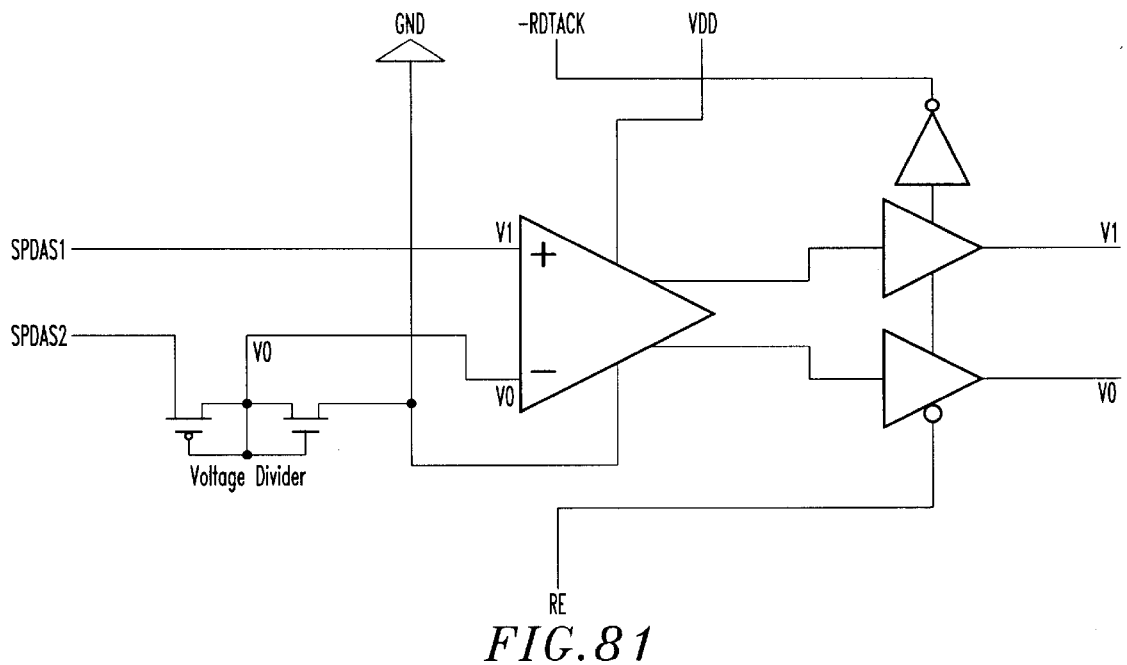

FIG. 81 is a logic-diagram drawing detail showing the digital logic behind the operation of a read-channel's Voltage Divider, Analog-Comparator, Digital Pre-Amp, and (-RDTACK) "Read Data Acknowledge" control circuits.

Figure 82:
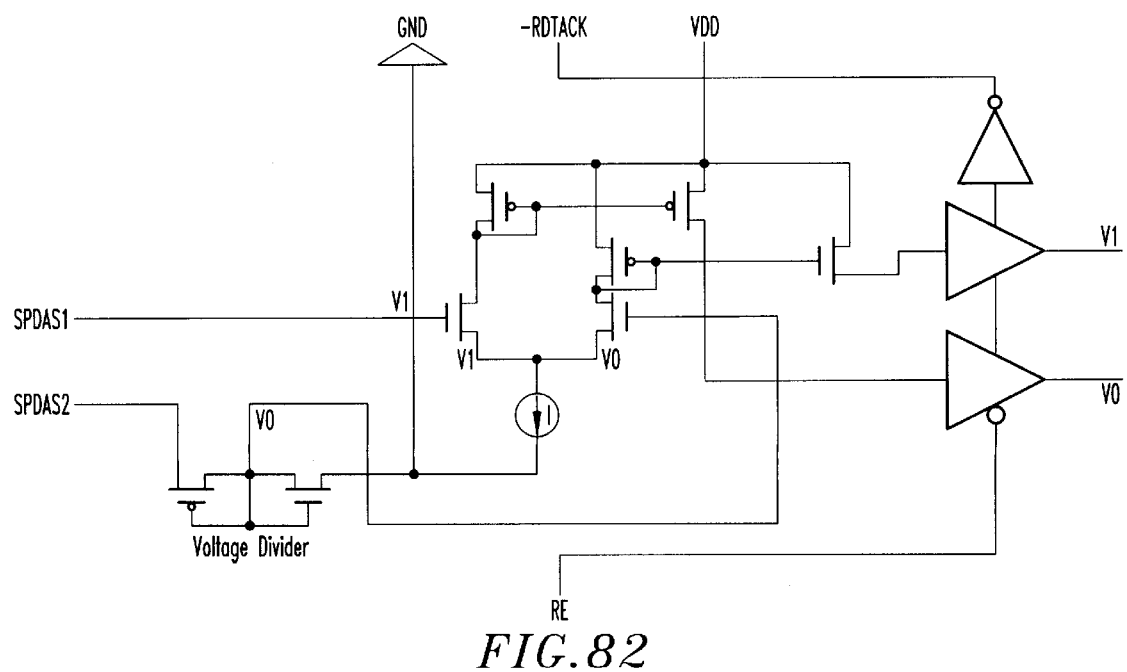

FIG. 82 is a circuit-diagram drawing detail showing the circuit configurations behind the operation of a read-channel's Voltage Divider, Analog-Comparator, Digital Pre-Amp, and (-RDTACK) "Read Data Ackowledge" control circuits.

Figure 83:
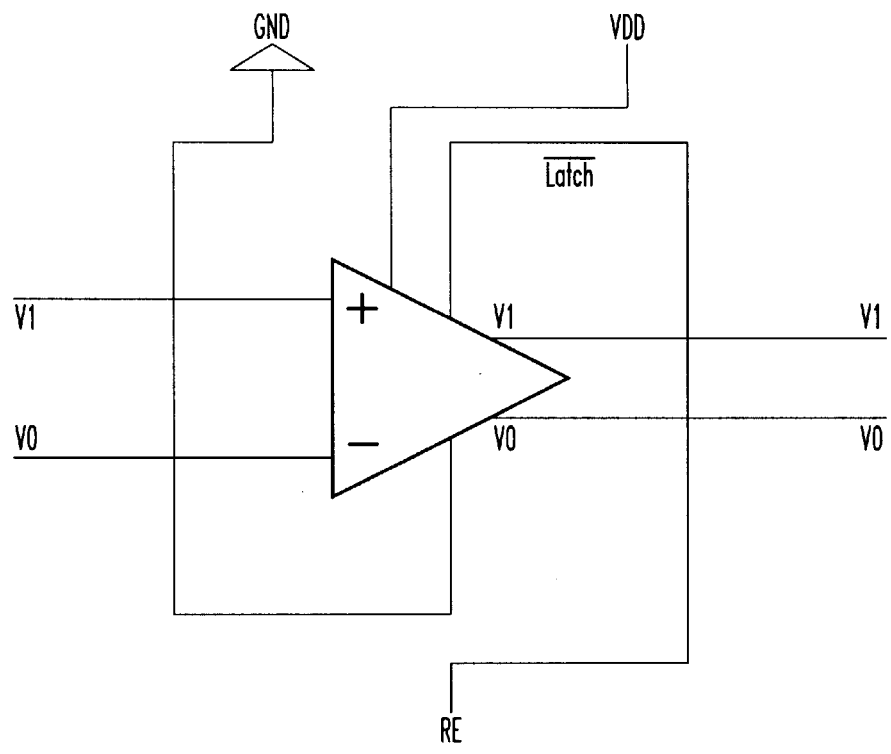

FIG. 83 is a logic-diagram drawing detail showing the digital logic behind the operation of a read-channel's Comparator Decision-Circuit and Read-Enable Latching Circuit.

Figure 84:
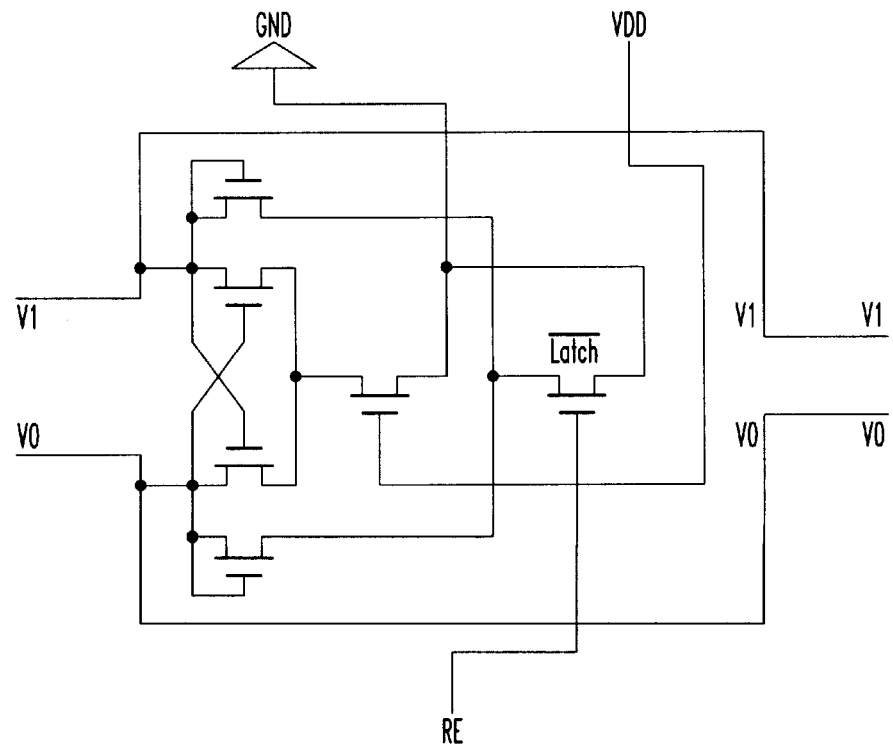

FIG. 84 is a circuit-diagram drawing detail showing the circuit configurations behind the operation of a read-channel's Comparator Decision-Circuit and Read-Enable Latching Circuit.

Figure 85:
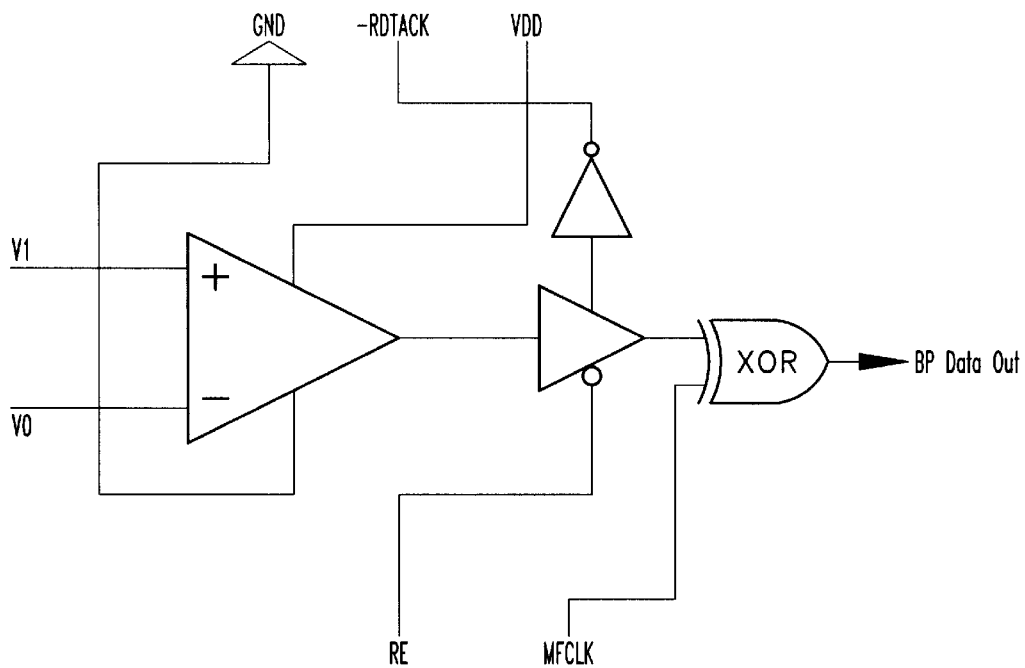

FIG. 85 is a logic-diagram drawing detail showing the digital logic behind the operation of a read-channel's Comparator Buffer Post-Amp Circuits, (-RDTACK) "Read Data Acknowledge" Input Circuits, and XOR Bi-Phase Data-Stream Encoding Pre-DPLL Circuit.

Figure 86:
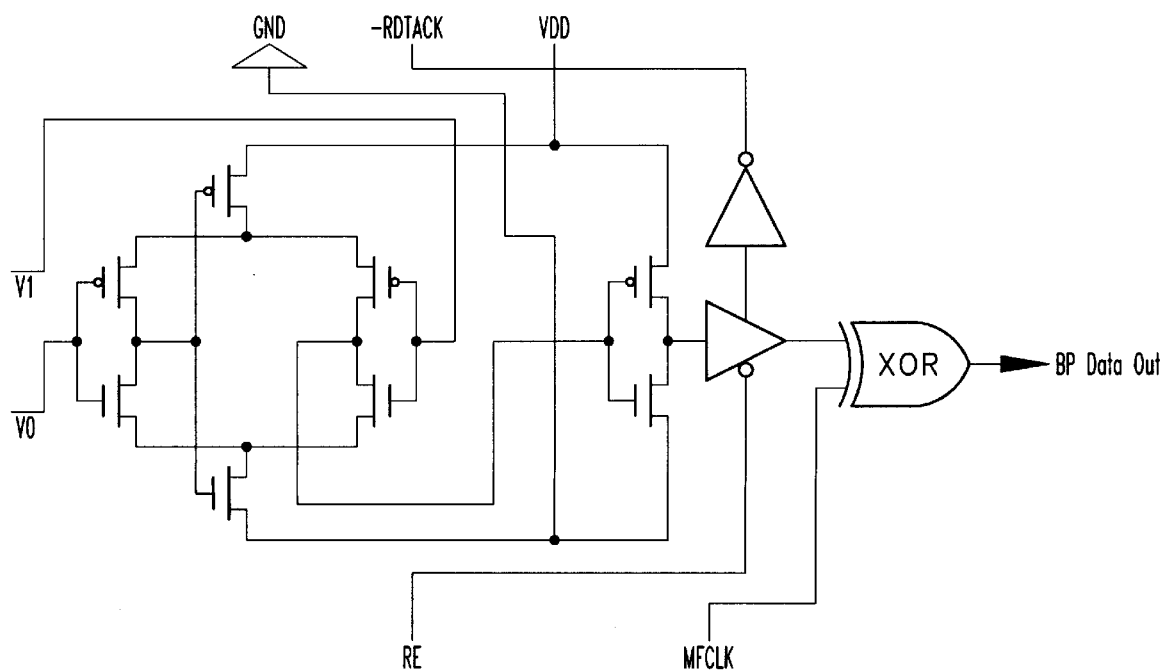

FIG. 86 is a circuit-diagram drawing detail showing the circuit configurations behind the operation of a read-channel's Comparator Buffer Post-Amp Circuit, (-RDTACK) "Read Data Acknowledge" Input Circuit, and XOR Bi-Phase Data-Stream Encoding Pre-DPLL Circuit.

FIG. 87 is a logic-diagram drawing showing the digital logic behind the operation of the R/W Control Circuit.

FIG. 88 is a circuit-diagram drawing showing the circuit configurations behind the operation of the R/W Control Circuit.

FIG. 89 is a truth-table diagram drawing showing in word form the digital logic behind the operation of the R/W Control Circuit.

FIG. 90 is a conversion-table legend drawing used to translate drawing symbols that represent various voltage settings for circuits illustrated in FIGS. 87, and 88.

FIG. 91 is a logic-diagram drawing showing the digital logic behind the operation of a read-channel's AOI XOR Bi-Phase Encoded Data-Out Circuit, Pre-DPLL Circuit, and Dclock-Input Circuit.

FIG. 92 is a circuit-diagram drawing showing the circuit configurations behind the operation of a read-channel's AOI XOR Bi-Phase Encoded Data-Out Circuit, Pre-DPLL Circuit, and Dclock-Input Circuit.

FIG. 93 is a Bi-Phase Data Encoding diagram drawing displaying the data-stream encoding scheme to be used by a read-channel's AOI XOR Bi-Phase Encoded Data-Out Circuit, Pre-DPLL Circuit, and Dclock-Input Circuit.

FIG. 94 is a truth-table diagram drawing showing in word form the digital logic behind the operation of a read-channel's AOI XOR Bi-Phase Encoded Data-Out Circuit, Pre-DPLL Circuit, and Dclock-Input Circuit.

FIG. 95 is a conversion-table legend drawing used to translate drawing symbols that represent various voltage settings for circuits illustrated in FIGS. 91, 92, and 93.

Figure 96:
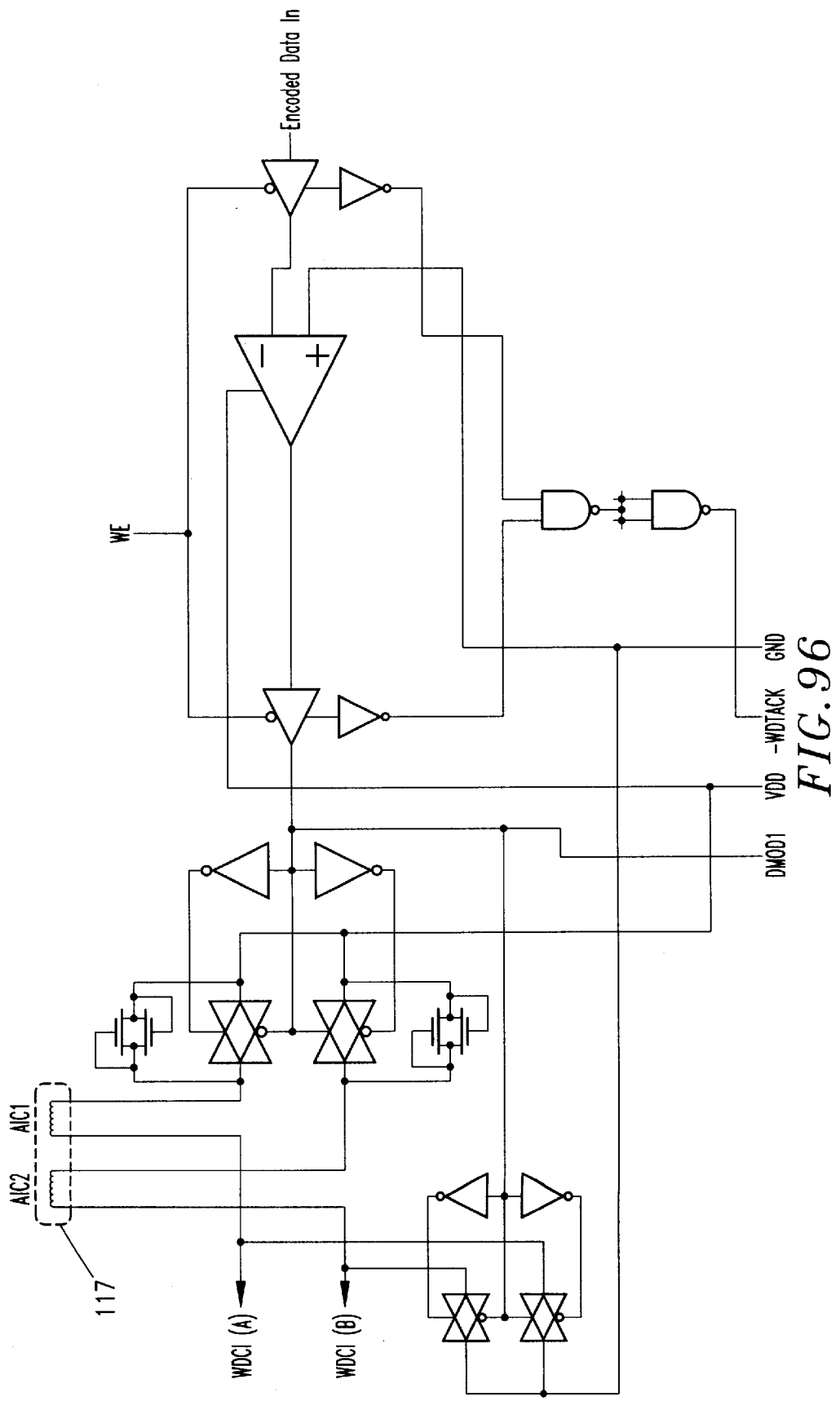

FIG. 96 is a logic-diagram drawing showing the digital logic behind the operation of a write-channel's Pre-Amp and Write Driver Circuit, while displaying the digital logic behind the operation of (-WDTACK) "Write Data Acknowledge" control signals.

Figure 97:
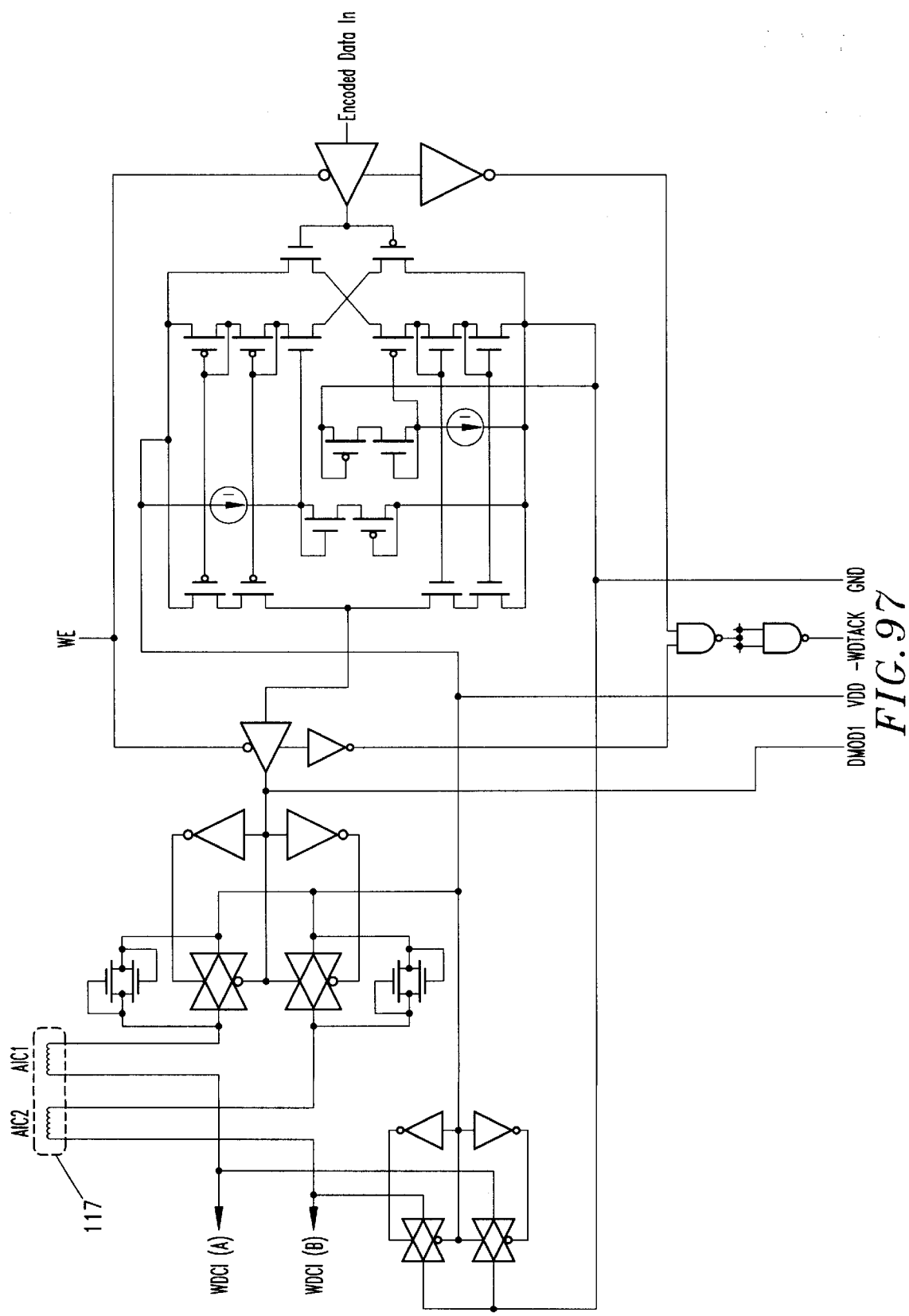

FIG. 97 is a circuit-diagram drawing showing the circuit configurations behind the operation of a write-channel's Pre-Amp and Write Driver Circuits, while displaying the circuit configurations behind the operation of (-WDTACK) "Write Data Acknowledge" control circuits.

Figure 98:
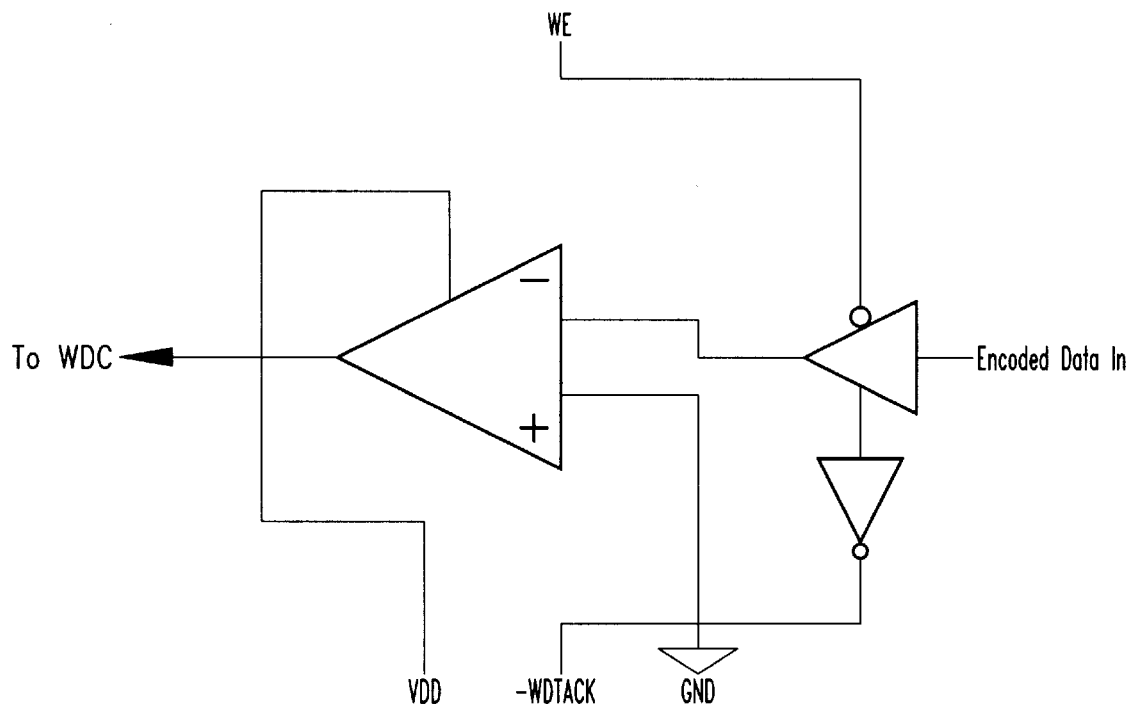

FIG. 98 is a logic-diagram drawing showing the digital logic behind the operation of a write-channel's (AB Class) Pre-Amp Circuit, while displaying the digital logic behind the operation of(-WDTACK) "Write Data Acknowledge" control signals.

Figure 99:
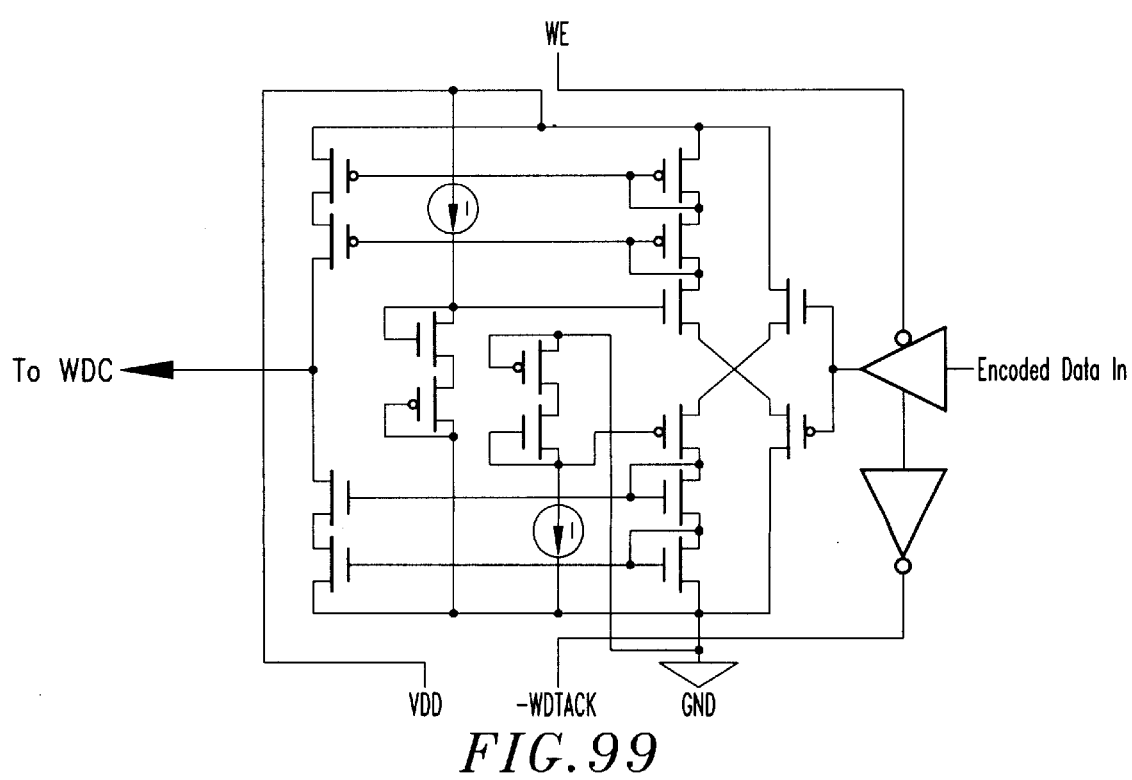

FIG. 99 is a circuit-diagram drawing showing the circuit configurations behind the operation of a write-channel's (AB Class) Pre-Amp Circuit, while displaying the circuit configurations behind the operation of (-WDTACK) "Write Data Acknowledge" control circuits.

Figure 100:
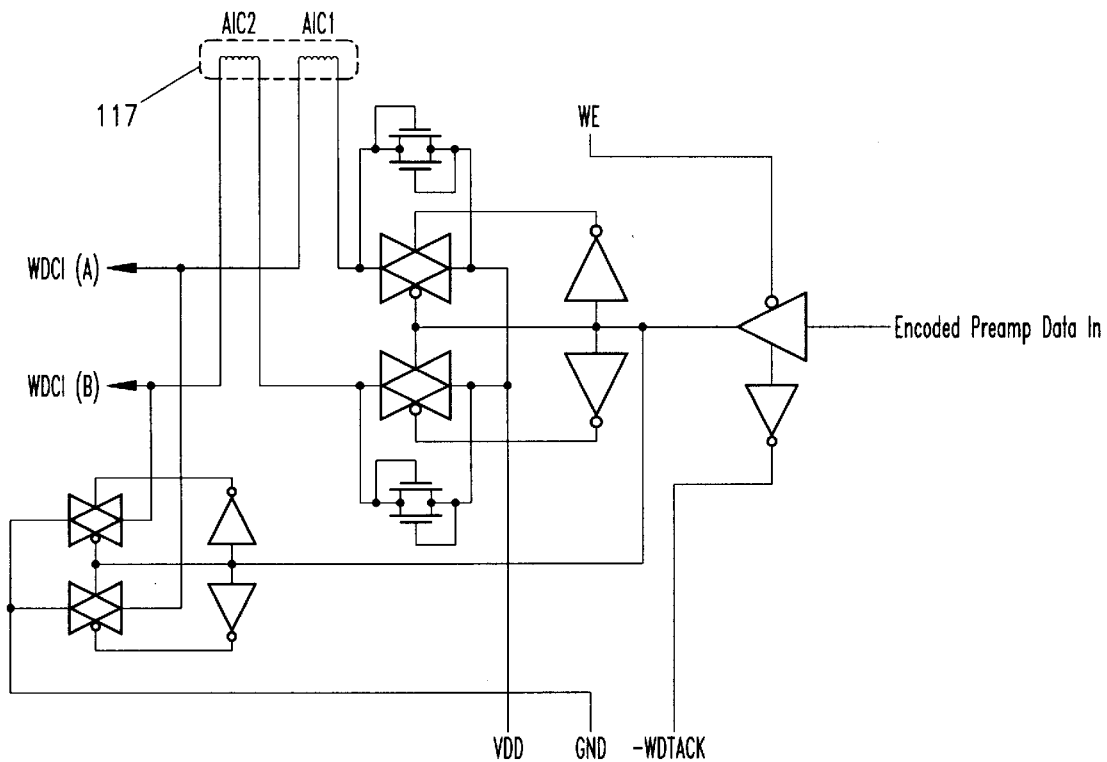

FIG. 100 is a logic-diagram drawing showing the digital logic behind the operation of a write-channel's Data Modulated Write Driver Circuit, while displaying the digital logic behind the operation of (-WDTACK) "Write Data Acknowledge" control signals.

Figure 101:
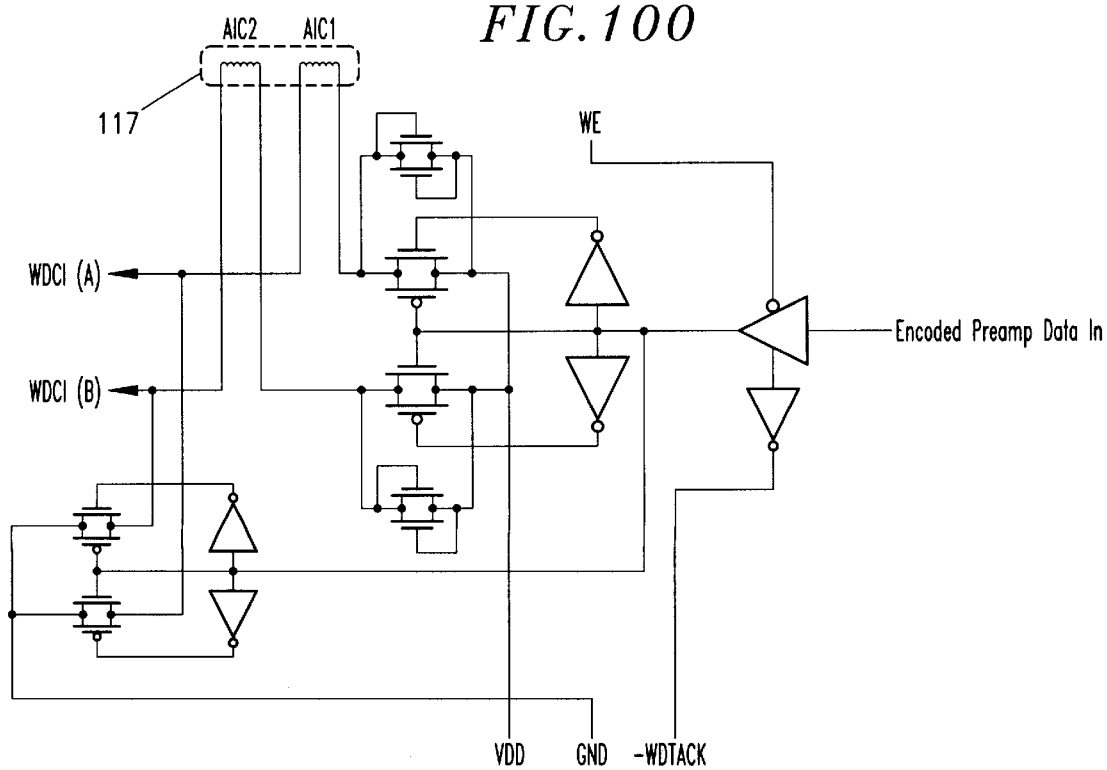

FIG. 101 is a circuit-diagram drawing showing the circuit configurations behind the operation of a write-channel's Data Modulated Write Driver Circuit, while displaying the circuit configurations behind the operation of (-WDTACK) "Write Data Acknowledge" control circuits.

FIG. 102 is a logic-diagram drawing showing the digital logic behind the operation of write-channel's (-WDTACK) "Write Data Acknowledge" control signals.

FIG. 103 is a circuit-diagram drawing showing the circuit configurations behind the operation of a write-channel's (-WDTACK) "Write Data Acknowledge" control circuits.

FIG. 104 is a truth-table diagram drawing showing in word form the digital logic behind the operation of a write-channel's (-WDTACK) "Write Data Acknowledge" control signals.

FIG. 105 is a conversion-table legend drawing used to translate drawing symbols that represent various voltage settings for circuits illustrated in FIGS. 102 and 103.

Figure 106:
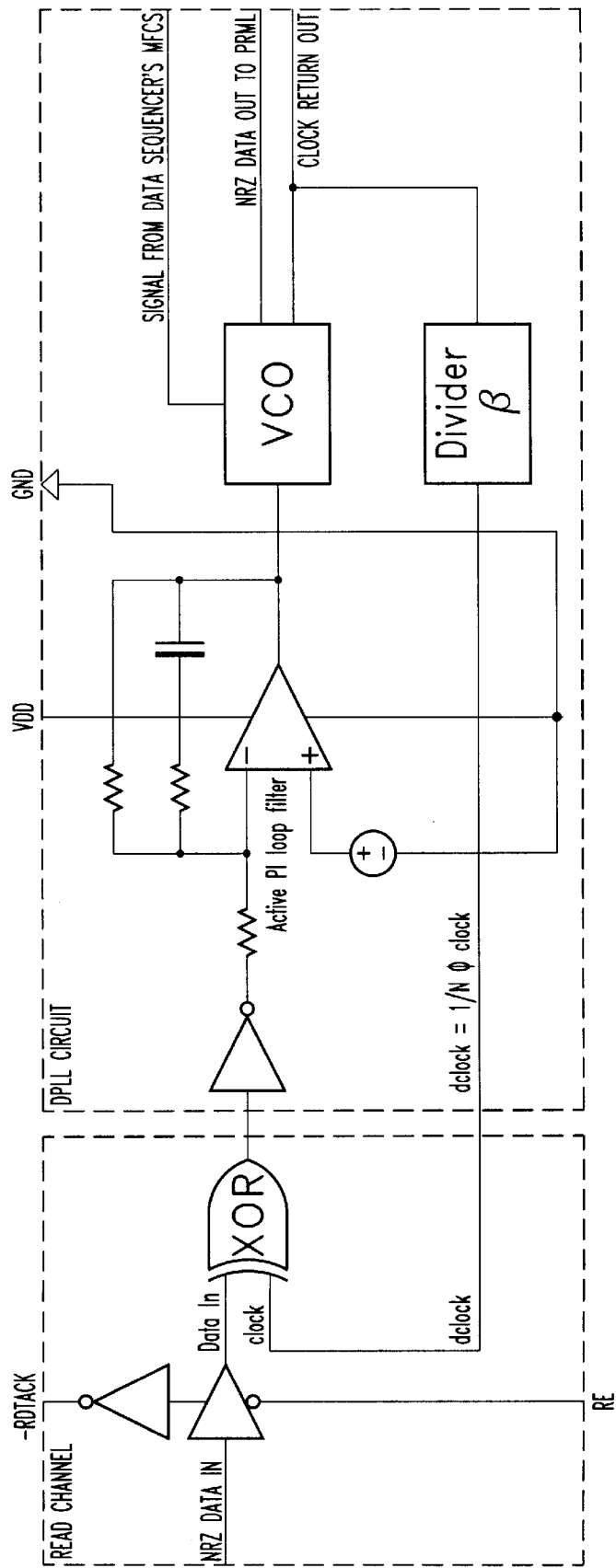

FIG. 106 is both a logic and a block-diagram drawing showing the digital logic behind the operation of a read-channel's XOR and Pre-DPLL Circuit.

FIG. 107 is a logic-diagram drawing showing the digital logic behind the operation of the Microhead Selection Line and Transmission-Gate Switching Circuits, while displaying the digital logic behind the operation of a Microhead Selection Line Circuit's control over every VCSEL microhead's connection to the power buses used in the Magneto-Optical Microhead Array Chips, using three illustrated examples of VCSEL microheads, which are shown in FIG. 107 as VCSEL00, VCSEL01, and N.

FIG. 108A is an orthographic side-view drawing showing details of a One Half-Mirrored Beam-Splitting Analyzer, One Quarter-Wave Light Polarizing Calcite Plate, One VCSEL Microhead, and two (SPC) "Semiconductor Photo-Conductor" photo-detection arrays.

FIG. 108B is a close-up drawing figure detail that uses an enclosed hatched-pattern to illustrate the necessary crystallographic orientation of two crystals used in the construction of the Half-Mirrored Beam-Splitting Analyzer.

FIG. 109 is a circuit-diagram drawing showing the circuit configurations behind the operation of a read-channel's VCSEL Microhead (PCCs) "Power Control Circuits", while displaying circuit configurations behind the operation of the two transmission-gates responsible for circuit pathway selection and power switching between the (WLV) "Write Laser Voltage" and the (RLV) "Read Laser Voltage" input power-bus lines.

FIG. 110 is a logic-diagram drawing showing the digital logic behind the operation of a read-channel's VCSEL Microhead (VCSEL Microhead PCC) "Vertical Cavity Surface Emitting Laser Power Control Circuit", while displaying the digital logic behind the operation of the two transmission-gates responsible for circuit pathway selection and power switching between the (WLV) "Write Laser Voltage" and the (RLV) "Read Laser Voltage" input power-bus lines.

FIG. 111 is a circuit-diagram drawing showing the circuit configurations behind the operation of the Microhead Selection Line and Transmission-Gate Switching Circuits, while displaying the circuit configurations behind the operation of a Microhead Selection Line Circuit's control over the connectivity to power bus lines for every VCSEL microhead used within a Magneto-Optical Microhead Array Chip, which are illustrated in FIG. 111 as VCSEL00, VCSEL01, and N.

Figure 112:
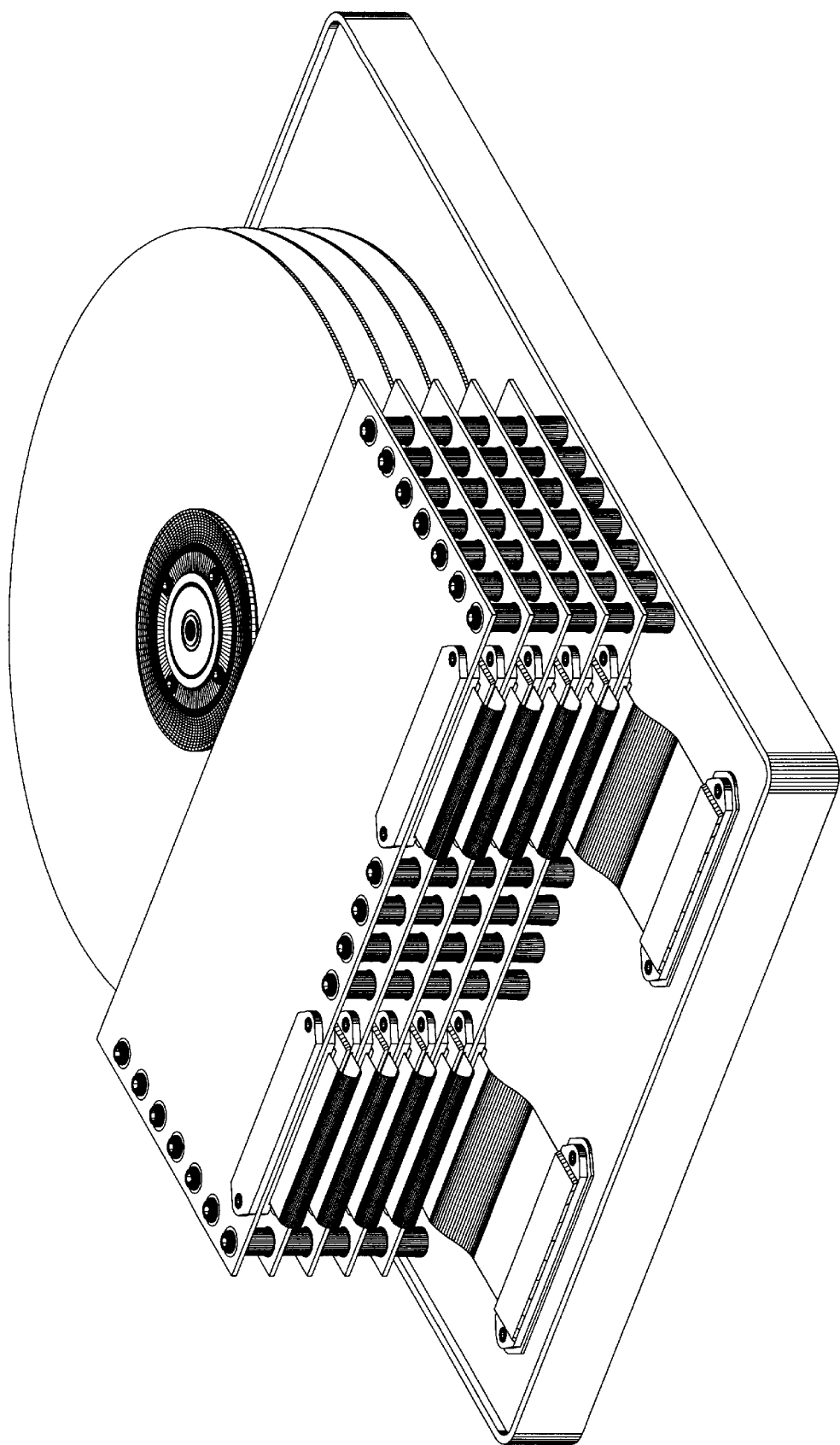

FIG. 112 is a 3D perspective-view drawing that illustrates how a Magneto-Optical Microhead Array Chip Hard Disk Drive unit-assembly will look when fully assembled, while for reasons of visual clarity is shown without a hard disk cover or a hard disk cover's sealing gasket.

DETAILED DESCRIPTION OF A PREFERRED EMBODIMENT

Two performance issues confronting a designer of a high capacity magnetic or optical hard disk drive are "average seek times" and "full stroke seek times". Moreover, seek-times are the movement of read/write data-head stack-assemblies from one data-track to another for the facilitation of data storage and data retrieval. To a designer the beforementioned seek-times presents a serious amount of lag-time or a "bottle neck" in a hard disk drive's execution of data storage or data retrieval processes. In addition, is the loss of a hard disk drive's data-surface real estate to embedded-servo sectoring and servo-information fields; normally needed by a conventional hard disk drive's tracking system, as defined by prior art.

However, when it comes to the Magneto-Optical Microhead Array Chip Hard Disk Drive's design the problems normally associated with traditional tracking methods and conventional voice-coil actuators are not improved upon, but are all-together eliminated. Furthermore, to fully understand the functionality and improvements the Magneto-Optical Microhead Array Chip Hard Disk Drive design introduces, we must begin by considering the structures illustrated in drawing FIGS. 1, 2, and 3. Moreover, these illustrations are orthographic drawings of a Magneto-Optical Microhead Array Chip Hard Disk Drive's unit-assembly.

Figure 1B:
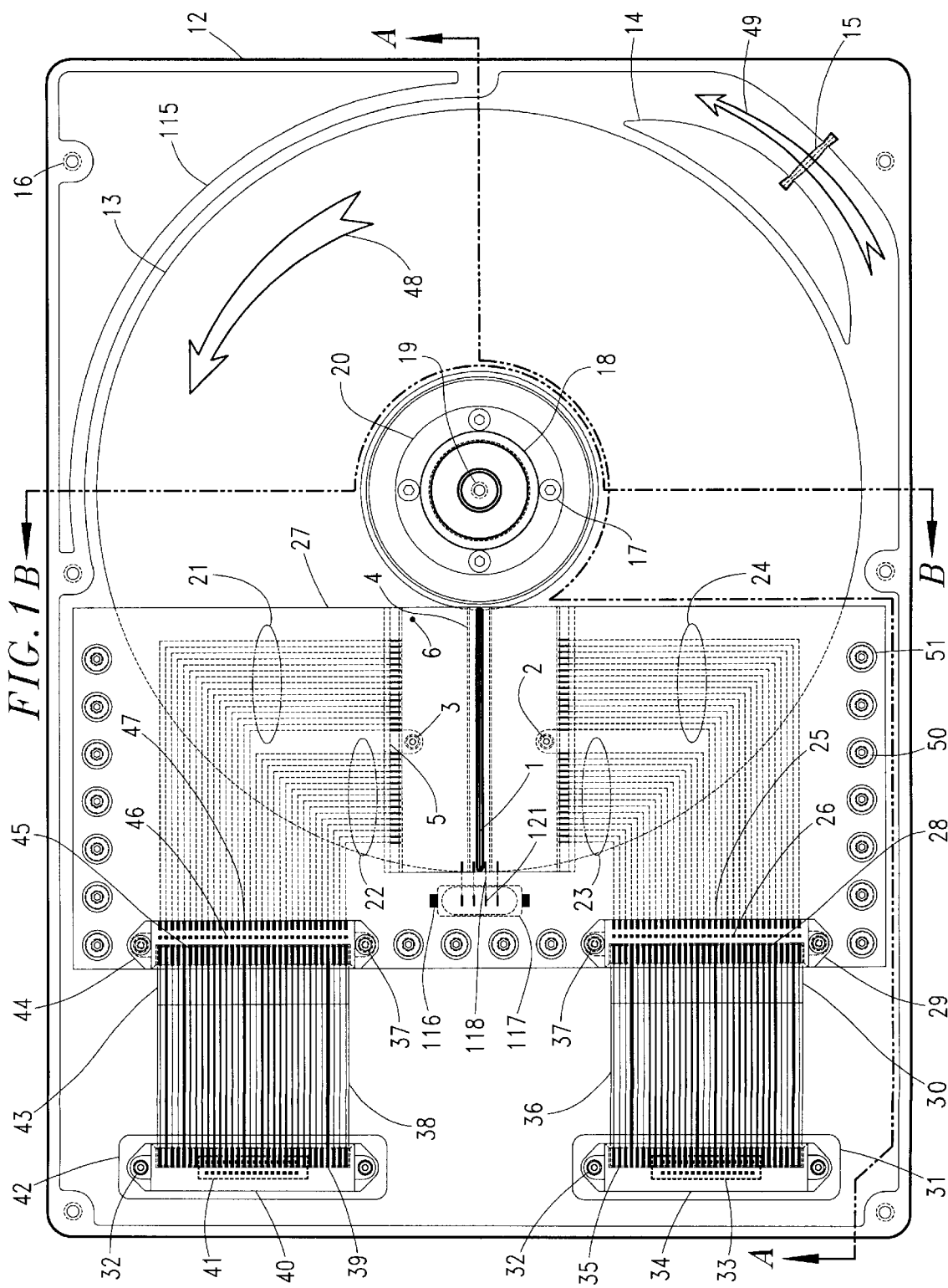
FIG. 1 shows an orthographic plan-view of a hard disk drive unit assembly for a Magneto-Optical Microhead Array Chip design, shown with the hard disk drive cover and sealing gasket removed.
Figure 2:
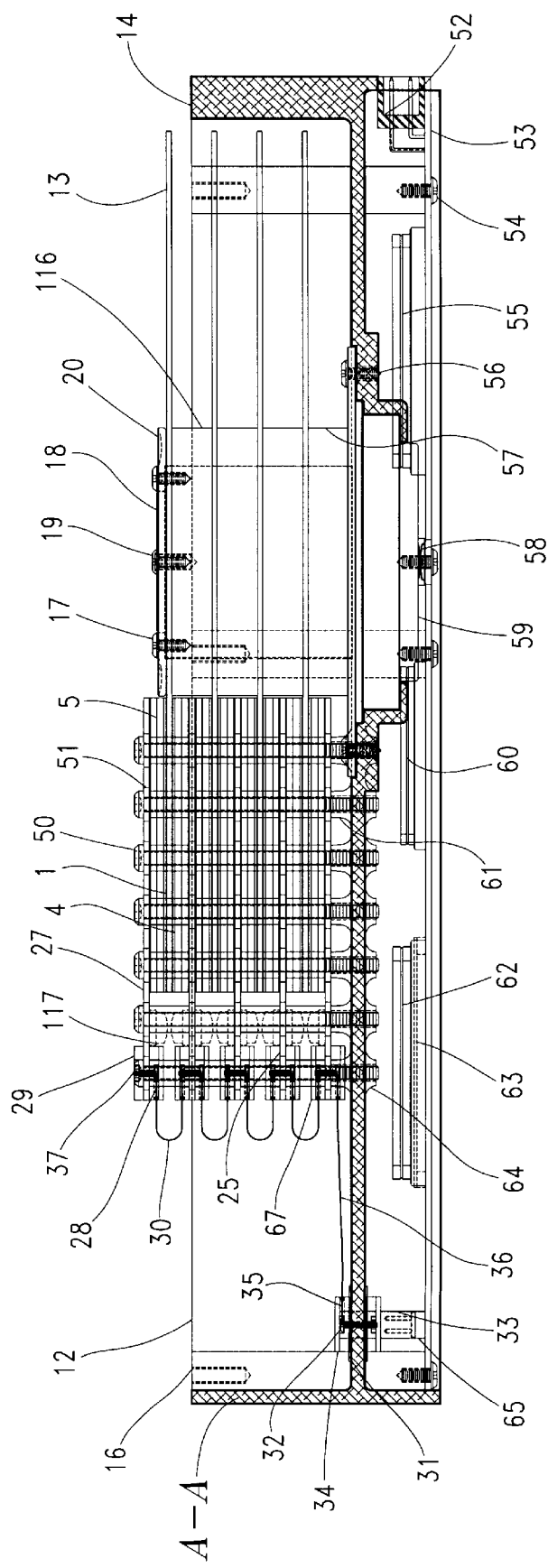
FIG. 2 shows an orthographic side-view of a unit assembly for a Magneto-Optical Microhead Array Chip design, shown with the hard disk drive cover and sealing gasket removed, displaying section A—A.
Figure 3:
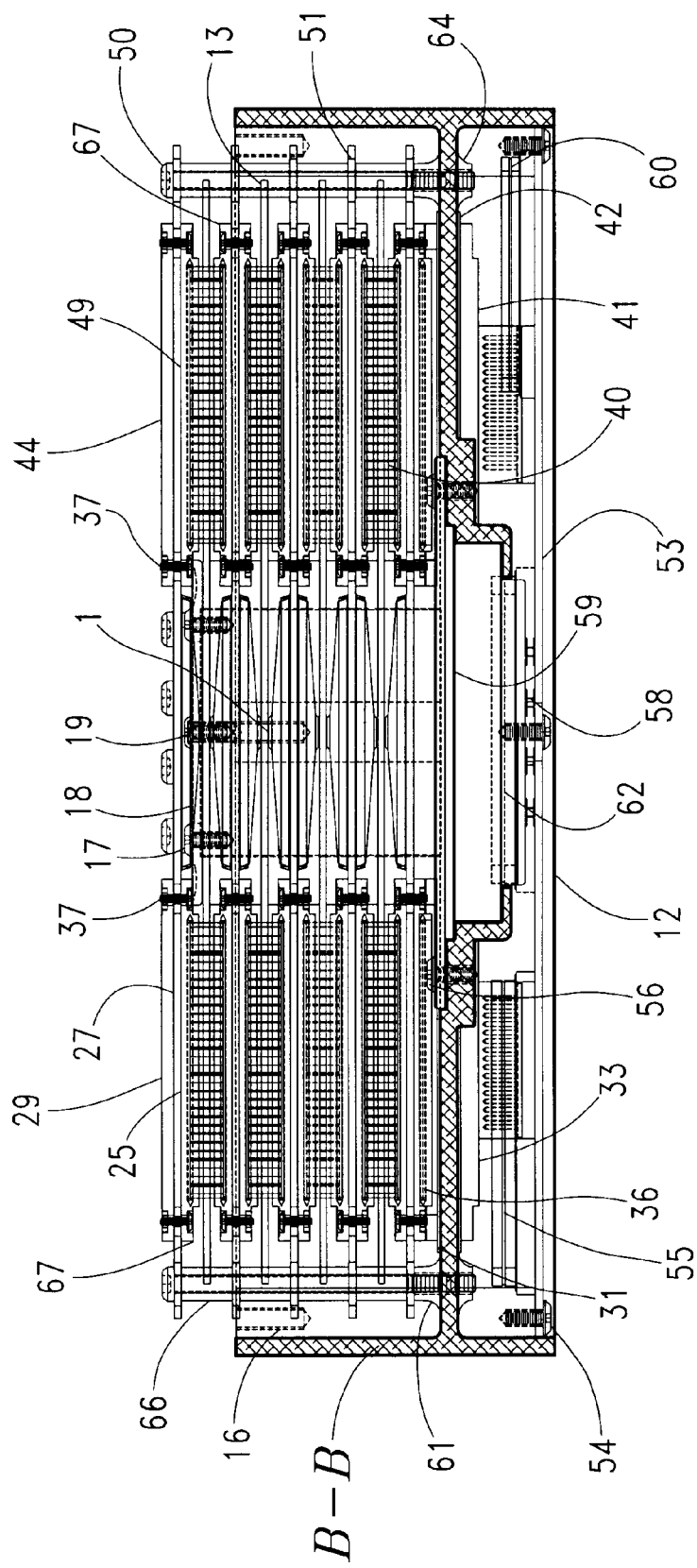
FIG. 3 shows an orhographic front-view of a unit assembly for a Magneto-Optical Microhead Array Chip design, shown with the hard disk drive cover and sealing gasket removed, displaying section B—B.

The preferred embodiment of the present invention, as illustrated in drawing FIGS. 1, 2, and 3 begins with a Magneto-Optical Microhead Array Chip Hard Disk Drive's casting-base 12 (FIGS. 1, 2, and 3), which is constructed from a single machined piece of aluminum-alloy that provides a mounting surface for a spindle-motor drive mechanism 59 (FIGS. 2 and 3), a (PCB) "Printed Circuit Board" hard disk drive controller 53 (FIGS. 2 and 3), a hard disk drive's cover and cover sealing-gasket (i.e., not shown here), and Magneto-Optical Microhead Array Chip chip-positioning circuit board assemblies 27 (FIGS. 1, 2, 3, 6, 9, and 10). The bottom inside of the beforementioned casting-base 12 (FIGS. 1, 2, and 3) acts as a mounting flange for the beforementioned (DC) "Direct Current" "Spindle-Motor" drive assembly 59 (FIGS. 2 and 3). Furthermore, integral with the beforementioned casting-base 12 (FIGS. 1, 2, and 3), is the beforementioned DC Spindle-Motor's drive assembly, which is a fixed-shaft and brushless DC Spindle-Motor drive mechanism 59 (FIGS. 2 and 3) that drives the "counterclockwise" rotation 48 (FIG. 1) of the data-storage disk-platters 13 (FIGS. 1, 2, and 3) installed in a Magneto-Optical Microhead Array Chip Hard Disk Drive's unit-assembly, as illustrated in FIG. 117.

In addition, a Magneto-Optical Microhead Array Chip Hard Disk Drive's unit-assembly uses data-storage disk-platters 13 (FIGS. 1, 2, and 3) to store various kinds of information, where the beforementioned disk-platters are constructed as double-sided, multi-layered, and circular-shaped disk structures. Moreover, a highly reflective substrate, a transparent dielectric layer, a magnetic recording layer, and a protective layer comprise a disk-platter's multi-layered structure, where deposition of the beforementioned layers is outward from both sides of a disk-platter's highly reflective substrate. The highly reflective substrate is made from a single piece of highly polished "Aluminum" and used by the beforementioned disk-platters to reflect laser-light produced by lasers located within the Magneto-Optical Microhead Array Chips. Moreover, a transparent dielectric layer, which is formed from a transparent material such as (SiN) "Silicon-Nitride" or (AlN) "Aluminum-Nitride", while the beforementioned magnetic recording layer is formed from an amorphous rare-earth transition-metal alloy such as (TbFeCo) or (GdTbFe), and finally the beforementioned protective layer, which is also formed from a transparent material such as (SiN)" Silicon-Nitride" or (AlN) "Aluminum-Nitride".

Furthermore, the beforementioned disk-platters are mounted upon a rotating spindle assembly 57 (FIG. 2), which is rotated "3,400" to "10,000" (RPM) "Revolutions-Per-Minute" by an in-spindle brushless DC Spindle-Motor 59 (FIGS. 2 and 3), relative to the beforementioned frame casting-base 12 (FIGS. 1, 2, and 3). Typically, the beforementioned Spindle-Motor is secured to an aluminum-alloy casting-base 12 (FIGS. 1, 2, and 3) with four motor mounting hex-screws 56 (FIGS. 2 and 3). In addition, the beforementioned Spindle-Motor 59 (FIGS. 2 and 3) has a rotor 57 (FIG. 2), which is flanged at the base, and a disk-platter axle, which is located at the center of the previously mentioned rotor 57 (FIG. 2).

In addition, a rotating flanged rotor housing is used to both position and firmly secure all of the beforementioned disk-platters, where each disk-platter has a disk-spacer 116 (FIG. 2) placed between each proceeded data-storage disk-platter installed. While, having a final data-storage disk-platter 13 (FIGS. 1, 2, and 3) secured into place with a rotor housing-cap 20 (FIGS. 1 and 2) and four rotor housing-cap mounting hex-screws 17 (FIGS. 1, 2, and 3). Preferably, the Spindle-Motor bearings are formed as a part of the Spindle-Motor drive assembly 59 (FIGS. 2 and 3), and used to rotate the spindle-assembly 57 (FIG. 2) relative to the frame casting-base 12 (FIGS. 1, 2, and 3). The Spindle-Motor 59 (FIGS. 2 and 3) itself is mounted to the bottom-inside surface of the casting-base 12 (FIGS. 1, 2, and 3) with four motor mounting hex-screws 56 (FIGS. 2 and 3).

Furthermore, in the center of a rotor-housing's top bearing 18 (FIGS. 1, 2, and 3) is a Spindle-Motor's non-moving bearing-rod core 19 (FIGS. 1, 2, and 3), where a non-moving bearing-rod core 19 (FIGS. 1, 2, and 3) has its top-end threaded for a Magneto-Optical Microhead Array Chip Hard Disk Drive's housing-cover mounting screw-hole 19 (FIGS. 1, 2, and 3), which is used to secure a Magneto-Optical Microhead Array Chip Hard Disk Drive's housing-cover to the beforementioned casting-base 12 (FIGS. 1, 2, and 3). Preferably, there are "6" other threaded hex-screw holes 16 (FIGS. 1, 2, and 3) in a Magneto-Optical Microhead Array Chip Hard Disk Drive's casting-base 12 (FIGS. 1, 2, and 3), which are also used for the securing and sealing of a (i.e., not shown here) Magneto-Optical Microhead Array Chip Hard Disk Drive's housing-cover, which is used to cover and seal a Magneto-Optical Microhead Array Chip Hard Disk Drive's casting-base housing.

Figure 61A:
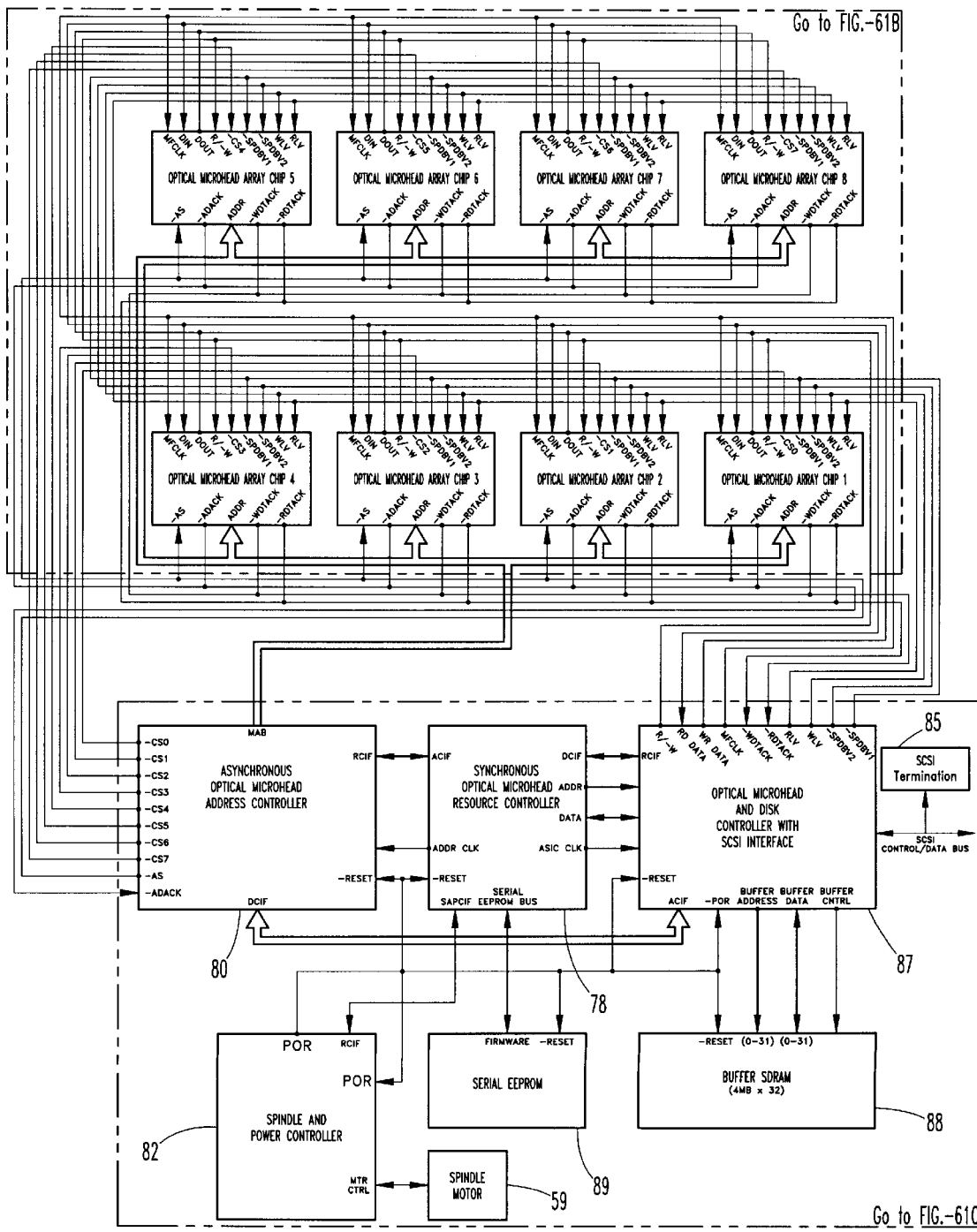
FIG. 61A is a block-diagram drawing of the SCSI Disk Controller used in the Magneto-Optical Microhead Array Chip Hard Disk Drive design, which displays areas within FIG. 61A that were copied to separate drawing files as block-diagram drawing figures containing enlarged versions of block-diagram 61A's various areas.
Figure 61B:
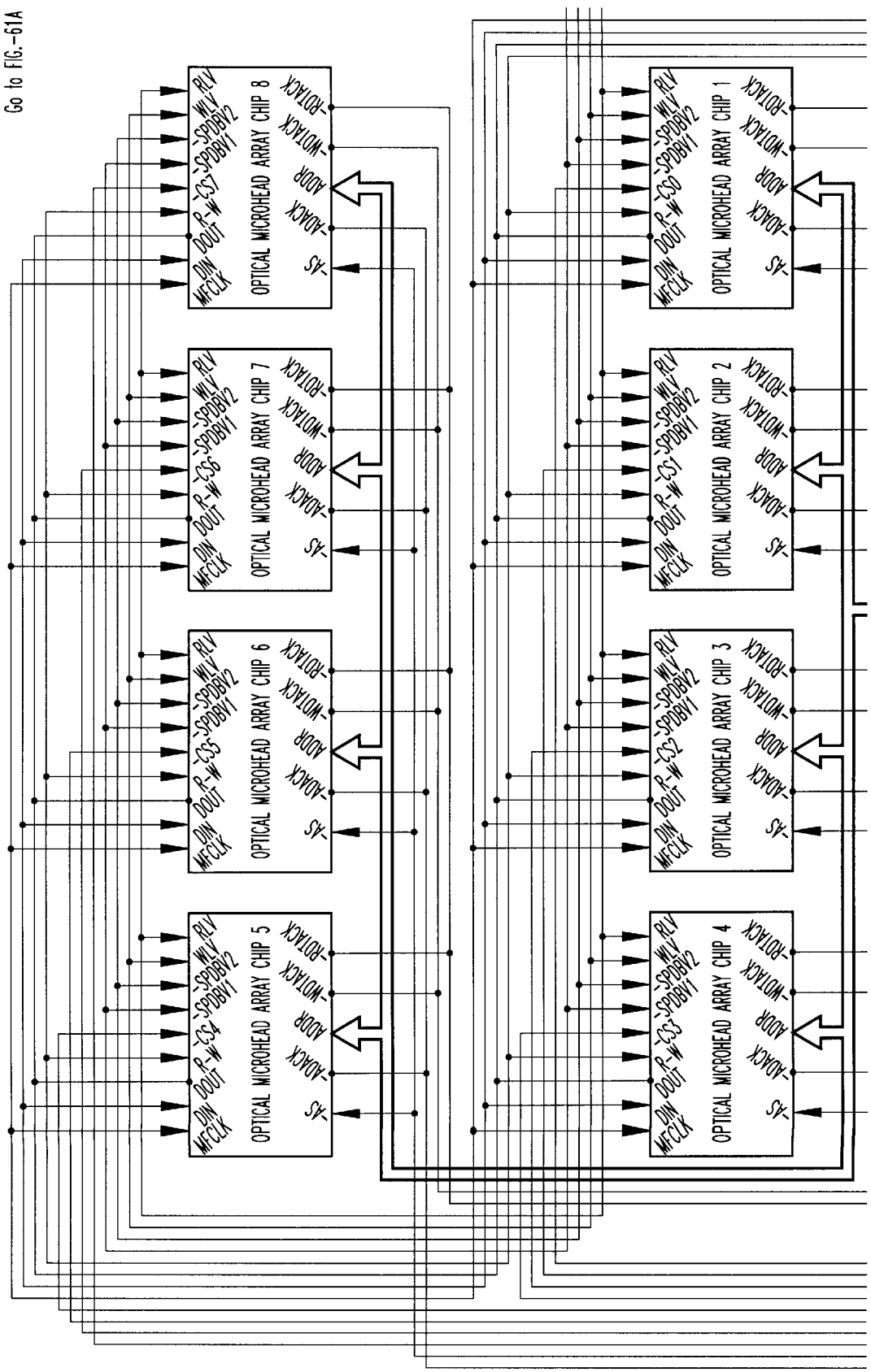
FIG. 61B is an enlarged block-diagram drawing of the SCSI Disk Controller used in the Magneto-Optical Microhead Array Chip Hard Disk Drive design, which displays an enlarged block-diagram showing details of the block-diagram illustrated in FIG. 61A.
Figure 61C:
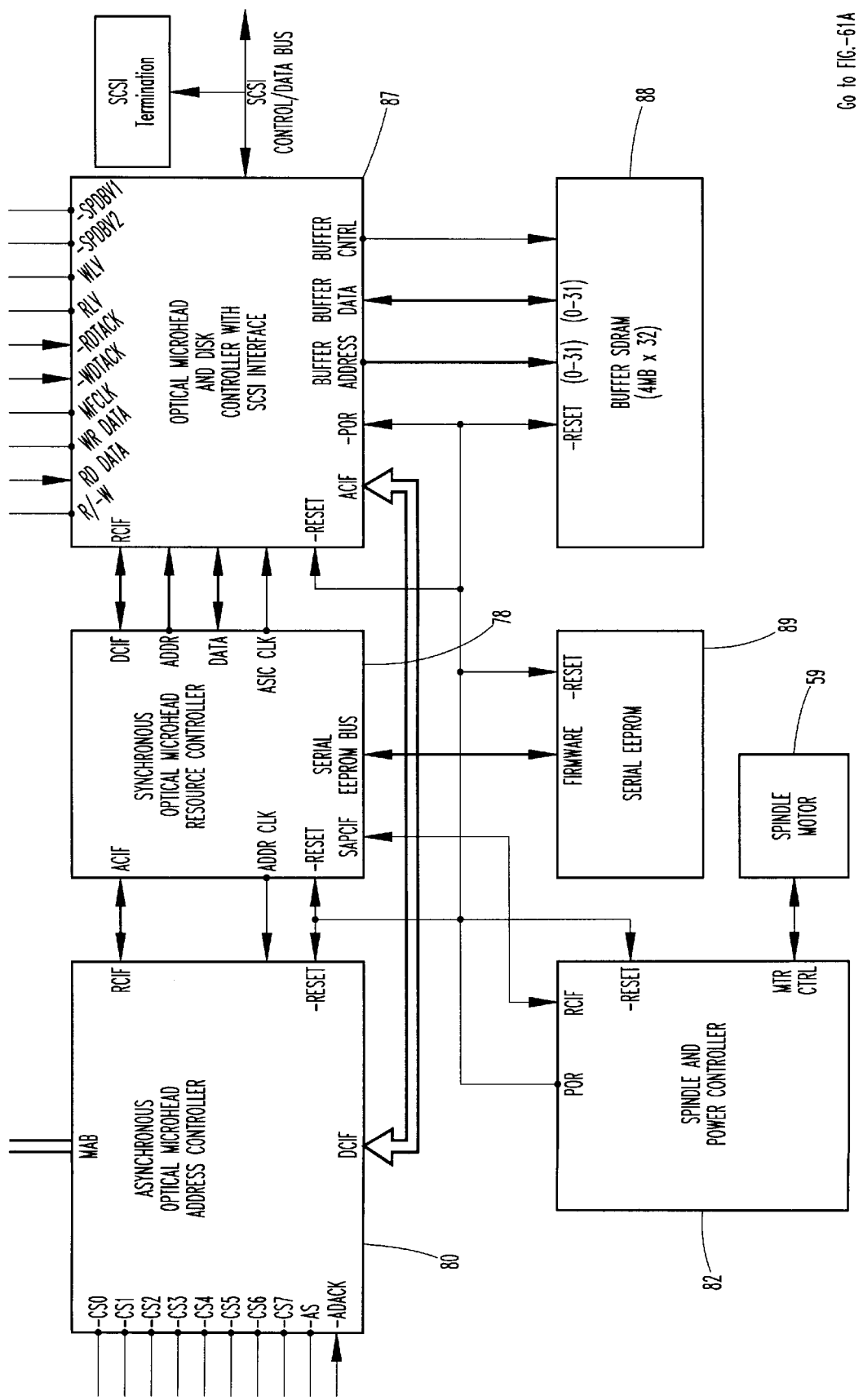
FIG. 61C is an enlarged block-diagram drawing of the SCSI Disk Controller used in the Magneto-Optical Microhead Array Chip Hard Disk Drive design, which displays an enlarged block-diagram showing details of the block-diagram illustrated in FIG. 61A.
Figure 62A:
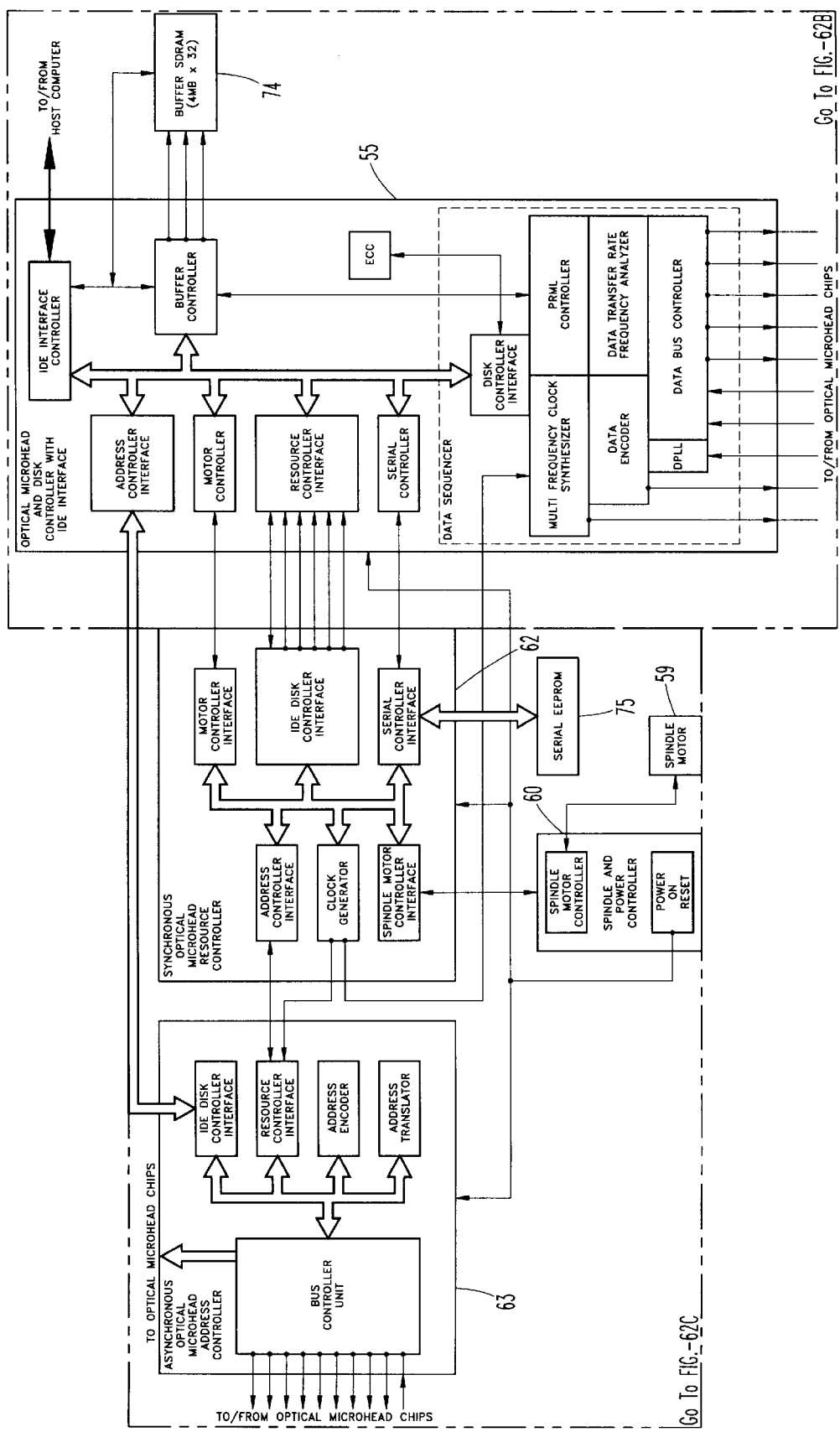
FIG. 62A is a block-diagram drawing showing the internal component configurations for the ATA-2 IDE Disk Controller used in the Magneto-Optical Microhead Array Chip Hard Disk Drive design, which displays areas within FIG. 62A that were copied to separate drawing files as block-diagram drawing figures containing enlarged versions of block-diagram 62A's various areas.
Figure 62C:
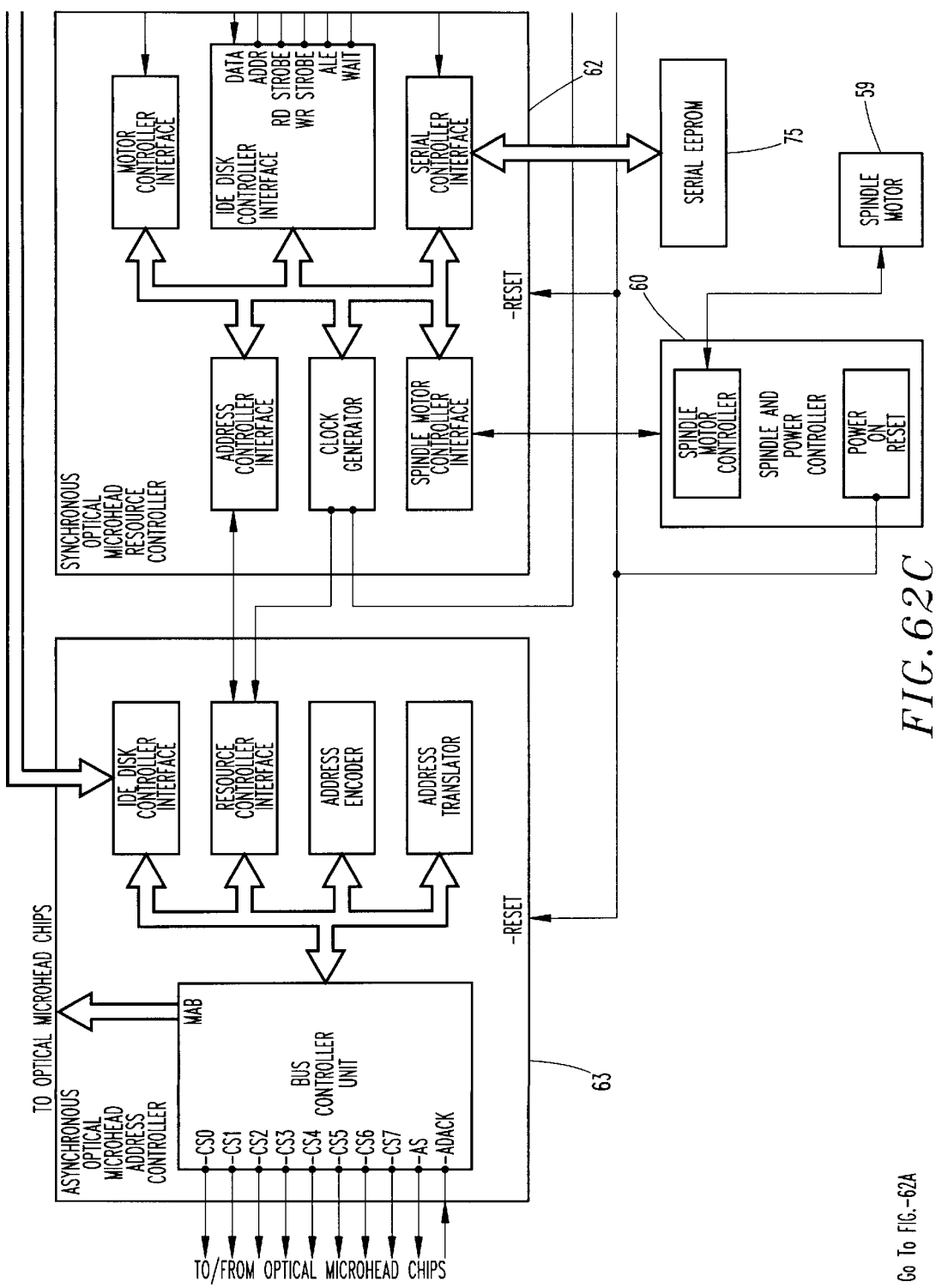
FIG. 62C is an enlarged block-diagram drawing showing details of internal component configurations for the ATA-2 IDE Disk Controller used in the Magneto-Optical Microhead Array Chip Hard Disk Drive design, which displays an enlarged block-diagram drawing showing details of the block-diagram drawing illustrated in FIG. 62A.
Figure 63A:
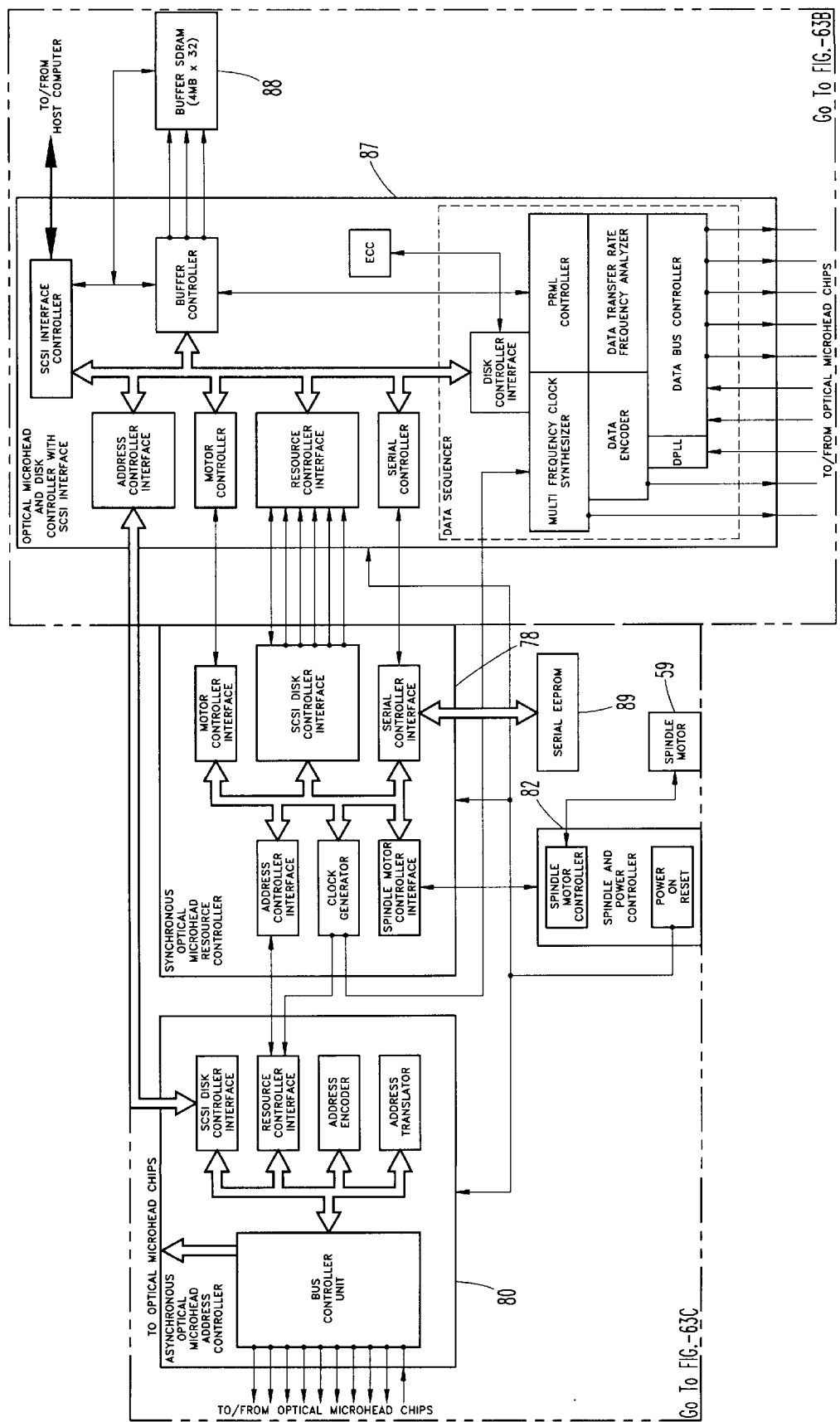
FIG. 63A is a block-diagram drawing showing the internal component configurations for the SCSI Disk Controller used in the Magneto-Optical Microhead Array Chip Hard Disk Drive design, which displays areas within FIG. 63A that were copied to separate drawing files as block-diagram drawing figures containing enlarged versions of block-diagram 63A's various areas.
Figure 63C:
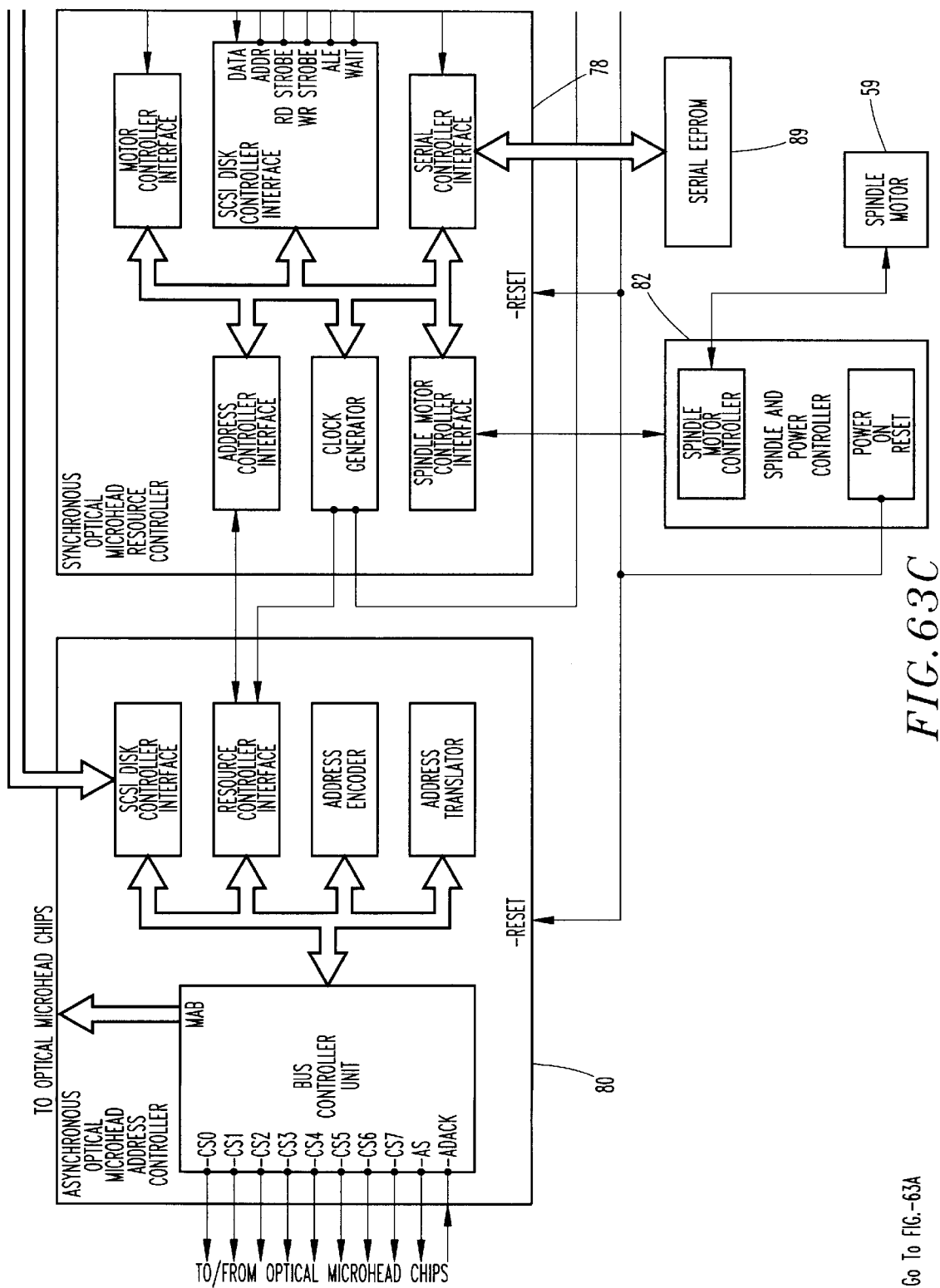
FIG. 63C is an enlarged block-diagram drawing showing details of internal component configurations for the SCSI Disk Controller used in the Magneto-Optical Microhead Array Chip Hard Disk Drive design, which displays an enlarged block-diagram drawing showing details of the block-diagram illustrated in FIG. 63A.

Furthermore, the beforementioned Spindle-Motor's driver-circuit, which is called the Spindle And Power Controller 60 (FIG. 4), 82 (FIG. 5), 60 (FIG. 60A), 60 (FIG. 60C), 82 (FIG. 61 A), 82 (FIG. 61C), 60 (FIG. 62A), 60 (FIG. 62C), 82 (FIG. 63A), 82 (FIG. 63C) is provided to communtate e.g. with the three-phase windings of a Magneto-Optical Microhead Array Chip Hard Disk Drive's brushless Spindle-Motor 59 (FIGS. 2, 3, 60A, 60C, 61A, 61C, 62A, 62C, 63A, and 63C). Furthermore, "Hall-Sensors" (i.e., not shown here) are also provided to determine the position of the permanent-magnetic rotary-elements located within a rotor relative to the fixed windings and poles of the beforementioned Spindle-Motor 59 (FIG. 2), (FIG. 3). Typically, Hall-Sensors (i.e., not shown here) provide response-control information to a "Spindle And Power Controller" 60 (FIG. 4), 82 (FIG. 5), 60 (FIG. 60A), 60 (FIG. 60C), 82 (FIG. 61A), 82 (FIG. 61C), 60 (FIG. 62A), 60 (FIG. 62C), 82 (FIG. 63A), 82 (FIG. 63C). In addition, the previously mentioned Spindle And Power Controller's driver-circuit will also control the Hall-Sensors in a conventional fashion, as well.

In addition, the final assembly of a Magneto-Optical Microhead Array Chip Hard Disk Drive is done in a contamination free "Clean Room" manufacturing facility. To provide the Magneto-Optical Microhead Array Chip Hard Disk Drives with a contamination free environment a hard disk drive cover sealing-gasket provides an air-tight seal between a Magneto-Optical Microhead Array Chip Hard Disk Drive's casting-base 12 (FIGS. 1, 2, and 3) and its metal cast-aluminum (i.e., not shown here) housing cover. Sealing-gaskets will be installed during final assembly of the Magneto-Optical Microhead Array Chip Hard Disk Drive unit assemblies using "6" threaded hex-screws (i.e., not shown here). Furthermore, to provide an environment that continues to be clean and free from air-contaminants; an internal air-filtering device is used 15 (FIG. 1) to filter the drive's internal air supply. Moreover, an orthographic plan-view drawing FIG. 1 shows the location of the beforementioned internal air-filtering device 15 (FIG. 1), which also displays internal airflow direction 49 (FIG. 1) with a direction indicating arrow. Indicating that the air flowing through the beforementioned air-filter 15 (FIG. 1) is moving in the same counterclockwise direction of rotation 48 (FIG. 1) as the data-storage disk-platters 13 (FIGS. 1, 2, and 3) of a Magneto-Optical Microhead Array Chip Hard Disk Drive does.

Moreover, the Magneto-Optical Microhead Array Chips that are used within a Magneto-Optical Microhead Array Chip Hard Disk Drive's unit-assembly are positioned very close to a Magneto-Optical Microhead Array Chip Hard Disk Drive's rotating disk-platter data-surfaces. Therefore, it is essential that the air circulation through Magneto-Optical Microhead Array Chip Hard Disk Drives be kept free of dust, pollen, and other air-borne particles and contaminates, least they are trapped between a microhead array of a Magneto-Optical Microhead Array Chip and a disk-platter's data-surface, causing disk-platter data-surface damage and data-loss. Furthermore, when the Magneto-Optical Microhead Array Chip Hard Disk Drives are in use the rotation of its installed disk-platters will force air through a Magneto-Optical Microhead Array Chip Hard Disk Drive's internal air-filter 15 (FIG. 1). Internal air-pressure within a Magneto-Optical Microhead Array Chip Hard Disk Drive's unit-assembly is shifted by a internal air-foil 14 (FIG. 1) from the outer-perimeter of its rotating disk-platters to a air-filter's 15 (FIG. 1) passage-way, where a constant stream of air is made to flow through a "0.3" micron air-filter 15 (FIG. 1).

Moreover, the beforementioned air-filter is installed into a slot lying between the upper right-hand corner of a Magneto-Optical Microhead Array Chip Hard Disk Drive's casting-base 12 (FIG. 1), and the beforementioned air-filter's air circulating airfoil air-scoop 14 (FIG. 1). Furthermore, during normal hard disk drive operation, while the disk-platters within a Magneto-Optical Microhead Array Chip Hard Disk Drive are rotating, the air-circulating airfoil air-scoop design 14 (FIG. 1) will also help a Magneto-Optical Microhead Array Chip Hard Disk Drive to keep cool.

Another preferred embodiment of the present invention, as illustrated in drawing FIGS. 1, 2, 3, 6, 9, 10, 29, 30, 31, 32, 33, 34, 35, 36, 37, and 38, shows how to execute the placement of the Magneto-Optical Microhead Array Chips. Moreover, positioned by specially designed chip-positioning circuit boards 27 (FIGS. 1, 2, 3, 6, 9, and 10). To insure rigid and stable placement of the beforementioned Magneto-Optical Microhead Array Chips, chip-positioning circuit boards need their core structures constructed from a rigid material, like "Titanium" or "Graphite Carbon Composite". Furthermore, a chip-positioning circuit board's core structure 27 (FIGS. 1, 2, 3, 6, 9, and 10) has two sides, where each side of every chip-positioning circuit board would have eighteen embossed bolt-flanges; a total of thirty-six bolt-flanges 51 (FIGS. 1, 2, 3, and 6) for each chip-positioning circuit board's core structure. Moreover, each chip-positioning circuit board's thirty-six embossed bolt-flanges are created as raised surfaces; protruding "1/16" of one-inch in an outward direction, which is perpendicular to a chip-positioning circuit board's surface, which will later contain sixty-four copper-circuit trace-runs. Each embossed bolt-flange will have its top-surface area machined down and shaped into a bolt-flange with a high degree of flatness, which must be within a allowed tolerance of plus or minus "1/8" of one-micron.

Moreover, after each chip-positioning circuit board has its thirty-six embossed bolt-flanges machined down to a degree of flatness that is within their specified tolerances, a first-layer application of fiberglass insulation is applied to the outer surfaces of the chip-positioning circuit boards. The beforementioned first fiberglass insulation layer will provide fundamental electrical insulation for a chip-positioning circuit board's installed copper circuit trace-runs 21, 22, 23, 24 (FIGS. 1, 6, 29, 30, 31, 32, 34, 35, 36, and 37). Furthermore, and only after the beforementioned fiberglass insulation has been applied to surfaces reserved for the future installation of a chip-positioning circuit board's copper circuit trace-runs, can installation of a chip-positioning circuit board's sixty-four copper circuit trace-runs proceed. Furthermore, installation of the beforementioned fiberglass insulation will both protect and isolate installed copper circuit trace-runs, not only from each other, but also from the metallic material used to construct a chip-positioning circuit board's core-structure.

In addition, the beforementioned thirty-six embossed bolt-flanges 51 (FIGS. 1, 2, 3, and 6), which are passively used to install completed chip-positioning circuit boards into a Magneto-Optical Microhead Array Chip Hard Disk Drive's unit-assembly (FIG. 117) and, moreover will need to be free of dirt, fiberglass, or any other particulate matter. Moreover, to explain this further, if, during a Magneto-Optical Microhead Array Chip Hard Disk Drive's final assembly, illustrated by FIG. 117, any particulate matter were to be left on any chip-positioning circuit board's embossed bolt-flange mounting surfaces 51 (FIGS. 1, 2, 3, and 6), the installation and placement of chip-positioning circuit boards, as illustrated by FIGS. 29, 30, 31, 32, 33, 34, 35, 36, 37, and 38, and not yet installed would, after installation become misaligned while in their respective Magneto-Optical Microhead Array Chip Hard Disk Drive's unit-assembly (FIG. 117), adversely affecting the respective Magneto-Optical Microhead Array Chip Hard Disk Drive's overall performance. Therefore, after applying the beforementioned fiberglass insulation to a chip-positioning circuit board's outermost surfaces the thirty-six embossed bolt-flanges 51 (FIGS. 1, 2, 3, and 6) of the chip-positioning circuit boards must be cleaned and made fiberglass free.

In addition, surface mounted chip-socket 5 (FIGS. 1, 2, and 6), which are used by chip-positioning circuit boards, illustrated by FIGS. 29, 30, 31, 32, 33, 34, 35, 36, 37, and 38, to install, position, and connect Magneto-Optical Microhead Array Chips (FIGS. 25, 26, 27, and 28) into a Magneto-Optical Microhead Array Chip Hard Disk Drive's unit-assembly (FIG. 117), while providing connectivity between them and installed copper circuit trace-run surfaces 21, 22, 23, 24 (FIGS. 30, 32, 35, and 37) of chip-positioning circuit boards, as illustrated in FIGS. 29, 30, 31, 32, 33, 34, 35, 36, 37, and 38.

Figure 5:
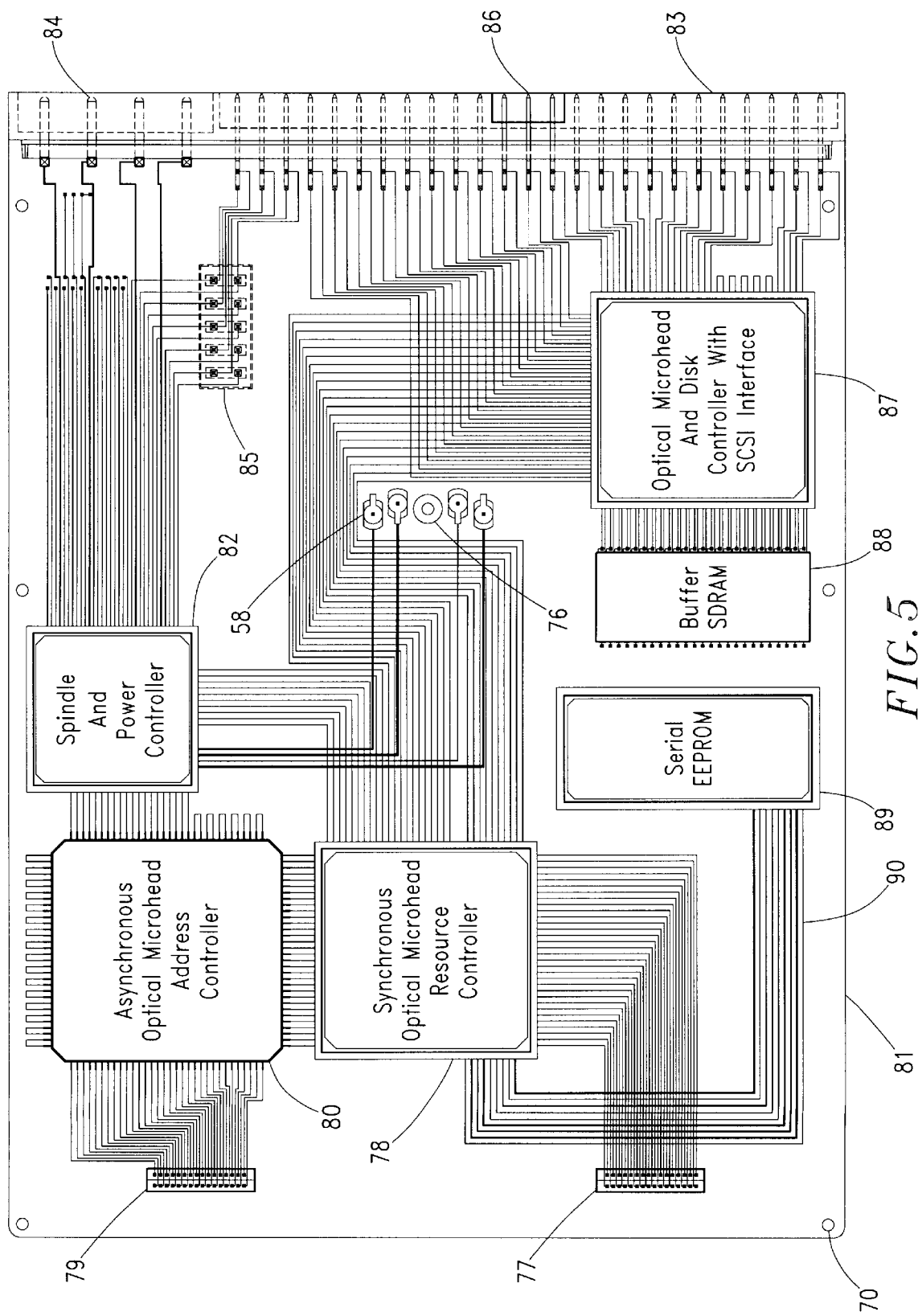
FIG. 5 shows an orthographic plan-view of a SCSI Disk Controller PCB for a Magneto-Optical Microhead Chip design.
Figure 6:
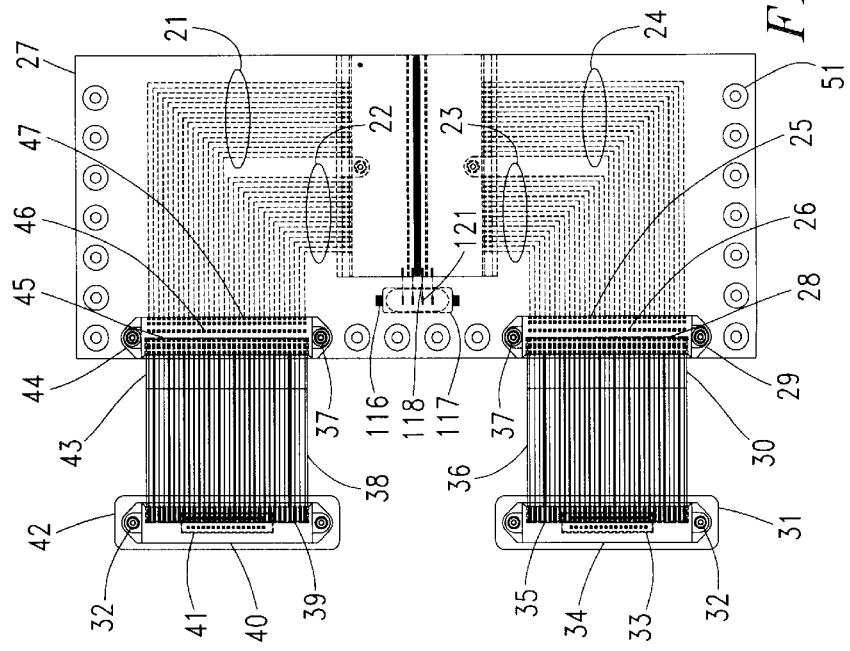
FIG. 6 shows an orthographic plan-view of the chip-positioning circuit board and surface mounting chip-socket for a Magneto-Optical Microhead Array Chip design.

In addition, and only after the installation of a chip-positioning circuit board's surface mounted chip-socket 5 (FIGS. 1, 2, and 6) has been accomplished, can a final topcoat layer of insulating fiberglass be applied to a chip-positioning circuit board's outer-most surface areas 21, 22, 23, 24 (FIGS. 30, 32, 35, and 37) and, therein to its surface mounted chip-socket's base-area perimeter 5 (FIGS. 1, 2, and 6), which will help to seal and secure a chip-positioning circuit board's surface mounted chip-socket(s) 5 (FIGS. 1, 2, and 6) into their final position(s). While applying fiberglass to a chip-positioning circuit board and to a chip-positioning circuit board's surface mounted chip-socket(s) 5 (FIGS. 1, 2, and 6) care must be taken to keep the beforementioned fiberglass insulation off any chip-positioning circuit board's embossed machined bolt-flange mounting surfaces 51 (FIGS. 1, 2, 3, and 6), and out of the contact-circuit areas 93 (FIGS. 30, 32, 3 5, and 37) of a chip-positioning circuit board's surface mounted chip-socket(s) 5 (FIGS. 1, 2, and 6).

Moreover, contact-circuit areas 93 (FIGS. 30, 32, 35, and 37), which are used to connect installed Magneto-Optical Microhead Array Chips, illustrated by FIGS. 29, 31, 34, and 36, to a Magneto-Optical Microhead Array Chip Hard Disk Drive's internal bus system are located at the inner-bottom surface-areas 93 (FIGS. 30, 32, 35, and 37) of every surface mounted chip-socket(s) 5 (FIGS. 1, 2, and 6) of every chip-positioning circuit board installed into a Magneto-Optical Microhead Array Chip Hard Disk Drive's unit-assembly, as illustrated in FIG. 117.

Moreover, the beforementioned surface mounted chip-sockets 5 (FIGS. 1, 2, and 6), like the ones illustrated in chip-positioning circuit board drawing FIGS. 29, 30, 31, 32, 33, 34, 35, 36, 37, and 38, have been designed to firmly secure and position Magneto-Optical Microhead Array Chips into pre-designated and stationary positions above disk-platter data-surfaces. Furthermore, the secured installation of the beforementioned Magneto-Optical Microhead Array Chips (FIGS. 29, 31, 34, and 36) into their surface mounted chip-sockets 5 (FIGS. 1, 2, and 6) is accomplished through a triangular-shaped "Chip Placement Key" 11 (FIGS. 7, 8, 26, and 27) and two surface mounting chip-socket threaded hex-screws (i.e., two threaded hex-screws per Magneto-Optical Microhead Array Chip) 2 (FIGS. 1 and 6).

Figure 26:
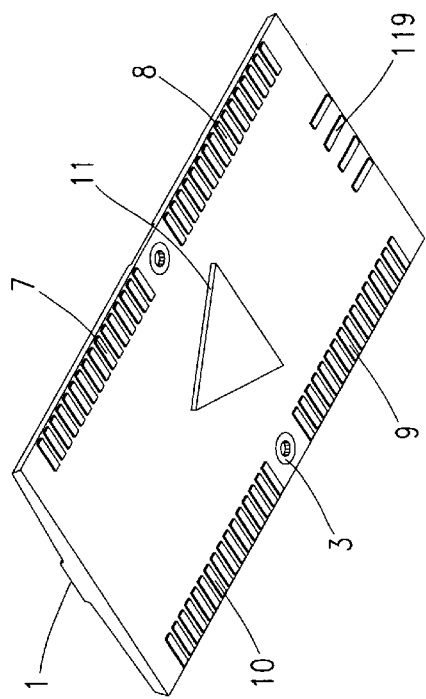
FIG. 26 is a 3D bottom-view drawing of the disk-platters' Top Data-Surface Magneto-Optical Microhead Array Chip.
Figure 27:
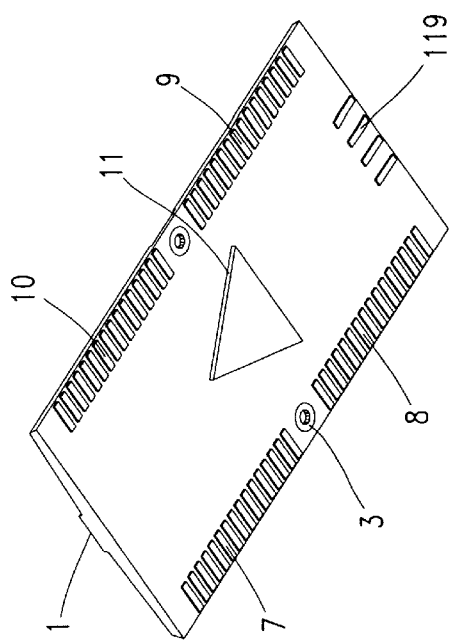
FIG. 27 is a 3D bottom-view drawing of the disk-platters' Bottom Data-Surface Magneto-Optical Microhead Array Chip.

In addition, a triangular-shaped placement key 11 (FIGS. 7, 8, 26, and 27) of a Magneto-Optical Microhead Array Chip is molded and shaped out of an extruded bottom-surface material, which is part of every Magneto-Optical Microhead Array Chip's outer-casing package 4 (FIGS. 1, 26, and 27). To meet with tolerances, triangular-shaped placement keys 11 (FIGS. 7, 8, 26, and 27) of Magneto-Optical Microhead Array Chips are located at the bottom of every Magneto-Optical Microhead Array Chip and machined down into a final triangular-shaped extruding plate 11 (FIGS. 7, 8, 26, and 27). After final machining a Magneto-Optical Microhead Array Chip's placement key 11 (FIG. 7), (FIG. 8), (FIG. 26), (FIG. 27) will protrude about "1/16" of one-inch down from underneath the bottom-center surface of a Magneto-Optical Microhead Array Chip's outer-casing package 4 (FIGS. 1, 26, and 27). The triangle-shaped chip placement keys 11 (FIGS. 7, 8, 26, and 27) will both position and secure the Magneto-Optical Microhead Array Chips (FIGS. 29, 31, 34, and 36) into the surface mounted chip-sockets 5 (FIGS. 1, 2, and 6) of chip-positioning circuit boards, as illustrated in FIGS. 29, 30, 31, 32, 33, 34, 35, 36, 37, and 38, by fitting the previously mentioned triangle-shaped keys 11 (FIGS. 7, 8, 26, and 27) into triangle-shaped and correspondingly sized chip placement keyholes 92 (FIGS. 30, 32, 35, and 37), which are located at the top-center surface of the bottom-center plane 92 of every surface mounted chip-socket installed 5 (FIGS. 1, 2, and 6). Afterwards, the chip placement keyholes 92 (FIGS. 30, 32, 35, and 37) will have the apex of their triangular shaped keyhole pointed toward the front of its respective chip-positioning circuit board's front-end 92 (FIGS. 30, 32, 35, and 37).

Furthermore, Magneto-Optical Microhead Array Chips are secured into surface mounted chip-sockets by using two threaded hex-screws 2 (FIGS. 1, 6, 7, and 8), which are pushed through a Magneto-Optical Microhead Array Chip's two un-threaded hex-screw holes 3 (FIGS. 1, 6, 7, 8, 25, 26, 27, and 28) into a surface mounted chip-socket's two threaded hex-screw holes 93 (FIGS. 30, 32, 35, and 37) and threaded into the previously mentioned surface mounted chip-socket's two threaded hex-screw holes 93, by turning them in a clockwise-direction, using torque wrench, until the two surface mounted chip-socket's hex-screws 2 have reached a predetermined tightness. In this way, the surface mounted chip-sockets will keep the Magneto-Optical Microhead Array Chips, illustrated by FIGS. 29, 31, 34, 36, tightly seated and secured into their respective chip-positioning circuit boards, as illustrated in FIGS. 29, 30, 31, 32, 33, 34, 35, 36, 37, and 38.

Figure 4:
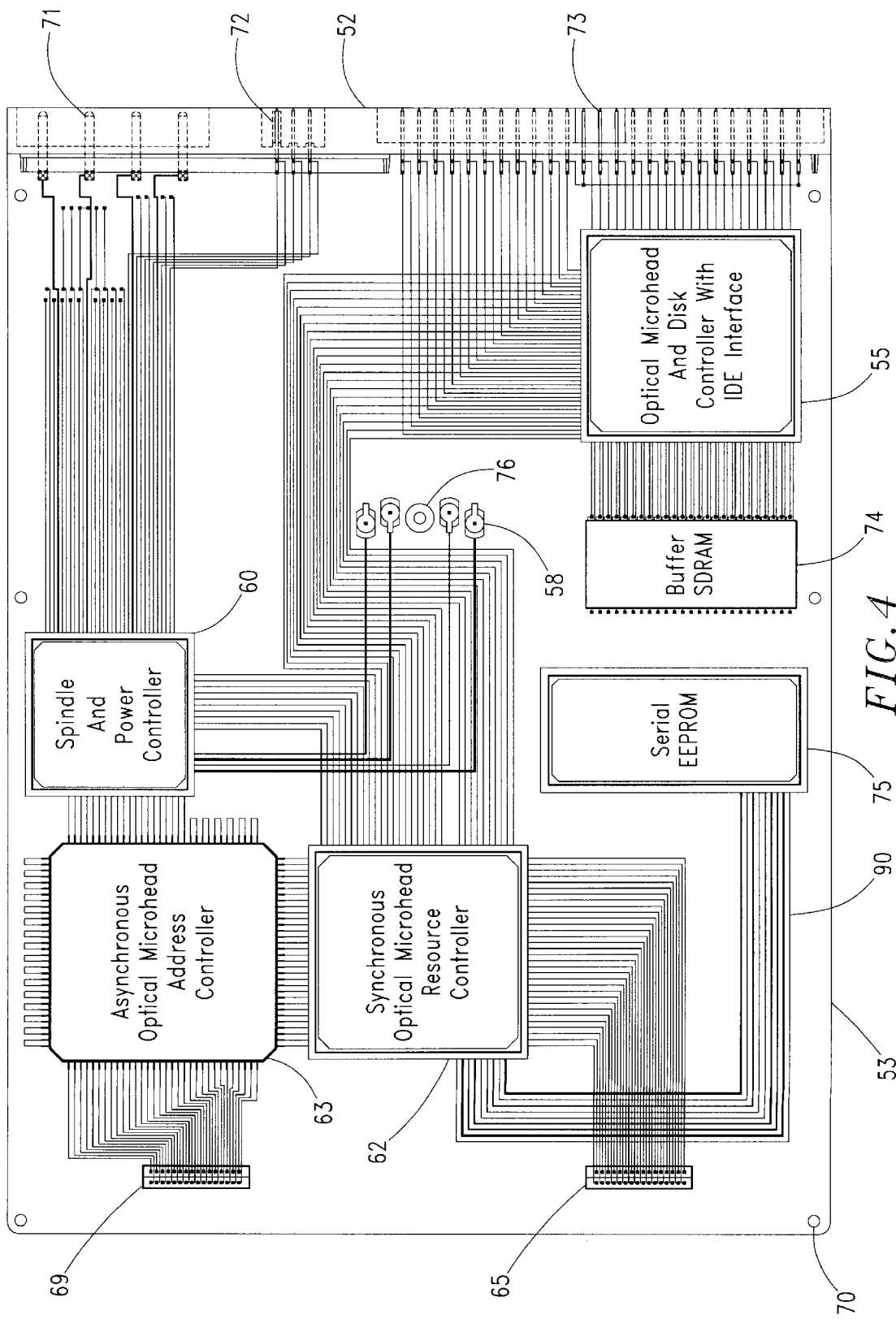
FIG. 4 shows an orthographic plan-view of an ATA-2 IDE Disk Controller PCB for a Magneto-Optical Microhead Array Chip design.

Another preferred embodiment of the Magneto-Optical Microhead Array Chip Hard Disk Drive design is the how, the where, and the why of the previously mentioned Polymer flex-cables and their respective Polymer flex-cable connectors 67, as illustrated in FIGS. 1, 2, 3, 6, 9, 10, 29, 30, 31, 32, 33, 34, 35, 36, and 37, give bus-system connectivity to installed Magneto-Optical Microhead Array Chips. Moreover, Polymer flex-cable connectors 67 are installed onto chip-positioning circuit boards 27 (FIGS. 1, 2, 3, 6, 9, and 10) to provide, via Polymer flex-cables 43, 36, 38, 30 (FIGS. 1, 2, 3, 6, 9, and 10), to chip-positioning circuit boards, as illustrated in FIGS. 29, 30, 31, 32, 33, 34, 35, 36, 37, and 38, and their installed Magneto-Optical Microhead Array Chips (FIGS. 29, 31, 34, and 36), connectivity to a Magneto-Optical Microhead Array Chip Hard Disk Drive's Disk Controller, which is illustrated by FIGS. 4 and 5.

Moreover, Polymer flex-cable connectors 67 and Polymer flex-cables 43, 36, 38, 30 will giving to the beforementioned Magneto-Optical Microhead Array Chips (FIGS. 25, 26, 27, and 28) access to a Magneto-Optical Microhead Array Chip Hard Disk Drive's bus-systems, while in return giving to the beforementioned Magneto-Optical Microhead Array Chip Hard Disk Drive's bus-systems access to the beforementioned Magneto-Optical Microhead Array Chips, as illustrated in FIGS. 25, 26, 27, and 28. The beforementioned Polymer flex-cable connectors 67 make circuit connections with the chip-positioning circuit boards 27 and, therein to the chip-positioning circuit boards' sixty-four copper-circuit trace-runs 21, 22, 23, 24 (FIGS. 1, 6, 29, 30, 31, 32, 34, 35, 36, and 37).

Moreover, by using open-circuit contact-points 46, 26 (FIGS. 1 and 6), which are located on the forward-facing side of the bottom inside-edge of a Polymer flex-cable connector's outer-shell casing 25, 47 (FIGS. 1, 2, 3, 6, 9, and 10), the beforementioned open-circuit contact-points 46,26 (FIGS. 1 and 6) shall form a multiple circuit connection with a chip-positioning circuit board's 27 (FIGS. 1, 2, 3, 6, 9, and 10) sixty-four copper-circuit trace-runs 21, 22, 23, 24 when the Polymer flex-cable connectors 67 (FIGS. 29, 30, 31, 32, 33, 34, 35, 36, and 37) are bolted, using two Polymer flex-cable connector hex-screws 37 (FIGS. 1, 2, and 3), onto the exposed copper-circuit trace-ends 47,25 (FIG. 1) of the chip-positioning circuit boards 27 (FIGS. 1, 2, and 3) sixty-four copper-circuit trace-runs 21, 22, 23, 24 (FIGS. 29, 30, 31, 32, 33, 34, 35, 36, and 37). In addition, when the exposed copper-circuit trace-ends 46, 26 (FIGS. 1 and 6) of polymer flex-cables 43, 30 (FIGS. 1 and 6) are inserted into Polymer flex-cable connector female connections 28, 45 (FIGS. 1, 2, 6, 10, and 29) they are held into place by internal spring-contacts 28, 45 of Polymer flex-cable connectors, giving the Polymer flex-cable connectors 67 (FIGS. 1, 2, and 3) and chip-positioning circuit boards 27 (FIGS. 1, 2, 3, 6, 9, and 10) they are bolted onto, connectivity to a Disk Controller's bus-system.

In addition, open-circuit contact-points 46, 26 (FIGS. 1 and 6) located within each Polymer flex-cable connector's outer-shell casing 25, 47 (FIGS. 1, 2, 3, 6, 9, and 10), also connect to Polymer flex-cable connectors 67 (FIGS. 29, 30, 31, 32, 33, 34, 35, 36, and 37), which are installed onto a chip-positioning circuit-board's opposite-side or bottom side through, what is called a chip-positioning circuit board's pass-through circuit connection 46, 26 (FIGS. 1 and 6). The pass-through circuit connection 46,26 (FIGS. 1 and 6) comprises a group of pin-holes 46, 26 (FIGS. 1 and 6), which act as unobstructed passage-ways that thirty-two micro-plugs having diameters one-half in size to the previously mentioned pin-hole passage-ways, connect two Polymer flex-cable connectors 67 with opposed locations, by allowing each Polymer flex-cable connector's respective group of micro-plugs to connect 46, 26 (FIGS. 1 and 6) with an opposed Polymer flex-cable connector's installation; moreover, creating a pass-through circuit connection 46, 26 (FIGS. 1 and 6). The just described pass-through circuit design also eliminates any possibility of a short-circuit between the beforementioned Polymer flex-cable connector's micro-plug contacts and its respective chip-positioning circuit board's inner metal-core 27 (FIGS. 1, 2, 3, 6, 9, and 10).

In addition, chip-positioning circuit board pass-through circuits 46, 26 (FIGS. 1 and 6) will give bus-system connectivity to installed Polymer flex-cable connectors 67 (FIGS. 1, 2, and 3), through the open-circuit contact-points 46, 26 of Polymer flex-cable connectors, which in turn gives bus-system connectivity to a chip-positioning circuit board's two groups of sixty-four copper-circuit trace-runs 21, 22, 23, 24 (FIGS. 29, 30, 31, 32, 34, 35, 36, and 37), which are located just under the outermost skin of a chip-positioning circuit board's last layer of applied fiber-glass insulation 27 (FIGS. 1, 2, 3, 6, 9, and 11).

Figure 33:
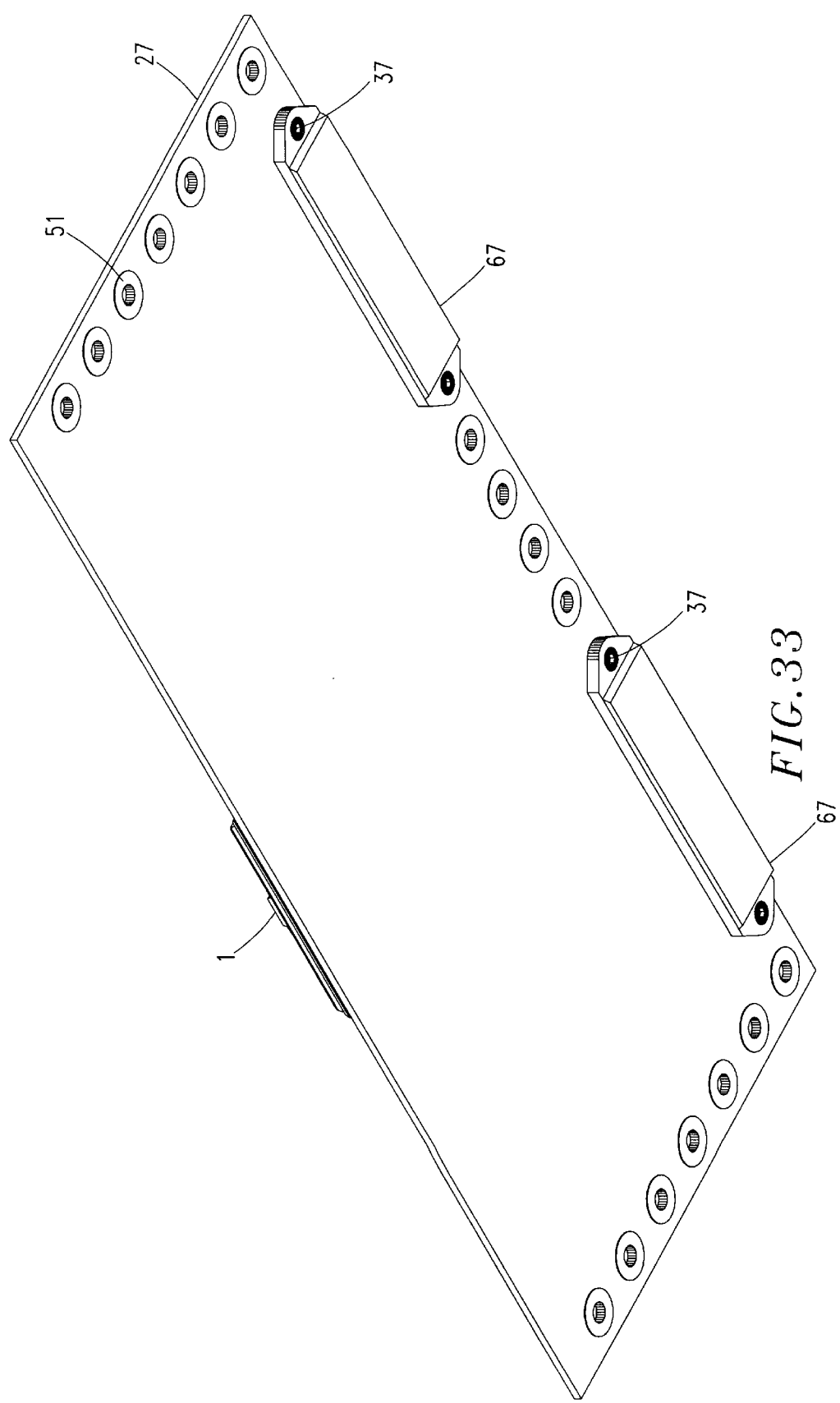
FIG. 33 is a 3D-bottom front-view drawing of a first disk-platter's chip-positioning circuit board assembly, shown with a Magneto-Optical Microhead Array Chip as installed.
Figure 34:
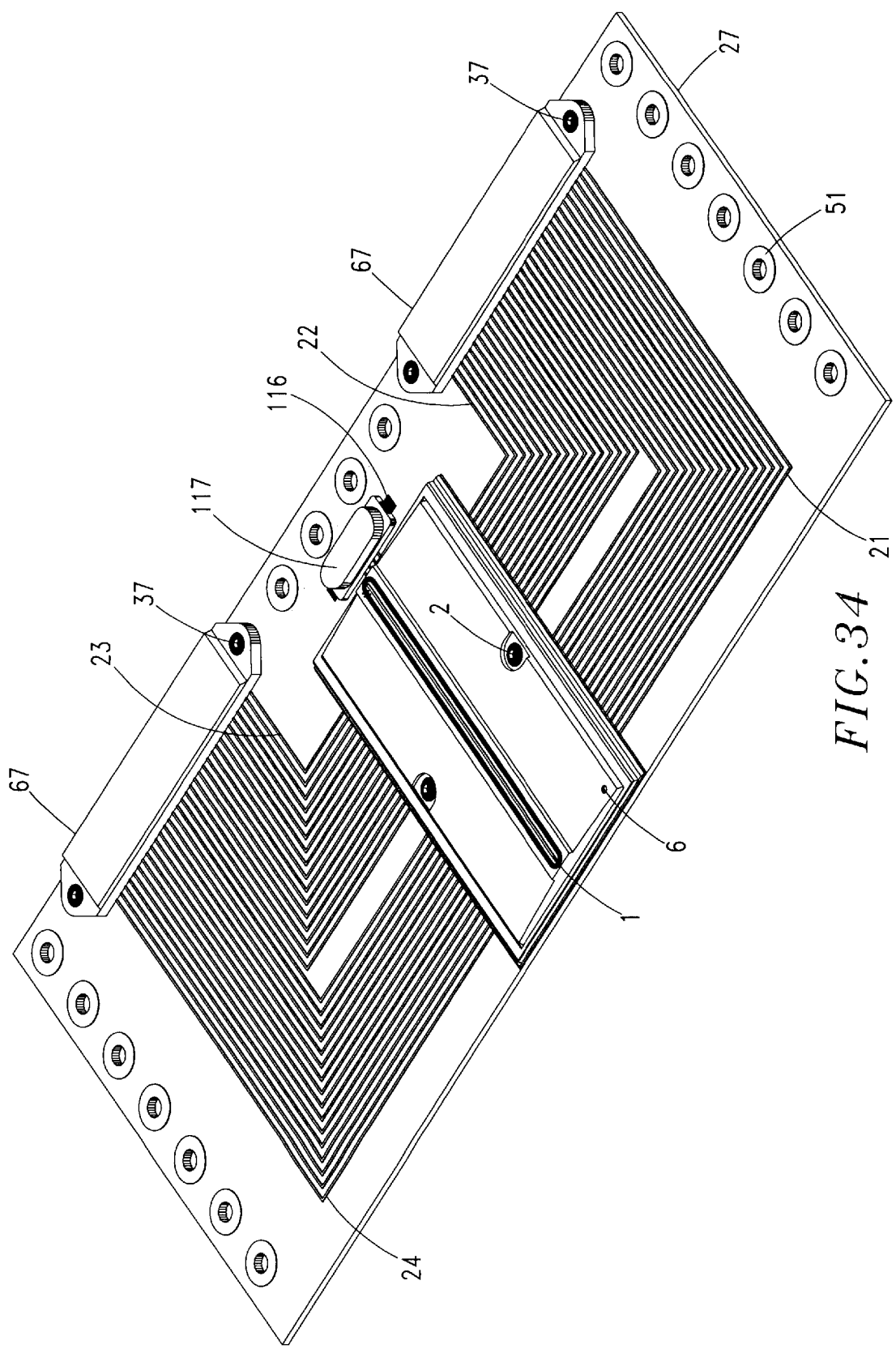
FIG. 34 is a 3D top front-view drawing of a first disk-platter's chip-positioning circuit board assembly, shown with a Magneto-Optical Microhead Array Chip as installed.
Figure 35:
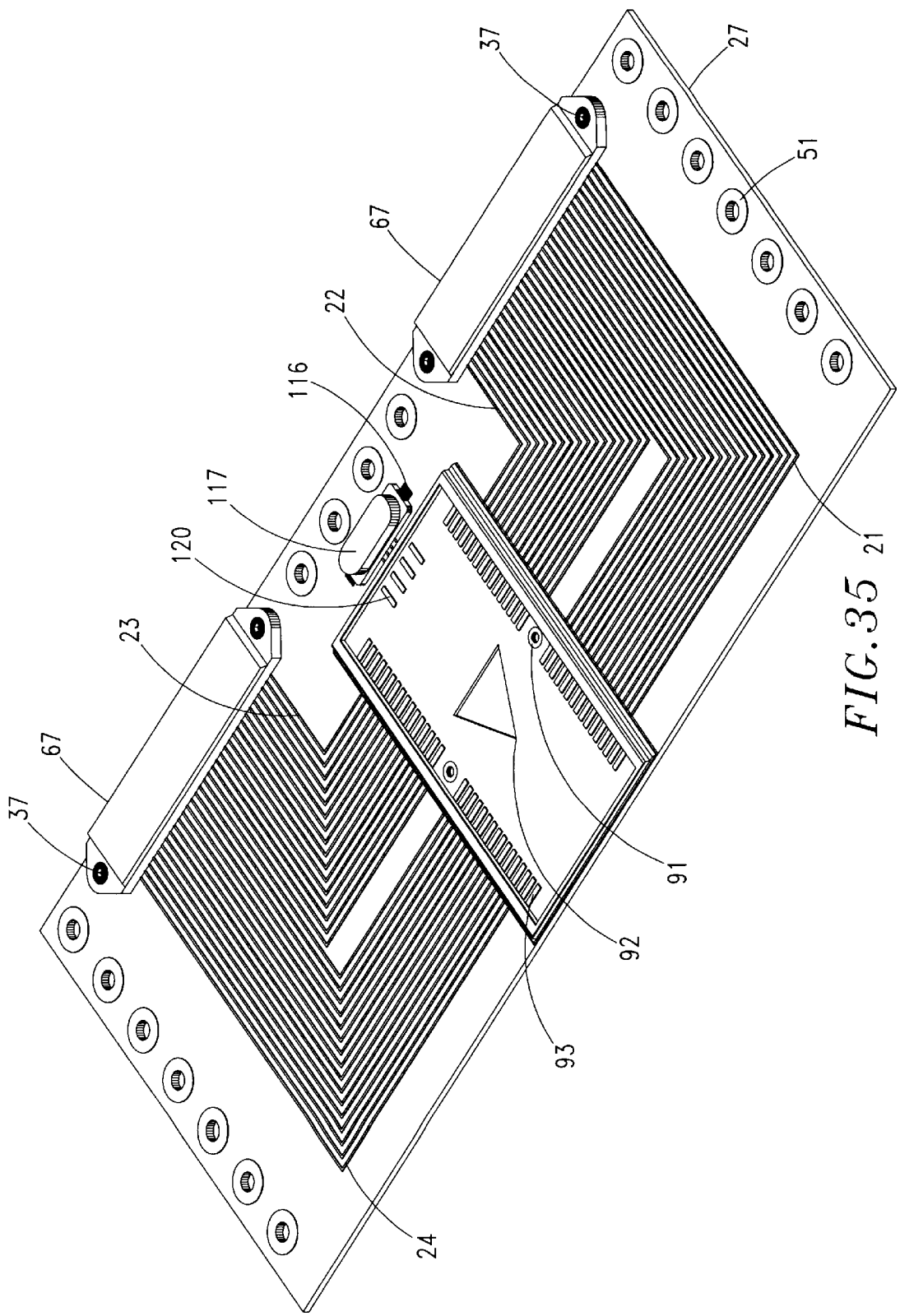
FIG. 35 is a 3D top front-view drawing of a first disk-platter's chip-positioning circuit board assembly, shown with a Magneto-Optical Microhead Array Chip as not installed.

Moreover, a Magneto-Optical Microhead Array Chip Hard Disk Drive's first chip-positioning circuit board, as illustrated in FIGS. 33, 34, and 35, is positioned at and attached to a Magneto-Optical Microhead Array Chip Hard Disk Drive's casting-base 12 (FIGS. 1, 2, and 3) and chip-positioning circuit board mounting pedestals 61, 64 (FIGS. 2, 3, and 117). Furthermore, when a Magneto-Optical Microhead Array Chip Hard Disk Drive's unit-assembly (FIG. 117) is viewed with its front-end turned-up vertical into the Y-direction of Cartesian coordinates (i.e., what is sometimes called the portrait-position), the beforementioned Polymer flex-cable connectors 67 (FIGS. 29, 30, 31, 32, 33, 34, 35, 36, and 37) and the beforementioned Polymer flex-cables 30 (FIGS. 1, 6, 10, and 15), if located on the right-hand side of the chip-positioning circuit boards installed into a Magneto-Optical Microhead Array Chip Hard Disk Drive's unit-assembly (FIG. 117) are multiple connection cable circuits, which are dedicated to a Magneto-Optical Microhead Array Chip Hard Disk Drive's Power, Ground, Data I/O, and Control bus-systems.

Furthermore, the beforementioned Polymer flex-cable connectors 67 (FIGS. 29, 30, 31, 32, 33, 34, 35, 36, and 37)

and the beforementioned Polymer flex-cables 30 (FIGS. 1, 6, 10, and 15), if installed on the right-hand side of the beforementioned chip-positioning circuit boards will form a multiple circuit connection between installed Magneto-Optical Microhead Array Chips (FIGS. 29, 31, 34, 36, and 38), through a Magneto-Optical Microhead Array Chip's chip-connecting contact-points 7, 8 (FIGS. 7, 8, 26, and 27), and a Disk Controller's (PCB) "Printed Circuit Board" unit-assembly 53 (FIGS. 2, 3, 4, and 5). Moreover, remembering that a Disk Controller's PCB 53 is positioned just under a Magneto-Optical Microhead Array Chip Hard Disk Drive's Spindle-Motor unit-assembly 59 (FIGS. 2 and 3), facing the bottom-inside surface of a Magneto-Optical Microhead Array Chip Hard Disk Drive's casting-base 12 (FIGS. 1, 2, and 3).

In addition, when a Magneto-Optical Microhead Array Chip Hard Disk Drive's unit-assembly (FIG. 117) is viewed with its front-end turned-up vertical into the Y-direction of Cartesian coordinates (i.e., what is sometimes called the portrait-position), the beforementioned Polymer flex-cable connectors 67 (FIGS. 29, 30, 31, 32, 33, 34, 35, 36, and 37) and the beforementioned Polymer flex-cables 43 (FIGS. 1, 6, 10, and 16), if located on the left-hand side of the chip-positioning circuit boards installed into a Magneto-Optical Microhead Array Chip Hard Disk Drive's unit-assembly (FIG. 117) are multiple connection cable circuits, which are dedicated to a Magneto-Optical Microhead Array Chip Hard Disk Drive's 32-bit microhead addressing bus-system.

In addition, the beforementioned Polymer flex-cable connectors 67 (FIGS. 29, 30, 31, 32, 33, 34, 35, 36, and 37) and the beforementioned Polymer flex-cables 43 (FIGS. 1, 6, 10, and 16), if installed on the left-hand side of the beforementioned chip-positioning circuit boards, will create a multiple circuit connection between installed Magneto-Optical Microhead Array Chips (FIGS. 29, 31, 34, 36, and 38), through their chip-connecting contact-points 9, 10 (FIGS. 7, 8, 26, and 27) and a Disk Controller's (PCB) "Printed Circuit Board" unit-assembly 53 (FIGS. 2, 3, 4, and 5). Moreover, remembering that a Disk Controller's PCB 53 (FIGS. 2, 3, 4, and 5) is positioned just under a Magneto-Optical Microhead Array Chip Hard Disk Drive's Spindle-Motor unit-assembly 59 (FIGS. 2 and 3), facing the bottom-inside surface of a Magneto-Optical Microhead Array Chip Hard Disk Drive's casting-base 12 (FIGS. 1, 2, and 3).

Furthermore, in addition too the previously mentioned Polymer flex-cable connectors 67 (FIGS. 29, 30, 31, 32, 33, 34, 35, 36, and 37) are the Polymer flex-cable connectors called female bridge-connectors 34, 40 (FIGS. 1, 2, and 3), which are used to connect a Magneto-Optical Microhead Array Chip Hard Disk Drive's chip-positioning circuit board assemblies, illustrated by FIGS. 29, 30, 31, 32, 33, 34, 35, 36, 37, and 38, up to the previously mentioned Disk Controller's PCB unit-assembly 53 (FIGS. 2, 3, 4, and 5). Wherein, a top-plug portion or first top-half of the beforementioned female bridge-connector 34, 40 (FIGS. 1, 2, and 3) comprises a 32-bit thirty-two spring-contact Polymer flex-cable female-connector 33, 41 (FIGS. 1, 2, and 3), a female bridge-connector's sealing-gasket 31, 42 (FIGS. 1, 2, and 3), and a female bridge-connector's two installation hex-screws 32 (FIGS. 1, 2, 3, 6, and 10).

Moreover, the aforesaid top-plug portions of the beforementioned two female bridge-connectors 34, 40 (FIGS. 1, 2, and 3) are to be installed into two slot-holes, which were previously created in the bottom-half of a casting-base's component mounting base-plate 12 (FIGS. 1, 2, and 3), which is opposite to the previously mentioned Magneto-Optical Microhead Array Chip Hard Disk Drive's front-end (FIGS. 1, 2, and 3). Moreover, the aforesaid top-plug portions of the beforementioned female bridge-connectors 34, 40 (FIGS. 1, 2, and 3) are connected, using a female bridge-connector's two hex-screws 32 (FIGS. 1, 2, and 3), to the inside top-surface of the bottom-half of the beforementioned casting-base's component mounting base-plate 12 (FIGS. 1, 2, and 3).

Furthermore, in addition to the beforementioned top-plug portion or first-half of the beforementioned female bridge-connector 34, 40 (FIGS. 1, 2, and 3) is a bottom-plug portion or second-half of the beforementioned female bridge-connector 33, 41 (FIGS. 1, 2, and 3), which comprises a thirty-two pin micro-plug female-connector, which has an install location identical to the install location of its companion top-plug portion 34, 40 (FIGS. 1, 2, and 3). Moreover, the beforementioned two female bridge-connectors 34, 40 (FIGS. 1, 2, and 3) are used to connect a Magneto-Optical Microhead Array Chip Hard Disk Drive's chip-positioning circuit boards, as illustrated in FIGS. 29, 30, 31, 32, 33, 34, 35, 36, 37, and 38, to a Disk Controller's two thirty-two pin micro-plug male connectors 65, 69 (FIG. 4) 77, 79 (FIG. 5). The previously mentioned micro-plug male connectors 65, 69 (FIG. 4) 77, 79 (FIG. 5) are located on the top-surfaces of Disk Controller PCB unit-assemblies 53, 81 (FIGS. 2, 3, 4, and 5), which also face toward a Spindle-Motor's flanged mounting-base 12 (FIGS. 1, 2, and 3). The top-plug portions of the beforementioned female bridge-connectors 34, 40 (FIGS. 1, 2, and 3) comprise the same 32-bit thirty-two spring-contact Polymer flex-cable female connector 35, 39 (FIGS. 1, 2, and 3), which was used in the beforementioned chip-positioning circuit board's Polymer flex-cable connectors 67 (FIGS. 1, 2, and 3).

In addition, every female bridge-connector 34, 40 (FIGS. 1, 6, 10, and 117) that is installed into a Magneto-Optical Microhead Array Chip Hard Disk Drive has two sealing-gaskets 31, 42 (FIGS. 1, 6, and 10), which are used for sealing a Magneto-Optical Microhead Array Chip Hard Disk Drive's interior-space from any air-borne particles existing in the air outside a Magneto-Optical Microhead Array Chip Hard Disk Drive's enclosed interior-space. Preferably, the Magneto-Optical Microhead Array Chip Hard Disk Drive design will use in its construction four of the previously mentioned sealing gaskets 31, 42 (FIG. 1) two for a right-side female bridge-connector and two for a left-side female bridge-connector 31, 42 (FIGS. 1, 2, 3, 6, 10, 117). Moreover, the sealing gaskets 31, 42 (FIG. 1) will tightly seal surface lying areas between a female bridge-connector's top-plug and bottom-plug portions and female bridge-connector installation slot-holes 34, 40, 33, 41 (FIGS. 1, 2, and 3). Moreover, the sealing gaskets 31, 42 (FIG. 1) also protect a Magneto-Optical Microhead Array Chip Hard Disk Drive's enclosed interior environment from air-borne dust and/or particle contamination. Furthermore, the beforementioned female bridge-connectors 34, 40, 33, 41 (FIGS. 1, 2, and 3) are fastened to a Magneto-Optical Microhead Array Chip Hard Disk Drive's casting-base 12 (FIGS. 1, 2, and 3) using two female bridge-connector threaded hex-screws 32, 43 (FIGS. 1, 2, 3, 6, 9, and 10).

Figure 10:
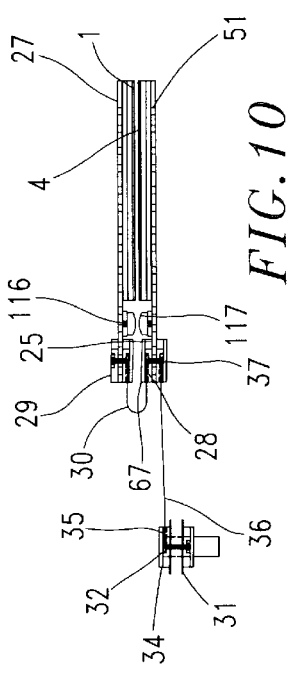
FIG. 10 is an orthographic side-view drawing of a combination Top and Bottom chip-positioning circuit board, which is shown with Magneto-Optical Microhead Array Chips installed into surface mounted chip-sockets.

Furthermore, the top-plug portion or first-half of the previously mentioned female bridge-connectors 34, 40 (FIGS. 1 and 6) provides connectivity between a Magneto-Optical Microhead Array Chip Hard Disk Drive's bus-system, a Magneto-Optical Microhead Array Chip Hard Disk Drive's Disk Controller, and a Magneto-Optical Microhead Array Chip Hard Disk Drive's chip-positioning circuit boards, illustrated by FIGS. 29, 30, 31, 32, 33, 34, 35, 36, 37, and 38, and their respective Magneto-Optical Microhead Array Chips (FIGS. 29, 31, 34, and 36). Moreover, the connectivity between the previously mentioned bus-system and Disk Controller is executed through two primary bus-system Polymer flex-cables 36, 38 (FIGS. 1, 6, 10, 15, 16, and 117), which are physically connected, using the beforementioned two female bridge-connector's top-plug portions 34, 40 (FIG. 1), to a first chip-positioning circuit board's two bottom Polymer flex-cable connectors 67 (FIGS. 2 and 10).

Furthermore, the first chip-positioning circuit board to be installed into a Magneto-Optical Microhead Array Chip Hard Disk Drive's unit-assembly (FIG. 117) is positioned by eighteen "Titanium" alloy circuit-board spacers 66 (FIGS. 1, 2, and 3), a casting-base 12 (FIGS. 1, 2, and 3), and eighteen hex-screw bolt-pedestals 61, 64 (FIGS. 2 and 3). Moreover, eighteen chip-positioning circuit board spacers 66 (FIGS. 1, 2, and 3) are also used to install each proceeding chip-positioning circuit board into a Magneto-Optical Microhead Array Chip Hard Disk Drive's unit-assembly, illustrated by FIG. 117. The last chip-positioning circuit board assembly, as illustrated in FIGS. 2, 3, 36, 37, 38, and 117, which is installed into a Magneto-Optical Microhead Array Chip Hard Disk Drive's unit-assembly (FIG. 117) and locked into place 66 (FIGS. 1, 2, 3, and 117) with eighteen chip-positioning circuit board's hex-screws 50 (FIGS. 1, 2, 3, and 117). Installation of all chip-positioning circuit boards into a Magneto-Optical Microhead Array Chip Hard Disk Drive's unit-assembly (FIG. 117) is finally accomplished when the beforementioned chip-positioning circuit board's eighteen installation hex-screws 50 (FIGS. 1, 2, 3, and 117) are first inserted into and through a last chip-positioning circuit board's hex-screw holes 51 (FIGS. 1, 2, and 3), while continuing with the insertion of the beforementioned chip-positioning circuit board hex-screws 50 through all chip-positioning circuit board spacers and spacer holes 66 (FIGS. 1, 2, and 3) until they reach the hex-screw holes 51 (FIGS. 1, 2, 3, and 117) then, afterwards threading the beforementioned chip-positioning circuit board hex-screws 50 (FIGS. 1, 2, 3, and 117) into a casting-base's eighteen hex-screw bolt-pedestals 61, 64 (FIGS. 2 and 3), which are located on the upward facing outer-surface of a casting-base component mounting base-plate's bottom-half area 13 (FIGS. 1, 2, and 3).

Moreover, the threaded hex-screws 50 (FIGS. 1, 2, 3, and 117) are tightened into place by turning them clockwise with a torque hex-wrench into the eighteen hex-screw bolt-pedestals 61, 64 (FIGS. 1, 2, and 3) of a casting-base, which are located on the top outer-surface of the component mounting base-plate's bottom-half 13 (FIGS. 1, 2, and 3), which will secure all of the previously mentioned chip-positioning circuit boards into their final and stationary positions, as illustrated in FIGS. 1, 2, 3, and 117.

Another preferred embodiment of the present invention, as illustrated in drawing FIGS. 29, 30, 31, 32, 33, 34, 35, 36, 37, and 38, shows chip-positioning circuit board assemblies, which are used in the Magneto-Optical Microhead Array Chip Hard Disk Drive design to position their previously mentioned and respective Magneto-Optical Microhead Array Chips FIG. 29, FIG. 31, FIG. 34, FIG. 36 above their respective disk-platters 13 (FIGS. 1, 2, and 3). Moreover, with the first chip-positioning circuit board FIG. 33, FIG. 34, FIG. 35, having a top-installed "Bottom Surface Magneto-Optical Microhead Array Chip" FIG. 28, put into a stationary position above a Magneto-Optical Microhead Array Chip Hard Disk Drive's disk-platter one, data-surface one 13 (FIGS. 1, 2, and 3), FIG. 117.

In addition, the first chip-positioning circuit board will provide system connectivity through its two bottom Polymer flex-cable connectors 36, 38 (FIGS. 1, 6, 15, 16, and 117), which are located closest to a Magneto-Optical Microhead Array Chip Hard Disk Drive's casting-base 12 (FIGS. 1, 2, and 3), connectivity is accomplished using two extra-long bus-system Polymer flex-cables 36, 38 (FIGS. 1, 2, and 117), which are inserted into the bottom two 32-bit spring-contact flex-cable connectors 67 (FIGS. 2, 3, 10, and 117) of the first chip-positioning circuit board. Moreover, a first chip-positioning circuit board's spring-contact flex-cable connectors are ultimately used to parallel-connect all of the installed chip-positioning circuit board assemblies used in a Magneto-Optical Microhead Array Chip Hard Disk Drive's unit-assembly (FIG. 117) into a Magneto-Optical Microhead Array Chip Hard Disk Drive's bus-system, as illustrated in FIGS. 29, 30, 31, 32, 33, 34, 35, 36, 37, and 38. Moreover, by using the beforementioned two female bridge-connectors 34, 40 (FIGS. 1 and 6), which are located on the inside-bottom surface of a Magneto-Optical Microhead Array Chip Hard Disk Drive's casting-base 12 (FIGS. 1, 2, and 3); moreover, the beforementioned two female bridge-connector's bottom-plug portion female-connector 33, 41 (FIGS. 1, 2, and 3) connects to the Disk Controller's two "32-pin" mini-plug male connectors, which are located on the Disk Controller's PCB 65, 69 (FIG. 4) 77, 79 (FIG. 5), through two rectangular shaped slot-holes located in the bottom-half of the casting-base's component mounting base-plate 12 (FIGS. 1, 2, and 3).

In addition, the second chip-positioning circuit board installed into a Magneto-Optical Microhead Array Chip Hard Disk Drive's unit-assembly (FIG. 117) is an "In-between Disk-Platter" chip-positioning circuit board assembly, illustrated by FIGS. 29, 30, 31, and 32, which show a bottom-installed "Top-surface Magneto-Optical Microhead Array Chip" (FIG. 25) as being put into position for disk-platter one, data-surface two, while showing a top-installed "Bottom Surface Magneto-Optical Microhead Array Chip" (FIG. 28) as being put into position for disk-platter two, data-surface one. Furthermore, a second chip-positioning circuit board's bottom two Polymer flex-cables 30, 43 (FIGS. 1, 2, 3, and 117) are used to connect to a first chip-positioning circuit board's top two 32-bit Polymer flex-cable spring-contact connectors 67 (FIGS. 2, 3, 10, and 117); moreover, creating a daisy chained bus-system for all installed Magneto-Optical Microhead Array Chips and their respective chip-positioning circuit board assemblies, as illustrated in FIGS. 29, 30, 31, 32, 33, 34, 35, 36, 37, and 38.

In addition, the third chip-positioning circuit board, illustrated by FIGS. 29, 30, 31, and 32, which is installed into a Magneto-Optical Microhead Array Chip Hard Disk Drive's unit-assembly as an "In-between Disk-Platter" chip-positioning circuit board assembly, illustrated by FIGS. 29, 30, 31, and 32, which show a bottom-installed "Top-surface Magneto-Optical Microhead Array Chip" (FIG. 25) as being put into position for disk-platter two, data-surface two, while showing a top-installed "Bottom Surface Magneto-Optical Microhead Array Chip" (FIG. 28) as being put into position for disk-platter three, data-surface one. Furthermore, a third chip-positioning circuit board's bottom two Polymer flex-cables 30, 43 (FIGS. 1, 2, 3, and 117), which connect to a second chip-positioning circuit board's top two 32-bit flex-cable spring-contact connectors 67 (FIGS. 2, 3, 10, and 117), are used to provide a third chip-positioning circuit board with connectivity to a Magneto-Optical Microhead Array Chip Hard Disk Drive's system-bus.

In addition, the fourth chip-positioning circuit board to be installed into a Magneto-Optical Microhead Array Chip Hard Disk Drive's unit-assembly is also an "In-between Disk-Platter" chip-positioning circuit board, illustrated by FIGS. 29, 30, 31, and 32, which show a bottom-installed "Top-surface Magneto-Optical Microhead Array Chip" (FIG. 25) as being put into position for disk-platter three, data-surface two, while showing a top-installed "Bottom Surface Magneto-Optical Microhead Array Chip" (FIG. 28) as being put into position for disk-platter four, data-surface one. Furthermore, the fourth chip-positioning circuit board's bottom two Polymer flex-cables 30, 43 (FIGS. 1, 2, 3, and 117), which connect to a third chip-positioning circuit board's top two 32-bit flex-cable spring-contact connectors 67 (FIGS. 2, 3, 10, and 117), are used to provide a fourth chip-positioning circuit board with connectivity to a Magneto-Optical Microhead Array Chip Hard Disk Drive's system-bus.

Figure 36:
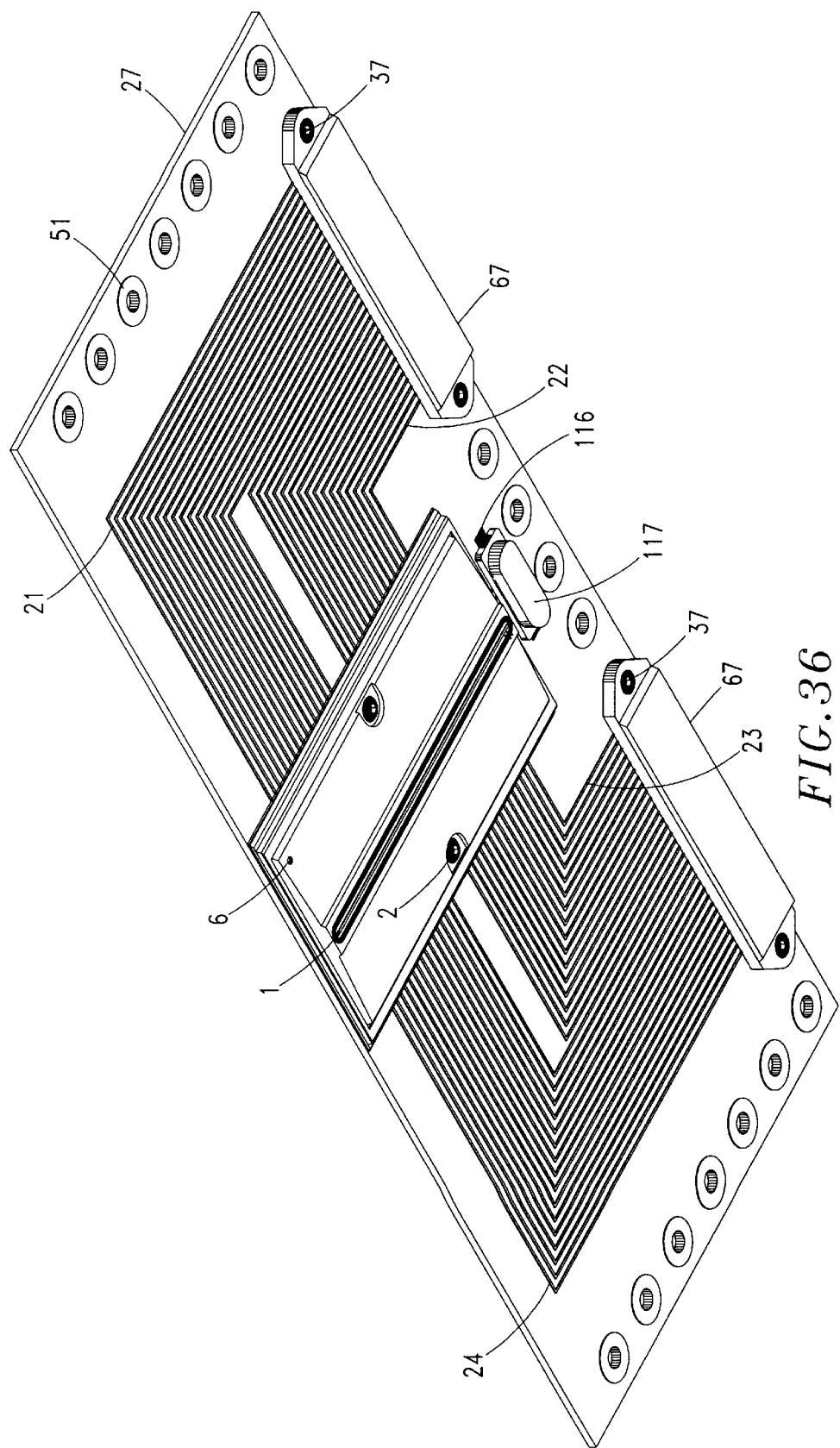
FIG. 36 is a 3D-bottom front-view drawing of a last disk-platter's chip-positioning circuit board assembly, shown with the Magneto-Optical Microhead Array Chip as installed.
Figure 37:
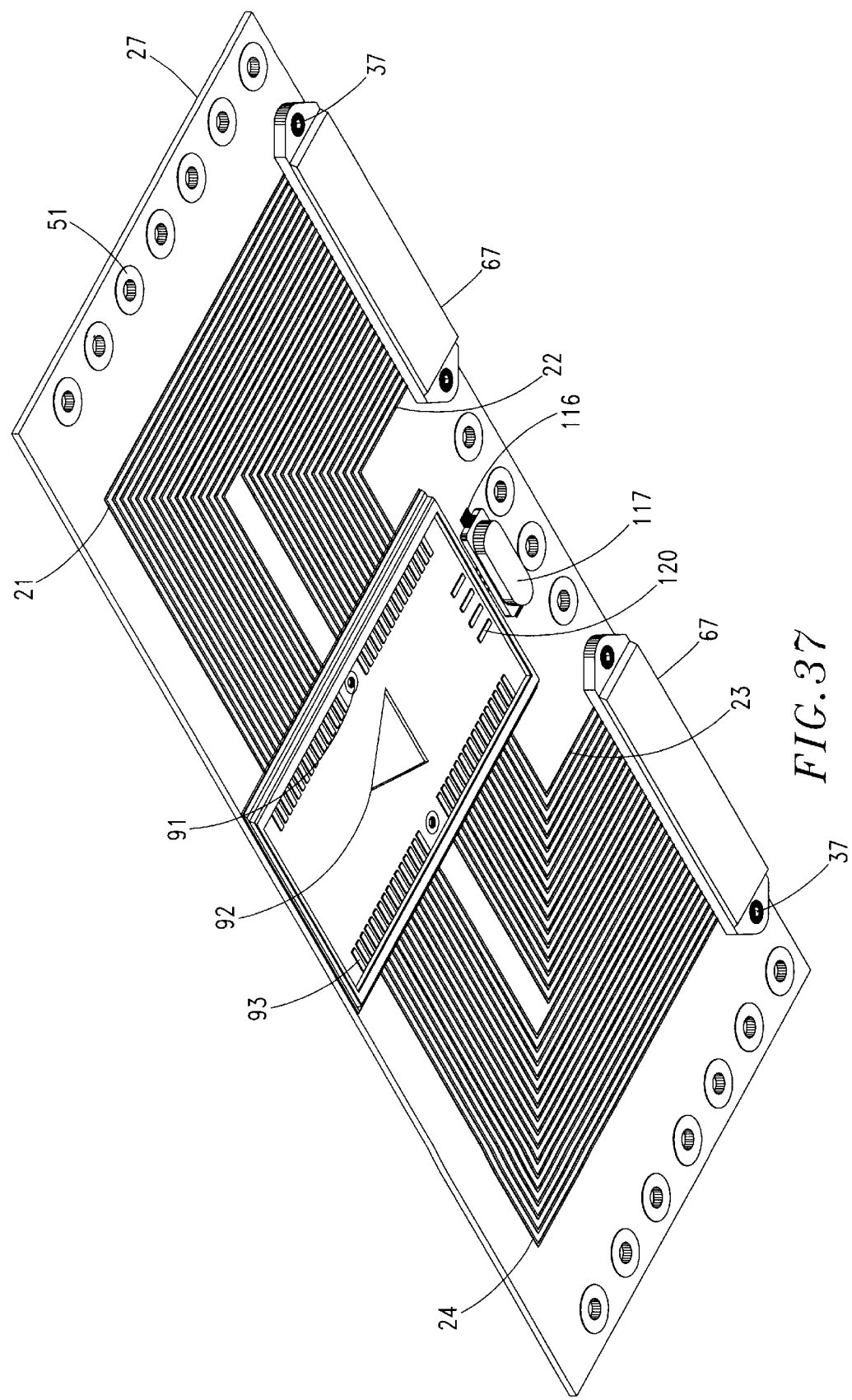
FIG. 37 is a 3D-bottom front-view drawing of a last disk-platter's chip-positioning circuit board assembly, shown with a Magneto-Optical Microhead Array Chip as not installed.
Figure 38:
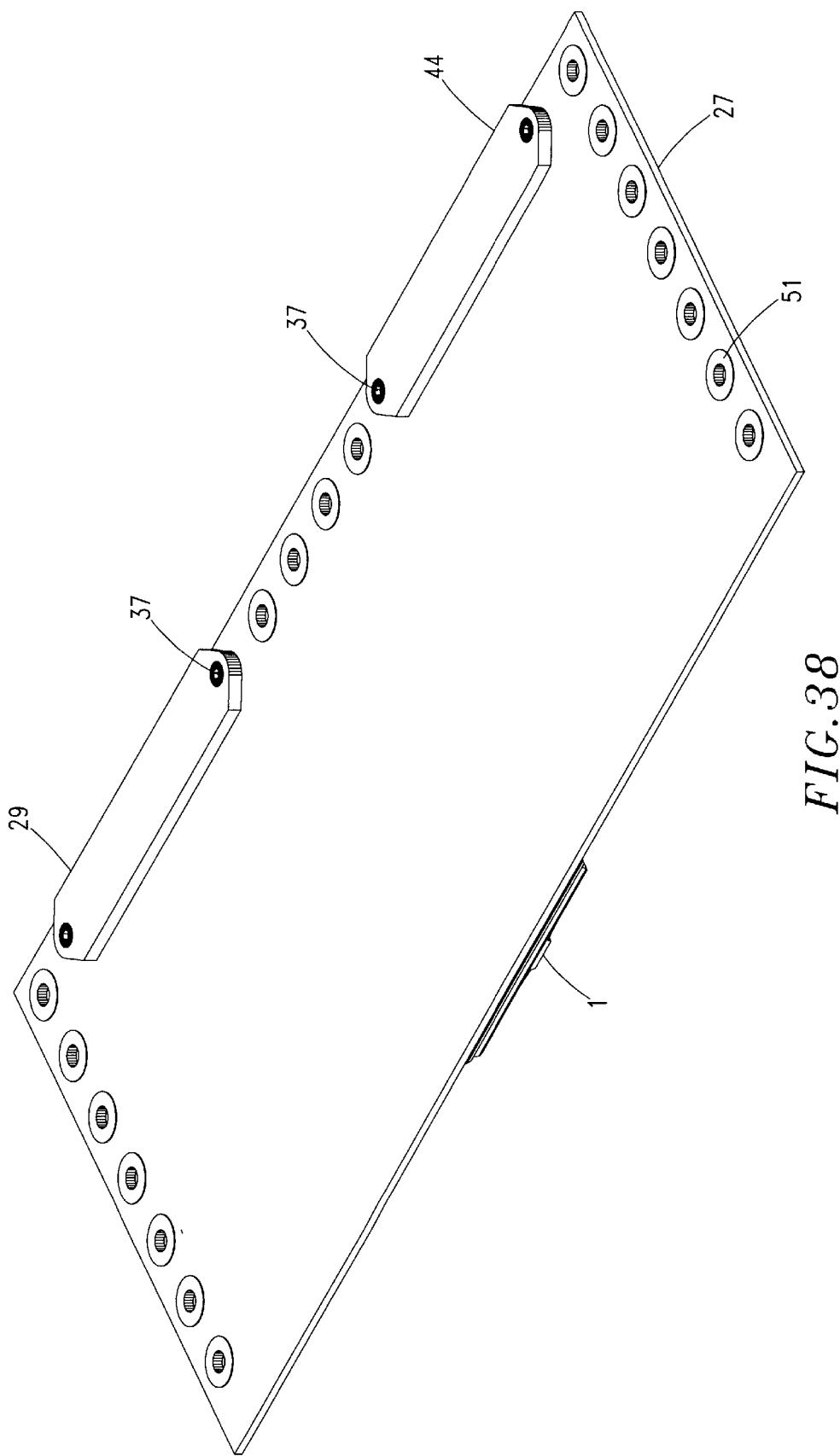
FIG. 38 is a 3D top front-view drawing of a last disk-platter's chip-positioning circuit board assembly, shown with a Magneto-Optical Microhead Array Chip as installed.

In addition, the fifth chip-positioning circuit board installed into a Magneto-Optical Microhead Array Chip Hard Disk Drive's unit-assembly is a "Last Disk Platter" chip-positioning circuit board assembly, illustrated by FIGS. 36, 37, and 38, which show its bottom-installed "Top-surface Magneto-Optical Microhead Array Chip" (FIG. 25) as being put into position for disk-platter four, data-surface two. Furthermore, the fifth Magneto-Optical Microhead Array Chip chip-positioning circuit board's bottom two Polymer flex-cables 30, 43 (FIGS. 1, 2, 3, and 117), which connect to the fourth chip-positioning circuit board's top two 32-bit flex-cable spring-contact connectors 67 (FIGS. 2, 3, 10, and 117).

In addition, the last two Polymer flex-cable connectors 29, 44 (FIGS. 1, 2, 3, 6, 38, and 117) are not Polymer flex-cable connectors at all, but are in reality Polymer flex-cable connector termination-caps. Moreover, the termination-caps are located on the topside surface of the beforementioned fifth and last chip-positioning circuit board (FIG. 38) used in a Magneto-Optical Microhead Array Chip Hard Disk Drive's unit-assembly, as illustrated in FIG. 117. The fastening of the fifth chip-positioning circuit board's two termination-caps 29, 44 (FIGS. 1, 2, 3, 6, 38, and 117) to the fifth and last chip-positioning circuit board's (FIG. 38) topside surface is accomplished with four threaded flex-cable connector hex-screws 37 (FIGS. 1, 2, 3, 6, 9, 10, and 117).

In addition, every chip-positioning circuit board installed into a Magneto-Optical Microhead Array Chip Hard Disk Drive's unit-assembly (FIG. 117) is connected to the other chip-positioning circuit board, starting from the casting-base, with two Polymer flex-cables 30, 43 (FIGS. 1, 2, 3, and 117). The chip-positioning circuit boards used in Magneto-Optical Microhead Array Chip Hard Disk Drives are all connected to one another in a daisy-chained bus-system cable configuration. Moreover, a daisy-chained bus-system cable configuration starts from the casting-base female bridge-connectors 34, 40 (FIGS. 1, 6, and 10), and ending at the fifth and last chip-positioning circuit board (FIG. 38) to be installed into a Magneto-Optical Microhead Array Chip Hard Disk Drive's unit-assembly, as illustrated in FIG. 117. The daisy-chained bus-system cable configuration of chip-positioning circuit board assemblies, illustrated by FIGS. 29, 30, 31, 32, 33, 34, 35, 36, 37, and 38, will simplify a Magneto-Optical Microhead Array Chip Hard Disk Drive's manufacturing, upgrading, and repair.

Another preferred embodiment of the present invention, as illustrated in drawing FIGS. 2, 3, 4, 5, and 81, shows a printed circuit board 53 (FIGS. 2, 3, 4, 5, and 81), which is installed onto the bottom of a Magneto-Optical Microhead Array Chip Hard Disk Drive's casting-base 12 (FIGS. 1, 2, and 3). A Magneto-Optical Microhead Array Chip Hard Disk Drive's Disk Controller will control installed the Magneto-Optical Microhead Array Chips through two "32-pin" mini-plug male connectors 65, 69 (FIGS. 4, 5, 77, and 79). Moreover, the previously mentioned two "32-pin" mini-plug male connectors 65, 69 (FIGS. 4, 5, 77, and 79) will connect to two "32-pin" mini-plug female bridge-connectors 34, 40 (FIGS. 1, 6, 10, and 117), which are located at the bottom area of a casting-base's component mounting base-plate 12 (FIGS. 1, 2, and 3). The Disk Controller's PCB is attached to a Magneto-Optical Microhead Array Chip Hard Disk Drive's casting-base 12 (FIGS. 1, 2, and 3) with six PCB mounting hex-screws 54 (FIGS. 2 and 3). Moreover, the previously mentioned six PCB mounting hex-screws 54 are inserted through a Disk Controller's six PCB hex-screw holes 70 (FIGS. 4, 5, and 76), and screwed clockwise into the previously mentioned six PCB hex-screw holes, which are located around the bottom edge areas 16 (FIGS. 1, 2, and 3) of a Magneto-Optical Microhead Array Chip Hard Disk Drive's casting-base 12 (FIGS. 1, 2, and 3).

In addition, the previously mentioned Disk Controller's PCB has attached at its center, four metal circuit-contacts 58 (FIGS. 4 and 5). The previously mentioned metal circuit-contacts 58 are used by a Spindle And Power Controller's driver circuitry to communtate with a Spindle-Motor and its hall-sensor circuits (i.e., not shown here). Furthermore, when the Disk Controller's PCB unit-assembly is installed onto a Magneto-Optical Microhead Array Chip Hard Disk Drive's casting-base 16 (FIGS. 1, 2, and 3) the four metal circuit-contacts 58 (FIGS. 1, 2, 3, 4 and 5) will make a connection with the previously mentioned Spindle And Power Controller's driver circuitry through circuit-contacts located on a Polymer circuit-trace substrate flex-cable (FIGS. 1, 2, and 3), which is located at the bottom of a Spindle-Motor's stator housing 58 (FIGS. 1, 2, and 3). Through the beforementioned four circuit-contacts 58 (FIGS. 1, 2, 3, 4, and 5), all of a Spindle-Motor's 59 (FIGS. 1, 2, and 3) velocity and radial positioning control, along with its hall sensor monitoring signals, will be sent by two-way communication, through a Spindle-Motor's Polymer circuit-trace substrate-cable, to and from, the previously mentioned PCB's circuit-contacts 53 (FIGS. 2, 3, 4, and 5), and back again to a Magneto-Optical Microhead Array Chip Hard Disk Drive's "Spindle-Motor" 59 (FIGS. 1, 2, and 3). Moreover, a Disk Controller's PCB unit-assembly is used in a Magneto-Optical Microhead Array Chip Hard Disk Drive's unit-assembly to contain and install most of a Magneto-Optical Microhead Array Chip Hard Disk Drive's electronics. A Disk Controller's PCB unit-assembly consists of four main (VLSI) "Very Large Scale Integration" surface-mounted microprocessors. Furthermore, the previously mentioned VLSI components will include an IDE bus-interface 55 (FIG. 4), or a SCSI bus-interface 87 (FIG. 5), which reside on a Disk Controller's PCB unit-assembly, as illustrated in FIGS. 4 and 5. However, the electronics used by every Magneto-Optical Microhead Array Chip to control functions like "Microhead-Addressing and Selection", "Bi-Metal Planar Induction Coil Rotate Toggle Switching", "Read and Write-Channel Pre-Amplification", "Read and Write-Channel Data Stream Encoding and Decoding", and "Write Driver Data Demodulation" are all built into the Magneto-Optical Microhead Array Chips themselves.

Figure 60A:
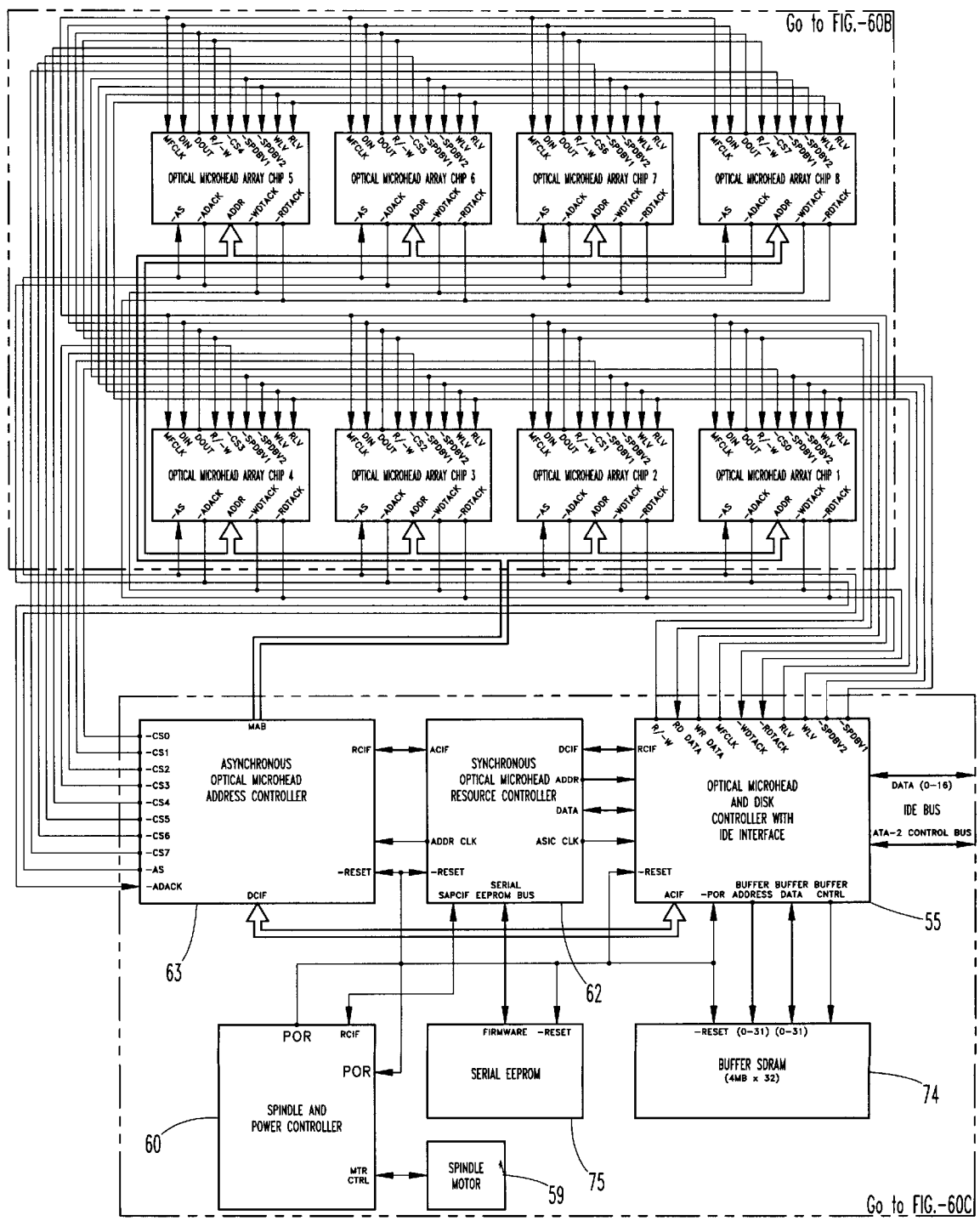
FIG. 60A is a block-diagram drawing of the ATA-2 IDE Disk Controller used in the Magneto-Optical Microhead Array Chip Hard Disk Drive design, which displays areas within FIG. 60A that were copied to separate drawing files as block-diagram drawing figures containing enlarged versions of block-diagram 60A's various areas.
Figure 60B:
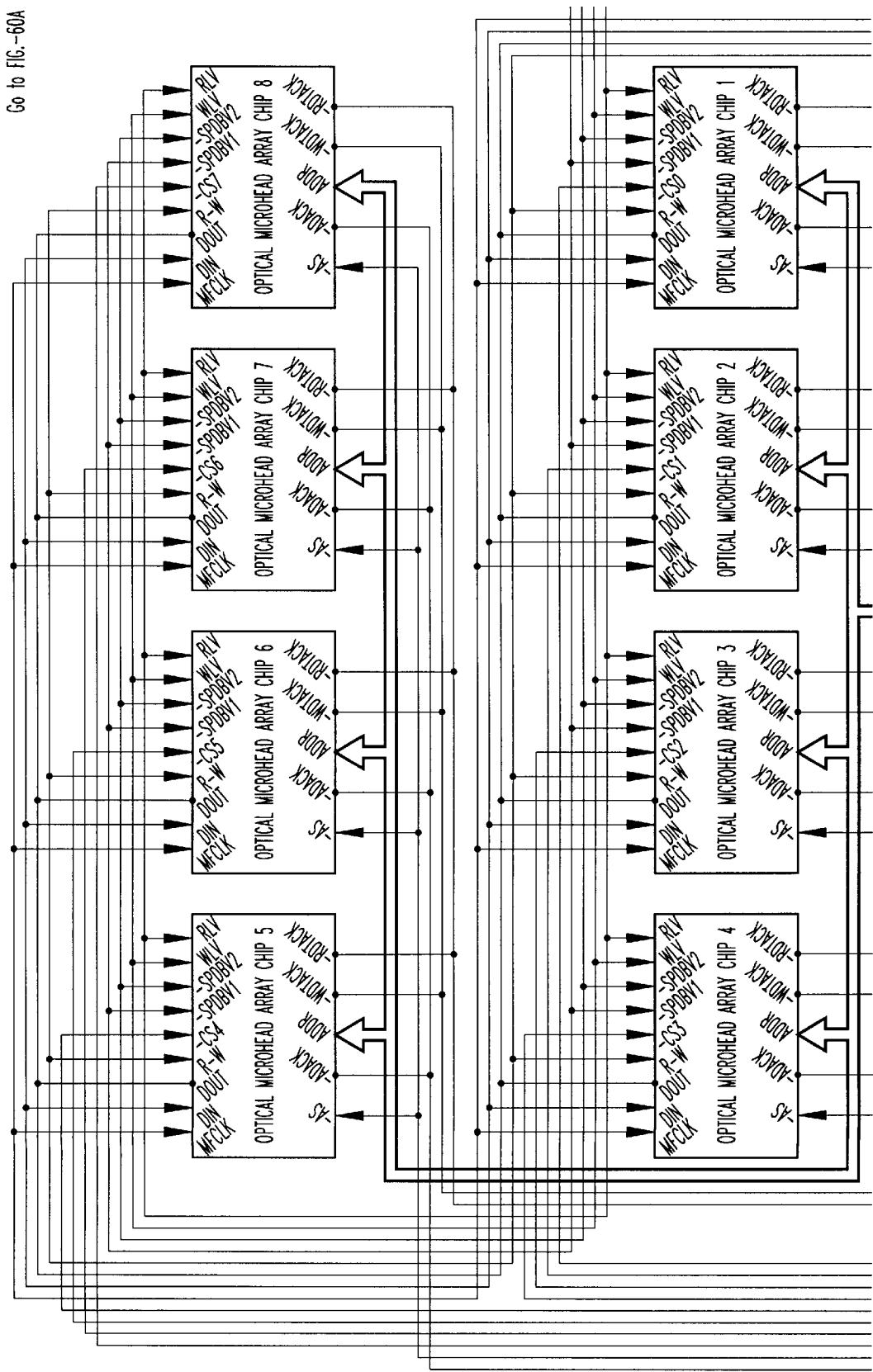
FIG. 60B is an enlarged block-diagram drawing of the ATA-2 IDE Disk Controller used in the Magneto-Optical Microhead Array Chip Hard Disk Drive design, which displays an enlarged block-diagram showing details of the block-diagram illustrated in FIG. 60A.
Figure 60C:
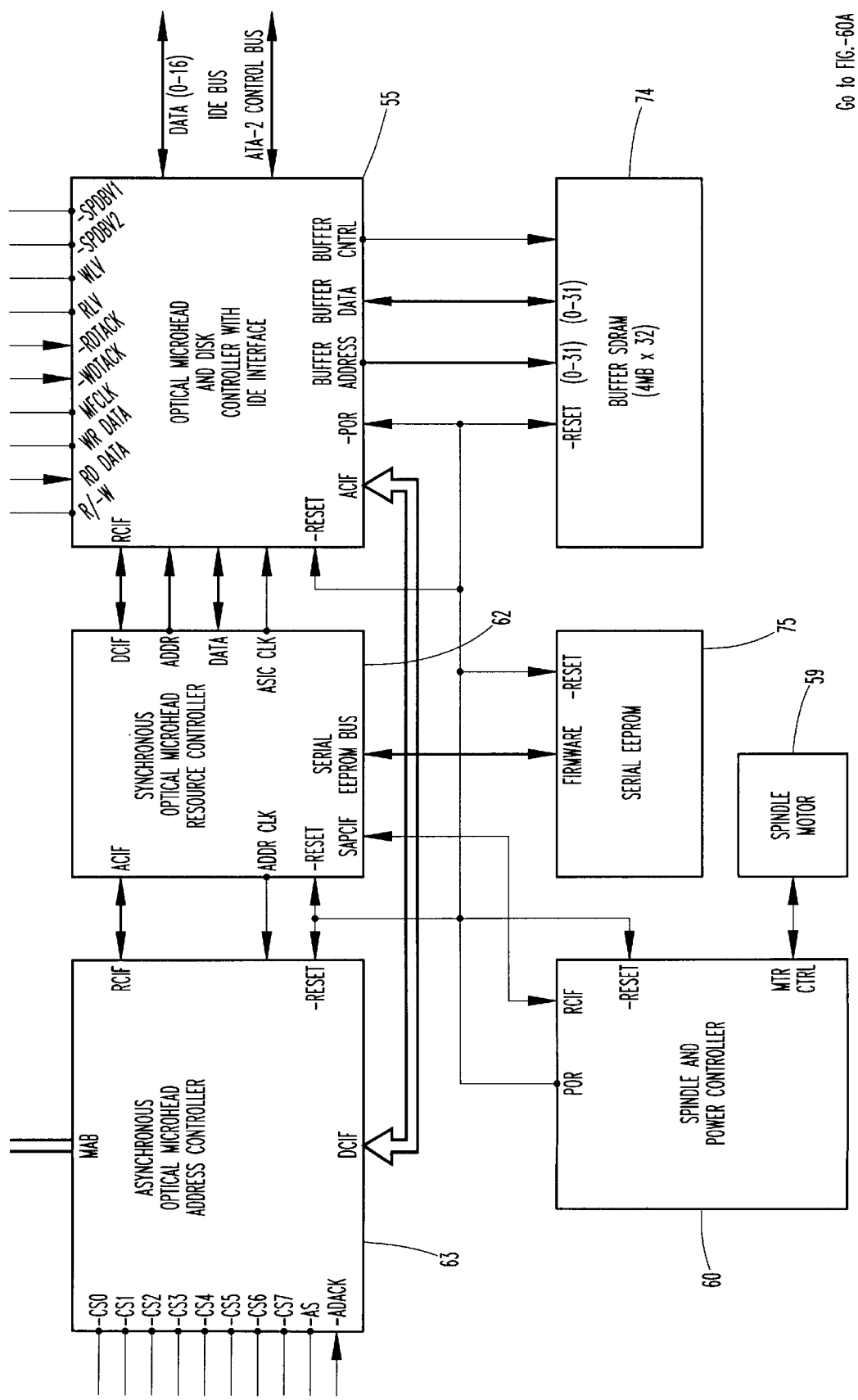
FIG. 60C is an enlarged block-diagram drawing of the ATA-2 IDE Disk Controller used in the Magneto-Optical Microhead Array Chip Hard Disk Drive design, which displays an enlarged block-diagram showing details of the block-diagram illustrated in FIG. 60A.

Furthermore, the integration that occurs between a microhead array of a Magneto-Optical Microhead Array Chip and its internal support circuitry significantly improves the "signal-to-noise" ratio of output-signals being created by the Magneto-Optical Microhead Array Chips. Moreover, as illustrated in FIGS. 60A, 60B, and 60C, the encoded datastream signals created within a Magneto-Optical Microhead Array Chip's read-channel (FIGS. 64A and 64C) is transported through data-bus system lines to a Magneto-Optical Microhead Array Chip Hard Disk Drive Disk Controller's "Data-Sequencer" for signal processing. Block-diagrams, as illustrated in FIGS. 60A, 60B, and 60C, are used to represent a IDE bus design, while the block-diagrams, as illustrated in FIGS. 61A, 61B, and 61C, are used to represent a SCSI bus design; moreover, displaying a Magneto-Optical Microhead Array Chip Hard Disk Drive's connectivity between Magneto-Optical Microhead Array Chips, a Magneto-Optical Microhead Array Chip Hard Disk Drive's Disk Controller, and a Disk Controller's 53 (FIGS. 4, 5, and 81) four main VLSI microprocessors.

Furthermore, the first microprocessor, which is called a "Synchronous Optical Microhead Resource Controller" 62 (FIG. 4) is presented here as two interface format embodiments; moreover, an IDE bus design 62 (FIG. 4), and two, an SCSI bus design 78 (FIG. 5). Moreover, both designs as presented here provide, while under program control, local microprocessor services to a Magneto-Optical Microhead Array Chip Hard Disk Drive's other PCB electronics. Furthermore, as presented, both Synchronous Optical Microhead Resource Controllers 62 (FIG. 4), 78 (FIG. 5) will also manage the various resources of a Magneto-Optical Microhead Array Chip Hard Disk Drive's other PCB electronic-units, as well. A Disk Controller's other PCB electronic-units include an "Optical Microhead And Disk Controller With IDE or SCSI Interface" 55 (FIG. 4), 87 (FIG. 5), a "Spindle And Power Controller" 60 (FIG. 4), 82 (FIG. 5), an "Asynchronous Optical Microhead Address Controller" 63 (FIG. 4), 80 (FIG. 5), a "Serial EEPROM" 75 (FIG. 4), 89 (FIG. 5), and a "SDRAM Buffer" 74 (FIG. 4), 88 (FIG. 5).

In addition, the previously mentioned "Synchronous Optical Microhead Resource Controllers" 62 (FIG. 4), 78 (FIG. 5) will also communicate serially with a "Serial EEPROM" firmware chip 75 (FIG. 4), 89 (FIG. 5), which contains operational program code used by a Magneto-Optical Microhead Array Chip Hard Disk Drive to conduct various disk and data I/O operations. The Synchronous Optical Microhead Resource Controllers will execute the previously mentioned program code to complete hard disk drive power-on-resets, spin-ups, and re-calibration procedures. In addition, the beforementioned Synchronous Optical Microhead Resource Controllers 62, 78 (FIGS. 4, 5, 60A, 60C, 61A, 61C, 62A, 62C, 63A, and 63C), will also, during a Magneto-Optical Microhead Array Chip Hard Disk Drive's normal operation 74 (FIG. 4), 88 (FIG. 5) read additional operational control code from a disk-platter data-surface and store it in a Disk Controller's memory buffer, which is comprised of (SDRAM) "Synchronous Dynamic Random Access Memory".

Furthermore, the operational control code is called (Opcode) "Operational Code" and is used in much the same way as a host-computer's microprocessor might use a host-computer's disk-stored operation system software to execute its system wide operations. Moreover, the Synchronous Optical Microhead Resource Controllers 62, 78, which are used in both PCB interface designs will run as synchronous devices on their Disk Controller's PCB 55 (FIG. 4), 87 (FIG. 5). In addition, the Serial EEPROMs 75 (FIG. 4), 89 (FIG. 5), used in both PCB interface designs, will also run as synchronous devices, along with a Disk Controller's (SDRAM) "Synchronous Dynamic Random Access Memory" 74 (FIG. 4), 88 (FIG. 5) memory buffer addressing control, data I/O busing control, and control-bus operating control.

Moreover, the Optical Microhead And Disk Controller With IDE or SCSI Interfaces 55 (FIG. 4), 87 (FIG. 5) will provide control-functions to Magneto-Optical Microhead Array Chip Hard Disk Drives under the direction of their Synchronous Optical Microhead Resource Controllers 62 (FIG. 4), 78 (FIG. 5). The "Optical Microhead And Disk Controller With IDE Interface" bus design (FIG. 4) has a block-diagram that illustrates the various component modules it uses, while displaying their connectivity (FIGS. 62A, 62B, and 62C), as well. In addition, the "Optical Microhead And Disk Controller With SCSI Interface" bus design (FIG. 5) also has a block-diagram that illustrates the various component modules it uses, while displaying their connectivity (FIGS. 63A, 63B, and 63C), as well. The previously mentioned block-diagrams also illustrate how each of a Disk Controller's microprocessor modules interconnect and communicate with one another; moreover, to form, and facilitate, a Magneto-Optical Microhead Array Chip Hard Disk Drive's control system.

Furthermore, a Optical Microhead And Disk Controller With IDE bus design (FIG. 4) has an (ECC) "Error Correction Control" system built into its "Optical Microhead And Disk Controller With IDE Interface" 55 (FIGS. 4, 62A, 62B, and 62C). In addition, the Optical Microhead And Disk Controller With SCSI bus design (FIG. 5) also has an (ECC) "Error Correction Control" built into its "Optical Microhead And Disk Controller With SCSI Interface" 87 (FIGS. 5, 63A, 63B, and 63C), as well. The Error Correction Codes executed during host-requested read-data or write-data disk-operations are used by both previously mentioned Disk Controllers (FIGS. 4 and 5), and are based upon a Reed-Solomon encoder/decoder circuit's calculated error results.

Furthermore, the previously mentioned Optical Microhead And Disk Controller With IDE bus design (FIG. 4) has a "Data Sequencer" (i.e., sometimes called a Data-Formatter) built into its "Optical Microhead And Disk Controller With IDE Interface" 55 (FIGS. 4, 62A, 62B, and 62C). In addition, the Optical Microhead And Disk Controller With SCSI bus design (FIG. 5) also has a "Data Sequencer" (i.e., sometimes called a Data-Formatter) built into its "Optical Microhead And Disk Controller With SCSI Interface" 87 (FIGS. 5, 63A, 63B, and 63C), as well. The previously mentioned "Data Sequencer", as illustrated in FIGS. 62A, 63A, 62B, 63B, 62C, and 63C, which is used in both IDE and SCSI interfaces, also controls the operation of the read and write-channels of a Magneto-Optical Microhead Array Chip Hard Disk Drive's Disk Controller 55 (FIG. 4), 87 (FIG. 5). Moreover, to initiate a host-requested disk-operation a "Synchronous Optical Microhead Resource Controller" 62, 78 (FIGS. 4, 5, 62A, 63A, 62C, and 63C) will load a set of commands into a "Writable Control Store Register", where the loading and manipulation of this register is done through a Synchronous Optical Microhead Resource Controller's "Interface Registers". Moreover, a Disk Controller's "Data Sequencer", as illustrated in FIGS. 62A, 63A, 62C, and 63C, directly controls a (R/-W) "Read and Write Enable output line, a (-RDTACK) "Read Data Acknowledge" input line, a (-WDTACK) "Write Data Acknowledge" input line, a (MF CLK) "Multiple Frequency Clock" output line, a (DATA RD) "Data Read" input line, a (DATA WR) "Data Write" output line, a (SPDBV1) "SPD Bias Voltage One" output line, a (SPDBV2) "SPD Bias Voltage Two" output line, a (WLV) "Write Laser Voltage" output line, a (RLV) "Read Laser Voltage" output line, and a (SYSCLK) "System Clock" input line, as illustrated in FIGS. 60A, 60B, 60C, 61A, 61B, and 61C.

Furthermore, during host-requested read-data disk-operations a particular data-zone, which is located on a Magneto-Optical Microhead Array Chip Hard Disk Drive's disk-platter data-surface, will need to have its data-sectors containing host requested data read. Moreover, to accomplish this read-data disk-operation a Disk Controller's "Data Sequencer" (FIGS. 62A, 63A, 62B, 63B, 62C, and 63C) will use a "Data Transfer Rate Frequency Analyzer" circuit to calculate a data-transfer frequency-rate for that particular data-zone. Next, a Data Sequencer's "Multi-Frequency Clock Synthesizer" circuit will commute the previously calculated data-transfer frequency-rate to a (VCO) "Voltage-Controlled Oscillator" circuit located within a Data Sequencer's (DPLL) "Digital Phased-Locked Loop" circuit. Moreover, the previously mentioned (DPLL) "Digital Phased-Locked Loop" circuit, will transmit, after receiving the previously mentioned data-transfer frequency-rate calculation, a (DCLOCK) "Divided Clock" signal to a (MF CLK) "Multi-Frequency Clock" input-connection of a singularly selected Magneto-Optical Microhead Array Chip, which is positioned above that particular disk-platter's data-zone containing the previously mentioned host-requested data-sectors needing to be read.

In addition, during host-requested write-data disk-operations a particular data-zone, which is located on a particular Magneto-Optical Microhead Array Chip Hard Disk Drive's disk-platter data-surface, will need to have its host requested data-sectors written to. Therefore, a Disk Controller's "Data Sequencer", illustrated by FIGS. 62A, 63A, 62B, 63B, 62C, and 63C, will also perform a data-encoding of data transmitted from the Disk Controller over a system-bus's write-data line to a (DIN) "Data In" input of a singularly selected Magneto-Optical Microhead Array Chip, which is positioned above that particular disk-platter's data-zone containing the previously mentioned host-requested data-sectors to be written to. Moreover, to accomplish the previously mentioned write-data disk-operation a "Write Driver Circuit" (FIGS. 64A, 64E, 65A, and 65C) will execute data-modulated current-reversals within a Magneto-Optical Microhead Array Chip's two "Bi-Metal Planar Induction Coils" when it receives incoming data-streams of encoded data, which are first encoded, then sent, by a Disk Controller's "Data Sequencer", illustrated by FIGS. 62A, 63A, 62B, 63B, 62C, and 63C, down a data-bus line connected to all Magneto-Optical Microhead Array Chips that are installed into a Magneto-Optical Microhead Array Chip Hard Disk Drive's unit-assembly.

Furthermore, an Optical Microhead And Disk Controller With IDE Interface processor (FIG. 4) has a "Buffer Controller" built into its "Optical Microhead And Disk Controller With IDE Interface" 55 (FIGS. 4, 62A, 62B, and 62C). In addition, an Optical Microhead And Disk Controller With SCSI Interface processor (FIG. 5), also has a "Buffer Controller" built into its "Optical Microhead And Disk Controller With SCSI Interface" 87 (FIGS. 5, 63A, 63B, and 63B). Moreover, the previously mentioned "Buffer Controller", illustrated by FIGS. 62A, 63A, 62B, 63B, 62C, and 63C, will support a "4-Mbyte SDRAM" buffer-cache. Moreover, a 32-bit wide implementation of this "buffer-cache" provides a "120" MB/s of maximum buffer bandwidth to a Magneto-Optical Microhead Array Chip Hard Disk Drive's I/O systems. Consequently, this increase in bandwidth will allow a "Synchronous Optical Microhead Resource Controller" to have direct access to the buffer itself, eliminating the need for a separate buffer (SDRAM) "Synchronous Dynamic Random Access Memory" resource controller. Moreover, a Disk Controller's "Buffer Controller", illustrated by FIGS. 62A, 63A, 62B, 63B, 62C, and 63C, operates under the direction of a Disk Controller's "Synchronous Optical Microhead Resource Controller".

In addition, an Optical Microhead And Disk Controller With IDE Interface processor 55 (FIGS. 4, 62A, 62B, and 62C) will have a "Resource Controller Interface" built into its "Optical Microhead And Disk Controller With IDE Interface" 55 (FIG. 4). In addition, an Optical Microhead And Disk Controller With SCSI Interface 87 (FIGS. 5, 63A, 63B, and 63C) will also have a "Resource Controller Interface" built into its "Optical Microhead And Disk Controller With SCSI Interface 87 (FIG. 5). The previously mentioned "Resource Controller Interface", illustrated by FIGS. 62A, 63A, 62B, 63B, 62C, and 63C, for both interface designs, will provide the means for the beforementioned Synchronous Optical Microhead Resource Controllers to read and write (Opcode) "Operational Code" and user data to a Disk Controller's various microprocessor modules; moreover, either to control their operations, or to supply them with needed system information.

In addition, the beforementioned "Resource Controller Interface", as illustrated in FIGS. 62A, 63A, 62B, 63B, 62C, and 63C, consists of both physical and logical components. The physical components of the interface comprise a 32-bit Address-bus, a 32-bit Data-bus, (RD STROBE) "Read Strobe", (WR STROBE) "Write Strobe" control lines, an (ALE) "Address Latch Enable" control line, and a (WAIT) "Wait" control line. While, the logical components of the previously mentioned "Resource Controller Interface", as illustrated in FIGS. 62A, 63A, 62B, 63B, 62C, and 63C, comprise of "Internal Control" and "Data Registers", which are both accessible to the beforementioned Disk Controller's "Synchronous Optical Microhead Resource Controller". Furthermore, by writing to and reading from the previously mentioned logical registers, a Disk Controller's "Synchronous Optical Microhead Resource Controller" can control and configure a Disk Controller's "Buffer Controller" and a Disk Controller's "Data Sequencer", as well.

In addition, an Optical Microhead And Disk Controller With IDE Interface microprocessor 55 (FIGS. 4, 62A, 62B, and 62C) has a "Serial Interface" built into its Optical Microhead And Disk Controller With IDE Interface 55 (FIG. 4). In addition, an Optical Microhead And Disk Controller With IDE Interface microprocessor 55 (FIGS. 4, 62A, 62B, and 62C) has a "Serial Interface" built into its Synchronous Optical Microhead Resource Controller 62 (FIG. 4). In addition, an Optical Microhead And Disk Controller With SCSI Interface microprocessor 87 (FIGS. 5, 63A, 63B, and 63C) has a "Serial Interface" built into its Optical Microhead And Disk Controller With SCSI Interface 87 (FIG. 5). In addition, an Optical Microhead And Disk Controller With SCSI Interface microprocessor 87 (FIGS. 5, 63A, 63B, and 63C) has a "Serial Interface" built into its "Synchronous Optical Microhead Resource Controller" 78 (FIG. 5). The two Serial Interfaces, as illustrated in FIGS. 62A, 63A, 62B, 63B, 62C, and 63C, will provide a high-speed pathway for firmware operational control code and data-streams, where the previously mentioned firmware's operational control code and data-streams are transferred from a Serial EEPROM component 75 (FIGS. 4, 5, and 89) to its Disk Controller 55 (FIG. 4), 87 (FIG. 5), through an executed control of its system's Synchronous Optical Microhead Resource Controller 62 (FIG. 4), 78 (FIG. 5).

In addition, an Optical Microhead And Disk Controller With IDE Interface processor 55 (FIG. 4), (FIG. 62A), (FIG. 62B), (FIG. 62C) has a "IDE Interface Controller" built right into its "Optical Microhead And Disk Controller With IDE Interface" 55 (FIGS. 4, 62A, 62B, and 62C). In addition, an Optical Microhead And Disk Controller With SCSI Interface microprocessor 87 (FIGS. 5, 63A, 63B, and 63C) has a "SCSI Interface Controller" built right into its "Optical Microhead And Disk Controller With SCSI Interface" 87 (FIG. 5). The previously mentioned IDE & SCSI Interface Controllers, as illustrated in FIGS. 62A, 63A, 62B, 63B, 62C, and 63C, provide the data handling, the bus control, and the transfer management services to and from a IDE or SCSI interface. The "Synchronous Optical Microhead Resource Controller" in both IDE & SCSI Disk Controller designs executes the configuration and control of a IDE or SCSI interface across a 32-bit address-bus and 32-bit data-bus, while a Disk Controller's "Buffer Controller" module, as illustrated in FIGS. 4 and 5, controls all data-transfer operations within the beforementioned Disk Controller.

In addition, for the IDE hard disk drive design, interfacing with a host-system is done through a 40-pin IDE interface-connector 52 (FIGS. 4, 62A, 62B, and 62C). Furthermore, the IDE Disk Controller's 55 (FIG. 4) IDE Interface Controller module, as illustrated in FIGS. 62A, 62B, and 62C, implements the IDE interface-logic, while operating under a Resource Controller's processor control. Furthermore, the IDE Disk Controller will receive and transmit words of data over the IDE bus. The IDE Disk Controller's Buffer Controller writes data to or reads data from the SDRAM buffer cache over thirty-two data lines. Furthermore, while under the Resource Controller's direction the IDE Disk Controller 55 (FIG. 4) controls the transfer of data and handles the addressing of the Magneto-Optical Microhead Array Chip Hard Disk Drive's cache. Moreover, the internal data transfer-rate to and from the Magneto-Optical Microhead Array Chip Hard Disk Drive's cache will be at "66.66" MB/s. In addition, these high-speed transfer-rates will allow the IDE Disk Controller to communicate over the IDE interface at a PIO data transfer-rate of "13.34" MB/s without using IOREADY "I/O Ready", at a PIO data transfer-rate up to "33.34" MB/s using IOREADY "I/O Ready", or at a DMA transfer-rate of "66.66" MB/s using Ultra DMA. Furthermore, the IDE Disk Controller simultaneously controls disk-to-buffer RAM transfers and microcontroller access to control-code stored in the buffer SDRAM's 74 (FIG. 4) memory during a data transference across the IDE Interface.

In addition, for the SCSI hard disk drive design, interfacing with a host-system is done through a 50-pin SCSI interface-connector 83 (FIGS. 5, 63A, 63B, and 63C). Furthermore, the SCSI Disk Controller's 87 (FIG. 5) SCSI Interface Controller module, as illustrated in FIGS. 63A, 63B, and 63C, implements the SCSI interface logic, while operating under a Resource Controller's processor control. Furthermore, the SCSI Disk Controller will receive and transmit bytes of data over the SCSI bus. The SCSI Disk Controller's Buffer Controller writes data to or reads data from the SDRAM buffer cache over thirty-two data lines. Furthermore, while under the Resource Controller's direction the SCSI Disk Controller 87 (FIG. 5) controls the transfer of data and handles the addressing of the Magneto-Optical Microhead Array Chip Hard Disk Drive's cache. Moreover, the internal data transfer rate to and from the Magneto-Optical Microhead Array Chip Hard Disk Drive's cache is "64"MB/s. In addition, this high-speed transfer-rate will allow the SCSI Disk Controller to communicate over the SCSI interface at an asynchronous data transfer-rate of "12" MB/s, or at a synchronous transfer-rate of up to "40" MB/s. In addition, the SCSI Disk Controller simultaneously controls disk-to-buffer RAM transfers and microcontroller access to control-code stored in the buffer SDRAM's 88 (FIG. 5) memory during a data transference across the SCSI Interface. The Magneto-Optical Microhead Array Chip Hard Disk Drive design uses a serial connected and code containing Firmware chip, which is comprised of a "Flash EEPROM" chip that contains (Opcode) "Operational Code" 75 (FIGS. 4, 62A, and 62C) 89 (FIGS. 5, 63A, and 63C). In addition, the Firmware chip is connected to a Magneto-Optical Microhead Array Chip Hard Disk Drive's Resource Controller through a high-speed serial connection. Furthermore, this device is programmable and controls various features like disk caching, track-skewing, cylinder-skewing, error detection, and error correction.

In addition, caching for the Magneto-Optical Microhead Array Chip Hard Disk Drives will enhance hard disk drive performance and significantly improve system throughput. Furthermore, through a dynamic caching scheme, like the one featured in the Microhead Array Chip's hard disk drive designs, will make better use of the buffer SDRAM's memory areas 74 (FIGS. 4 and 62C) 88 (FIGS. 5 and 63C). Moreover, with this dynamic caching feature, the buffer's memory space used during a read-data or write-data disk operation will be dynamically allocated and controlled. In addition, the cache will be flexibly divided into several memory segments under program control, with each memory segment containing one cache-entry. Furthermore, a cache-entry will consist of the requested read-data, plus its corresponding prefetch-data. Consequently, dynamic segmentation will allow Magneto-Optical Microhead Array Chip Hard Disk Drives to make optimum use of their cache memory buffers. Moreover, by allowing the amount of stored data to be increased or decreased, which ever is required; dynamically the dynamic-cache of Magneto-Optical Microhead Array Chip Hard Disk Drives will anticipate host-system requests for data, and store that data for faster access. Furthermore, when the host-system requests a particular segment of data the Magneto-Optical Microhead Array Chip Hard Disk Drives' dynamic caching feature will use a prefetch strategy. Moreover, a prefetch strategy that' looks ahead and automatically stores the subsequent data from a disk-platter's data-surface into a high-speed buffer SDRAM memory area of the Magneto-Optical Microhead Array Chip Hard Disk Drive.

Moreover, since fifty-percent or more of all hard disk drive host-requested data-reads are sequential, the beforementioned host-system, more likely, will request the previously cached subsequent-data from the beforementioned SDRAM 74, 88 (FIGS. 4, 5, 62C, and 63C) memory buffer rather than from a particular Magneto-Optical Microhead Array Chip Hard Disk Drive's disk-platter data-surface sector area. Moreover, the beforementioned subsequent-data, being dynamically stored in high-speed cache, will be retrieved for use in microseconds, rather than in milliseconds. Consequently, the previously mentioned process of "Dynamic Caching" can provide substantial timesaving, during at least half of all hard disk drive data requests. Therefore, the use of "Dynamic Caching" will save most of the transaction time occurring for a Magneto-Optical Microhead Array Chip Hard Disk Drive by eliminating the "rotational latency delays" that dominate a typical disk transaction. In addition, the beforementioned process of "Dynamic Caching" also works by continuing to fill its memory areas with adjacent data, while transferring any data requested by the host-system. Therefore, unlike a non-caching Disk Controller, a Disk Controller used in a Magneto-Optical Microhead Array Chip Hard Disk Drive's design will continue on with further read operations after the requested-data has been transferred to the host-system, via the I/O interface. However, the previously mentioned read operations would terminate after a programmed amount of subsequent-data had been read into a dynamic memory-segment of the beforementioned buffer cache.

In addition, the cache memory will consist of (SDRAM) "Synchronous Dynamic Random Access Memory" 74 (FIGS. 4 and 62C), 88 (FIGS. 5 and 63C), which is allocated to hold data. Moreover, data that can be directly accessed by the host-system, by means of the (RDDATA) "Read Data" and the (WRDATA) "Write Data" commands. Furthermore, the buffer cache memory will function as a group of segments with rollover points at the end of each segment. In addition, the unit of data stored will be a logical block (i.e., a multiple of a 512-byte sector). Therefore, all access to the buffer cache memory must be in multiples of "512" byte size sectors. Furthermore, when a (WRDATA) "Write Data" command is executed Magneto-Optical Microhead Array Chip Hard Disk Drives will store the data to be written in a SDRAM cache buffer 74 (FIGS. 4 and 62C), 88 (FIGS. 5 and 63C). In addition, the Buffer Controller will immediately send a (GDDATA) "Good Data" status-message to the host-system before the data can actually be written to a disk-platter's data-surface. The host-system will then be free to move on to other tasks, such as preparing data for the next data-transfer, without having to wait for the Magneto-Optical Microhead Array Chip Hard Disk Drive to switch to a different microhead located above the appropriate track, or rotate the disk-platters to the specified sector. Furthermore, while the host-system is preparing data for the next data-transfer, the Magneto-Optical Microhead Array Chip Hard Disk Drive will immediately write the cached data to a disk-platter's data-sector. Moreover, this will usually complete the write-operation in less than "20" milliseconds after issuing the (GDDATA) Good Data status-message.

Moreover, when writing to the cache, a single-block random write, for example, would require only "3" milliseconds of host-system processing time to execute. Therefore, without the Disk Controller's ability to write to the cache, the same write-operation would have occupied the host-system for about "20" milliseconds. In addition, writing to cache memory dynamically will allow data to be transferred to a Magneto-Optical Microhead Array Chip Hard Disk Drive in a continuous flow, rather than as individual blocks of data separated by hard disk drive access delays. Furthermore, this is achieved by taking advantage of a Magneto-Optical Microhead Array Chip Hard Disk Drive's ability to write blocks of data sequentially to a Magneto-Optical Microhead Array Chip Hard Disk Drive with data-surfaces that where formatted with a "1:1 hard drive interleave". This means that as the last byte of data is transferred out of the write-cache and the selected microhead passes over the next sector of a disk-platter's data-sector the first byte of the next data-block will be transferred, causing no interruption, or delay in the data-transfer process. In addition, the write to cache algorithm fills the cache buffer with new data from the host-system, while simultaneously transferring any data that the host-system had previously stored in the cache to the Magneto-Optical Microhead Array Chip Hard Disk Drive.

Furthermore, a Magneto-Optical Microhead Array Chip Hard Disk Drive without some kind of cache optimization would suffer just like a conventional hard disk drive would, from delays during a sequential read, which occur simply because all hard disk drive designs exhibit a "rotational latency". Moreover, even if the selected microhead within that same Microhead Array Chip's Microhead Array were above the desired data-track to be read "rotational latency" would still be a problem. Therefore, cache optimization eliminates a Magneto-Optical Microhead Array Chip Hard Disk Drive's rotational latency time (i.e., on the average a "7.50" millisecond time period); moreover, when the requested-data resides in the cache. However, the hard disk drives of today must often service requests from multiple processes in a multitasking or multi-user environment. Furthermore, in these instances, while each process might request-data sequentially, a hard disk drive must time-share among all these processes. Moreover, in conventional hard disk drive designs, the data-heads must move from one-track location to another. Therefore, with cache optimization, even if another process interrupts, the hard disk drive will continue to access the data sequentially from its high-speed cache memory. Therefore, in handling multiple processes, and when the desired data resides in the cache, cache memory optimization will achieve its most impressive performance gains, saving on both seek and latency times.

Furthermore, the cache can be flexibly divided into several memory-segments, under program control, with each memory-segment containing one cache-entry. Moreover, a cache-entry would consist of requested read-data along with any corresponding prefetch-data. The requested read-data will take up a certain amount of space in the cache-segment so the corresponding prefetch-data can essentially occupy the rest of the available space within that memory-segment. Other factors determining prefetch size are the maximum and minimum prefetch settings present in a Disk Controller's circuit design. Furthermore, the Magneto-Optical Microhead Array Chip Hard Disk Drive's prefetch algorithm will dynamically control the actual prefetch value based on the current demands, with consideration for overhead to subsequent commands.

Another Firmware feature incorporated into the hard disk drive design of the Microhead Array Chip is "Track Skewing". Track Skewing reduces the latency time that results from a hard disk drive's switching of a read or writes data-head to access sequential data. Moreover, a track skew is employed in such a way that the next logical sector of data to be accessed will be under the read or write microhead once the microhead switch has been made and that same data is ready to be accessed. In addition, when sequential-data is on the same cylinder, but on a different disk-surface, a microhead switch would be needed. Since sequential microhead switching times are well defined within the Magneto-Optical Microhead Array Chip Hard Disk Drive design, the sector being addressed can be optimally positioned across track-boundaries to minimize any latency time accrued during a Microhead Array Chip's microhead switch. Another Firmware feature incorporated into the hard disk drive design of the Microhead Array Chip is "Cylinder Skewing". Cylinder Skewing is also used to help minimize the latency time associated with "single-cylinder seeks". Therefore, a cylinder skew is employed in such a way that the next logical sector of data that crosses a cylinder boundary will be positioned on the hard drive's disk-platter, after a single-cylinder seek is performed. In addition, when the Magneto-Optical Microhead Array Chip Hard Disk Drive is ready to continue accessing data, the sector to be accessed will be positioned directly under the addressed read or write microhead. Therefore, the cylinder skew can take place between the last-sector of data of a cylinder and the first-sector of data of the hard drive disk-platter's next cylinder.

In addition, the Magneto-Optical Microhead Array Chip Hard Disk Drive design will also incorporate an "ID-less Format" for tracking sector locations across data-surfaces. Moreover, the ID-Less Format has several advantages over the traditional "ID After Wedge" or "ID Before Sector"

methods of sector tracking. For example, the lack of an "ID field" written to the hard drive disk-platter data-surfaces will regain approximately 4% of the overall track real-estate present within the Magneto-Optical Microhead Array Chip Hard Disk Drive's unit assembly. Furthermore, since no ID's have to be read or corrected in case of an error, the drives overall throughput is also increased. Moreover, in ID-Less Formatting of data-sectors, the ID of each sector is not written onto a hard drive disk-platter's data-surface, instead it is stored in a SDRAM's 74 (FIGS. 4 and 62C) 88 (FIGS. 5 and 63C) buffer memory area, called the "Descriptor". In addition, each data-sector will have an associated Descriptor containing the rotational start-time for each sector's disk location. Subsequently, the Descriptor does not have any defect information stored within its memory areas. In addition, Magneto-Optical Microhead Array Chip Hard Disk Drives will also store a "Defect Map" within the hard disk drive's SDRAM's 74 (FIGS. 4 and 62C) 88 (FIGS. 5 and 63C) buffer memory, but in a separate memory-location away from the Descriptor. Subsequently, for the Magneto-Optical Microhead Array Chip Hard Disk Drive design the Sequencer section of the Disk Controller will have access to both the Descriptor and the Defect Map listings through requests made to the buffer-block within the Disk Controller. Therefore, only "end user data" and ECC information are actually written to the Magneto-Optical Microhead Array Chip Hard Disk Drive's disk-platter data-surfaces.

In addition, error detection and correction for the Magneto-Optical Microhead Array Chip Hard Disk Drive design will become a concern as the Magneto-Optical Microhead Array Chip Hard Disk Drive's areal densities continue to increase. Moreover, the obtaining of extremely low error-rates will require sophisticated (ECC) "Error Correction Codes". Furthermore, the Magneto-Optical Microhead Array Chip Hard Disk Drive implements a Reed-Solomon error correction technique to reduce the uncorrectable read-error rates of any data-bits being read. Therefore, when errors do occur, an automatic retry, a double-burst, and a more rigorous triple-burst correction algorithm will enable the correction of any data-sector with three-bursts of four incorrect-bytes each. Furthermore, before invoking the complex triple-burst ECC algorithm the Magneto-Optical Microhead Array Chip Hard Disk Drive design will always try to recover from an error by attempting to re-read the data correctly. Therefore, this strategy prevents the invoking of correction, on non-repeatable errors. Moreover, each time a data-sector in error is re-read, a set of ECC syndromes has to be computed, and this is a very wasteful use of processing time. Therefore, if the entire syndrome-values equal zero, the data was read with no errors, and the data-sector is transferred to the host-system. However, if any of the syndrome-values do not equal zero, an error has occurred, the syndrome-values are retained, and another re-read is invoked. Furthermore, Non-repeatable errors are usually related to the signal-to-noise ratio of the system and are not due to media-defects.

Furthermore, when sets of syndromes from two consecutive re-reads are the same, a stable-syndrome has been achieved. This event may be significant depending on whether or not the automatic read-reallocation or early-correction features have been enabled within the Magneto-Optical Microhead Array Chip Hard Disk Drive's unit assembly. In addition, if an early correction feature has been enabled and a stable-syndrome has been achieved, triple-burst ECC correction is applied, and the appropriate message will be transferred to the host-system (e.g., corrected data, etc.). The ECC bit will enable early ECC triple-burst correction if a stable-syndrome has been achieved before all of the re-reads have been exhausted. Therefore, if the automatic read-reallocation feature is enabled, the drive, when encountering triple-burst errors, will attempt to re-read the data. In addition, the Magneto-Optical Microhead Array Chip Hard Disk Drive design will be equipped with an automatic read-reallocation feature, so any new defective data-sectors can be easily and automatically reallocated for the end-user.

In addition, to accommodate inline-sparing of defective sectors the Magneto-Optical Microhead Array Chip Hard Disk Drive design will allocate thousands of extra data-sectors to the end of its physical data storage area. Furthermore, in the factory, the media will be scanned for defects, and if a data-sector is found defective, the address of the defective data-sector is added to Magneto-Optical Microhead Array Chip Hard Disk Drive's Defect Map listing. In addition, data sectors located physically after the defective data-sector will be assigned logical block addresses, so that a sequential ordering of logical blocks can be maintained. Moreover, the inline-sparing technique will be maintained in an attempt to eliminate any slow data-transfers, which result from a single defective data-sector on a cylinder. Subsequently, all factory defective data-sectors will be inline-spared, but if a defective data-sector is found in the field, inline-sparing is not performed on those sectors. Instead, the data-sector is reallocated to an available spare-sector on a nearby cylinder, while its previous sector location is marked as being bad.

Another preferred embodiment of the present invention, as illustrated in FIGS. 7, 11, 13, 27, and 28, shows chip configurations for a "Bottom Data-Surface Magneto-Optical Microhead Array Chip", and a "Top Data-Surface Magneto-Optical Microhead Array Chip", where each Magneto-Optical Microhead Array Chip has a different surface mounting circuit-contact pin-out arrangement. The illustrations in drawing FIGS. 7, 11, 13, 27, and 28, display a Bottom Data-Surface Magneto-Optical Microhead Array Chip's circuit-contact pin-out arrangements, while the illustrations in drawing FIGS. 8, 12, 14, 25, and 26, display a Top Data-Surface Magneto-Optical Microhead Array Chip's circuit-contact pin-out arrangements. In addition, how the bus-system and bus-system cables are connected and used in the Magneto-Optical Microhead Array Chip Hard Disk Drives, when examined in associated drawing figures, explains why there needs to be two different Magneto-Optical Microhead Array Chip circuit-contact pin-out arrangements. Moreover, when a Bottom Data-Surface Magneto-Optical Microhead Array Chip is used in a Magneto-Optical Microhead Array Chip Hard Disk Drive (FIGS. 7 and 28) it is installed into a chip-positioning circuit board with its VCSEL microhead-array facing upward toward the observer, while the observer is looking down into a plan view of the chip, through the Cartesian Y-axis. Moreover, when installed, a Bottom Data-Surface Magneto-Optical Microhead Array Chip's 6 (FIGS. 7, 11, 13, and 28) pin-one designation dot should be located in the upper-left hand corner of the beforementioned Magneto-Optical Microhead Array Chip's outer-package. Alternatively, when a Top Data-Surface Magneto-Optical Microhead Array Chip is used in a Magneto-Optical Microhead Array Chip Hard Disk Drive (FIGS. 8 and 25) it is installed into a chip-positioning circuit board with its VCSEL microhead-array facing downward away from an observer, while the observer is looking down into a plan view of the chip, through the Cartesian Y-axis. Moreover, when installed a Top Data-Surface Magneto-Optical Microhead Array Chip's 6 (FIGS.

8, 12, 14, and 25) pin-one designation dot should also be located in the upper-left hand corner of the beforementioned Magneto-Optical Microhead Array Chip's outer-package.

Furthermore, when the Magneto-Optical Microhead Array Chips are installed into their chip-positioning circuit boards, and chip-positioning circuit boards are installed into a Magneto-Optical Microhead Array Chip Hard Disk Drive's casting-base, there will be one Magneto-Optical Microhead Array Chip positioned for and facing each data-surface of every disk-platter installed into a Magneto-Optical Microhead Array Chip Hard Disk Drive's unit-assembly. Moreover, the arrangement described above is how both Magneto-Optical Microhead Array Chip designs will align with each other when installed and connected into a Magneto-Optical Microhead Array Chip Hard Disk Drive's unit-assembly and into the drive's bus-system. In addition, when installed into a Magneto-Optical Microhead Array Chip Hard Disk Drive's unit-assembly there are at-least two VCSEL microhead arrays facing each other (FIGS. 9 and 10) with at-least one disk-platter 13 (FIGS. 1, 2, and 3) positioned between them; moreover, as if each installed Magneto-Optical Microhead Array Chip were looking at a reflection of itself in a mirror. Furthermore, the main reason for this approach was to simplify a Magneto-Optical Microhead Array Chip Hard Disk Drive's bus-system design, and to create an easy form of connectivity and construction for a Magneto-Optical Microhead Array Chip Hard Disk Drive's unit-assembly.

Another preferred embodiment of the present invention, as illustrated in drawing FIGS. 1, 6, 9, 10, and 15, shows Polymer flex-cable connectors 34, 67 (FIGS. 1, 6, 9, and 10) and their associated Polymer flex-cables 36 (FIGS. 1, 6, 10, and 15), which are located, when looking down into a plan view illustration of a Magneto-Optical Microhead Array Chip Hard Disk Drive's unit-assembly, on both the right-hand side and left-hand side of the beforementioned Magneto-Optical Microhead Array Chip Hard Disk Drive's chip-positioning circuit boards. Wherein, Polymer flex-cable connectors and Polymer flex-cables, if installed on the right-hand side of a Magneto-Optical Microhead Array Chip Hard Disk Drive's unit-assembly are dedicated to the Power, the Ground, the Data I/O, and the Control bus-systems that are used in a Magneto-Optical Microhead Array Chip Hard Disk Drive. Furthermore, the previously mentioned Polymer flex-cables 36 (FIGS. 1, 6, 10, and 15) and their associated Polymer flex-cable connectors 34, 67 (FIGS. 1, 6, 9, and 10), which are located on the right-hand side of a Magneto-Optical Microhead Array Chip Hard Disk Drive's unit-assembly (FIG. 117), create multiple circuit connections between chip-connecting contact-points that are located on the right-hand side of installed Magneto-Optical Microhead Array Chips 7, 8 (FIGS. 7, 8, 26, and 27), and a Disk Controller's (PCB) "Printed Circuit Board". Moreover, the Disk Controller PCB used in Magneto-Optical Microhead Array Chip Hard Disk Drives is located underneath a Magneto-Optical Microhead Array Chip Hard Disk Drive's Spindle-Motor unit-assembly at the bottom of a Magneto-Optical Microhead Array Chip Hard Disk Drive's casting-base 12 (FIGS. 1, 2, and 3).

However, if the Polymer flex-cable connectors 40, 67 (FIGS. 1, 6, 9, and 10), and their associated Polymer flex-cables 38 (FIGS. 1, 6, 10, and 16), are installed on the left-hand side of a Magneto-Optical Microhead Array Chip Hard Disk Drive's unit-assembly, they are dedicated to the 32-bit Microhead-Addressing bus-systems of the Magneto-Optical Microhead Array Chip Hard Disk Drive. Furthermore, the beforementioned Polymer flex-cables 38 (FIGS. 1, 6, 10, 16), and their Polymer flex-cable connectors 40, 67 (FIGS. 1, 6, 9, and 10), which are located on the left-hand side of a Magneto-Optical Microhead Array Chip Hard Disk Drive's unit-assembly (FIG. 117), create multiple circuit connections between the chip-connecting contact-points that are located on the left-hand side of installed Magneto-Optical Microhead Array Chips 9, 10 (FIGS. 7, 8, 26, and 27), and a Disk Controller's (PCB) "Printed Circuit Board". Moreover, the Disk Controller PCB used in a Magneto-Optical Microhead Array Chip Hard Disk Drive is located underneath a Magneto-Optical Microhead Array Chip Hard Disk Drive's Spindle-Motor unit-assembly at the bottom of a Magneto-Optical Microhead Array Chip Hard Disk Drive's casting-base 12 (FIGS. 1, 2, and 3).

Another preferred embodiment of the present invention, as illustrated in drawing FIGS. 26 and 27, shows a "Chip Placement Key" 11, which is located on the outer-package bottom-surface areas of Magneto-Optical Microhead Array Chips. Moreover, the previously mentioned "Chip Placement Key" 11 (FIGS. 26 and 27), which is shaped like a triangle, and located at the bottom-center of every Magneto-Optical Microhead Array Chip's outer-package, when installed, will have its triangle-apex facing toward the front of its outer-package's top-edge surface, while facing a Magneto-Optical Microhead Array Chip Hard Disk Drive's front-end. In addition, the "Chip Placement Keys" used in the Magneto-Optical Microhead Array Chips protrude about "$\frac{1}{16}$" of one inch out from underneath the bottom-center surface of a Magneto-Optical Microhead Array Chip's outer-package 11 (FIGS. 26 and 27). Furthermore, the sidewalls of the beforementioned "Chip Placement Keys" form "90" degree angles from the bottom-surface of its outer-package. In addition, the triangular-shaped "Chip Placement Keys" 11 (FIGS. 26 and 27) will also have a corresponding and triangular-shaped "Chip Placement Keyhole" 92 (FIGS. 30, 32, 35, and 37). Moreover, the previously mentioned "Chip Placement Keyholes" are located at the top-surface of the bottom-inside center mounting-plane of every chip-positioning circuit board's surface mounted chip-socket. In addition, the previously mentioned "Chip Placement Keyholes" 92 are also triangle-shaped and have a machined-out recess that measures "$\frac{1}{16}$" of one-inch from the top-surface of the bottom-inside center mounting-plane of every chip-positioning circuit board's surface mounted chip-socket. Moreover, the side-walls of the Chip Placement Keyholes will form "270" degree angles from the exposed bottom-center top-surface of every chip-positioning circuit board's surface mounted chip-socket 92 (FIGS. 30, 32, 35, and 37).

Furthermore, the manufacturing and machining dimensions for the "Chip Placement Keys" 11 (FIGS. 26 and 27) and "Chip Placement Keyholes" 92 (FIGS. 30, 32, 35, and 37) are critical and must adhere to a tolerance that is plus or minus "$\frac{1}{1000}$" of one-inch. Moreover, the previously mentioned dimensional tolerance used for the "Chip Placement Keys" and "Chip Placement Keyholes" is necessary to insure an accurate, a secure, and a non-compromizable placement of the beforementioned Magneto-Optical Microhead Array Chips into surface mounted chip-sockets of installed chip-positioning circuit boards. Furthermore, the installation of the Magneto-Optical Microhead Array Chips into their chip-positioning circuit board's surface mounted chip-sockets is done using two Magneto-Optical Microhead Array Chip's chip-mounting threaded hex-screws 2 (FIGS. 1, 6, 7, and 8). Moreover, the two chip-mounting hex-screws thread into a surface mounted chip-socket's two hex-screw holes 92 (FIGS. 30, 32, 35, and 37). This will completely seat and secure the Magneto-Optical Microhead Array Chips into their surface mounted chip-socket's inside-bottom chip mounting surface 92 (FIGS. 30, 32, 35, and 37).

In addition, the removal or displacement of a Magneto-Optical Microhead Array Chip after its installation into a chip-positioning circuit board's surface mounted chip-socket, should only occur if a Magneto-Optical Microhead Array Chip has failed. Moreover, a failed Magneto-Optical Microhead Array Chip would then need to be removed and replaced with a new and fully functioning Magneto-Optical Microhead Array Chip. However, if a Magneto-Optical Microhead Array Chip were replaced the newly installed Magneto-Optical Microhead Array Chip would need to be used to execute a low-level and operating system reformatting of the disk-platter data-surface located under the Magneto-Optical Microhead Array Chip replacement. After a low-level and operating system reformatting of the disk-platter data-surface located under the replacement chip has been executed, the newly installed replacement Magneto-Optical Microhead Array Chip should never be re-adjusted or moved in any way, or again, a new low-level and operating system reformatting of the adjusted Magneto-Optical Microhead Array Chip's disk-platter data-surface would be required.

Another preferred embodiment of the present invention, as illustrated in drawing FIGS. 26 and 27, shows a Magneto-Optical Microhead Array Chip's sixty-eight circuit connecting contacts, which are physically embedded into the bottom-surface 7, 8, 9, 10 (FIGS. 26 and 27) of every Magneto-Optical Microhead Array Chip's outer-package. Moreover, for every Magneto-Optical Microhead Array Chip's sixty-eight embedded circuit connecting contacts there is a matching set of sixty-eight circuit connecting contacts 92 (FIGS. 30, 32, 35, and 37), which are physically embedded into the top-surface of the bottom-inside center mounting-plane of every chip-positioning circuit board's surface mounted chip-socket 5 (FIGS. 1, 2, 7, and 8). When viewing a Magneto-Optical Microhead Array Chip in a plan-view the location of a Magneto-Optical Microhead Array Chip's pin-one designation dot can be clearly seen 6 (FIGS. 1, 7, 8, 25, and 28). Moreover, the pin-one designation dot of a plan-viewed Magneto-Optical Microhead Array Chip indicates that its either a "Top Data-Surface Magneto-Optical Microhead Array Chip" or a "Bottom Data-Surface Magneto-Optical Microhead Array Chip". Therefore, the pin-one designation dot of a plan-viewed Magneto-Optical Microhead Array Chip, also indicates, by way of reference, the locations, the names, and the number-designations of the viewed Magneto-Optical Microhead Array Chip's sixty-eight embedded circuit-connecting contacts, as illustrated in FIGS. 11 and 12.

Therefore, when viewing a Magneto-Optical Microhead Array Chip with its microheads facing upward in a portrait plan-view position, its pin-one designation dot will be located in the upper left-hand corner of its outer-package, which indicates that it is an installed "Bottom Data-Surface Magneto-Optical Microhead Array Chip". In addition, when viewing a Magneto-Optical Microhead Array Chip with its microheads facing downward in a portrait plan-view position, its pin-one designation dot will also be located in the upper left-hand corner of its outer-package, which indicates that it is an installed "Top Data-Surface Magneto-Optical Microhead Array Chip". However, when viewing a Magneto-Optical Microhead Array Chip with its microheads facing upward in a portrait plan-view position, while its pin-one designation dot is located in the upper left-hand corner of its outer-package, would indicate that this is an un-installed "Bottom Data-Surface Magneto-Optical Microhead Array Chip" 6 (FIGS. 1, 7, 11, 13, and 28). In addition, when viewing a Magneto-Optical Microhead Array Chip with its microheads again facing upward in a portrait plan-view position, while its pin-one designation dot is located in the upper right-hand corner of its outer-package, would indicate that this is an un-installed "Top Data-Surface Magneto-Optical Microhead Array Chip" 6 (FIGS. 1, 8, 12, 14, and 25).

Figure 7:
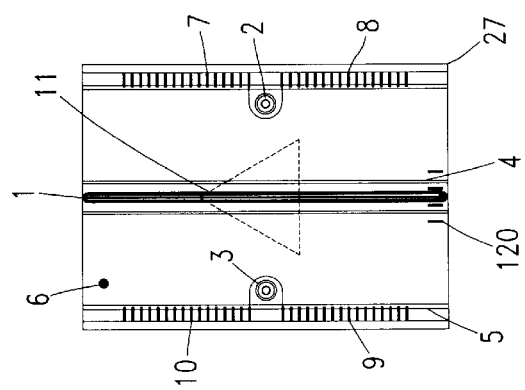
FIG. 7 shows an orthographic plan-view of the Bottom Data Surface Magneto-Optical Microhead Array Chip.
Figure 9:
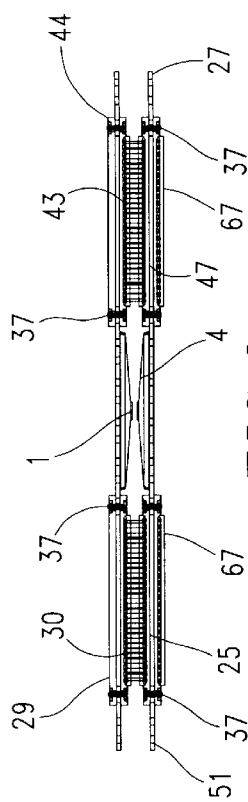
FIG. 9 is an orthographic front-view drawing of a combination Top and Bottom chip-positioning ciruit board, which is shown with Magneto-Optical Microhead Array Chips installed into surface mounted chip-sockets.
Figure 11:
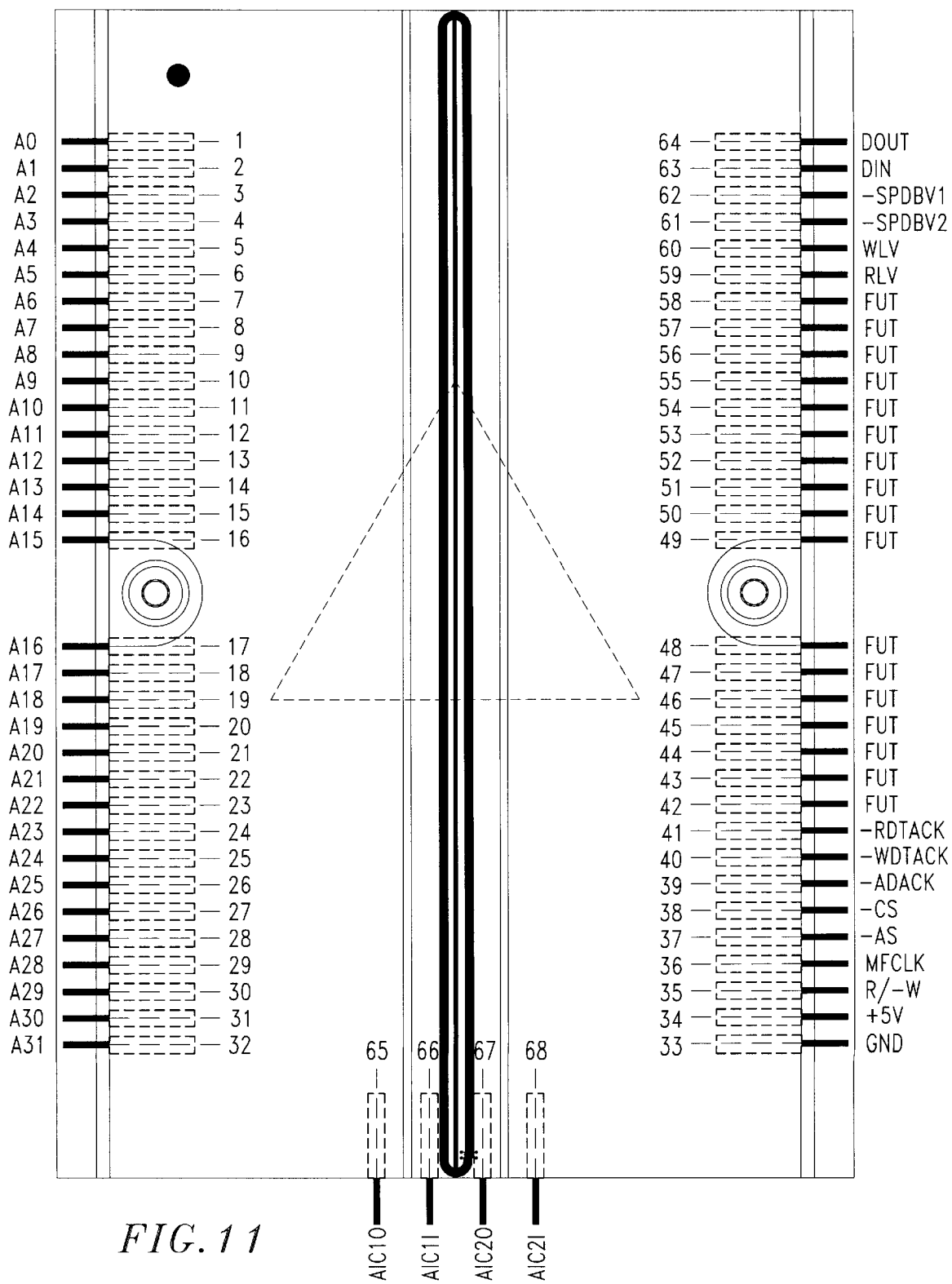
FIG. 11 is an orthographic plan-view drawing of a Magneto-Optical Microhead Array Chip shown installed into a surface mounted chip-socket displaying pin locations, number assignments, and logic-function labels for a Bottom Data-Surface Magneto-Optical Microhead Array Chip.
Figure 12:
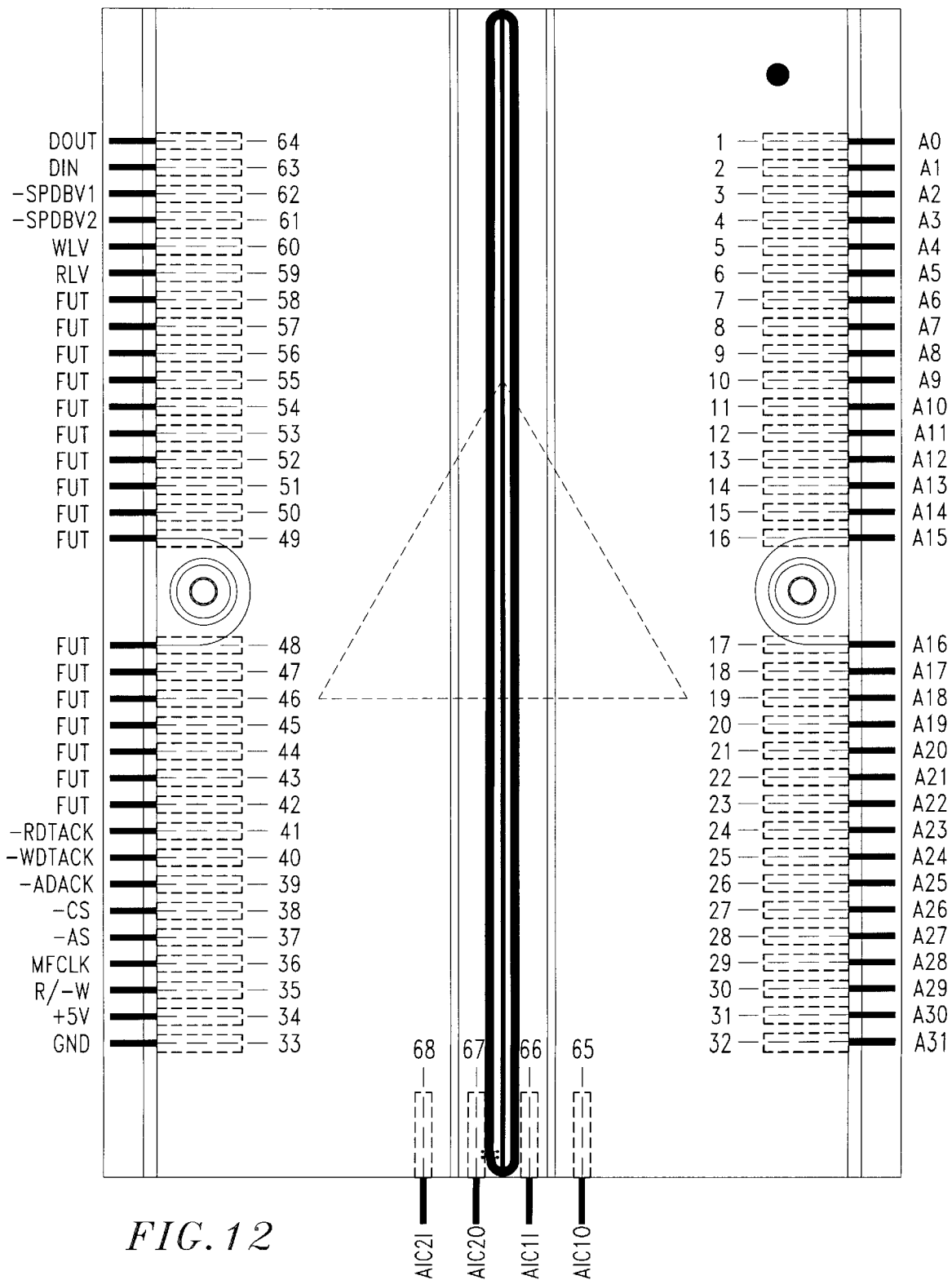
FIG. 12 is an orthographic plan-view drawing of a Magneto-Optical Microhead Array Chip shown installed into a surface mounted chip-socket displaying pin locations, number assignments, and logic-function labels for a Top Data-Surface Magneto-Optical Microhead Array Chip.
Figure 28:
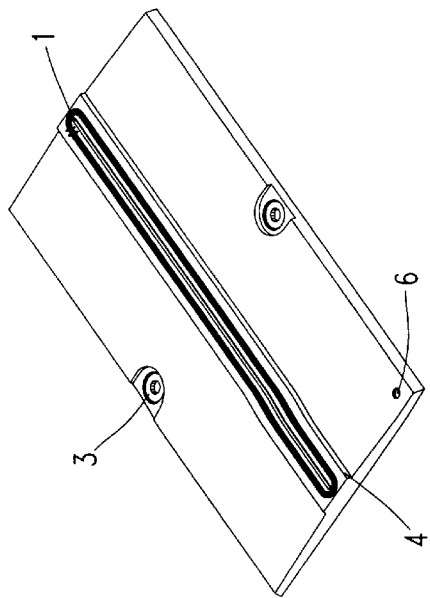
FIG. 28 is a 3D top-view drawing of the disk-platters' Bottom Data-Surface Magneto-Optical Microhead Array Chip.
Figure 29:
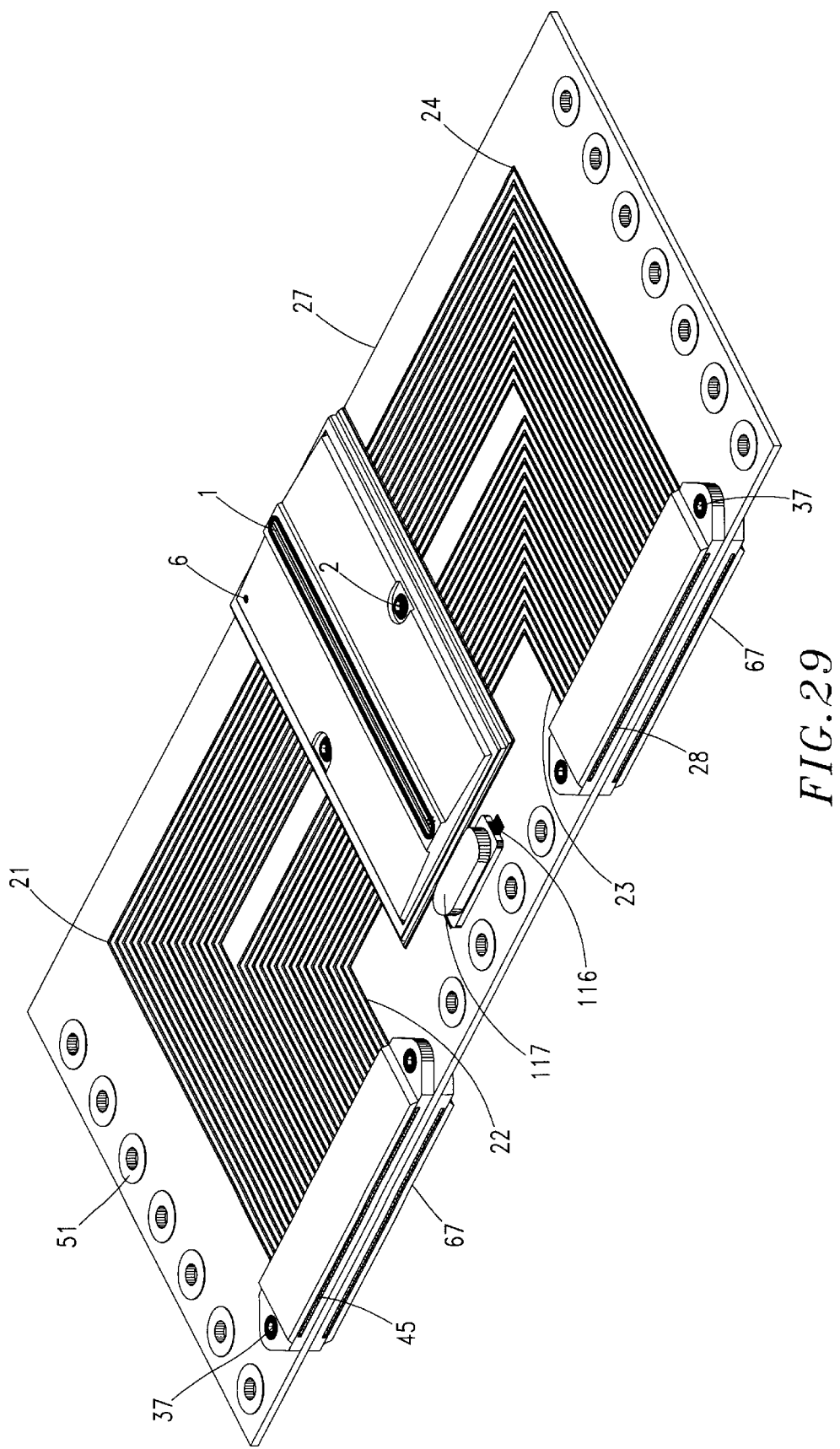
FIG. 29 is a 3D top back-view drawing of the between disk-platter chip-positioning circuit board assembly shown with both Magneto-Optical Microhead Array Chips as installed.
Figure 30:
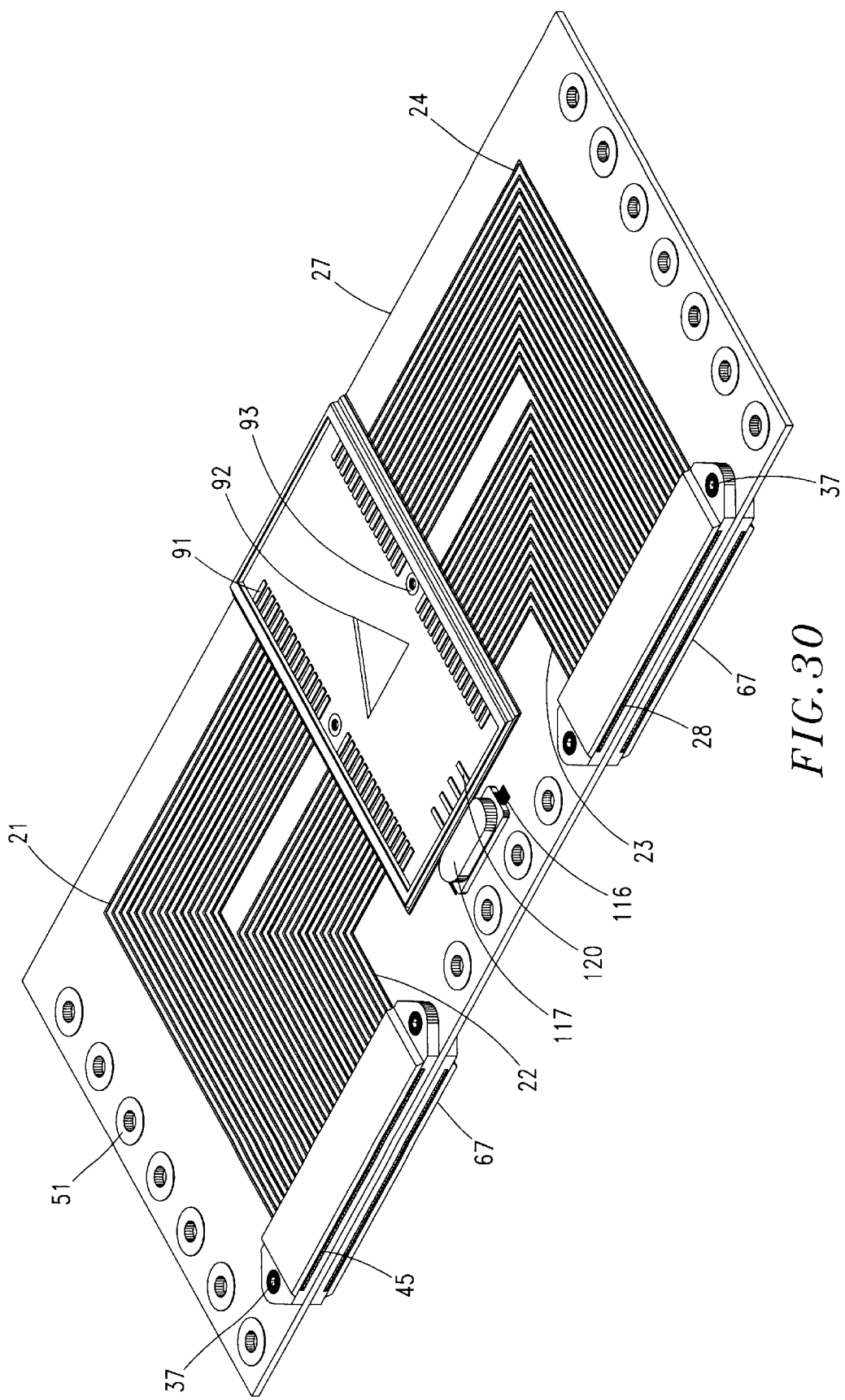
FIG. 30 is a 3D top back-view drawing of the between disk-platters chip-positioning circuit board assembly, shown with the Magneto-Optical Microhead Array Chips as not installed.
Figure 31:
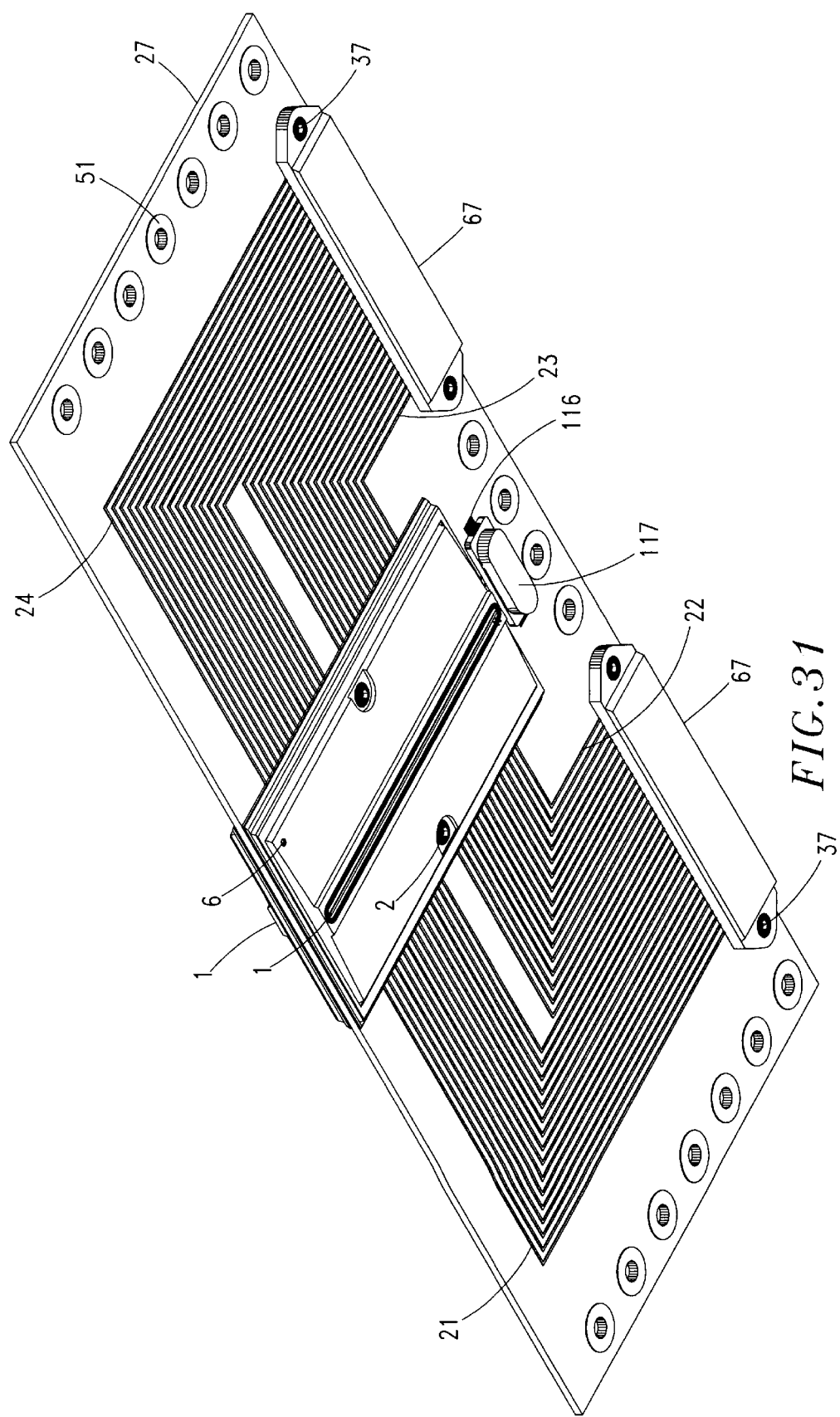
FIG. 31 is a 3D-bottom front-view drawing of the between disk-platters chip-positioning circuit board assembly, shown with both Magneto-Optical Microhead Array Chips as installed.
Figure 32:
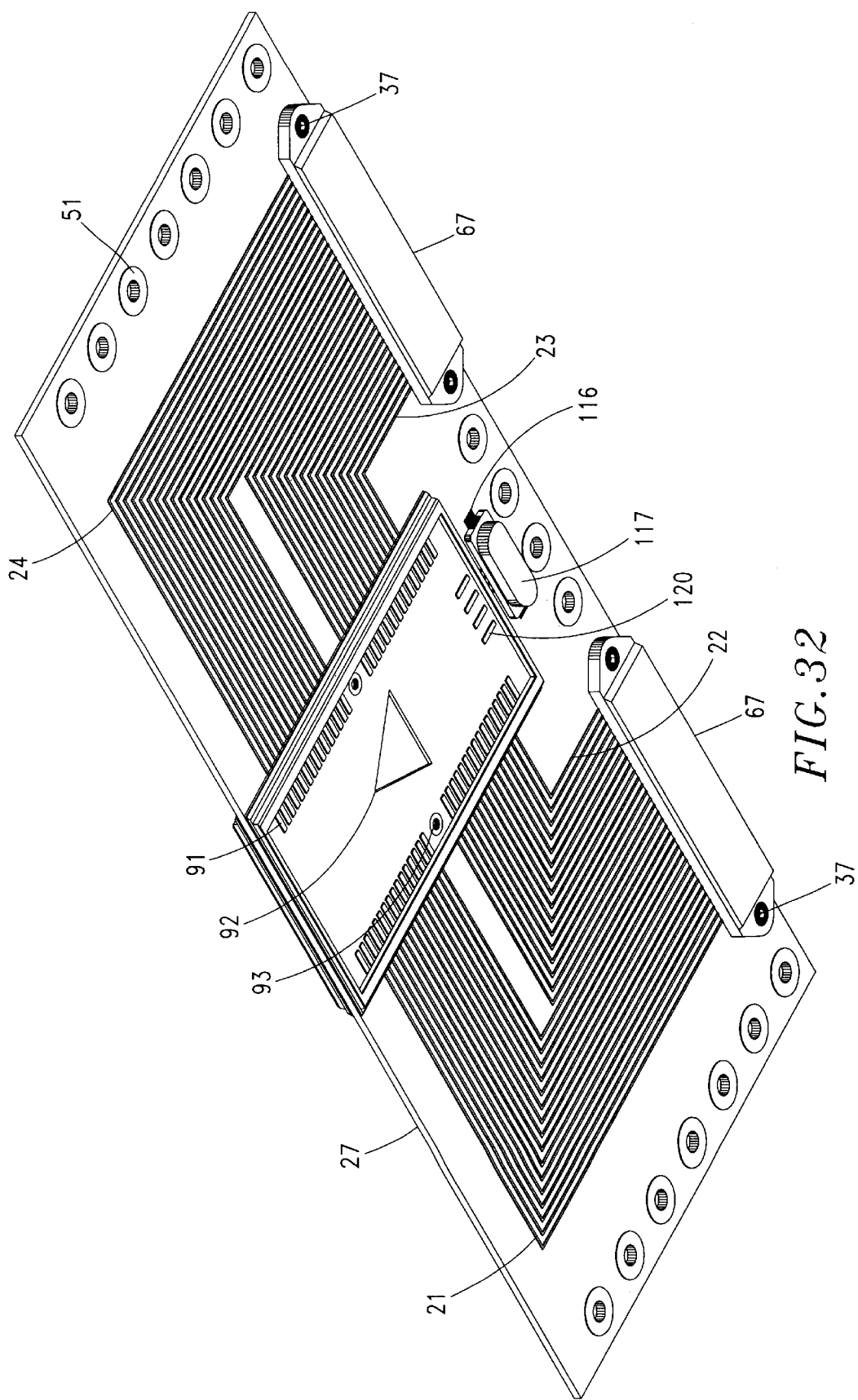
FIG. 32 is a 3D-bottom front-view drawing of the between disk-platters chip-positioning circuit board assembly, shown with the Magneto-Optical Microhead Array Chips as not installed.

Furthermore, the plan-viewed and un-installed version of a "Bottom Data-Surface Magneto-Optical Microhead Array Chip" has its 32-bit Microhead-Addressing bus-circuit's connecting input-contacts (FIG. 11) located on the left-hand side of its outer-package's bottom-surface 9, 10 (FIGS. 7, 11, and 27). Moreover, the thirty-two Microhead-Addressing and bus-circuit connecting input-contacts are presented as two groups of sixteen input-contacts 9, 10 (FIGS. 7, 11, and 27). Moreover, a group number-one will contain input-contacts zero to sixteen 10 (FIGS. 1, 7, and 11), while a group number-two will contain input-contacts seventeen to thirty-one 9 (FIGS. 1, 7, and 11). The two groups of sixteen circuit-connecting input-contacts are physically separated from each other by a Magneto-Optical Microhead Array Chip's chip installing hex-screws 2 (FIGS. 1 and 7), and a Magneto-Optical Microhead Array Chip's chip installing hex-screw holes 3 (FIGS. 1, 7, and 28). However, when logically combined, the previously mentioned two groups of sixteen circuit-connecting input-contacts complete a 32-bit Microhead-Addressing bus-system's contact configuration.

Furthermore, the beforementioned plan-viewed and un-installed "Bottom Data-Surface Magneto-Optical Microhead Array Chip", should have its control and data I/O bus-circuit's connecting contacts (FIG. 11) located on the right-hand side of its outer-package's bottom-surface 7, 8 (FIGS. 1, 7, and 27). Furthermore, the thirty-two control and data I/O bus-circuit connecting contacts are presented as two groups of sixteen contacts 7, 8 (FIGS. 1, 7, and 27). Wherein, group number one will contain contacts thirty-two to forty-eight 8 (FIGS. 1, 7, and 11), while group number two will contain contacts forty-nine to sixty-four 7 (FIGS. 1, 7, and 11). Furthermore, the previously mentioned two groups of sixteen circuit-connecting contacts are physically separated from each other by a Magneto-Optical Microhead Array Chip's installation hex-screw 2 (FIGS. 1 and 7), and a Magneto-Optical Microhead Array Chip's hex-screw hole 3 (FIGS. 1, 7, and 28). However, when logically combined, the previously mentioned two groups of sixteen circuit-connecting contacts complete a control and data 1/0 bus-system's contact configuration.

Figure 8:
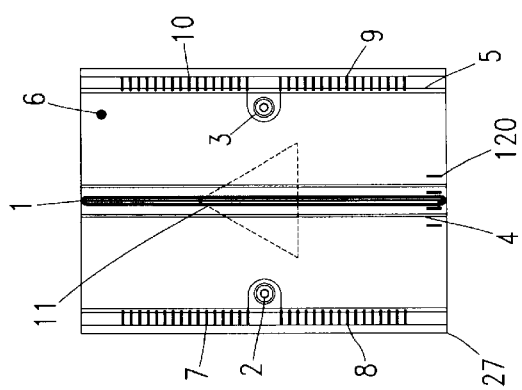
FIG. 8 shows an orthographic plan-view of the Top Data Surface Magneto-Optical Microhead Array Chip.
Figure 25:
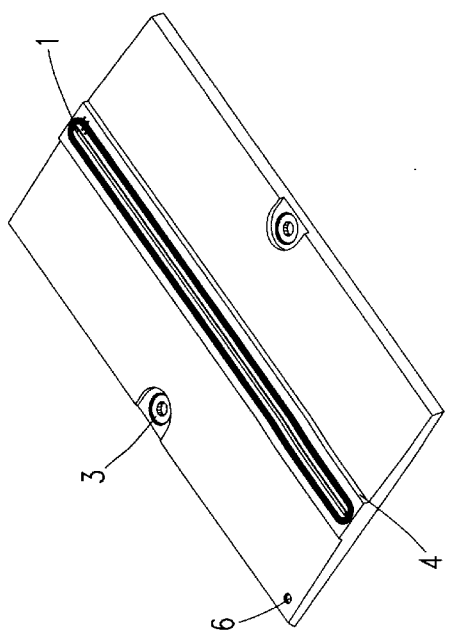
FIG. 25 is a 3D top-view drawing of the disk-platters' Top Data-Surface Magneto-Optical Microhead Array Chip.

Furthermore, the beforementioned plan-viewed and un-installed "Top Data-Surface Magneto-Optical Microhead Array Chip", should have its 32-bit Microhead-Addressing bus-circuit's connecting input-contacts (FIG. 12) located on the right-hand side of its outer-package's bottom-surface 9, 10 (FIGS. 8 and 26). Furthermore, the thirty-two Microhead-Addressing bus-circuit connecting input-contacts are presented as two groups of sixteen input-contacts 9, 10 (FIGS. 8 and 26). Wherein, group number one will contain input-contacts zero to sixteen 10 (FIGS. 8 and 12), while group number two will contain input-contacts seventeen to thirty-one 9 (FIGS. 8 and 12). Furthermore, the previously mentioned two groups of sixteen circuit-connecting input-contacts are physically separated from each other by a Magneto-Optical Microhead Array Chip's installation hex-screw 2 (FIG. 8), and a Magneto-Optical Microhead Array Chip's hex-screw hole 3 (FIGS. 8 and 25).

However, when logically combined, the previously mentioned two groups of sixteen circuit-connecting input-contacts complete a 32-bit Microhead-Addressing bus-system's contact configuration.

Furthermore, the beforementioned plan-viewed and un-installed "Top Data-Surface Magneto-Optical Microhead Array Chip", should have its control and data I/O bus-circuit's connecting contacts (FIG. 12) located on the left-hand side of its outer-package's bottom-surface 7, 8 (FIGS. 8 and 26). Furthermore, the thirty-two control and data I/O bus-circuit connecting contacts are presented as two groups of sixteen contacts 7, 8 (FIGS. 8 and 26). Wherein, group number one will contain contacts thirty-two to forty-eight 8 (FIGS. 8 and 12), while group number two will contain contacts forty-nine to sixty-four 7 (FIGS. 8 and 12). Furthermore, the previously mentioned two groups of sixteen circuit-connecting contacts are physically separated from each other by a Magneto-Optical Microhead Array Chip's installation hex-screw 2 (FIG. 8), and a Magneto-Optical Microhead Array Chip's installation hex-screw hole 3 (FIGS. 8 and 25). However, when logically combined, the previously mentioned two groups of sixteen circuit-connecting contacts complete a control and data I/O bus-system's contact configuration.

Furthermore, a plan-viewed and installed "Bottom Data-Surface Magneto-Optical Microhead Array Chip" will have its pin-one designation dot located in the upper left-hand corner of a Magneto-Optical Microhead Array Chip's outer-package 6 (FIGS. 1, 7, and 28). Moreover, a beforementioned plan-viewed and installed "Bottom Data-Surface Magneto-Optical Microhead Array Chip" (FIGS. 29 and 34) has its 32-bit addressing bus-circuit's connecting input-contacts (FIG. 11) located on the left-hand side of its outer-package's bottom-surface 9, 10 (FIGS. 7 and 27). In addition, a beforementioned plan-viewed and installed "Bottom Data-Surface Magneto-Optical Microhead Array Chip" (FIGS. 29 and 34) has its input-contacts one to thirty-two (FIG. 11) dedicated to its 32-bit addressing bus-circuit. In conclusion, an installed "Bottom Data-Surface Magneto-Optical Microhead Array Chip" connects its 32-bit addressing bus-circuit to a Magneto-Optical Microhead Array Chip Hard Disk Drive's Disk Controller and it's bus-system through its surface mounted chip-socket's "A0" to "A31" connection-contacts, as illustrated in FIG. 11.

Furthermore, the plan-viewed and installed "Bottom Data-Surface Magneto-Optical Microhead Array Chip" will have its pin-one designation dot located in the upper left-hand corner of a Magneto-Optical Microhead Array Chip's outer-package 6 (FIGS. 1, 7, and 28). Moreover, a plan-viewed and installed "Bottom Data-Surface Magneto-Optical Microhead Array Chip" (FIGS. 29 and 34) has its control and data I/O bus-circuit's connecting-contacts (FIG. 11) located on the right-hand side of its outer-package's bottom-surface 7, 8 (FIGS. 7 and 27). In addition, a beforementioned plan-viewed and installed "Bottom Data-Surface Magneto-Optical Microhead Array Chip" (FIGS. 29 and 34) has contacts thirty-three to thirty-eight (FIG. 11) dedicated to its (GND) "Ground" output-contact, its (+5) "VDD Power" input-contact, its (R/-W) "Read or Write Enable" input-contact, its (MFCLK) "Multi-Frequency Clock" input-contact, its (-AS) "Address Strobe" input-contact, and its (-CS) "Chip Select" input-contact, as illustrated in FIG. 11. In addition, a plan-viewed and installed "Bottom Data-Surface Magneto-Optical Microhead Array Chip" (FIGS. 29 and 34) has contacts thirty-nine to forty-one (FIG. 11) dedicated to its (-ADACK) "Address Acknowledge" output-contact, its (-WDTACK) "Write Data Acknowledge" output-contact, and its (-RDTACK) "Read Data Acknowledge" output-contact, as illustrated in FIG. 11.

Figure 13:
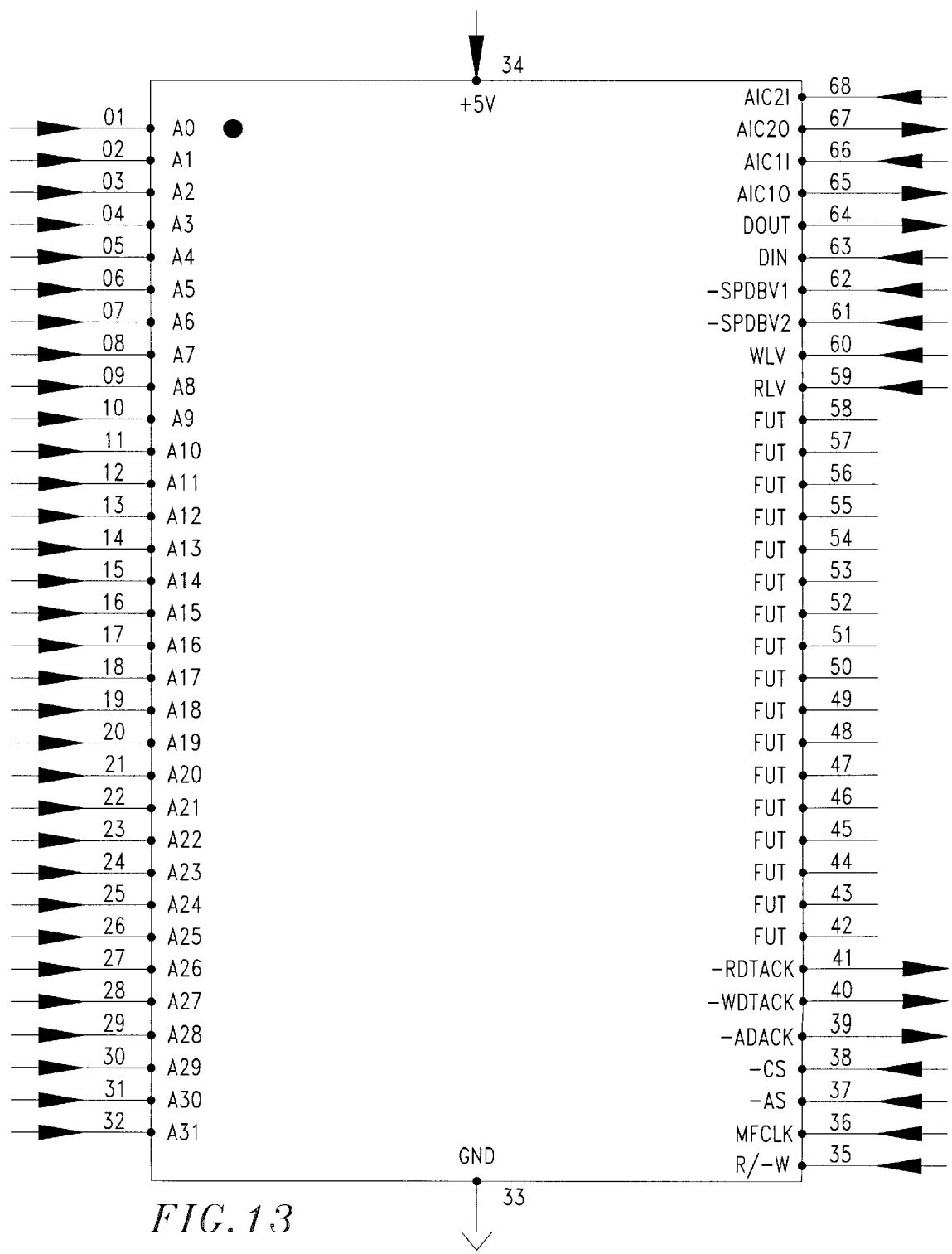
FIG. 13 is a logic-signal flow-schematic for the Bottom Data-Surface Magneto-Optical Microhead Array Chips displaying signal direction, pin assignments, and function labels.

In addition, a plan-viewed and installed "Bottom Data-Surface Magneto-Optical Microhead Array Chip" (FIGS. 29 and 34) has contacts forty-two to sixty-two (FIG. 1) dedicated to its (FUR) "Future" I/O contacts, as illustrated in FIG. 11. In addition, a plan-viewed and installed "Bottom Data-Surface Magneto-Optical Microhead Array Chip" (FIGS. 29 and 34) has contact fifty-nine (FIG. 11) dedicated to its (RLV) "Read Laser Voltage" output-contact, as illustrated in FIG. 11. In addition, a plan-viewed and installed "Bottom Data-Surface Magneto-Optical Microhead Array Chip" (FIGS. 29 and 34) has contact sixty (FIG. 11) dedicated to its (WLV) "Write Laser Voltage" output-contact, as illustrated in FIG. 11. In addition, a plan-viewed and installed "Bottom Data-Surface Magneto-Optical Microhead Array Chip" (FIGS. 29 and 34) has contact sixty-one (FIG. 11) dedicated to its (SPDBV2) "Semiconductor Photo-Diode Biased Voltage 2" output-contact, as illustrated in FIG. 11. In addition, a plan-viewed and installed "Bottom Data-Surface Magneto-Optical Microhead Array Chip" (FIGS. 29 and 34) has contact sixty-two (FIG. 11) dedicated to its (SPDBV1) "Semiconductor Photo-Diode Biased Voltage 1" output-contact, as illustrated in FIG. 11. In addition, a plan-viewed and installed "Bottom Data-Surface Magneto-Optical Microhead Array Chip" (FIGS. 29 and 34) has contacts sixty-three to sixty-four (FIG. 11) dedicated to its (DIN) "Data-In" input contact, and to its (Dout) "Data-out" output-contact, as illustrated in FIG. 11. In conclusion, an installed "Bottom Data-Surface Magneto-Optical Microhead Array Chip" connects its control and data I/O bus-circuits to a Magneto-Optical Microhead Array Chip Hard Disk Drive's Disk Controller and it's bus-systems through a surface mounted chip-socket's connection-contacts as they were previously numbered and named, and illustrated in FIG. 11. In addition, a "Signal-Flow" (i.e., sometimes called an in-put/out-put logic-flow configuration) for a un-installed"Bottom Data-Surface Magneto-Optical Microhead Array Chip" is illustrated in FIG. 13.

Furthermore, a plan-viewed and installed"Top Data-Surface Magneto-Optical Microhead Array Chip" has its pin-one designation dot located in the upper left-hand corner of the Magneto-Optical Microhead Array Chip's outer-package 6 (FIGS. 8 and 25). Moreover, a plan-viewed and installed "Top Data-Surface Magneto-Optical Microhead Array Chip" (FIG. 31, FIG. 36) has its 32-bit Microhead-Addressing bus-circuit's connecting input-contacts (FIG. 12) located on the left-hand side of its outer-package's bottom-surface 9, 10 (FIGS. 8 and 26). In addition, a plan-viewed and installed "Top Data-Surface Magneto-Optical Microhead Array Chip" (FIGS. 31 and 36) has its input-contacts one to thirty-two (FIG. 12) dedicated to its 32-bit Microhead-Addressing bus-circuit, as illustrated in FIG. 12. In conclusion, an "installed" "Top Data-Surface Magneto-Optical Microhead Array Chip" connects its 32-bit addressing bus-circuit to a Magneto-Optical Microhead Array Chip Hard Disk Drive's Disk Controller and its bus-system through its surface mounted chip-socket's "A0" to "A31" connection-contacts, as illustrated in FIG. 12.

Figure 14:
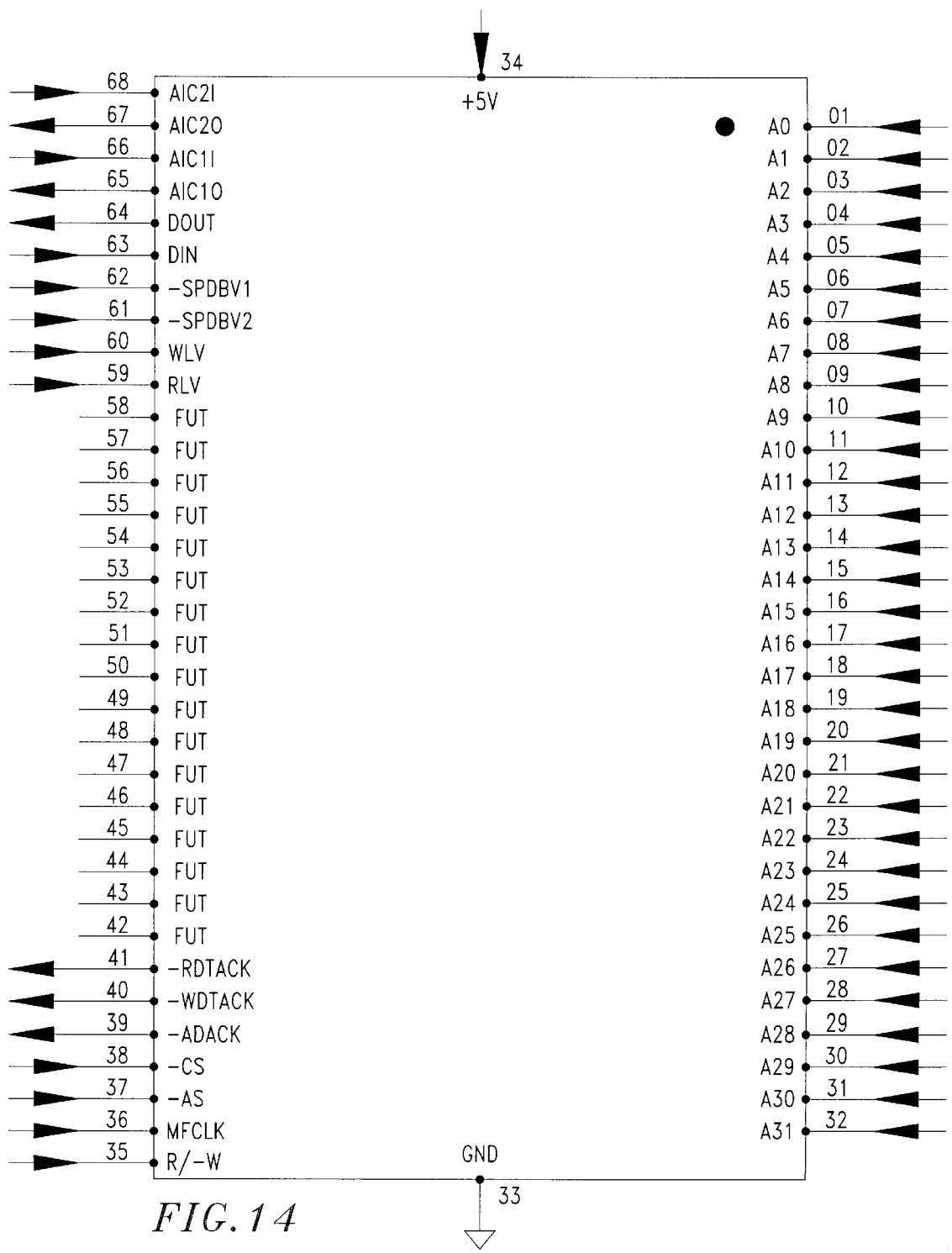
FIG. 14 is a logic-signal flow-schematic for the Top Data-Surface Magneto-Optical Microhead Array Chips displaying signal direction, pin assignments, and pin function labels.
Figure 15:
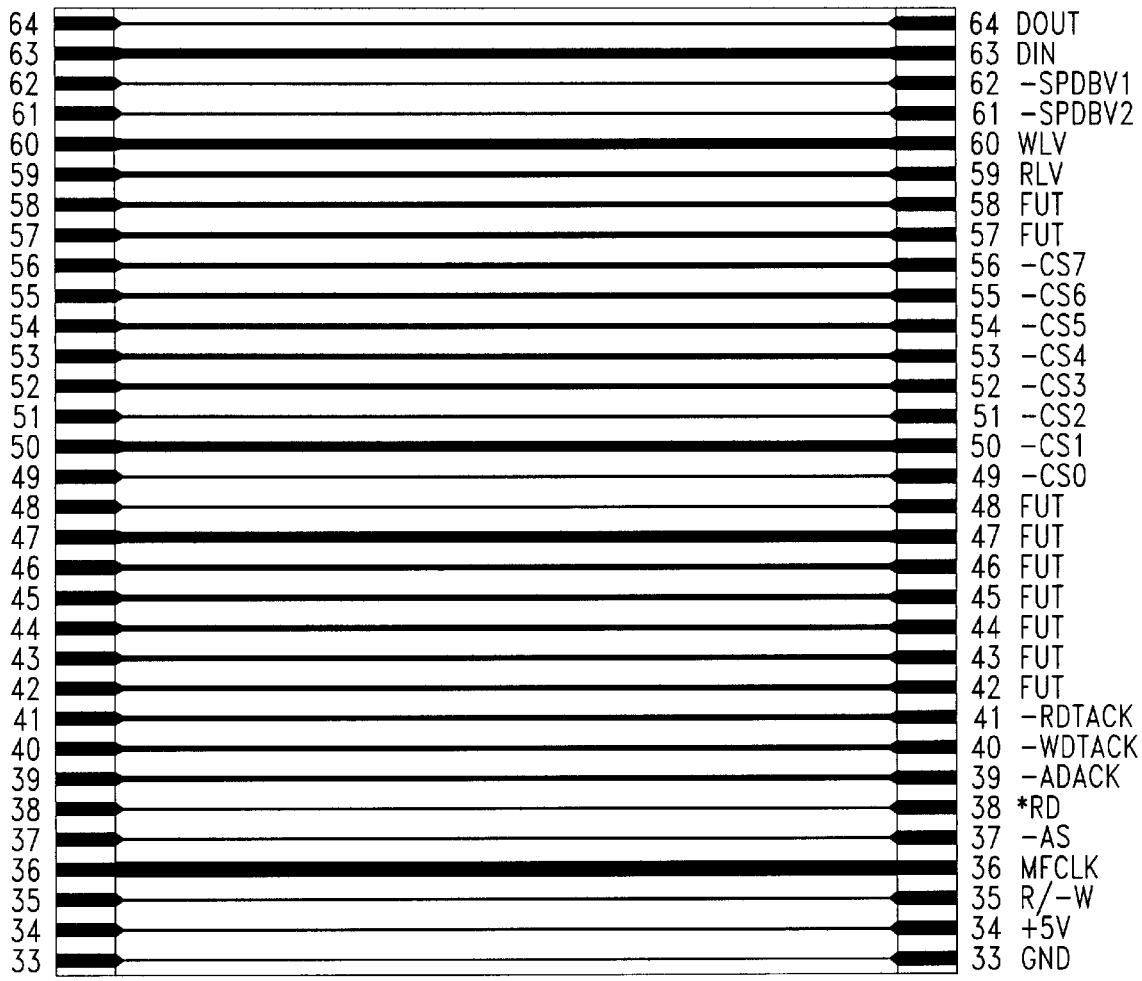
FIG. 15 is an plan-view drawing of a Polymer flex bus-cable for the chip-positioning circuit boards' right side connector-used in the Magneto-Optical Microhead Array Chip design, while displaying data-bus, future-bus, and control-bus pin assignments.
Figure 16:
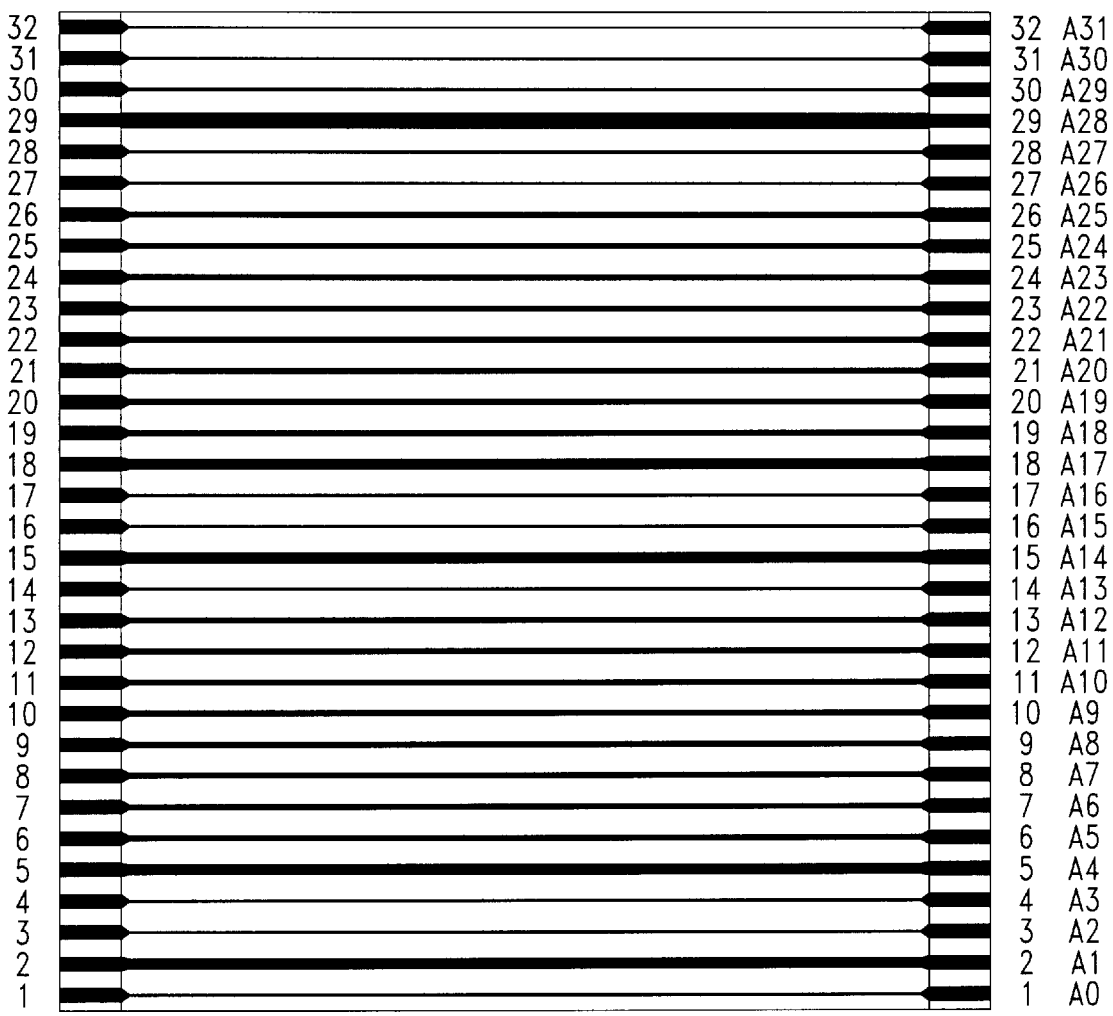
FIG. 16 is a plan-view drawing of a Polymer flex bus-cable for the chip-positioning circuit boards'left side connector used in the Magneto-Optical Microhead Array Chip design, while displaying the "32" bit as pin assignments.

Furthermore, a plan-viewed and installed "Top Data-Surface Magneto-Optical Microhead Array Chip" has its pin-one designation dot located in the upper left-hand corner of the Magneto-Optical Microhead Array Chip's outer-package 6 (FIGS. 8 and 25). Moreover, a plan-viewed and installed "Top Data-Surface Magneto-Optical Microhead Array Chip" (FIGS. 31 and 36) has its control and data I/O bus-circuit's connecting contacts (FIG. 12) located on the right-hand side of its outer-package's bottom-surface 7, 8 (FIGS. 7 and 26). In addition, a plan-viewed and installed "Top Data-Surface Magneto-Optical Microhead Array Chip" (FIGS. 31 and 36) has its contacts thirty-three to thirty-eight (FIG. 12) dedicated to its (GND) "Ground" output-contact, its (+5) "VDD Power" input-contact, its (R/-W) "Read or Write Enable" input-contact, its (MFCLK) "Multi-Frequency Clock" input-contact, its (-AS) "Address Strobe" input-contact, and its (-CS) "Chip Select" input-contact, as illustrated in FIG. 12. In addition, contacts thirty-nine to forty-one (FIG. 12) are dedicated to its (-ADACK) "Address Acknowledge" output-contact, its (-WDTACK) "Write Data Acknowledge" output-contact, and its (-RDTACK) "Read Data Acknowledge" output-contact, as illustrated in FIG. 12. In addition, contacts forty-two to sixty-two (FIG. 12) are dedicated to its (FUR) "Future" I/O contacts, as illustrated in FIG. 12. In addition, contact fifty-nine (FIG. 12) is dedicated to its (RLV) "Read Laser Voltage" output-contact, contact sixty (FIG. 12) is dedicated to its (WLV) "Write Laser Voltage" output-contact, and contact sixty-one (FIG. 12) is dedicated to its (SPDBV2) "Semiconductor Photo-Diode Biased Voltage 2" output-contact. In addition, contact sixty-two (FIG. 12) is dedicated to its (SPDBV1) "Semiconductor Photo-Diode Biased Voltage 1" output-contact. While contacts sixty-three to sixty-four FIG. 12 are dedicated to its (DIN) "Data-In" input-contact, and to its (Dout) "Data-out" output-contact, as illustrated in FIG. 12. In conclusion, an installed "Top Data-Surface Magneto-Optical Microhead Array Chip" connects its control and data I/O bus-circuits to a Magneto-Optical Microhead Array Chip Hard Disk Drive's Disk Controller and it's bus-systems through a surface mounted chip-socket's connection-contacts as they were previously numbered and named, as illustrated in FIG. 12. In addition, a "Signal-Flow" (i.e., sometimes called an in-put/out-put logic-flow configuration) for a un-installed "Top Data-Surface Magneto-Optical Microhead Array Chip" is illustrated in FIG. 14.

In addition, the contacts sixty-five to sixty-eight are dedicated to both the Top and Bottom Data-Surface Magneto-Optical Microhead Array Chip's two off-chip Auxiliary Induction Coils 117 (FIGS. 1, 2, 6, 10, 29, 30, 31, 32, 34, 35, 36, and 37) and their I/O contacts 121 (FIGS. 1 and 6). Moreover, the previously mentioned auxiliary induction coils and their associated contacts are listed as (AIC1O) "Auxiliary Induction Coil One Out" output-contact "65", (AIC1I) "Auxiliary Induction Coil One In" input-contact "66", (AIC2O) "Auxiliary Induction Coil Two Out" output-contact "67", and (AIC2I) "Auxiliary Induction Coil Two In" input-contact "68", as illustrated in FIGS. 11, 12, 13, and 14.

Figure 39:
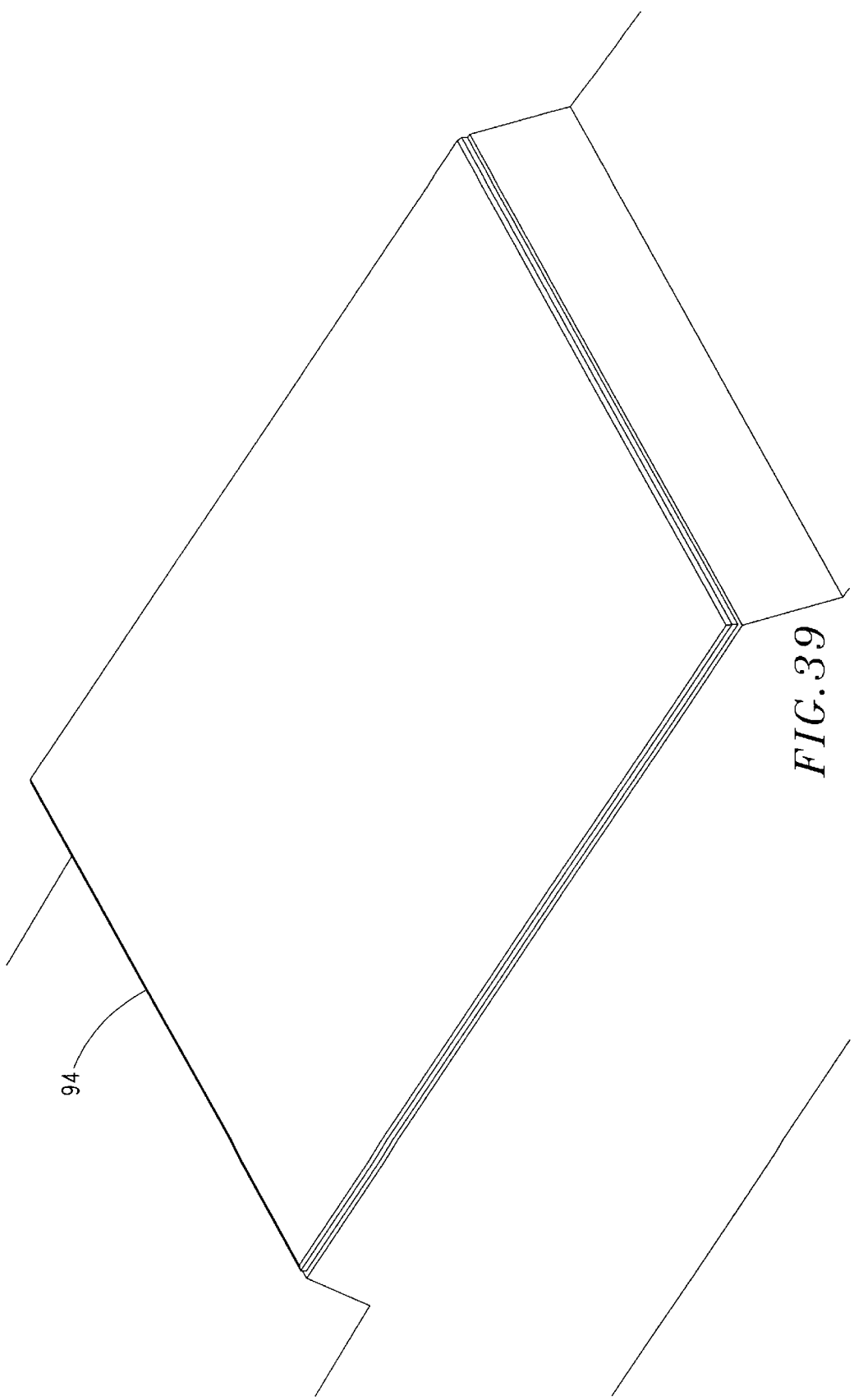
FIG. 39 is a 3D top front-view drawing of a Magneto-Optical Microhead Array Chip's concealed VCSEL microhead array that displays the quarter-wave calcite plate covering the microhead array.

Another preferred embodiment of the present invention, as illustrated in drawing FIGS. 41, 42, 43, 44, 45, 46, 47, 48, 49, 50, 52, and 52, is Magneto-Optical Microhead Array Chip core design and internal microhead structures, which are located within every Magneto-Optical Microhead Array Chip and comprises a microhead array containing as few as one-thousand or up to as many as four-billion multi-layered (VCSEL) "Vertical Cavity Surface Emitting Laser" devices 1 (FIGS. 1, 2, and 3) per Magneto-Optical Microhead Array Chip 4 (FIGS. 41 and 42), two reversed-biased (SPD) "Semiconductor Photo-Diode" photocell arrays 103, 104 (FIGS. 41 and 42), two (BIMPIC) "Bi-Metal Planar Induction Coil" "25-turn" planar induction coils 101, 102 (FIGS. 41 and 42), one quarter-wave polarizing plate 94, 95 (FIGS. 39 and 40), and one Ahrens polarizing analyzer and beam-splitting calcite crystal 129, 130, 131 (FIGS. 108A and 108B). Furthermore, the (VCSEL) "Vertical Cavity Surface Emitting Laser" microhead arrays used in the Magneto-Optical Microhead Array Chips are forward-biased, microscopic, and alloy-doped silicon semiconductor structures. Moreover, the VCSELs are built-up layer-upon-layer from a single semiconductor substrate, using existing (MBE) "Molecular Beam Epitaxy" or (MOVPE) "Metal-Organic Vapor-Phase Epitaxy" manufacturing methods. However, the Magneto-Optical Microhead Array Chips'support circuitry are fully integrated with the previously mentioned (VCSEL) "Vertical Cavity Surface Emitting Laser" microhead arrays and comprise a Microhead Address Latch And Decoder Circuit, a Chip-Selection And Chip-Control Circuit, a Data I/O And Pre-Amplification Circuit, a Data Encoding/Decoding Circuit, two (BIMPICs) "Bi-Metal Planar Induction Coils", and two reversed-biased (SPC) "Semiconductor Photo-Conductor" linear position-sensing (CdS) "Cadmium Sulfide" semiconductor devices, or as an alternative embodiment two reversed-biased (SPD) "Semiconductor Photo-Diode" photocell (Si) "Silicon" semiconductor arrays.

Furthermore, the previously mentioned photocell arrays are constructed from and upon semiconductor substrates that are different and separate from the beforementioned support circuitry's beforementioned substrates 1 (FIGS. 1, 2, and 3), but all other previously mentioned integrated circuits are masked, lithographed, etched, and built-up from the same semiconductor substrate as the previously mentioned VCSEL microhead arrays, along with their support and control circuitry. For example, the beforementioned support circuitry is made from "Silicon-Oxide" semiconductor wafer-chips, which are covered with a photo-resistant oxide material that is exposed to ultraviolet-light through a light blocking mask, which causes, using a photo-resist masking, the oxide-areas of the Silicon wafer-chip not masked, and therefore exposed to become photo-chemically altered. Next, the beforementioned areas of the "Silicon-Oxide" wafer-chip not masked are photo-chemically developed to expose an underlying layer beneath the photo-resist oxide material. In addition, the newly exposed lower layers of "Silicon-Oxide" material are next chemically removed, or etched-out; therein, leaving empty areas in the wafer itself, where the empty wafer areas can be filled-in later with various alloys or doped semi-conducting and/or conducting materials. Furthermore, along with the beforementioned VCSEL microhead arrays and their semiconductor support circuitry are the layers of non-conducting "Silicon Oxide" material, which is used as a fill-in insulating material for the non-conducting and iso-insulation areas that are present around every semiconductor and VCSEL structure, built into every Magneto-Optical Microhead Array Chip.

Figure 58:
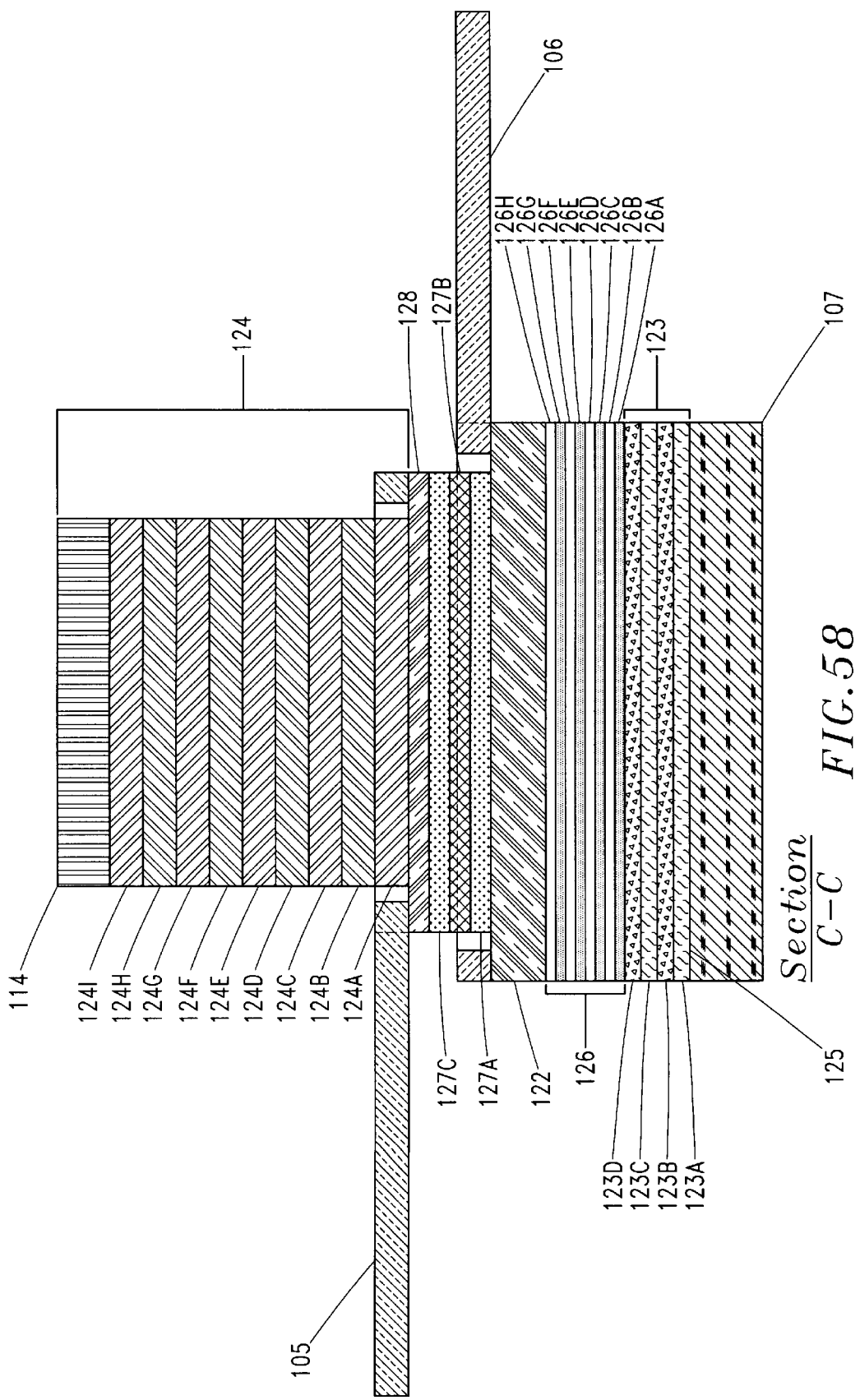
FIG. 58 is an orthographic side-view close-up drawing of a typical mesa-etched VCSEL device that displays section C—C, as defined in FIG. 57, while the drawing also illustrates the various layers and structures normally used in the construction of a typical prior art mesa-etched VCSEL device.

Furthermore, the previously mentioned non-conducting "Silicon-Oxide" insulating structures are also constructed layer-upon-layer and at the same time as the other semi-conducting circuit structures built into every Magneto-Optical Microhead Array Chip. Moreover, as illustrated in FIGS. 55 and 56, are two 3-D isometric views of an "p-n" junction ultra-violet VCSEL microhead design; moreover, presented as an example of existing prior art technology that utilizes "electron/hole" recombination to produce a blue-green to ultra-violet VCSEL laser with a frequency range of "435" to "350" nanometers. Illustrated in FIG. 58 is the "C—C" section of a double "p-n" junction ultra-violet VCSEL, which displays different semiconductor layers as being built-up via (MBE) "Molecular Beam Epitaxy" or (MOVPE) "Metal-Organic Vapor-Phase Epitaxy". Moreover, a epitaxy structure, which comprises, first of all of a metallic supporting substrate that is used as a back-reflecting mirror, while providing a base-structure for the growth of a VCSEL microhead's 107 (FIGS. 55, 56, and 58) subsequent multilayers, where this base-structure, while conductive, and as an alternative embodiment, also serves as an electrode composed of a (NiAl) "Nickel-Aluminum" alloy-mixture, while having between an eight to twelve percent lattice mismatch, or more specifically a ten percent lattice mismatch to (GaN) "Gallium-Nitride".

Nevertheless, (NiAl) "Nickel-Aluminum" is the preferred alloy-mixture for this kind of structure, while having a surface roughness of less than "15" atoms thick, the beforementioned (Ni—Al) "Nickel-Aluminum" alloy-mixture, also displays a highly reflective property as well. Furthermore, as illustrated in FIG. 58, a layer-by-layer growth of (AlN) "Aluminum-Nitride", while being only a few atoms thick, can also be utilized as a buffer layer 123 (FIGS. 55, 56, and 58) for facilitating the epitaxial-growth of subsequent multilayers that will eventually comprise a VCSEL's or VCSELs completed structure(s).

Typically, a first distributed Bragg reflector 126 (FIGS. 55, 56, and 58) is epitaxially grown onto a multi-layered buffer 123 (FIGS. 55, 56, and 58), by using any suitable epitaxial deposition method, such as (MBE) "Molecular Beam Epitaxy" or (MOVPE) "Metal-Organic Vapor-Phase Epitaxy". Moreover, a fit distributed Bragg reflector 126 (FIG. 58) is composed of alternating layers of n-doped (GaN) "Gallium-Nitride" 126A (FIG. 58) and n-doped (AlGaN) "Aluminum-Gallium-Nitride" 126B (FIG. 58); thereby, making a mirror pair or one pair of reflectors (AlGaN/GaN), or more precisely, two alternating layers that completes one "mirror pair". However, if additional mirror pairs are required, several more layers can be epitaxially deposited onto the last existing mirror pair thus, producing additional mirror pairs. Where the preferred number of mirror pairs ranges from five to ten mirror pairs 126A, 126B (FIG. 58), 126C, 126D (FIG. 58), 126E, 126F (FIG. 58), 126G, 126H (FIG. 58). Moreover, the second distributed Bragg reflector 124 (FIG. 58) is to be composed of alternating layers of (Al2O3) "Aluminum-Oxide" 124A (FIG. 58) and (ZnO) "Zinc-Oxide" 124B (FIG. 58); thereby, making a mirror pair or one pair of reflectors (Al2O3/ZnO), or more precisely, two alternating layers that completes one "mirror pair". However, if additional mirror pairs are required, several more layers can be epitaxially deposited onto the last existing mirror pair thus, producing additional mirror pairs. Where the preferred number of mirror pairs ranges from five to ten mirror pairs 124A, 124B (FIG. 58), 124C, 124D (FIG. 58), 124E, 124F (FIG. 58), 124G, 124H (FIG. 58), 124I, 114 (FIG. 58). However, it should be understood that the thickness and doping level of each layer must be precisely controlled. Therefore, any deviation from design parameters, no matter how slight, will effect a typical VCSEL's performance (i.e., frequency range and flux intensity).

For example, if a VCSEL microhead were designed to emit light within a frequency range, say "200" to "550" nanometers, it would need to have an optical thickness for each alternating layer used in the beforementioned second Bragg reflector 124 (FIG. 58) to be one-quarter of one wavelength of the light 139 (FIG. 108A) being emitted from the example VCSEL's emitter layer 114 (FIG. 58). In-general, each distributed layer used in a Bragg reflector, more specifically, Bragg reflectors 126, 124 (FIGS. 55, 56, and 58), must have an optical thickness that is equal to one-quarter of one wavelength of a VCSEL's laser emissions.

Furthermore, the doping of the semiconductor layers used in the construction of a VCSEL microhead is accomplished by the addition of various dopant materials (e.g., n-type dopants and p-type dopants) to epitaxial materials that are used for epitaxial deposition; thereby, doping the epitaxially deposited material. Typically, the semiconductor layers used in the construction of a VCSEL microhead will use many different dopant concentrations of specific dopant materials within their different intrinsic semiconductor structures; forming extrinsic semiconductor structures. For example, the alternating layers of the beforementioned first distributed Bragg reflector 126 (FIG. 58) are n-type and doped with "Selenium", "Silicon", or the like, to a concentration that ranges from "1E15" to "1E20" cubic-centimeters with a preferred range from "1E17" to "1E19" cubic centimeters, while a nominal range would be from "5E17" to "5E18" cubic centimeters 124A (FIG. 58). Furthermore, the percent of composition of the beforementioned first distributed Bragg reflector 126 (FIG. 58) can be stated as (Al x Ga x N/GaN) where x is the variable of "0.05" to "0.96", while in a preferred embodiment x would be greater than "0.8". Therefore, once the plurality of alternating layers that are used in the beforementioned first distributed Bragg reflector 126 (FIG. 58) have been deposited on buffer layer 123 (FIG. 58), a first contact-layer 122 (FIG. 58), which is composed of highly n-doped (GaN) "Gallium-Nitride" material and epitaxially grown on top of the last alternating layer of the beforementioned first distributed Bragg reflector 126 (FIG. 58). Moreover, the first contact-layer 122 (FIG. 58) will provide connectivity to a VCSEL's n-metal contact 106 (FIG. 58), but also enhances the reliability of a VCSEL, by preventing the migration of dislocations, and the like, to a VCSEL's active-region.

Furthermore, to prevent the overcrowding of the cladding-regions, each are shown as a single layer 127A, 127C (FIG. 58). However, it should be understood that each cladding-region can also be made of more than one layer 127A, 127C (FIG. 58) with each cladding-region epitaxially deposited onto the previous cladding-region 127A (FIG. 58). Wherein, each cladding-region 127A, 127C (FIG. 58) is composed of any suitable doped or un-doped material, such as a n-doped and a p-doped (AlGaN) "Aluminum-Gallium-Nitride" epitaxially deposited material. Furthermore, the beforementioned active-region 127B (FIG. 58) of a VCSEL is also represented by a single layer and epitaxially deposited onto the beforementioned first cladding-region 127A (FIG. 58). However, it should be understood that the previously mentioned active-region 127B (FIG. 58) can also include one or more barriers and quantum-wells; particularly a first barrier and a second barrier with a quantum-well positioned between the previously mentioned first barrier layer and the previously mentioned second barrier layer, while the beforementioned active-region 127B (FIG. 58) is composed of (InGaN) "Indium-Gallium-Nitride" material. Moreover, a second contact-layer 128 (FIG. 58); moreover, a layer of highly p-doped (GaN) "Gallium-Nitride" material is epitaxially grown onto a VCSEL's second cladding-region 127C (FIG. 58). Wherein, the previously mentioned second contact-layer provides connectivity to a VCSEL's p-metal contact 105 (FIG. 58).

In addition, a second distributed Bragg reflector is made of a plurality of alternating layers 124 (FIG. 58); moreover, a plurality of alternating layers 124, 114 (FIG. 58) that includes one or more layers of (Al2O3) "Aluminum-Oxide" material, which are illustrated as layers 124A, 124C, 124E, 124G, 124I (FIG. 58), and one or more layers of (ZnO) "Zinc-Oxide" material, which are illustrated as layers 124B,

124D, 124F, 124H, 114 (FIG. 58). For example, a layer of (Al2O3) "Aluminum-Oxide", which was epitaxially deposited on the previously mentioned second contact-layer 128 (FIG. 58), has a layer of (ZnO) "Zinc-Oxide" subsequently and epitaxially deposited on the previously mentioned first layer of (Al2O3) "Aluminum-Oxide"; thereby, making a first mirror pair of dielectric (Al2O3/ZnO) reflectors 124A, 124B (FIG. 58). Furthermore, if additional mirror-pairs are required, several more layers of additional mirror-pairs are deposited on the existing layers of (Al2O3) "Aluminum Oxide" and (ZnO) "Zinc Oxide". In addition, the plurality of alternating layers of the previously mentioned second distributed Bragg reflector 124 (FIG. 58) are formed from one mirror pair to ten mirror pairs with a preferred number of mirror pairs ranging from four to five pairs.

However, it should be understood that the number of mirror pairs could be adjusted for specific applications. In addition, a p-metal electrical contact 105 (FIG. 58) is formed on the previously mentioned second contact-layer 128 (FIG. 58) by disposing any suitable conductive material on the previously mentioned second contact-layer 128 (FIG. 58); moreover, a metal such as Indium-Tin-Oxide, Gold, Zinc, Platinum, Tungsten, and Germanium like metallic alloys. In addition, a n-metal electrical contact 106 (FIG. 58) is formed on the previously mentioned first contact-layer 122 (FIG. 58) by disposing any suitable conductive material on the previously mentioned first contact-layer 122 (FIG. 58) such as Indium-Tin-Oxide, Gold, Zinc, Platinum, Tungsten, and Germanium like metallic alloys. Furthermore, it should be understood that depending upon which material is selected for the previously mentioned electrical contacts 105, 106 (FIG. 58) that a specific method of disposition, disposing and patterning, onto the previously mentioned first and second contact-layers 122, 128 (FIG. 58) for a specific material, will change, along with that materials electrical contacts 105, 106 (FIG. 58).

A summarized listing of the layers that make-up the previously described prior art "p-n" junction ultra-violet VCSEL's structure; moreover, layers, which are listed according to their epitaxial deposition:

(i) A prior art "p-n" junction ultra-violet VCSEL's base-substrate back-reflecting mirror structure composed of (NiAl) "Nickel-Aluminum" alloy-mixture 107 (FIG. 58).

(ii) A prior art "p-n" junction ultra-violet VCSEL's multi-layered buffer structure comprising four layers composed of (AlN) "Aluminum-Nitride" 123A, 123B, 123C, 123D (FIG. 58).

(iii) A prior art "p-n" junction ultra-violet VCSEL's first distributed Bragg reflector 126 (FIG. 58) comprising alternating layers of n-doped (GaN) "Gallium-Nitride" 126A, 126C, 126E, 126G (FIG. 58) and n-doped (AlGaN) "Aluminum-Gallium-Nitride" 126B, 126D, 126F, 126H (FIG. 58).

(iv) A prior art "p-n" junction ultra-violet VCSEL's first contact-layer composed of a highly n-doped (GaN) "Gallium-Nitride" material 122 (FIG. 58).

(v) A prior art "p-n" junction ultra-violet VCSEL's n-metal contact 106 (FIG. 58).

(vi) A prior art "p-n" junction ultra-violet VCSEL's first cladding-region composed of an n-doped (AlGaN) "Aluminum-Gallium-Nitride" material 127A (FIG. 58).

(vii) A prior art "p-n" junction ultra-violet VCSEL's active-region comprising a single or multiple quantum-well composed of (InGaN) "Indium-Gallium-Nitride" material 127B (FIG. 58).

(viii) A prior art "p-n" junction ultra-violet VCSEL's second cladding-region composed of a p-doped (AlGaN) "Aluminum-Gallium-Nitride" material 127C (FIG. 58).

(ix) A prior art "p-n" junction ultra-violet VCSEL's second contact-layer composed of a highly p-doped (GaN) "Gallium-Nitride" material 128 (FIG. 58).

(x) A prior art "p-n" junction ultra-violet VCSEL's p-metal contact 105 (FIG. 58).

(xi) A prior art "p-n" junction ultra-violet VCSEL's second distributed Bragg reflector 124 (FIG. 58) comprising alternating layers of (Al2O3) "Aluminum-Oxide" material, which are illustrated as layers 124A, 124C, 124E, 124G, 124I (FIG. 58) and alternating layers of (ZnO) "Zinc-Oxide" material, which are illustrated as layers 124B, 124D, 124F, 124H, 114 (FIG. 58).

Furthermore, it should be noted that a prior art "p-n" junction ultra-violet VCSEL's second contact-layer 128 (FIG. 58), second cladding-region 127C (FIG. 58), quantum-well active-region 127B (FIG. 58), and first cladding-region 127A (FIG. 58) are all etched and, therefore define the overall structures of a mesa etched VCSEL's design (FIG. 58), while their diameters will remain substantially larger than the beforementioned prior art VCSEL's emission aperture 114 (FIG. 58), and its operating vertical cavity. Furthermore, so that the beforementioned prior art VCSEL's active-region 127B (FIG. 58) is not damaged by the etching process, proton-implantation can be utilized for current isolation; wherein, an proton-implantation mask's diameter is slightly larger than the beforementioned prior art VCSEL's emission aperture's diameter 114 (FIG. 58). In addition, as the above described etching and proton-implantation steps are completed a p-metal contact 105 (FIG. 58) is deposited upon the beforementioned VCSEL's second contact-layer 128 (FIG. 58), while leaving the beforementioned VCSEL's emission aperture area open 114 (FIG. 58). In addition, a n-metal contact is deposited upon the beforementioned first contact-layer 122 (FIG. 58), or the previously mentioned n-metal contact is deposited upon the beforementioned "p-n" ultra-violet VCSEL's base-substrate back-reflecting mirror structure 107 (FIGS. 55, 56, and 58) as an alternative preferred embodiment.

Figure 54:
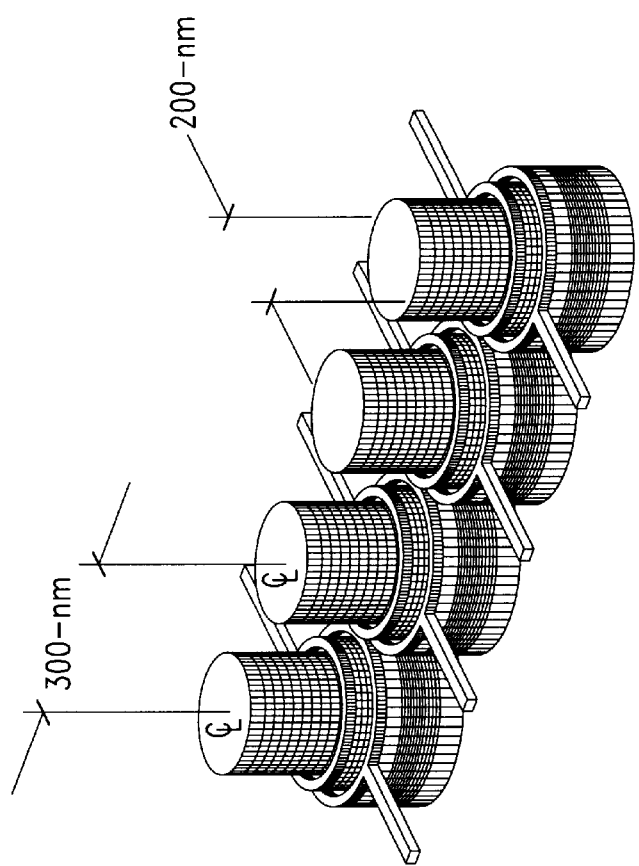
FIG. 54 is a 3D drawing showing a 5-degree left-side close-up view of four Magneto-Optical Microhead Array Chip VCSEL microheads, while displaying minute structural details, along with typical diameter and spacing dimensions for said VCSEL microheads.
Figure 53:
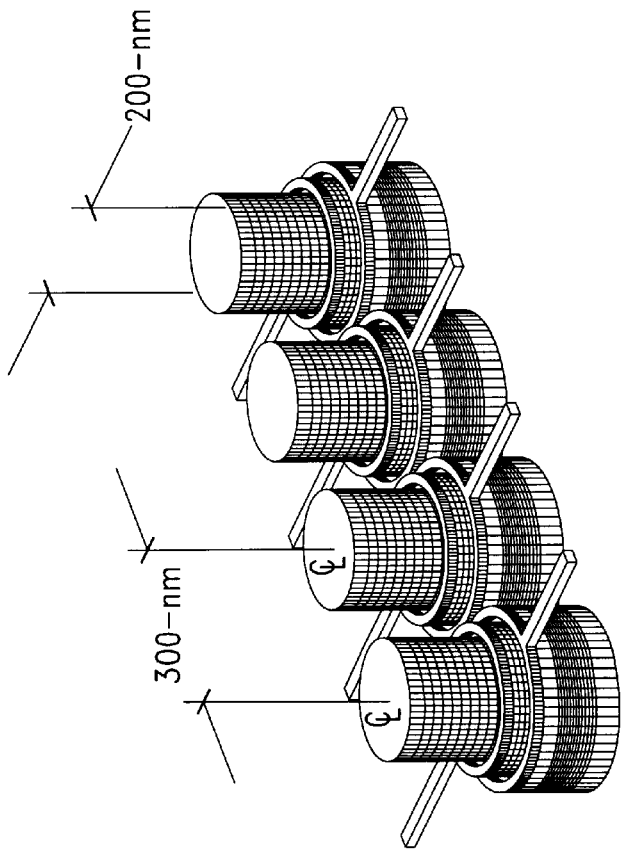
FIG. 53 is a 3D drawing showing a 5-degree right-side close-up view of four Magneto-Optical Microhead Array Chip VCSEL microheads, while displaying minute structural details, along with typical diameter and spacing dimensions for said VCSEL microheads.
Figure 57:
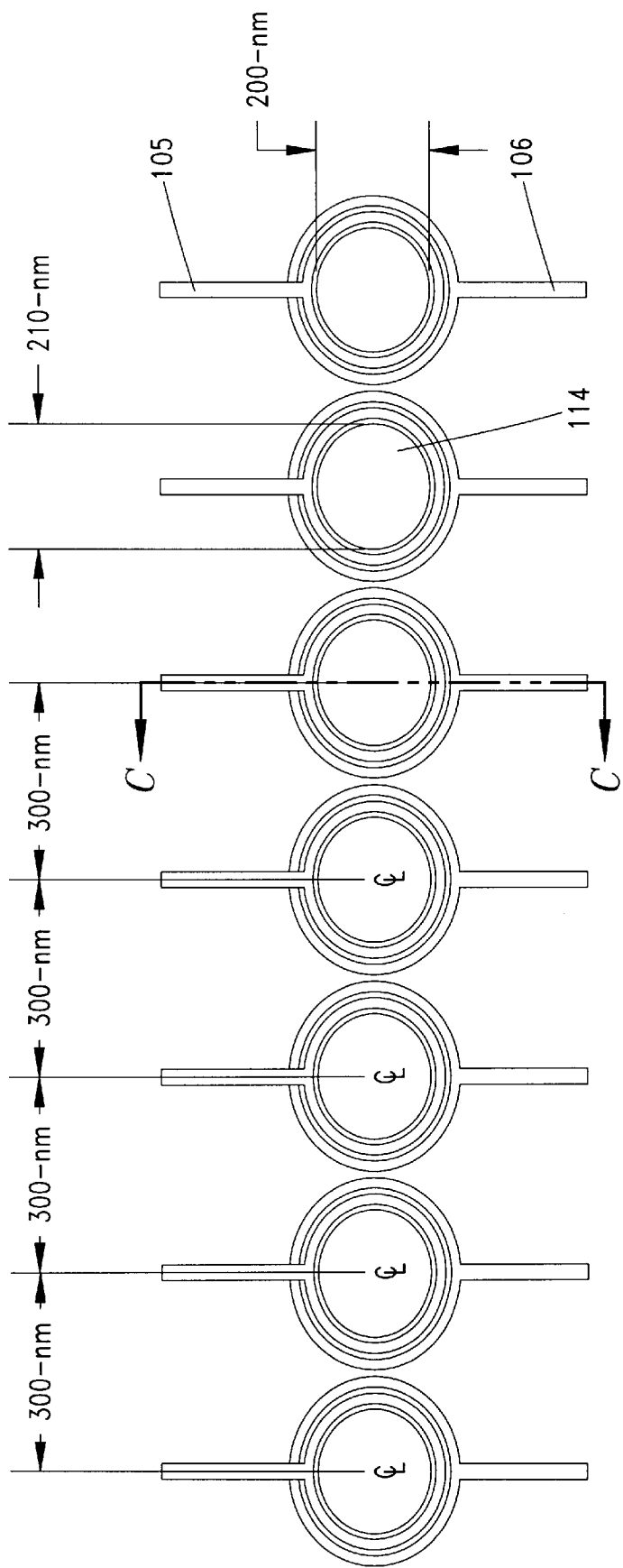
FIG. 57 is an orthographic plan-view close-up drawing of seven Magneto-Optical Microhead Array Chip VCSEL microheads that display section lines B—B and C—C, but the drawing also illustrates the diameter and the spacing dimensions for each of the seven Magneto-Optical Microhead Array Chip VCSEL microheads shown.

Furthermore, the metallic-alloy base-substrate and back-reflecting mirror structure 107 (FIGS. 55, 56, and 58), in conjunction with the (AlGaN/GaN) "Aluminum-Gallium-Nitride/Gallium-Nitride" Bragg reflector, provides for approximately 99% of the prior art VCSEL's reflectivity. Furthermore, the beforementioned "p-n" ultra-violet VCSEL microheads that could be used in a Magneto-Optical Microhead Array Chip's microhead array, would have a centerline-to-centerline dimension of approximately "300m" nanometers (FIGS. 53, 54, and 57), while the "p-n" ultra-violet VCSEL emission apertures 114 (FIG. 58) would have an elliptical diameter of "210"×"200" nanometers, as illustrated in FIG. 57. In addition, the previously mentioned and novel elliptical shape of the "p-n" junction ultra-violet VCSEL microheads (FIGS. 47 and 48) will cause their laser emissions to be elliptically shaped; thereby, increasing the "Circular Dichroism" of a disk-platter's reflected and linearly polarized E-ray; thus, improving the individually selected VCSEL microhead's demodulated read-out signal's quality of its signal-to-noise ratio.

Furthermore, the beforementioned two reversed-biased (SPC) "Semiconductor Photo-Conductor" linear position-sensing (CdS) "Cadmium Sulfide" semiconductor devices 103, 104, 107, 108 (FIGS. 41, 42, 43, 44, 45, 46, 47, 48, 49, 50, 51, and 52), or as a different preferred embodiment, the beforementioned two reversed-biased (SPD) "Semiconductor Photo-Diode" (Si) "Silicon" semiconductor photocell arrays. In addition, since the previously mentioned two reversed-biased (SPD) "Semiconductor Photo-Diode" (Si) "Silicon" semiconductor photocell arrays 103, 104, 107, 108 (FIGS. 41 and 42) are incapable of detecting frequencies of ultra-violet light so they must be coated with a phosphorous material like "Coronene" or "Liumogen" to convert disk reflected ultra-violet light into detectable frequencies of visible light. Furthermore, the previously mentioned photocell arrays are the last two of three semiconductor substrate surfaces present within a Magneto-Optical Microhead Array Chip device to be photo-resist oxide-masked, etched, and built-up, through MBE, into semiconductor circuit arrays.

In addition, the two (BIMPIC) "Bi-Metal Planar Induction Coil" devices 101, 102 (FIGS. 41 and 42) are to be positioned at the top-center of each Magneto-Optical Microhead Array Chip 4 (FIGS. 41 and 42), which surrounds a VCSEL microhead array with two interlayer Bi-Metal Planar Induction Coils. Wherein, each Bi-Metal Planar Induction Coil will have a dual structure consisting of a vertical copper planar-wire that is coated on one side with a thin layer of magnetic-core Nickel-Ferrite material, while each coil will comprise twenty-five coil winding turns. Consequently, the beforementioned VCSEL microhead arrays that are used in the Magneto-Optical Microhead Array Chips need to be completely surrounded by a Magneto-Optical Microhead Array Chip's two horizontal Bi-Metal Planar Induction Coils in order to affect a realignment of magnetic fields within the rare-earth materials located within a laser localized and thermally confined data cell area and, therefore will have no room at its center for a Nickel-Ferrite core structure.

Moreover, for the previously described reason, the (BIMPIC) "Bi-Metal Planar Induction Coil" design 101, 102 (FIGS. 41 and 42), which will be used in every Magneto-Optical Microhead Array Chip made will, by necessity use a core-less induction coil design (i.e., sometimes called an "Air Core Induction Coil" design). To describe further how the (BIMPIC) "Bi-Metal Planar Induction Coil" design 101, 102 (FIGS. 41 and 42) is used in the Magneto-Optical Microhead Array Chip Hard Disk Drive to solve the previously mentioned problem of not having a centrally located space within a Magneto-Optical Microhead Array Chip to physically place a magnetic core for a (BIMPIC) "Bi-Metal Planar Induction Coil" write-channel device. Moreover, the problem is solved by constructing a planar coil flat-wire out of two different metallic materials and having one-half of the planar flat-wire coil constructed from an electron conducting material like "Aluminum" or "Copper", while having the other-half of the planar flat-wire coil constructed from a magnetic-field producing, non-permanent, and magnetic Ferrite material, like "Ni—Zn Ferrite".

Next, by winding, the beforementioned two planar flat vertical wires of bi-metal into induction coils causing, therein the MBE deposited non-permanent magnetic "Ni—Zn Ferrite" material to become pressed between alternating layers of an electron conducting material, like "Aluminum" or "Copper"; moreover, forming a non-magnetic, multi-layered, and cylinder shaped induction coil with a "Ni—Zn Ferrite" magnetic core. Furthermore, because the magnetic core has a multi-layered and cylinder shape, which is hollow at its center, the VCSEL microhead arrays can now be placed within the previously mentioned two Bi-Metal Planar Induction Coils center area 101, 102 (FIGS. 41 and 42); moreover, allowing the VCSEL microheads to thermally confine, via curie-point manipulation, any magnetic-domain that lies across a disk-platter's data-surface, and by surrounding that magnetic-domain with a Bi-Metal Planar Induction Coil's vertical alternating magnetic field.

Another preferred embodiment of the present invention, as illustrated in drawing FIGS. 4 and 5, shows read-channel and write-channel circuit configurations of the Magneto-Optical Microhead Array Chips along with their connectivity to the operational control of a Magneto-Optical Microhead Array Chip Hard Disk Drive's SCSI or IDE interface designs, which are both used to connect a Magneto-Optical Microhead Array Chip Hard Disk Drive up to a host computer system. Moreover, the Magneto-Optical Microhead Array Chip Hard Disk Drive design, after performing a disk drive boot-up initialization of its operating system and its pre-check protocols, it normally begins an data operation with either a host-requested read-data or write-data disk-operation with a Magneto-Optical Microhead Array Chip Hard Disk Drive's Disk Controller forwarding a host-requested data-sector and cylinder/track address locations to a Magneto-Optical Microhead Array Chip Hard Disk Drive's "Asynchronous Optical Microhead Address Controller" 63 (FIG. 4), 80 (FIG. 5) for translation.

Furthermore, the "Asynchronous Optical Microhead Address Controller" is located on a Magneto-Optical Microhead Array Chip Hard Disk Drive Disk Controller's (PCB) "Printed Circuit Board" 63 (FIG. 4), 80 (FIG. 5). Moreover, a "Asynchronous Optical Microhead Address Controller" translates, into executable Magneto-Optical Microhead Array Chip control code, all forwarded host-requested data-sector location addresses that were previously stored in an Asynchronous Optical Microhead Address Controller's "Address Translation Register", which is located in the Asynchronous Optical Microhead Address Controller's "Address Unit". Furthermore, when the previously mentioned address translations are retrieved from an Asynchronous Optical Microhead Address Controller's "Address Unit", as Magneto-Optical Microhead Array Chip Control-Code, it is used to execute the selection of a particular Magneto-Optical Microhead Array Chip and the selection of one of the selected Magneto-Optical Microhead Array Chip's stationary microheads. Moreover, the previously mentioned Magneto-Optical Microhead Array Chip and microhead selection process is done through address bus-line cables and control-signals, which are sent to all Magneto-Optical Microhead Array Chips installed into a Magneto-Optical Microhead Array Chip Hard Disk Drive's unit-assembly. However, before any disk-operation, of any kind, can take place, the beforementioned "Asynchronous Optical Microhead Address Controller" must first select and enable one particular Magneto-Optical Microhead Array Chip. While this action is similar to a read or write head-selection process used by conventional hard disk drives it differs because every installed Magneto-Optical Microhead Array Chip is a stationary device (i.e., always in one place) having a multitude of stationary, separate, and singularly addressable VCSEL microheads 1 (FIGS. 41, 42, 43, and 44) contained within the Magneto-Optical Microhead Array Chips.

In addition, the previously mentioned Magneto-Optical Microhead Array Chip selection process is initialized first, by executing a (-CS) "Chip Select" control-bus signal (FIG. 64A, FIG. 64B), which is one of two control signals responsible for the selection of one Magneto-Optical Microhead Array Chip, amongst many that are connected to the Magneto-Optical Microhead Array Chip Hard Disk Drive's bus-system. Furthermore, the selected Magneto-Optical Microhead Array Chip is positioned over a Magneto-Optical Microhead Array Chip Hard Disk Drive's disk-platter data-surface containing the cylinder/track and data-sector location the host-system had requested data from, during a read-data disk-operation, or a Magneto-Optical Microhead Array Chip Hard Disk Drive's disk-platter data-surface containing the empty data-sector location the host-system had requested data sent to, during write-data disk-operation. In addition, the Magneto-Optical Microhead Array Chip's Chip-Selection process is accomplished through, point-to-point, individual (-CS) "Chip Select" chip control bus-lines. Wherein, one point-to-point control bus-line is dedicated to each Magneto-Optical Microhead Array Chip installed into a Magneto-Optical Microhead Array Chip Hard Disk Drive's unit-assembly (i.e., eight installed Magneto-Optical Microhead Array Chips would each have its own separate "Chip Select" point-to-point control bus-line).

Subsequently, the previously mentioned (-CS) "Chip Select" point-to-point control-signal bus-lines are each redirected from their bus-line flex-cable connector locations, which are present on every chip-positioning circuit board, to a previously mentioned chip-positioning circuit board's surface mounted chip-socket's pin-number "38" input-contact. Furthermore, the previously mentioned redirection of the (-CS) "Chip Select" point-to-point control-signal bus-lines, which are located on every chip-positioning circuit board installed into a Magneto-Optical Microhead Array Chip Hard Disk Drive's unit-assembly, and is based upon a cross-connect design that uses a (-CS) "Chip Select" line that is different and unique for every chip-positioning circuit board circuit-trace's architecture, as illustrated in FIGS. 17, 18, 19, 20, 21, 22, 23, and 24. Therefore, the Magneto-Optical Microhead Array Chip's chip-positioning circuit board surface mounted chip-socket's input-contact pin-number "38" and the chip-positioning circuit board's Polymer flex-cable connector inputs are cross-connected, giving individual selection control over every Magneto-Optical Microhead Array Chip installed into a Magneto-Optical Microhead Array Chip Hard Disk Drive's unit-assembly.

Figure 17:
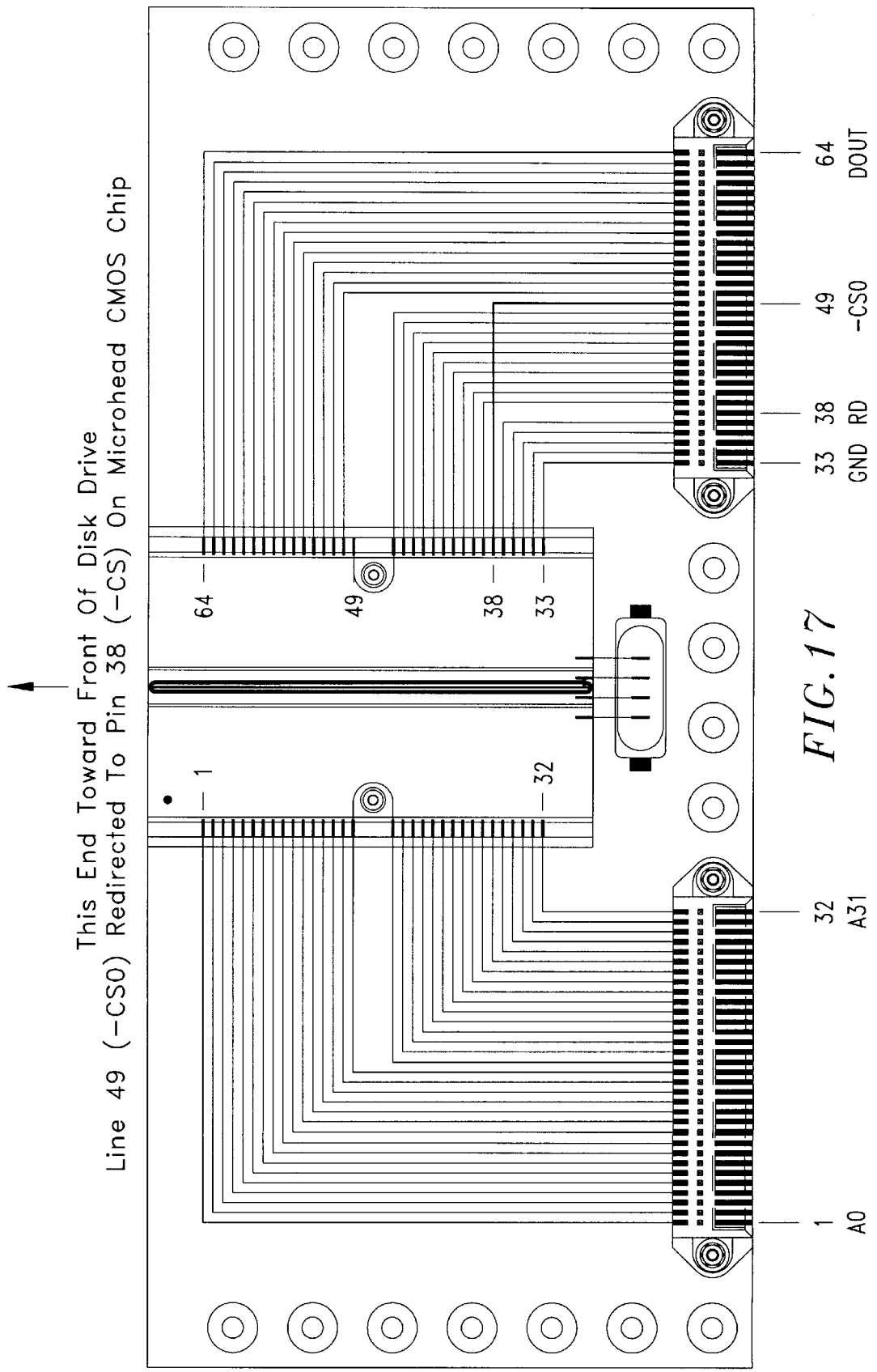
FIG. 17 is a plan-view drawing of a chip-positioning circuit board that displays a (RD) "Redirection" of the (-CS) "Chip Select" line for Magneto-Optical Microhead Array Chip Number-1, which is positioned for disk-platter one's bottom-side; also called disk-platter one's data-surface side-one.
Figure 18:
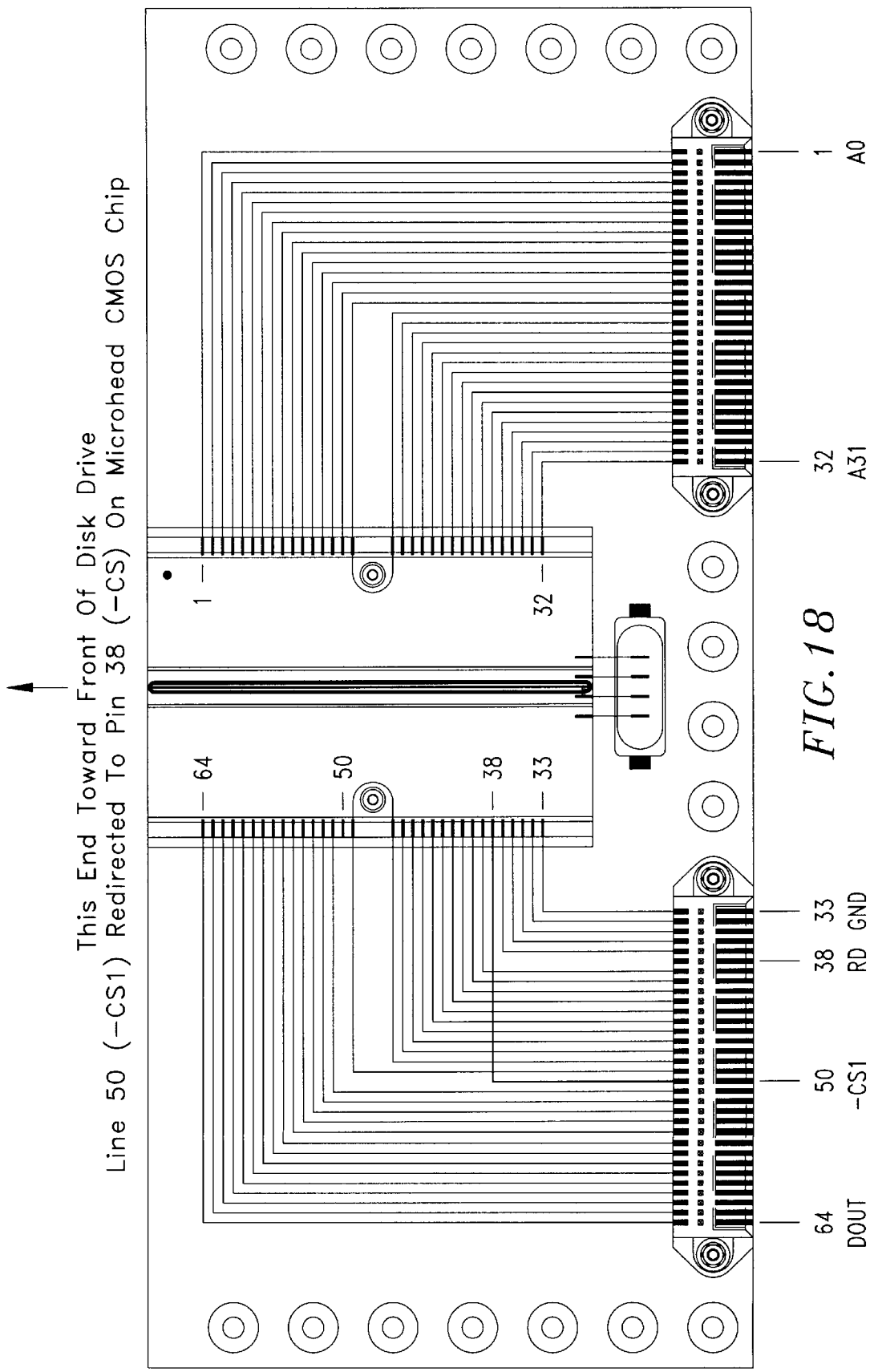
FIG. 18 is a plan-view drawing of a chip-positioning circuit board that displays a (RD) "Redirection" of the (-CS) '"Chip Select" line for Magneto-Optical Microhead Array Chip Number-2, which is positioned for disk-platter one's top-side; also called disk-platter one's data-surface side-two.
Figure 19:
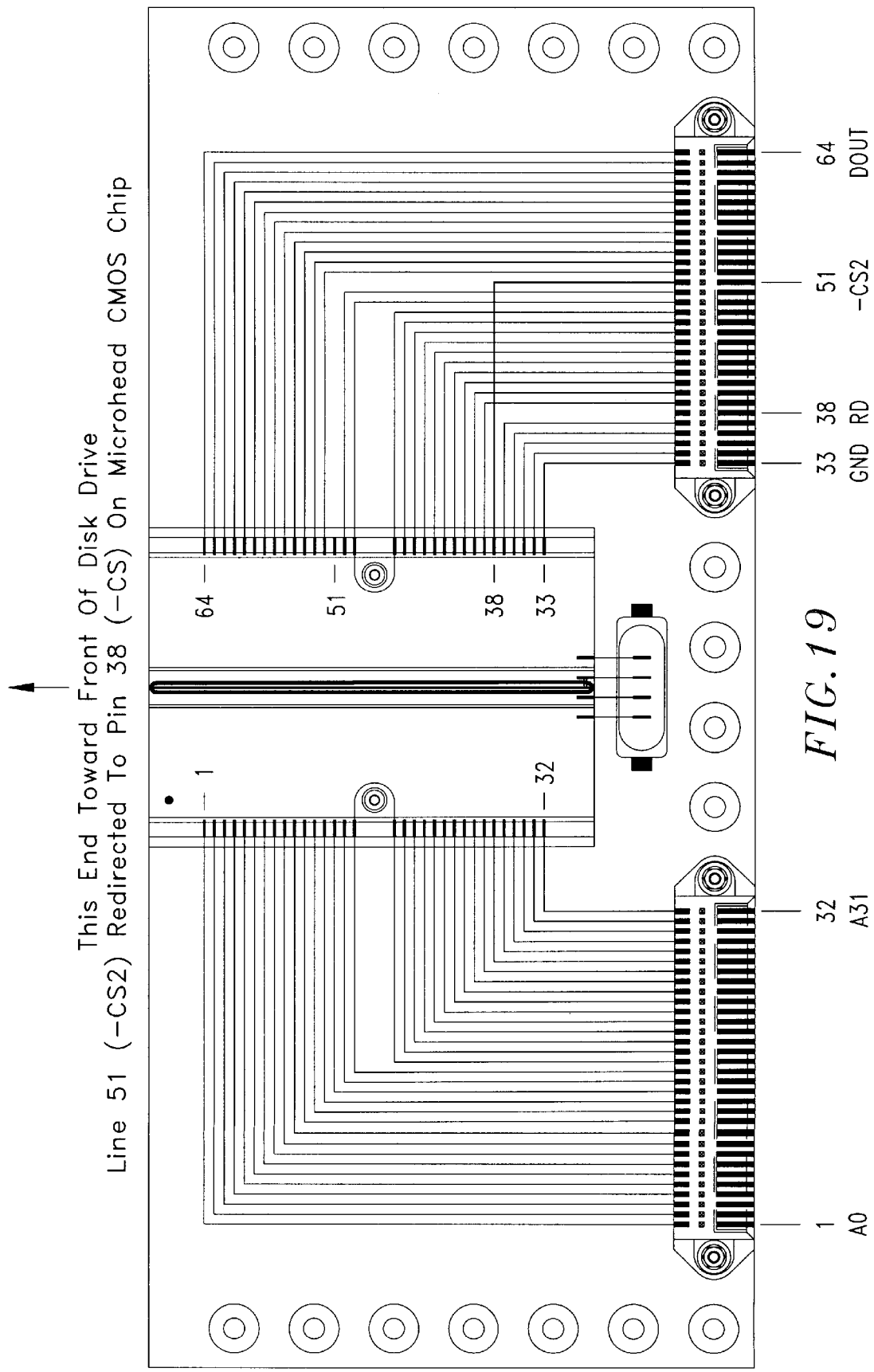
FIG. 19 is a plan-view drawing of a chip-positioning circuit board that displays a (RD) "Redirection" of the (-CS) "Chip Select" line for Magneto-Optical Microhead Array Chip Number-3, which is positioned for disk-platter two's bottom-side; also called disk-platter two's data-surface side-one.
Figure 20:
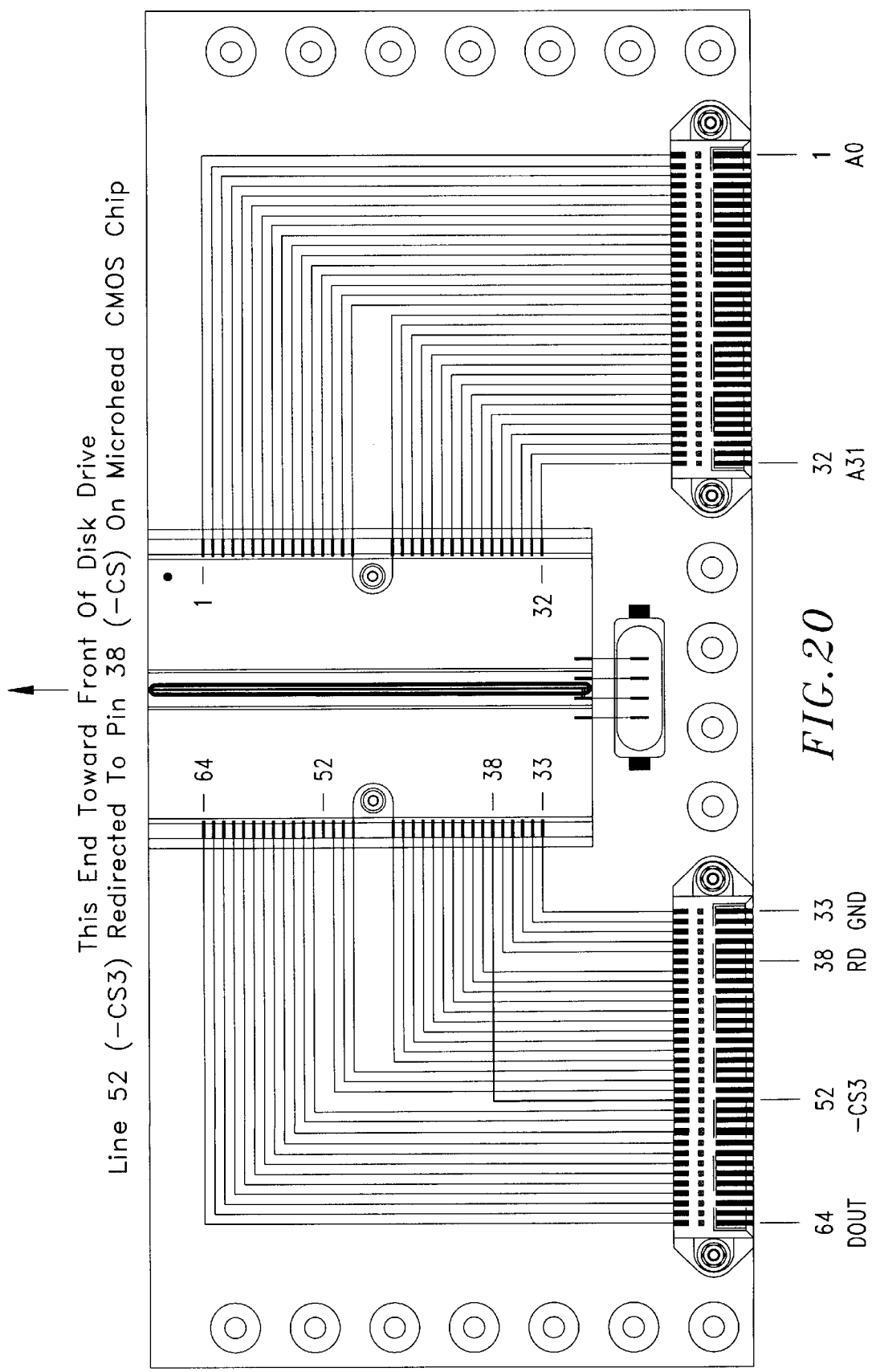
FIG. 20 is a plan-view drawing of a chip-positioning circuit board that displays a (RD) "Redirection" of the (-CS) "Chip Select" line for Magneto-Optical Microhead Array Chip Number-4, which is positioned for disk-platter two's top-side; also called disk-platter two's data-surface side-two.
Figure 21:
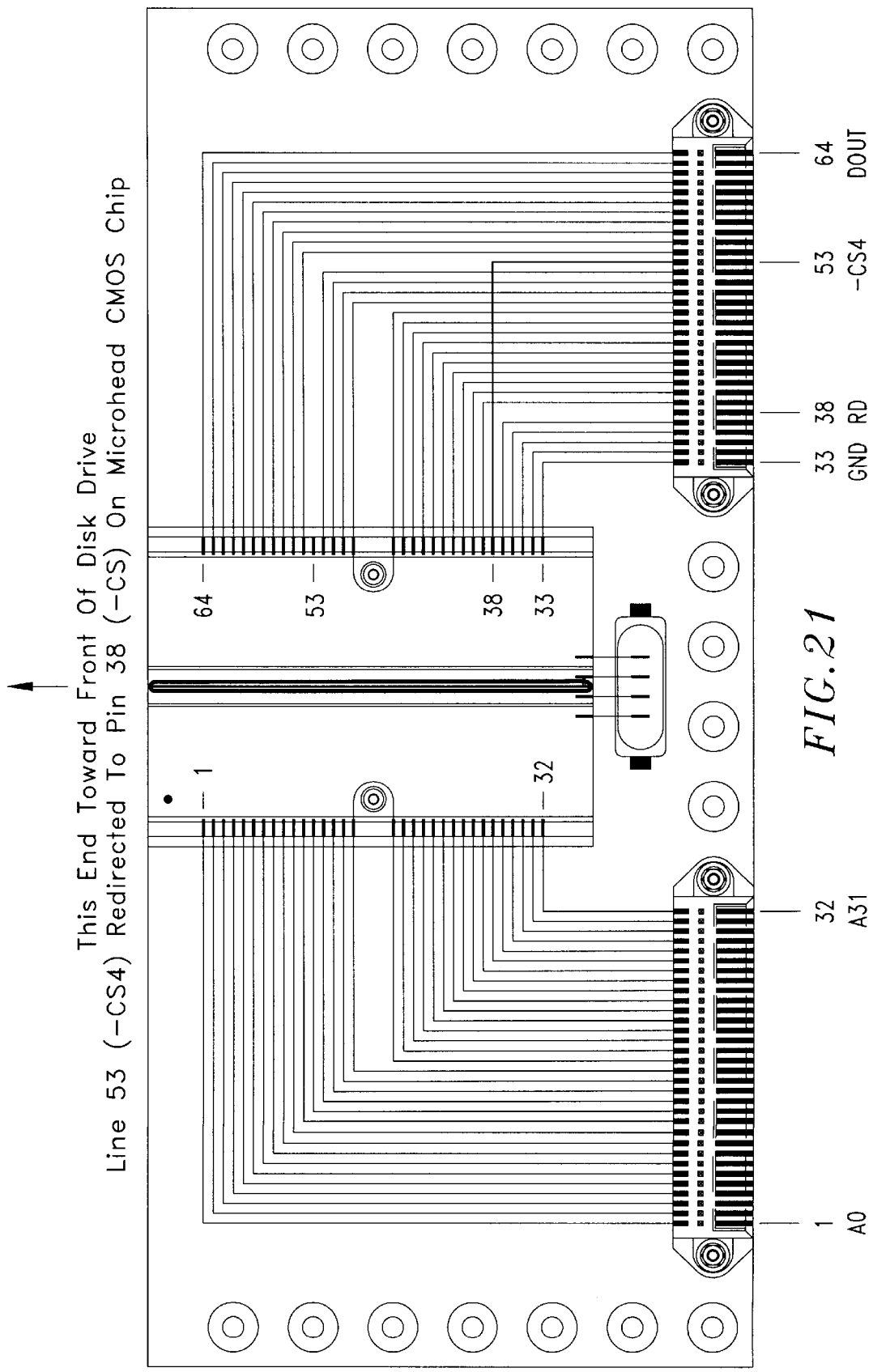
FIG. 21 is a plan-view drawing of a chip-positioning circuit board that displays a (RD) "Redirection" of the (-CS) "Chip Select" line for Magneto-Optical Microhead Array Chip Number-5, which is positioned for disk-platter three's bottom-side; also called disk-platter three's data-surface side-one.
Figure 22:
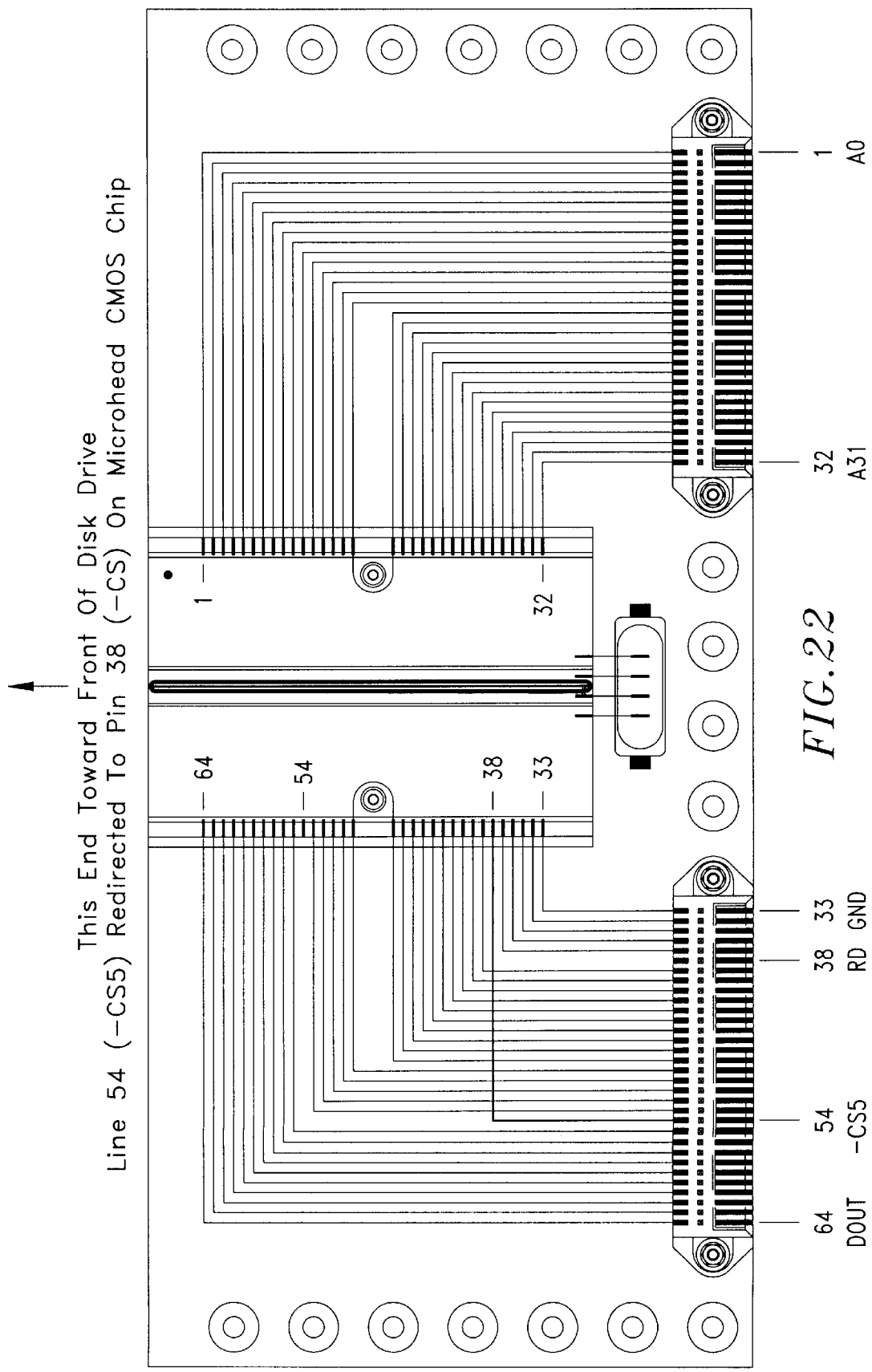
FIG. 22 is a plan-view drawing of a chip-positioning circuit board that displays a (RD) "Redirection" of the (-CS) "Chip Select" line for Magneto-Optical Microhead Array Chip Number-6, which is positioned for disk-platter three's top-side; also called disk-platter three's data-surface side-two.
Figure 23:
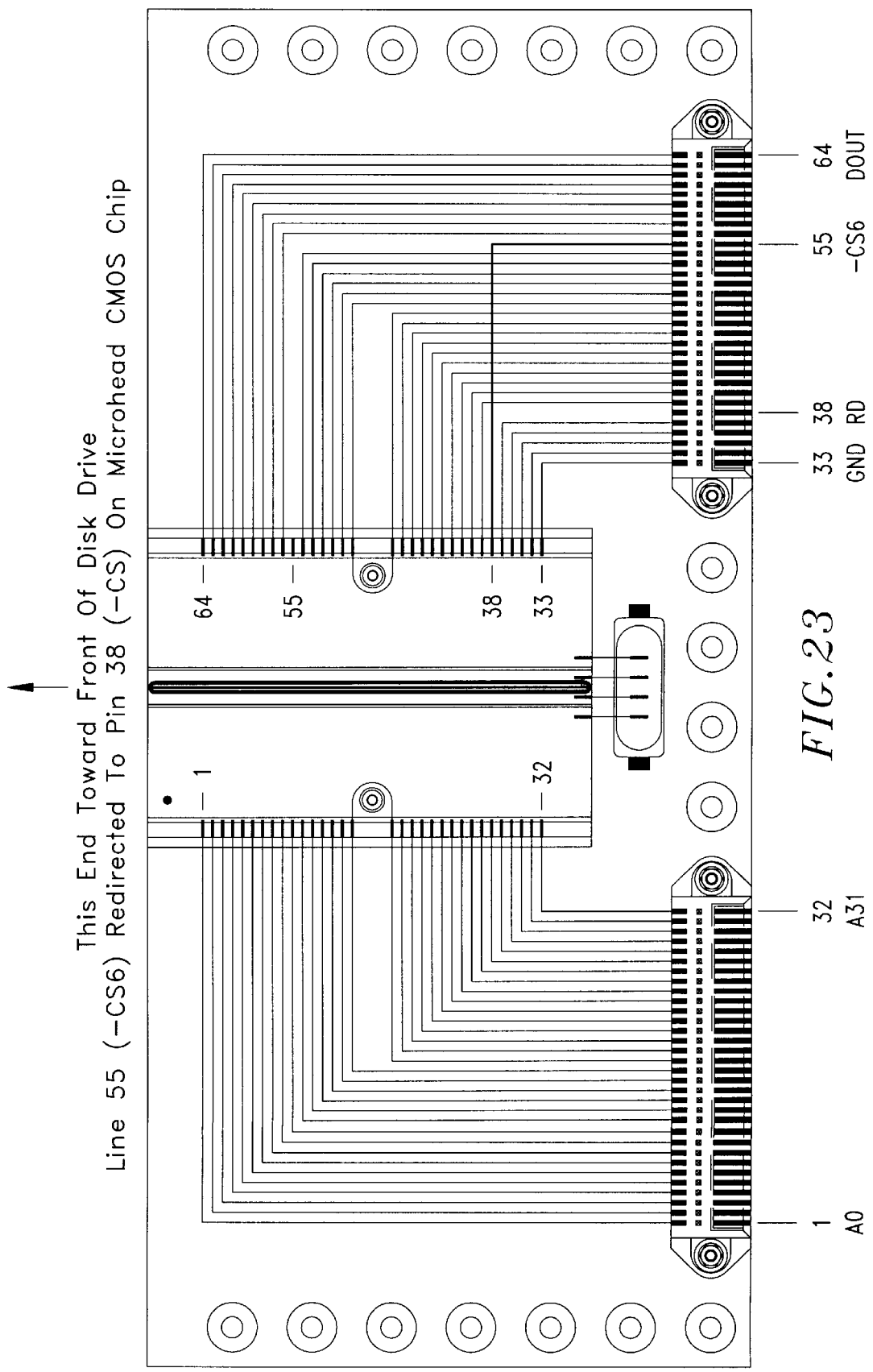
FIG. 23 is a plan-view drawing of a chip-positioning circuit board that displays a (RD) "Redirection" of the (-CS) "Chip Select" line for Magneto-Optical Microhead Array Chip Number-7, which is positioned for disk-platter four's bottom-side; also called disk-platter four's data-surface side-one.
Figure 24:
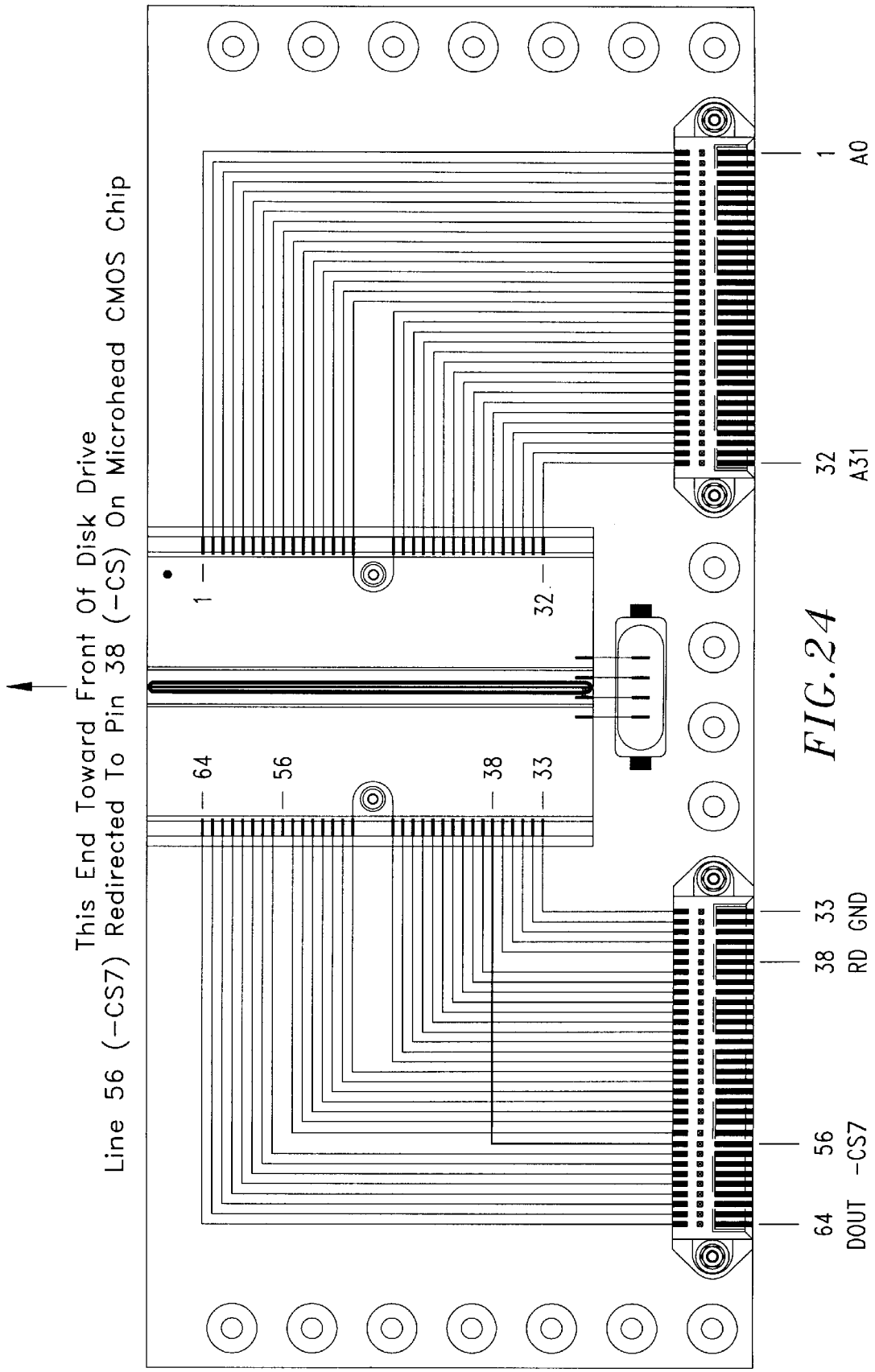
FIG. 24 is a plan-view drawing of a chip-positioning circuit board that displays a (RD) "Redirection" of the (-CS) "Chip Select" line for Magneto-Optical Microhead Array Chip Number-8, which is positioned for disk-platter four's top-side; also called disk-platter four's data-surface side-two.

In addition, as presented within this art are eight examples of redirected (-CS) "Chip Select" Chip-Selection chip-positioning circuit board cross-connects, which are used within this presented hard disk drive Magneto-Optical Microhead Array Chip's design. Furthermore, FIG. 17 illustrates the (-CS) "Chip Select" Polymer flex-cable input bus-line "49", or (-CS0) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 18 illustrates the (-CS) "Chip Select" Polymer flex-cable input bus-line "50", or (-CS1) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 19 illustrates the (-CS) "Chip Select" Polymer flex-cable input bus-line "51", or (-CS2) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 20 illustrates the (-CS) "Chip Select" Polymer flex-cable input bus-line "52", or (-CS3) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 21 illustrates the (-CS) "Chip Select" Polymer flex-cable input bus-line "53", or (-CS4) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 22 illustrates the (-CS) "Chip Select" Polymer flex-cable input bus-line "54", or (-CS5) as redirected to the surface mounted chip-socket's contact-input pin-number "38", or (-CS) "Chip Select" contact-input (FIGS. 11 and 12), which is present in all Magneto-Optical Microhead Array Chips. In addition, FIG. 23 illustrates the (-CS) "Chip Select" Polymer flex-cable input bus-line "55", or (-CS6) as redirected to the surface mounted chip-socket's contact-input pin-number "38", or (-CS) Chip Select contact-input (FIGS. 11 and 12), which is present in all Magneto-Optical Microhead Array Chips. In addition, FIG. 24 illustrates the (-CS) Chip Select Polymer flex-cable input bus-line "56", or (-CS7) as redirected to the surface mounted chip-socket's contact-input pin-number "38", or (-CS) "Chip Select" contact-input (FIGS. 11 and 12), which is present in all Magneto-Optical Microhead Array Chips.

Furthermore, since there is one unique (i.e., un-bused or point-to-point) (-CS) "Chip Select" bus-line available to each of the installed "8" Magneto-Optical Microhead Array Chips through cross-connect circuitry, each of the installed "8" Magneto-Optical Microhead Array Chips can now be individually selected and controlled during the course of any read-data or write-data disk-operation. Moreover, the connectivity of the Magneto-Optical Microhead Array Chip "Chip-Selection" process is illustrated in FIGS. 60A, 61A, 60B, 61B, 60C, and 61C.

Another preferred embodiment of the present invention, as illustrated in drawing FIGS. 4 and 5, shows a Magneto-Optical Microhead Array Chip's read-channel and its output signal's pathway. Moreover, to start with, the previously mentioned Magneto-Optical Microhead Array Chip's read-channel and its output signal's pathway begins, moreover at a Magneto-Optical Microhead Array Chip's two reversed-biased (SPC) "Semiconductor Photo-Conductor" linear position-sensing (CdS) "Cadmium Sulfide" semiconductor photoconductor-array read-elements 103, 104, 107, 108 (FIGS. 41, 42, 43, 44, 45, 46, 47, 48, 49, 50, 51, and 52), or as a different preferred embodiment, the two reversed-biased (SPD) "Semiconductor Photo-Diode" (Si) "Silicon" semiconductor photocell-array read-elements, as illustrated in FIGS. 64A, 64B, 64C, 64D, and 64E. Furthermore, as "magnetic-optical flux transitions", previously recorded on a Magneto-Optical Microhead Array Chip Hard Disk Drive disk-platter's data-surface, pass under a selected VCSEL microhead's low intensity "Read Laser", the two reversed-biased (SPD) "Semiconductor Photo-Diode" (Si) "Silicon" semiconductor photocell-array read-elements mentioned before will generate output-voltages from reflected light they receive as the previously mentioned disk-platters rotate under a pre-selected VCSEL microhead. Furthermore, the read-channel output signals created will pass from the two reversed-biased (SPD) "Semiconductor Photo-Diode" (Si) "Silicon" semiconductor photocell-array read-elements previously mentioned to the two reversed-biased (SPD) "Semiconductor PhotoDiode" (Si) "Silicon" semiconductor photocell-array read-element's of a Magneto-Optical Microhead Array Chip read-channel's (SPDAS1) "Semiconductor Photo-Diode Analog-signal 1" and (SPDAS2) "Semiconductor Photo-Diode Analog-signal 2" inputs for pre-amplification and signal encoding, as illustrated in FIGS. 64A, 64C, 79, 80, 81, 82, 83, 84, 85, and 85. Wherein, the pre-amplification of a selected VCSEL microhead's read-signal output will occur during a Magneto-Optical Microhead Array Chip Hard Disk Drive's read-data disk-operation. In-conclusion, the following paragraphs contain a detailed description of a Magneto-Optical Microhead Array Chip's entire read-data disk-operation as its occurs during a read-channel's reading of data-sectors, which is thoroughly defined from its beginning (i.e., the host-systems request for data stored on a particular disk-plater) to its end (i.e., the host-systems reception of the requested data).

Moreover, a read-data disk-operation actually begins when a Magneto-Optical Microhead Array Chip Hard Disk Drive's Disk Controller has received a read-data request from a host computer system; moreover, a request to read-data from a particular disk-platter's cylinder/track location, which contains a disk-sector or disk-sectors identified as containing the host-requested data. For example, a host-system sends a read-data request to a Magneto-Optical Microhead Array Chip Hard Disk Drive's Disk Controller, through a computer system's IDE or SCSI interface, where it is received by a Disk Controller's "Optical Microhead And Disk Controller With IDE or SCSI Interface module. Moreover, the request might look like this: Request data-read using disk id: 0, at head number: "5", at cylinder/track number: "4562", at sector number: "43".

Next, a "Asynchronous Optical Microhead Address Controller" module 63 (FIGS. 60A and 60C), 80 (FIGS. 61A and 61C), 63 (FIGS. 62A and 62B), 80 (FIGS. 63A and 63C) would receive this request from a Disk Controller and place it into its "Disk Controller Interface Register", where it would be held until a different address is requested by the host-system, or the read-data disk-operation has been completed. Furthermore, an Asynchronous Optical Microhead Address Controller's "Address Translator" reads then translates the information contained within a "Disk Controller Interface Register" into terms that the Asynchronous Optical Microhead Address Controller can use to activate the required Magneto-Optical Microhead Array Chip's "Address Latch And Chip-Select Circuit" bus-system signal lines.

Moreover, to execute control over a particular Magneto-Optical Microhead Array Chip an Asynchronous Optical Microhead Address Controller's "Address Translator" (FIGS. 62A, 63A, 62C, and 63C) would first tell the Asynchronous Optical Microhead Address Controller's "Address Unit" that Magneto-Optical Microhead Array Chip Number "5", being equivalent to a conventional flying head numbered as "5". Wherein, an Asynchronous Optical Microhead Address Controller's response would be to enable the point-to-point (-CS4) "Chip Select" line-number "4" (i.e., the chip select lines available in the present design are CS0, CS1, CS2, CS3, CS4, CS5, CS6, and CS7) with a logic-low control-signal, as illustrated in FIGS. 60A, 61A, 60B, 61B, 60C, and 61C. Moreover, this would begin the process that executes the selection of a single Magneto-Optical Microhead Array Chip, which is chosen because of its stationary location above the host-requested data-sectors present on disk-surface number "5".

In addition, a (-CS) "Chip Select" logic-low control-signal will make the Magneto-Optical Microhead Array Chip number "5" the only Magneto-Optical Microhead Array Chip connected to a Magneto-Optical Microhead Array Chip Hard Disk Drive's microhead addressing bus-system able to latch into its "Address Latch And Chip Select Circuit" (FIGS. 64A, 64B, and 64E) a single VCSEL microhead's 32-bit address number, which is sent down a Magneto-Optical Microhead Array Chip Hard Disk Drive's thirty-two microhead addressing bus-system's thirty-two address lines to every Magneto-Optical Microhead Array Chip connected to the microhead addressing bus-system, as illustrated in FIGS. 62A, 63A, 62B, 63B, 62C, and 63C.

However, at the same time as the 32-bit microhead addressing system-bus sends the (cylinder/track) address number "4562" down its 32-bit microhead addressing bus-system's thirty-two lines, which are connected, in parallel, to all Magneto-Optical Microhead Array Chips installed into a Magneto-Optical Microhead Array Chip Hard Disk Drive's unit-assembly, will a chip-control bus-system's logic-low control-signal, called the (-AS) "Address Strobe", be sent down the chip-control bus-system's (-AS) "Address Strobe" signal-line, to input-contact pin-number "37" (FIGS. 11 and 12) of every Magneto-Optical Microhead Array Chip. Moreover, only when a simultaneous and combined transmission of logic-low control-signals are sent down both the (-CS4) "Chip Select 4" selection line-number "5" to input-contact pin-number "38", and the (-AS) "Address Strobe" to input-contact pin-number "37" (FIGS. 65, 66, 67, and 68), will Magneto-Optical Microhead Array Chip number "5" be selected during the previously mentioned example of a host-requested read-data disk-operation. Conclusion, only Magneto-Optical Microhead Array Chip number "5" is selected to latch (FIGS. 70A and 70B) into its tri-stated "Address Latch And Chip Select Circuit" (FIGS. 69, 70A, and 70B) the previously mentioned (cylinder/track) address number "4562". In addition, the aforementioned 32-bit address number "4562" will stay latched into a Magneto-Optical Microhead Array Chip's tri-stated "Address Latch And Chip Select Circuit" as long as the previously mentioned (-CS4) and (-AS) bus-lines continue to have logic-low control-signals present on their bus-system lines.

In addition, a Magneto-Optical Microhead Array Chip's microhead addressing bus-system connection consists of a 32-bit bus-system input of thirty-two contact-pins numbered, moreover as "A0" to "A31", as illustrated in FIGS. 11, 12, 13, and 14. Furthermore, after the address number "4562" has been successfully latched into an "Address Latch And Chip Select Circuit" will the (-ADACK) "Address Acknowledge" circuit send a logic-low control-signal down its chip-control bus-system control line. Moreover, the beforementioned (-ADACK) control-signal is generated from the simultaneous enabling of a selected Magneto-Optical Microhead Array Chip's (-CS4) and (-AS) control circuits, as illustrated in FIGS. 65, 66, 67, and 68. Moreover, the previously mentioned (CS4) and (-AS) control circuits (FIGS. 65, 66, 67, and 68) are located within a selected Magneto-Optical Microhead Array Chip's "Address Latch And Chip Select Circuit", as illustrated in FIGS. 69, 70A, and 70B. In addition, the (-ADACK) control-signal is sent from a selected Magneto-Optical Microhead Array Chip's output-contact (FIGS. 11, 12, 13, and 14) pin-number "40" down the bus-system's cable to an "Asynchronous Optical Microhead Address Controller" module's 63 (FIGS. 60A and 60C), 80 (FIGS. 61A and 61C), 63 (FIGS. 62A and 62B), 80 (FIGS. 63A and 63C) "Address Acknowledge" input contact location (FIGS. 60A, 61A, 60C, and 61C), which is physically located on a Magneto-Optical Microhead Array Chip Hard Disk Drive's PCB 63 (FIG. 4), 80 (FIG. 5).

Furthermore, the logic-low chip-control bus-system signal received at an Asynchronous Optical Microhead Address Controller's (-ADACK) "Address Acknowledge" input-contact (FIGS. 60A, 61A, 60C, and 61C) tells an "Asynchronous Optical Microhead Address Controller" that the address-number "4562" has been successfully latched into a selected Magneto-Optical Microhead Array Chip's "Address Latch And Chip Select Circuit" (FIGS. 69, 70A, and 70B), which is located in selected Magneto-Optical Microhead Array Chip number "5". In addition, the successfully latched 32-bit microhead selecting address signal is next sent from the previously mentioned 32-bit "Address Latch And Chip Select Circuit" to a selected Magneto-Optical Microhead Array Chip's 32-bit "Address Decoder Circuit", as illustrated in FIGS. 64A, 64B, 71, 72. Subsequently, when a selected Magneto-Optical Microhead Array Chip's "Address Decoder Circuit" receives a 32-bit microhead selecting address signal it will decode it internally by using its "address tree decoder" circuit, as illustrated in FIGS. 64A, 64B, 72, and 73. In addition, the process of decoding a latched 32-bit microhead selecting address signal by the beforementioned "address tree decoder" circuit (FIGS. 71 and 72) results in the enabling of one VCSEL microhead selecting selection-line with a logic-high control-signal, where the previously mentioned VCSEL microhead selection-line has the requested microhead's address number "4562".

In addition, due to what is called the "inverter body effect", which is normally associated with, and caused by, semiconductor circuits that contain a large number of switching inverters. For example, like the large number of inverters that are present in an "address tree decoder" circuit. Moreover, this is due to the shear number of inverter gates a logic-high control-signal must travel through, which ultimately causes the previously mentioned logic-high control-signal to undergo signal loss. Consequently, an address tree decoder's singularly enabled VCSEL microhead selection-line will need its logic-high control-signal regenerated by a selected Magneto-Optical Microhead Array Chip's "Address Buffer Circuit" (FIGS. 73 and 74), or signal-loss is bound to occur on the microhead selection line possibly causing a VCSEL microhead selection error to occur. Furthermore, when a Magneto-Optical Microhead Array Chip's "Address Decoder Circuit" sends a logic-high activation signal down a host-requested VCSEL microhead's selection-line to a Magneto-Optical Microhead Array Chip's "Address Buffer Circuit" (FIGS. 64A, 64B, 73, and 74) two very important and simultaneous processes will occur:

i. A regeneration of an address tree decoder's logic-high microhead selection signal by a Magneto-Optical Microhead Array Chip's "Address Buffer Circuit", as illustrated in FIGS. 64A, 64B, and 74.

ii. A pulling-down of an address tree decoder's unsolicited VCSEL microhead selection-lines into a ground state through the Long-L inverters within a Magneto-Optical Microhead Array Chip's "Address Buffer Circuit", as illustrated in FIGS. 64A, 64B, and 74.

Consequently, the pulling-down of the unsolicited VCSEL microhead selection-lines into a ground state will also put those same microhead selection lines into what is called a (Hi-Z) "High Impedance Line State". Furthermore, during a host-requested read-data disk-operation a selected Magneto-Optical Microhead Array Chip's "Alpha" and "Beta" (BIMPIC) "Bi-Metal Planar Induction Coils" (FIGS. 77 and 78) are simultaneously switch-toggled off by a logic-low control-signal called the (WE) "Write Disable" control-signal. Moreover, (WE) "Write Disable" logic-low control-signals coming from a Magneto-Optical Microhead Array Chip's "R/W Control Circuit" will enter a (WE) "Write Enable" input for four write-channel I/O data circuits, including the (PICCC) "Planar Induction Coil Control Circuit", disabling a selected Magneto-Optical Microhead Array Chip's write-channel during the read-data disk-operation.

Simultaneously, (RE) "Read Enable" logic-high control signals, which come from a Magneto-Optical Microhead Array Chip's "R/W Control Circuit" will enter the (RE) "Read Enable" inputs for four read-channel I/O data circuits, enabling a Magneto-Optical Microhead Array Chip's read-channel during a read-data disk-operation. Therefore, a selected Magneto-Optical Microhead Array Chip's "Alpha" and "Beta" (BIMPIC) "Bi-Metal Planar Induction Coils" (FIGS. 77 and 78) are simultaneously "Switch-Toggled" off during a read-data disk-operation. Furthermore, the toggling off of a selected Magneto-Optical Microhead Array Chip's two (BIMPIC) "Bi-Metal Planar Induction Coils" (FIGS. 77 and 78), during a read-data disk-operation, is done because the two (BIMPIC) "Bi-Metal Planar Induction Coils" (FIGS. 77 and 78) are only used for writing data to a disk-platter's data-surface during a write-data disk-operation.

Furthermore, every VCSEL microhead's selection-line within a selected Magneto-Optical Microhead Array Chip has its beginning in a Magneto-Optical Microhead Array Chip's "Address Decoder Circuit", while its ending is in its respective VCSEL microhead. Wherein, each microhead selection-line is terminated at a transmission-gate control-circuit, which is attached to its termination circuit-end, as illustrated in FIGS. 64A, 64B, 64E, 107, and 111. Moreover, the microhead selection-line transmission-gates (FIGS. 107 and 111) independently control a VCSEL microhead's access to a host-selected Magneto-Optical Microhead Array chip's power-bus system line, as illustrated in FIGS. 107 and 111. In addition, (RLV) "Read Laser Voltage", and (WLV) "Write Laser Voltage" power signals, which are inputted at a selected Magneto-Optical Microhead Array Chip's (FIGS. 107 and 111) (LVIN) "Laser Voltage In" input contact (FIGS. 64A and 64E), or more specifically, the switching between a Magneto-Optical Microhead Array Chip's (RLV) "Read Laser Voltage" and a Magneto-Optical Microhead Array Chip's (WLV) "Write Laser Voltage" power-signals, occur within a selected Magneto-Optical Microhead Array Chip's (VCSEL Microhead PCC) "Vertical Cavity Surface Emitting Laser Power Control Circuit" (FIGS. 64A, 64D, 109, and 110), while the switching itself is controlled by a selected Magneto-Optical Microhead Array Chip's "R/W Control Circuit", as illustrated in FIGS. 87, 88, 89, and 90.

In addition, the actual switching on and off of electrical power and electrical current to a selected Magneto-Optical Microhead Array Chip's (RLV) "Read Laser Voltage" and (WLV) "Write Laser Voltage" power-bus input lines is executed by a Data Sequencer's "Data Bus Controller", as illustrated in FIGS. 62A, 63A, 62B, 63B, 62C, and 63C. Furthermore, for a host-requested read-data disk-operation to occur a Magneto-Optical Microhead Array Chip's "R/W Control Circuit" (FIGS. 87, 88, 89, and 90) must first enable a selected Magneto-Optical Microhead Array Chip's read-channel with a (RE) "Read Enable" logic-high control-signal.

Furthermore, in order for Magneto-Optical Microhead Array Chip Hard Disk Drives to commence data disk-operations as quickly as possible a Magneto-Optical Microhead Array Chip's R/W Control Circuit's default setting, after a "Power-On-Restart" or "Power-On-Initialization" has been executed, is to have a selected Magneto-Optical Microhead Array Chip's read-channel become enabled. Moreover, the purpose of enabling a Magneto-Optical Microhead Array Chip's read-channel, after a "Power-On-Restart" or "Power-On-lnitialization", is so (OP Code) "Operational Code" can be read from track-0 of a disk-platter's data-surface into a Disk Controller's (SDRAM) "Synchronous Dynamic Random Access Memory" buffer area, which is put aside for the execution of a Magneto-Optical Microhead Array Chip Hard Disk Drive's disk operating (OP Code) system instruction set.

Furthermore, the control-bus circuits that enables or disables a read-channel of a selected Magneto-Optical Microhead Array Chip consists of three control logic circuits:

(i) A Magneto-Optical Microhead Array Chip's (R/-W) "Read or Write enable" control-bus signal-line, which is connected at input-contact pin-number "35".

(ii) A Magneto-Optical Microhead Array Chip's (+5) "VDD" control-bus signal-line, which is connected at input-contact, pin-number "34".

(iii) A Magneto-Optical Microhead Array Chip's (-CS) "Chip Select" point-to-point control-bus signal-line, which is connected at input-contact pin-number "38".

Moreover, the previously mentioned three control logic circuits are located in every Magneto-Optical Microhead Array Chip (FIGS. 64A, 64C, 87, 88, 89, and 90) that is installed into a Magneto-Optical Microhead Array Chip Hard Disk Drive's unit-assembly. Furthermore, to enable a read-channel within a selected Magneto-Optical Microhead Array Chip three simultaneous logic conditions must occur within a selected Magneto-Optical Microhead Array Chip's "R/W Control Circuit":

(i) A logic-high control-signal must be at a particular Magneto-Optical Microhead Array Chip's input-contact pin-number "34" (+5V) "VDD".

(ii) A logic-low control-signal must be at a particular Magneto-Optical Microhead Array Chip's input-contact pin-number "38" (-CS) "Chip Select".

(iii) A logic-high control-signal must be at a particular Magneto-Optical Microhead Array Chip's input-contact pin-number "35" (R/-W) or "Read or Write enable".

Moreover, the previously mentioned three control bus-system's signal lines must simultaneously have three logic signal-conditions present across their signal-lines in order for a host-requested Magneto-Optical Microhead Array Chip's read-channel to become enabled during a read-data disk-operation. For example, to select Magneto-Optical-Microhead Array Chip number "5", a physical re-direction of an Asynchronous Optical Microhead Address Controller's point-to-point (-CS4) "Chip Select" line-number "4" must occur. Moreover, the beforementioned physical re-direction of an Asynchronous Optical Microhead Address Controller's point-to-point (-CS4) "Chip Select" line-number "4" occurs at a chip-positioning circuit board's copper-race circuit-runs (FIG. 21) for a (CS4) "Chip Select" line-number "4", which must be cross-connected from the input-contact pin-number "53" of a chip-positioning circuit board's Polymer flex-cable spring-contact connector 67 (FIGS. 2, 3, and 10) to a (-CS) "Chip Select" and null input-contact pin-number "38" of a host selected Magneto-Optical Microhead Array Chip's surface mounted chip-socket 5 (FIGS. 7, 8, and 21). Furthermore, every installed Magneto-Optical Microhead Array Chip is connected to a Magneto-Optical Microhead Array Chip Hard Disk Drive's "Address Bus" system, "Data I/O Bus" system, and "Chip Control Bus" system. Thereafter, the selected Magneto-Optical Microhead Array Chip, numbered as chip "5", would become the only Magneto-Optical Microhead Array Chip connected to a Magneto-Optical Microhead Array Chip Hard Disk Drive's bus-system to have its read-channel activated, while all the other Magneto-Optical Microhead Array Chips connected to a Magneto-Optical Microhead Array Chip Hard Disk Drive's bus-system would have their read-channels placed into a three-stated or what is sometimes called a (Hi-Z) "High Impedance Line State".

Furthermore, a host selected Magneto-Optical Microhead Array Chip has its read-channel I/O enabled with a (RE) "Read Enable" logic-high control-signal, which is sent by a selected Magneto-Optical Microhead Array Chip's "R/W Control Circuit" to various read-channel enabling internal circuits. In addition, a read-channel's three line-drivers (FIGS. 79, 80, 85, and 86) will receive a R/W Control Circuit's (RE) "Read Enable" logic-high control-signal; therein, activating a read-channel's connectivity to a Magneto-Optical Microhead Array Chip Hard Disk Drive's system. Two logic-high control-signals are sent by two of the read-channel's three line-drivers, which will enter the (A) and (B) inputs of a read-channel's double NAND (-RDTACK) "Read Data Acknowledge" control-circuit. Moreover, if the previously mentioned two (A) and (B) inputs of a read-channel's double NAND (-RDTACK) "Read Data Acknowledge" control-circuit (FIGS. 102, 103, 104, and 105) receives two logic-high control-signals then a control-circuit's double NAND, would in response, output a (-RDTACK) "Read Data Acknowledge" logic-low control-signal onto the (-RDTACK) "Read Data Acknowledge" control-bus line, which is connected to all of the Magneto-Optical Microhead Array Chips output-contacts with the pin-number "41", as illustrated in FIGS. 64A, 64C, and 64D.

In addition, a Magneto-Optical Microhead Array Chip's (-RDTACK) "Read Data Acknowledge" logic-low control-signal, while being sent to pin-number "41" will travel through a control-bus Polymer flex-cable's (-RDTACK) "Read Data Acknowledge" control-bus line 30, 36 (FIGS. 1 and 6) until it reaches a (-RDTACK) "Read Data Acknowledge" input-contact, which is located in a Data Sequencer's "Data Bus Controller", as illustrated in FIGS. 62A, 63A, 62C, and 63C. Moreover, after a Data Sequencer's "Data Bus Controller" has received a (-RDTACK) "Read Data Acknowledge" logic-low control-signal; moreover, will a Data Sequencer's "Data Bus Controller" know that a selected Magneto-Optical Microhead Array Chip's read-channel is now open and ready to read host-requested data from disk-platter number five's data-sector "43", which is located on cylinder/track "4562", while using the addressed VCSEL microhead "4562".

Furthermore, a Magneto-Optical Microhead Array Chip's (VCSEL Microhead PCC) "Vertical Cavity Surface Emitting Laser Microhead Power Control Circuit" will also receive a (RE) "Read Enable" logic-high control-signal from a Magneto-Optical Microhead Array Chip's "R/W Control Circuit", which in turn will cause a Vertical Cavity Surface Emitting Laser Microhead Power Control Circuit transmission-gate's switch-toggled selection (FIGS. 109 and 110) of a Magneto-Optical Microhead Array Chip's (RLV) "Read Laser Voltage" power-line over a Magneto-Optical Microhead Array Chip's (WLV) "Write Laser Voltage" power-line, which is sent to a Magneto-Optical Microhead Array Chip's (LVOUT) "Laser Voltage Output" circuit terminal (FIGS. 109 and 110), and ultimately leads to a Magneto-Optical Microhead Array Chip's (LVIN) "Laser Voltage Input" circuit terminal (FIGS. 107 and 111), and although a (RLV) "Read Laser Voltage" power-line has been selected for a host-requested read-data disk-operation, no electrical-current is sent down to a Magneto-Optical Microhead Array Chip's address selected VCSEL microhead, until a host-requested data-sector is rotated under an address selected VCSEL microhead. Whereby, at the very instant the host-requested data-sector lines-up underneath an address selected VCSEL microhead, will a low-power output of electrical current be sent down a Magneto-Optical Microhead Array Chip's (RLV) "Read Laser Voltage" power-line; therein, turning on an address selected VCSEL microhead's data cell reading laser emissions.

Furthermore, a Magneto-Optical Microhead Array Chip Hard Disk Drive's "Hall-Sensors" (i.e., not shown here) will provide a rotated position and location for any disk-platter's data-sector, at all times, through a constantly changing rotational placement of permanent-magnetic rotary-elements located within a rotor-housing. Moreover, the previously mentioned rotational placement is relative to the fixed windings and poles of a "Spindle-Motor" 59 (FIGS. 2 and 3). Typically, the previously mentioned "Hall-Sensors" will provide response-control information to a Magneto-Optical Microhead Array Chip Hard Disk Drive's "Spindle And Power Controller" 60 (FIG. 4), 82 (FIG. 5) and Spindle-Motor's driver-circuit. In addition, the beforementioned "Hall-Sensors" (i.e., not shown here) will also provide real-time rate of rotation and positional information about the disk-platters that are installed within a Magneto-Optical Microhead Array Chip Hard Disk Drive's unit-assembly, which is "ID-less Tracking Format" information that is sent to the beforementioned "Spindle And Power Controller" 60 (FIG. 4), 82 (FIG. 5), which in-turn sends a rate of rotation and positional information to a Disk Controller's "Data Sequencer", which in-turn controls the on and off switching of a Magneto-Optical Microhead Array Chip Hard Disk Drive's (RLV) "Read Laser Voltage", and a Magneto-Optical Microhead Array Chip Hard Disk Drive's (WLV) "Write Laser Voltage" power-line electrical currents, during host-requested read-data or write-data disk-operations.

In addition, the source of the laser-light used during a host-requested read-data disk-operation lies within every Magneto-Optical Microhead Array Chip. Moreover, within every microhead array is an "Ahrens Polarizing Analyzer" laser-light polarizer, which is positioned upon the top surface of a group of VCSEL microhead laser emitters 114 (FIG. 108A). Wherein, a multidirectional un-polarized light-beam, which is emitted by a single host-selected VCSEL microhead 135 (FIG. 108A) is instantly changed into linearly polarized laser-light 139 (FIG. 108A) as it enters the "Ahrens Polarizing Analyzer" calcite-crystal's bottom surface 130 (FIG. 108A), which also eliminates the need for a collimating lens because the top surfaces of the VCSEL laser emitters are flush against the bottom-surface of an "Ahrens Polarizing Analyzer" calcite-crystal's bottom 130 (FIG. 108A). Moreover, when the un-polarized, but collimated laser-light 139 (FIG. 108A) reaches the first-diagonal or hypotenuse-surface 131 (FIG. 108A) of the beforementioned analyzer's bottom calcite-crystal 130 (FIG. 108A) it becomes linearly polarized (i.e., changed from a un-polarized laser-light beam into a linearly polarized laser-light beam), and split into two separate laser-light beams 137, 138 (FIG. 108A). Furthermore, because the two calcite-crystal triangles that make up an "Ahrens Polarizing Analyzer" have a horizontal optical-axis 136 (FIG. 108A) the "O-ray" and "E-ray" laser-light output created by the beforementioned "Ahrens Polarizing Analyzer" 137, 138 (FIG. 108A) will have a natural propagation direction that is horizontal.

Furthermore, first of the two linearly polarized laser-light beams consists of "O-rays" 137 (FIG. 108A) (i.e., Ordinary-rays of linearly polarized light that are perpendicular to the plane of illustration FIG. 108A), which are deflected "90" degrees to the right by the bottom calcite-crystal's 130 (FIG. 108A) diagonal hypotenuse 131 (FIG. 108A) and projected out through the calcite crystal's right angle plane 130 (FIG. 108A) as "O-rays" 137 (FIG. 108A) of linearly polarized horizontal traveling light-rays, which are perpendicular to the plane of illustration FIG. 108A. Subsequently, the previously mentioned "O-rays" of linearly polarized horizontal traveling laser-light continue to travel in a "90" degree direction 137 (FIG. 108A) until they strike 140 (FIG. 108A) the beforementioned reversed-biased "SPD Array 2" (FIGS. 64A and 64E) (SPD) "Semiconductor PhotoDiode" reference-voltage photocell-array read element 104, 109 (FIG. 108A); therein, generating a reference-voltage analog-signal, which is immediately pre-amplified by a transimpedence-amplifier (FIGS. 64A and 64F), and sent to the beforementioned read-channel's (SPDAS2) "Semiconductor Photo-Diode Analog-signal 2" signal-input, as a Magneto-Optical Microhead Array Chip's reference-signal, as illustrated in FIGS. 64A, 64C, 79, 80, 81, 82, 83, 84, 85, and 86.

Furthermore, second of the two linearly polarized laser-light beams consists of vertically traveling "E-rays" 138 (FIG. 108A) (i.e., Extraordinary-rays of linearly polarized light that are parallel to the plane of illustration FIG. 108A), which will vertically pass through 139 (FIG. 108A) the previously mentioned Ahrens Polarizing Analyzer's "Half-Mirror" 131 (FIG. 108A) non-reflective surface-side, while its Half-Mirror's reflective surface-side faces toward the top calcite-crystal's 129 (FIG. 108A) diagonal hypotenuse's bottom-surface 131 (FIG. 108A). In addition, a Magneto-Optical Microhead Array Chip's Ahrens Polarizing Analyzer's top-surface will have a single "Quarter-Wave Plate" of calcite-crystal 94, 95 (FIG. 108A), 94 (FIG. 39), 95 (FIG. 40) epitaxially deposited upon its top-surface 94, 95 (FIG. 108A).

Figure 40:
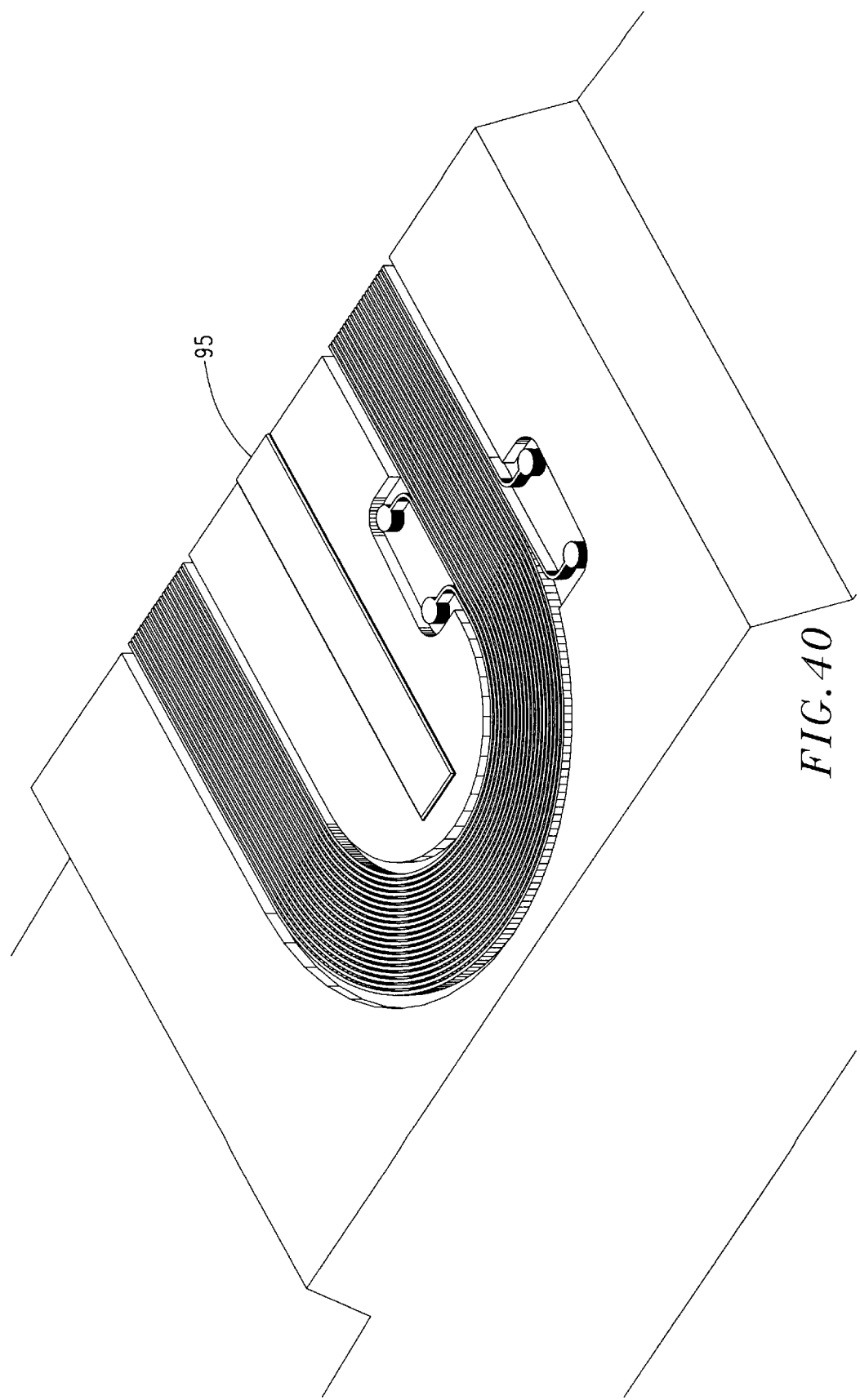
FIG. 40 is a 3D top front-view drawing of a Magneto-Optical Microhead Array Chip's two Bi-Metal Planar Induction Coils and concealed VCSEL microhead array that displays a smaller quarter-wave calcite plate covering the microhead array.
Figure 41:
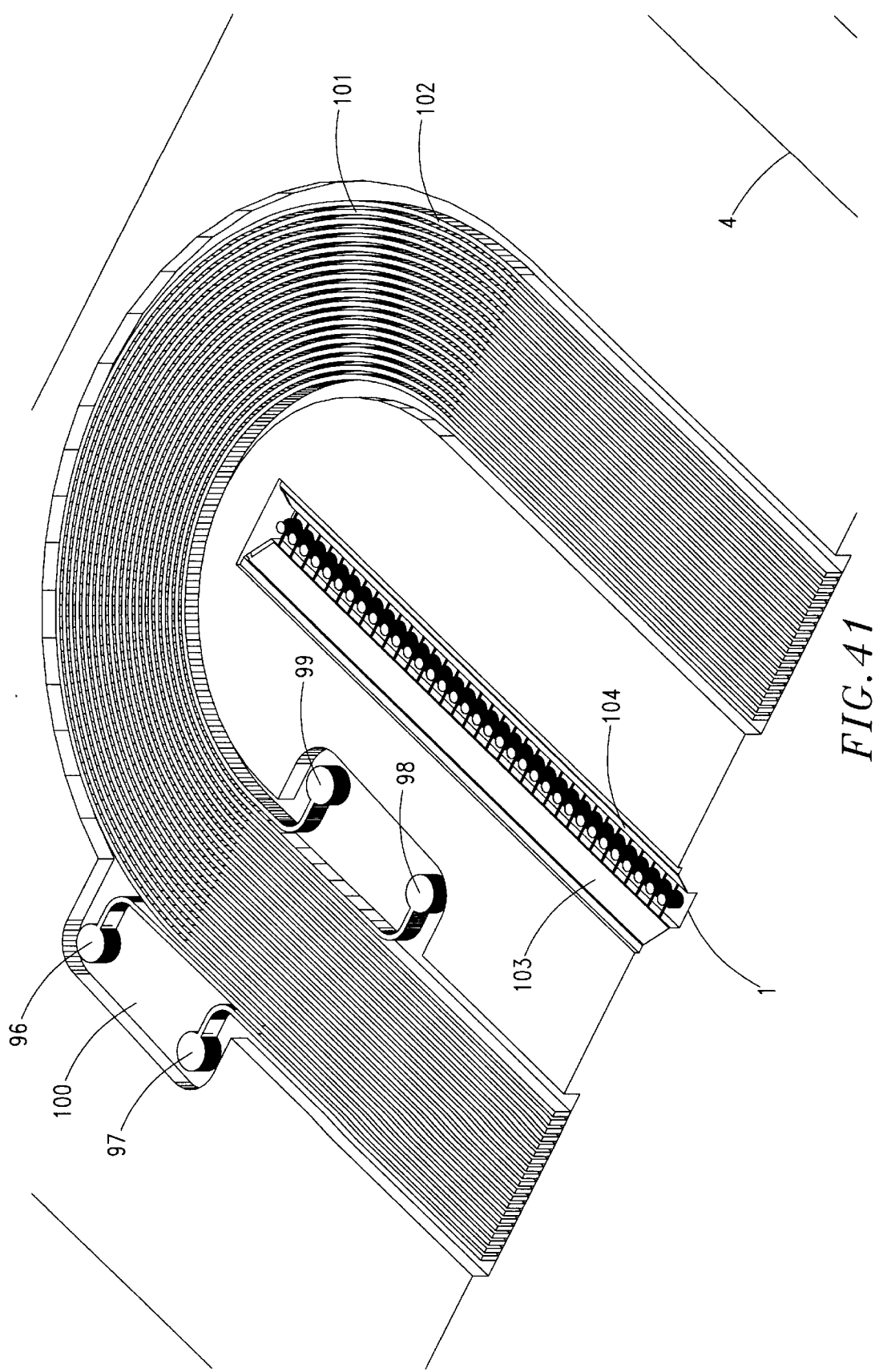
FIG. 41 is a 3D drawing of a top-front right-side view of a Magneto-Optical Microhead Array Chip's two Bi-Metal planar Induction Coils and un-concealed VCSEL microhead array that displays the reference-voltage and signal-voltage read-channel photo-diode array semiconductor substrates.
Figure 42:
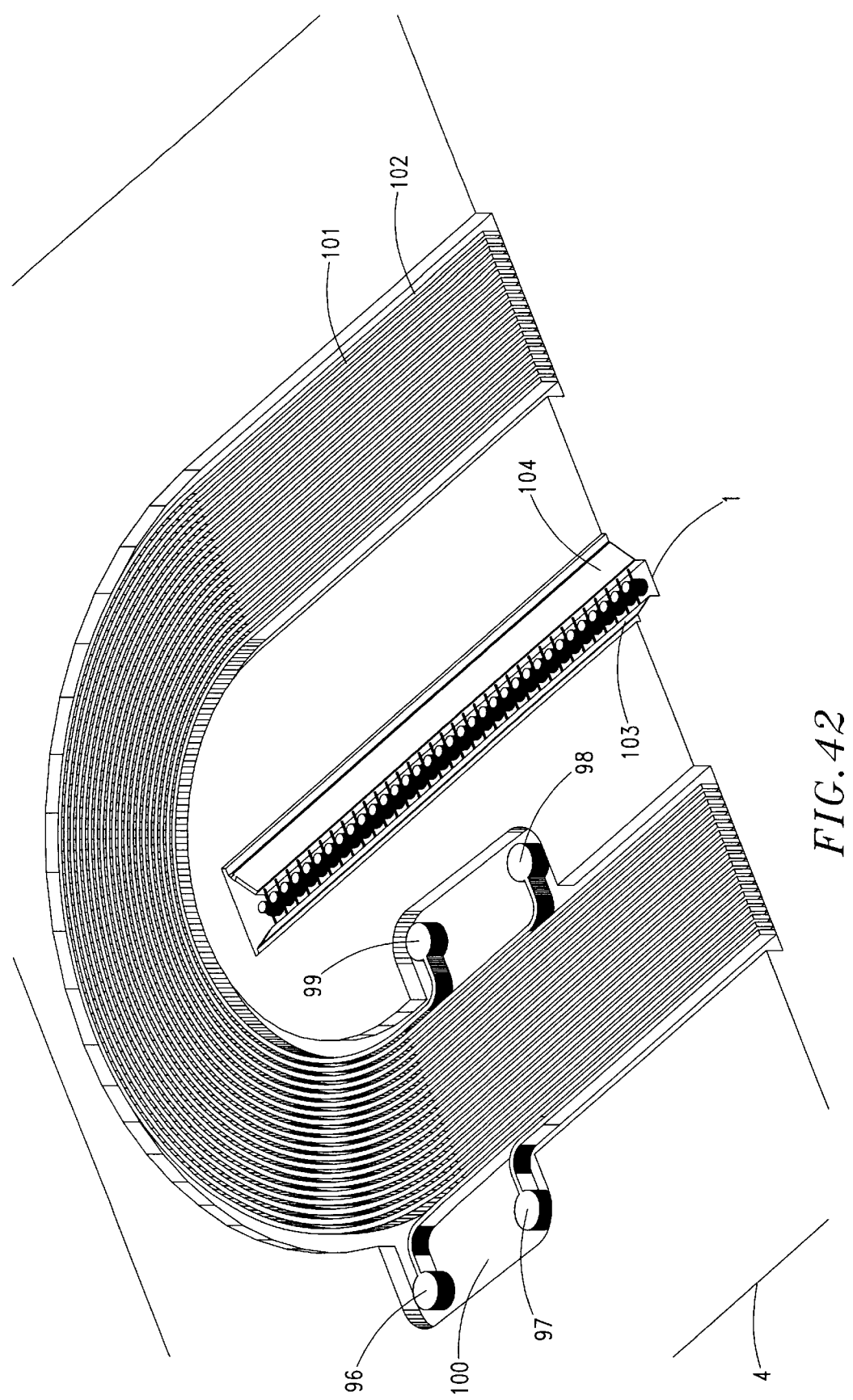
FIG. 42 is a 3D drawing of a top-front left-side view of a Magneto-Optical Microhead Array Chip's two Bi-Metal Planar Induction Coils and un-concealed VCSEL microhead array that displays the reference-voltage and signal-voltage read-channel photo-diode array semiconductor substrates.
Figure 43:
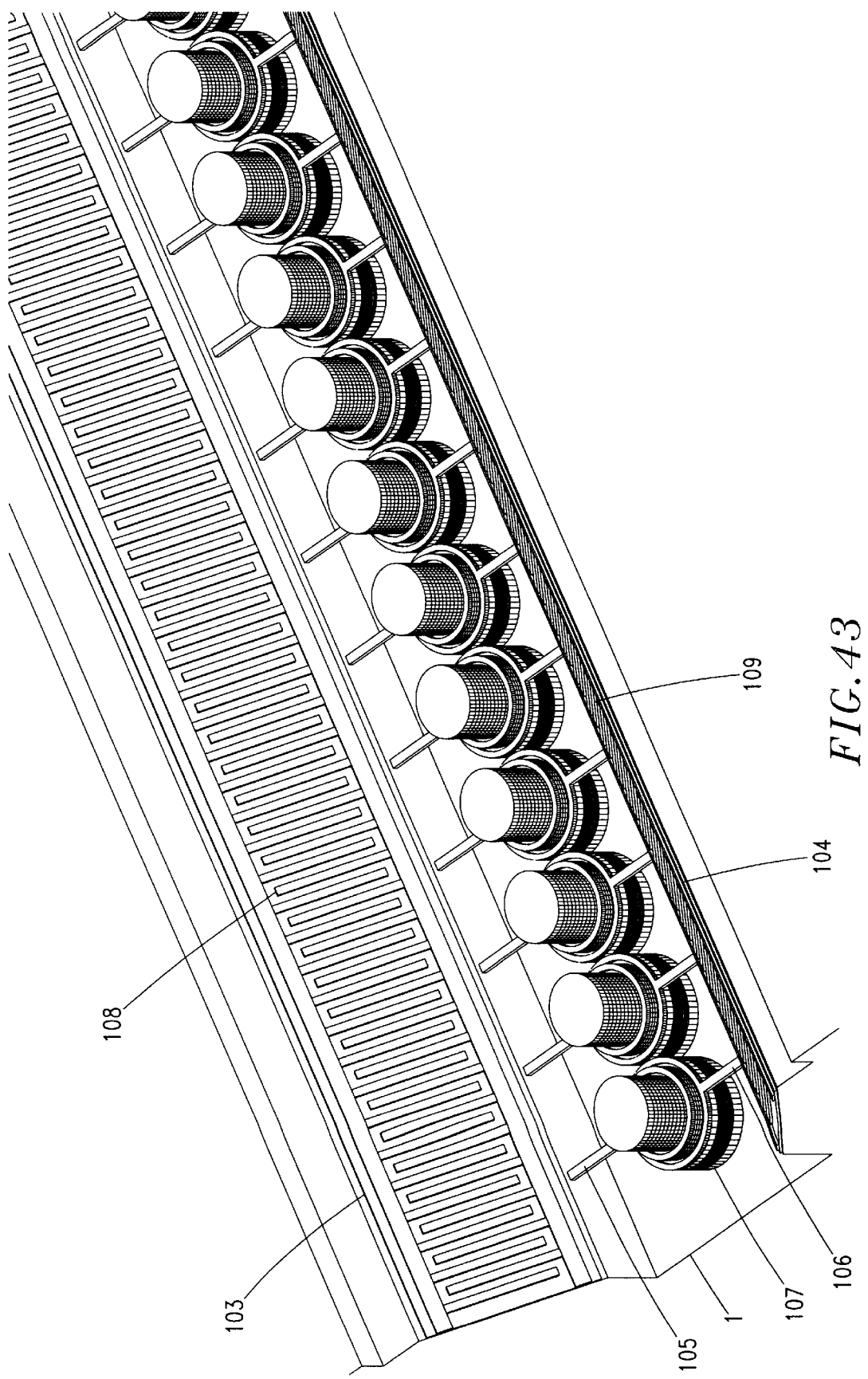
FIG. 43 is a 3D drawing showing a 30-degree top front right-side close-up view of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 44:
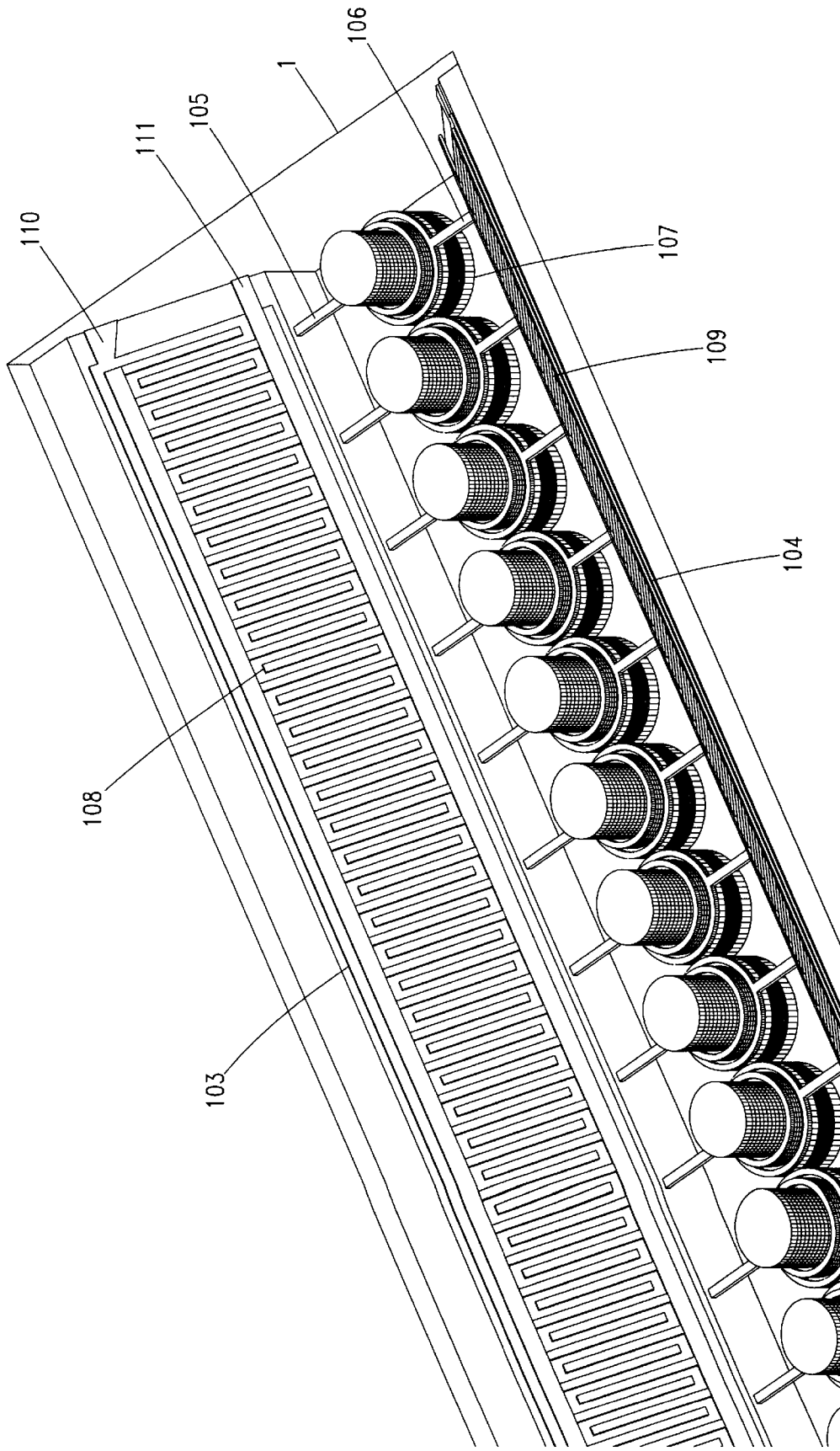
FIG. 44 is a 3D drawing showing a 30-degree top back right-side close-up view of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 45:
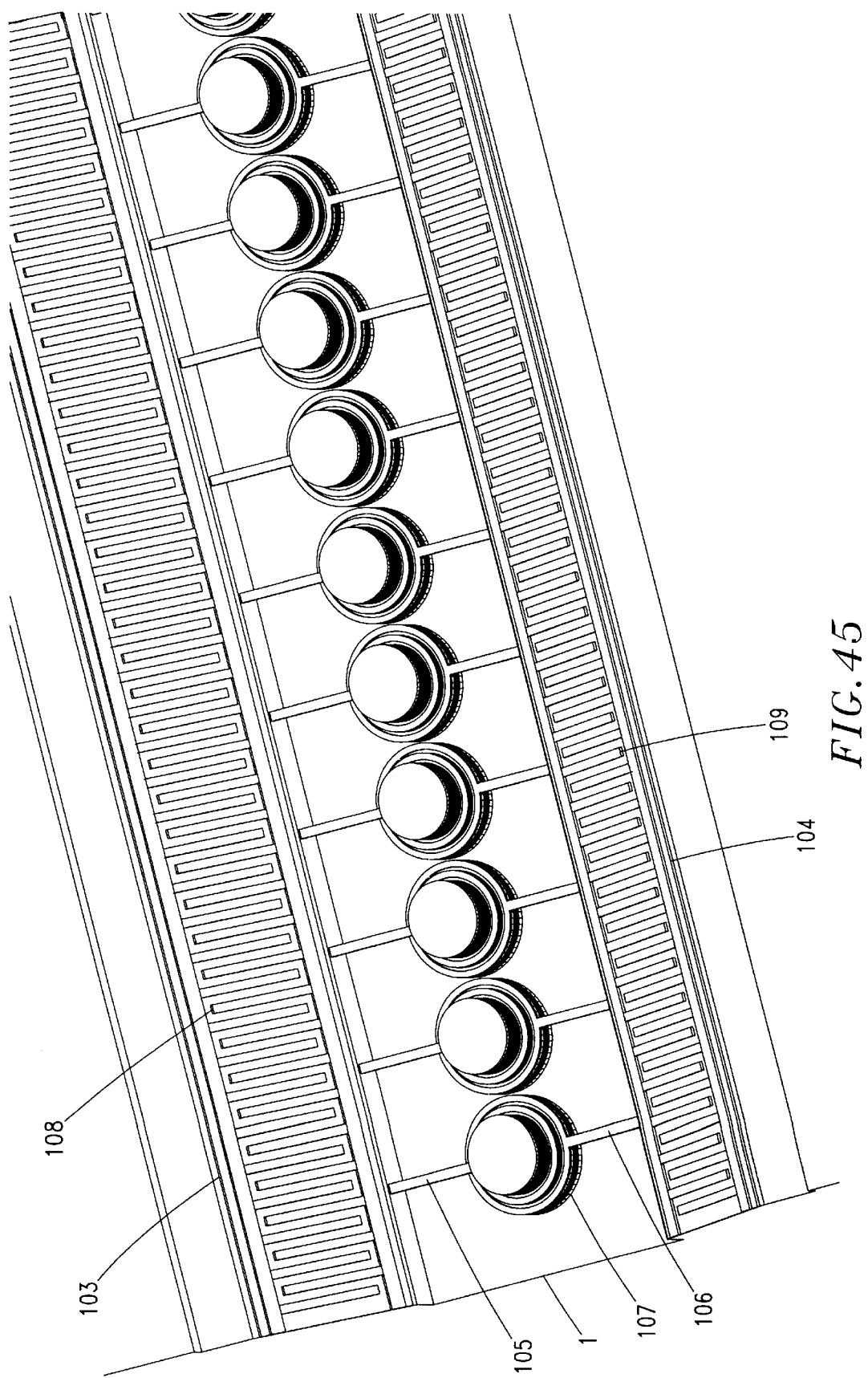
FIG. 45 is a 3D drawing showing a 10-degree top front-end right-side close-up view of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 46:
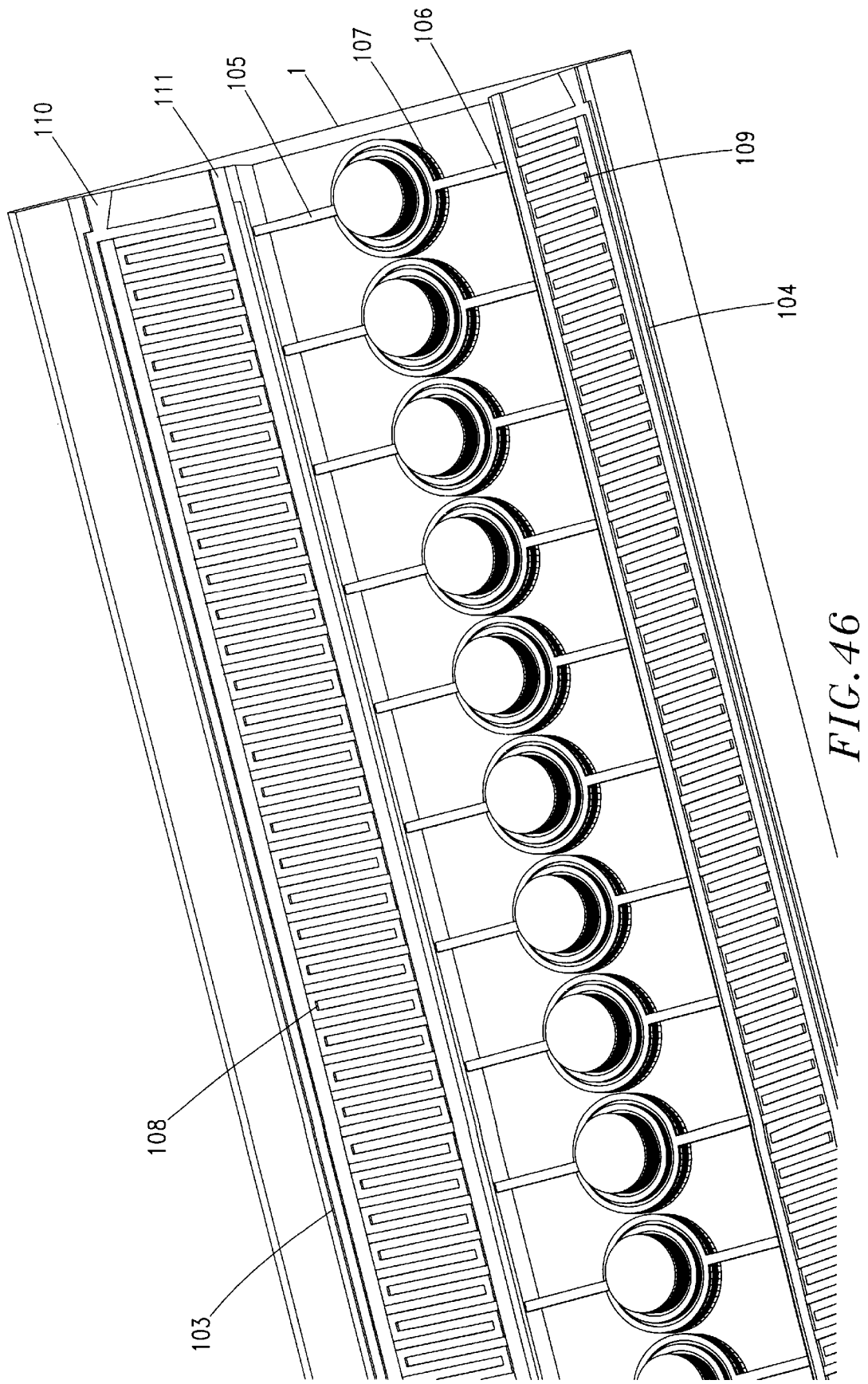
FIG. 46 is a 3D drawing of a 10-degree top back-end right-side close-up view of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 47:
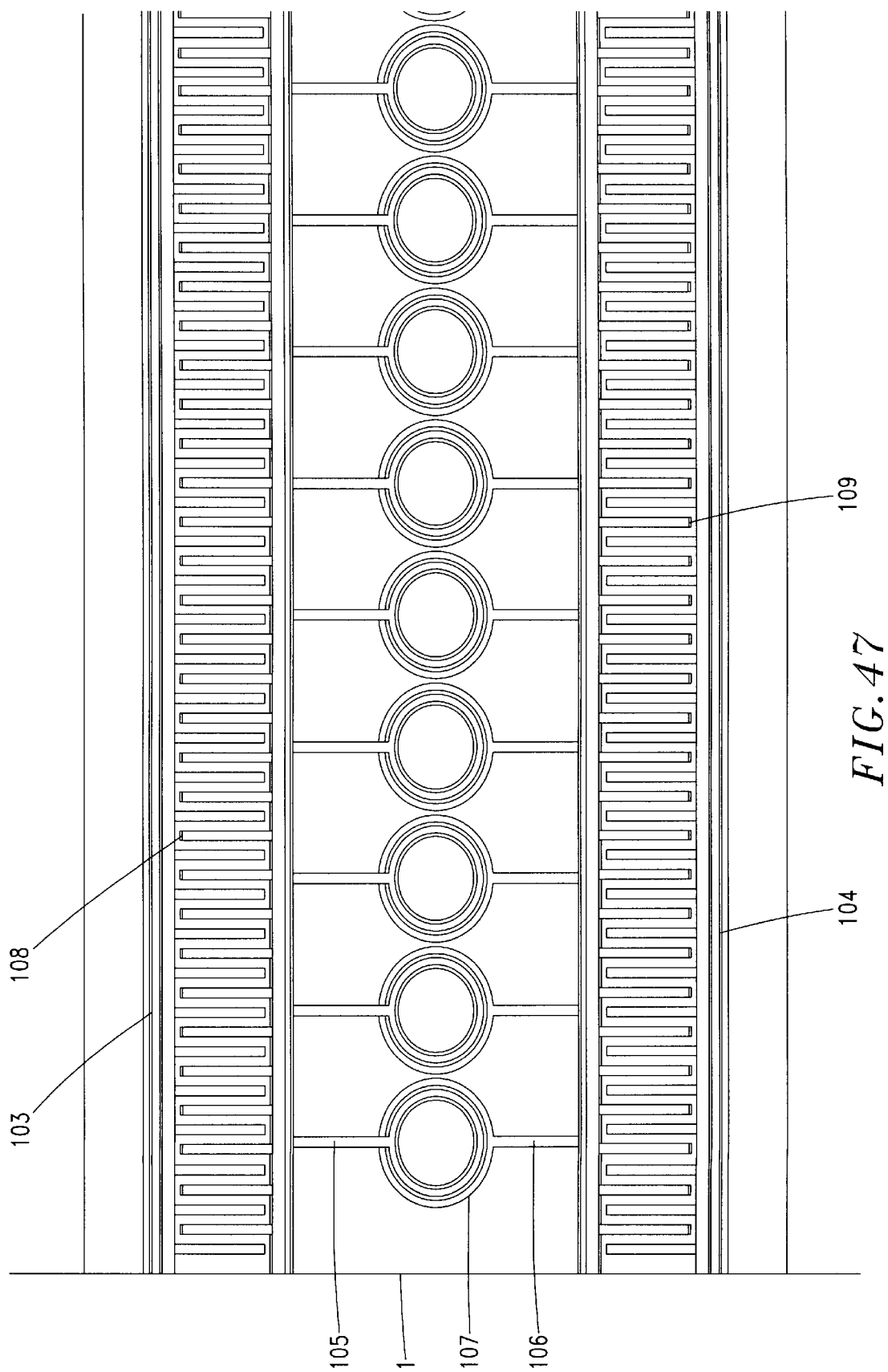
FIG. 47 is an orthographic drawing showing a front-end plan-view close-up of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 48:
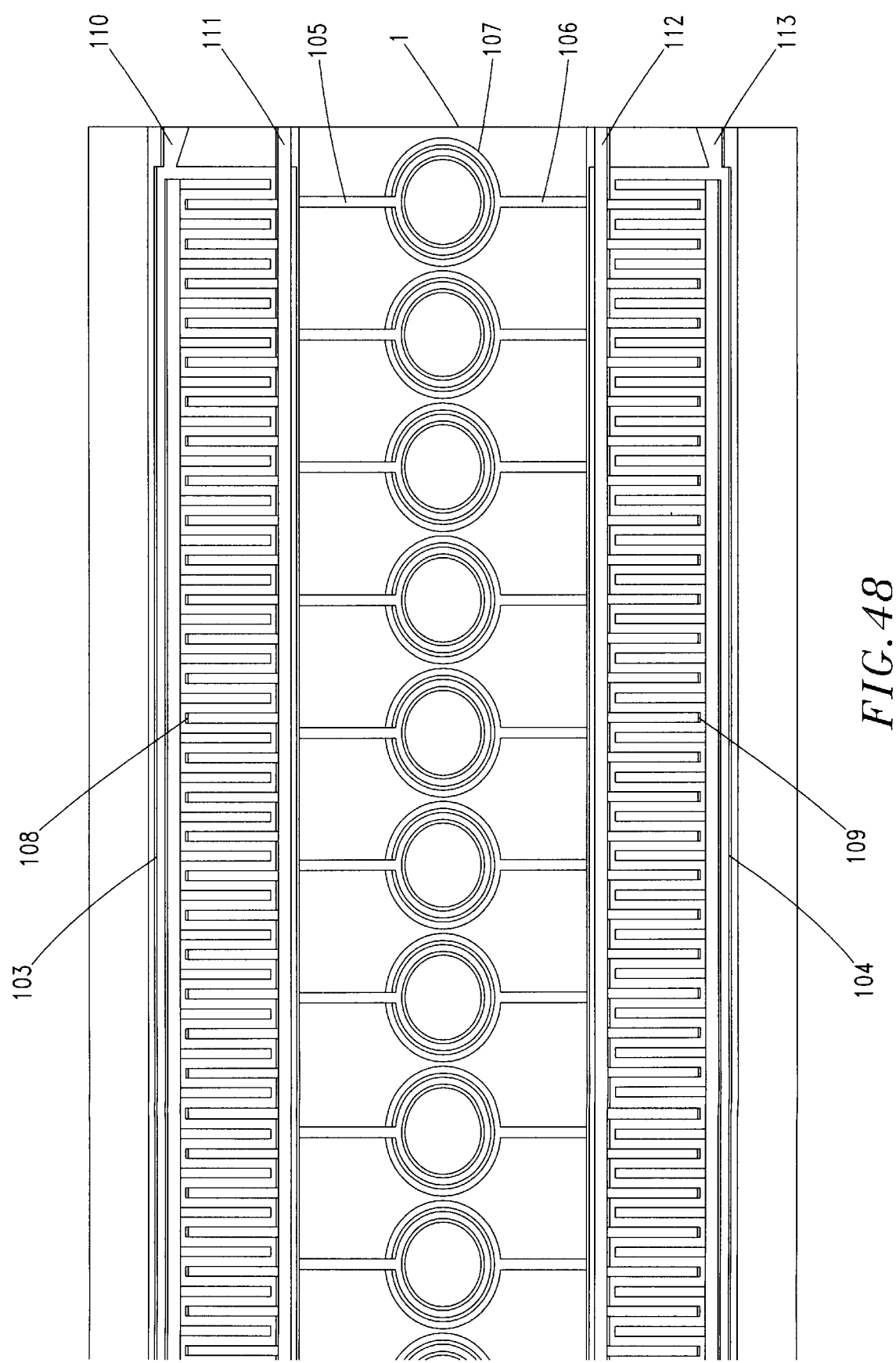
FIG. 48 is an orthographic drawing showing a back-end plan-view close-up of a Magneto-Optical Microhead Array Chip's un-concealed VCSEL microhead array that displays details of the VCSEL microheads and two reversed-biased (SPC) "Semiconductor Photo-Conductor" linear position-sensing (CdS) "Cadmium Sulfide" semiconductor photo-diode devices.
Figure 49:
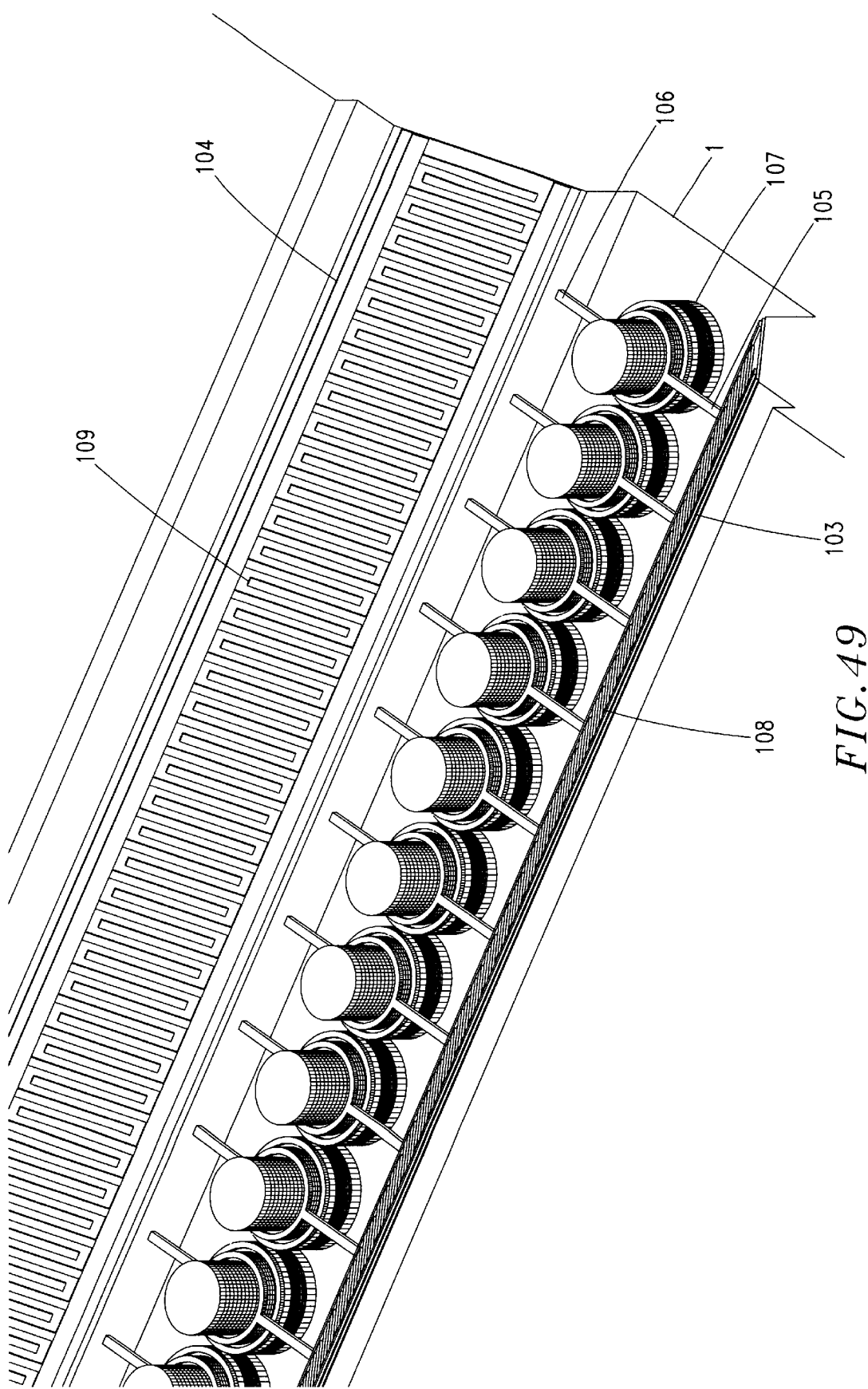
FIG. 49 is a 3D drawing showing a 30-degree top front-end left-side close-up view of a Magneto-Optical Microhead Array Chip's un-concealed VCSEL microhead array, while displaying details of the VCSEL microheads and two reversed-biased (SPC) "Semiconductor Photo-Conductor" linear position-sensing (CdS) "Cadmium Sulfide" semiconductor photo-diode devices.
Figure 50:
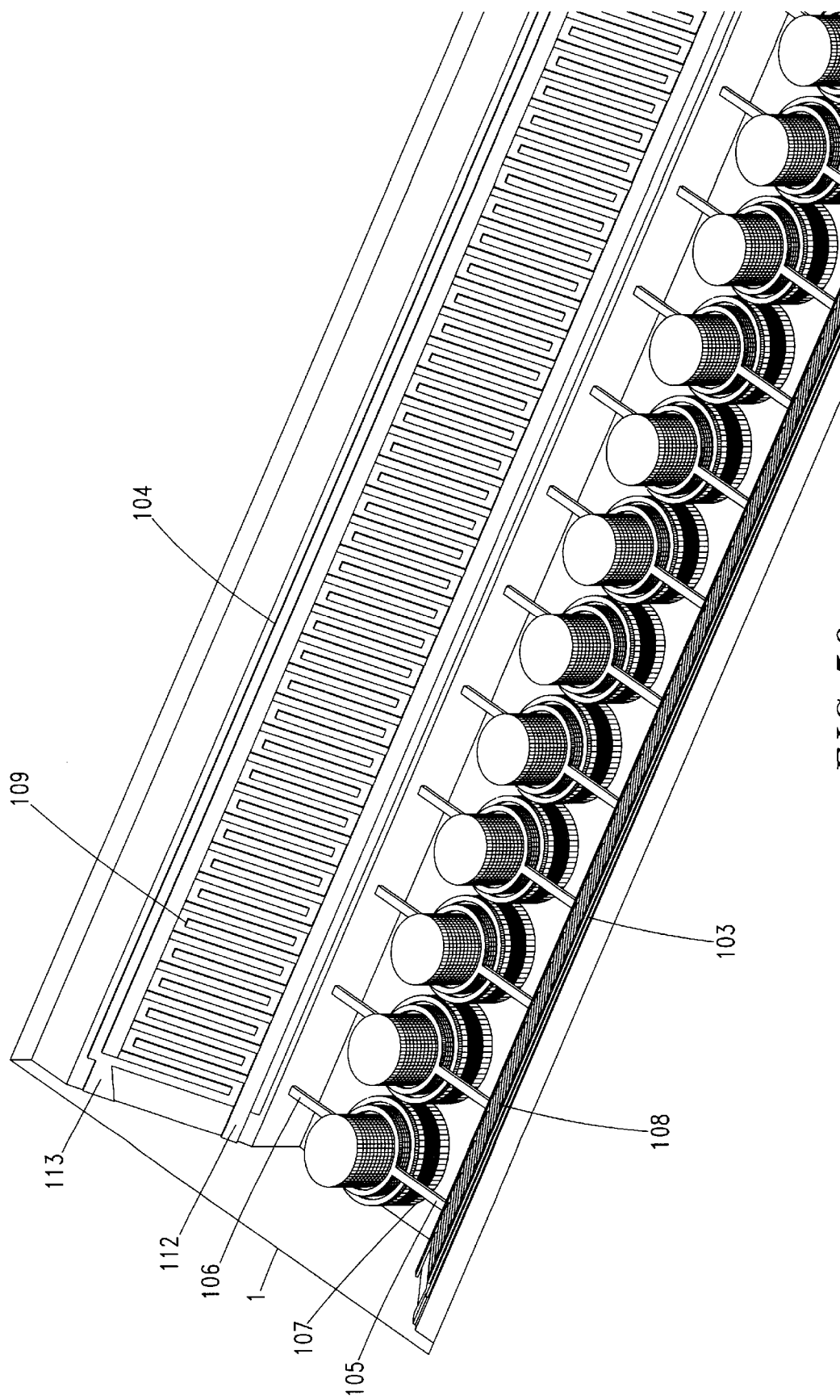
FIG. 50 is a 3D drawing showing a 30-degree top back-end left-side close-up view of a Magneto-Optical Microhead Array Chip's un-concealed VCSEL microhead array, while displaying details of the VCSEL microheads and two reversed-biased (SPC) "Semiconductor Photo-Conductor" linear position-sensing (CdS) "Cadmium Sulfide" semiconductor photo-diode devices.
Figure 51:
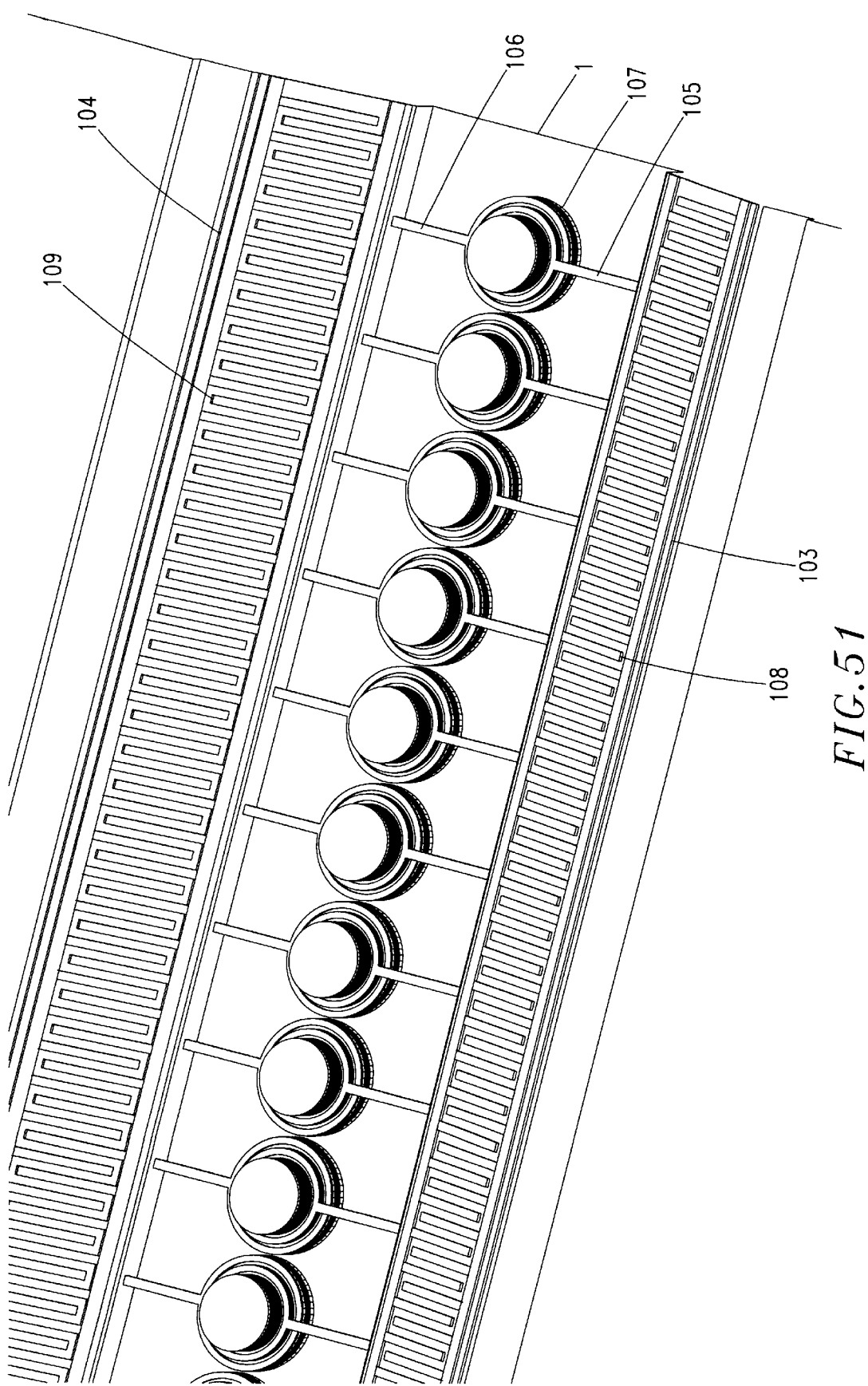
FIG. 51 is a 3D drawing showing a 10-degree top front-end left-side close-up view of a Magneto-Optical Microhead Array Chip's unconcealed VCSEL microhead array, while displaying details of the VCSEL microheads and two reversed-biased (SPC) "Semiconductor Photo-Conductor" linear position-sensing (CdS) "Cadmium Sulfide" semiconductor photo-diode devices.
Figure 52:
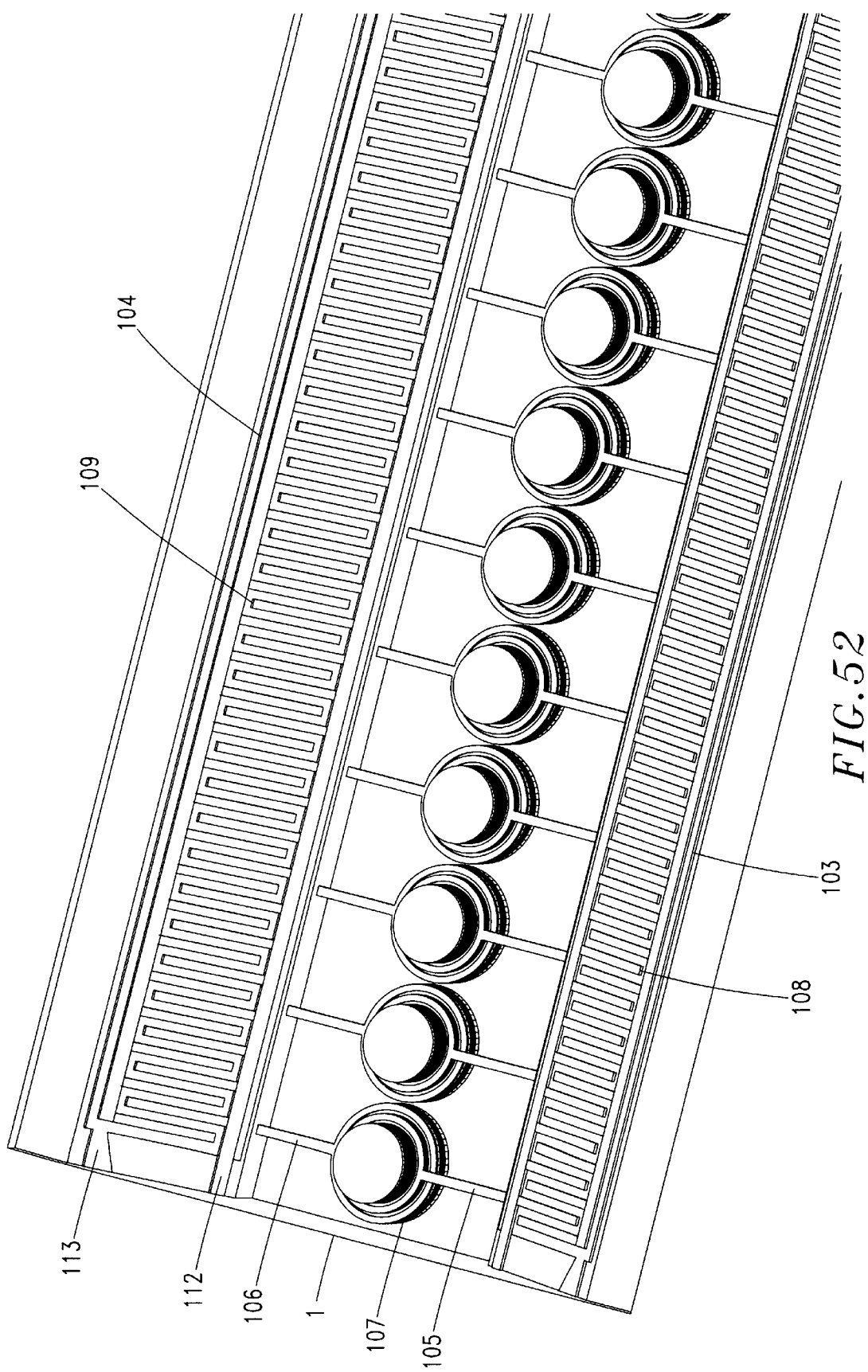
FIG. 52 is a 3D drawing showing a 10-degree top back-end left-side close-up view of a Magneto-Optical Optical Microhead Array Chip's un-concealed VCSEL microhead array, while displaying details of the VCSEL microheads and two reversed-biased (SPC) "Semiconductor Photo-Conductor" linear position-sensing (CdS) "Cadmium Sulfide" semiconductor photo-diode devices.

Furthermore, the previously mentioned "Quarter Wave Plate" is utilized to convert linearly polarized "E-ray" laser-light 138 (FIG. 108A) into (RHCP) "Right Hand Circular Polarized" laser light 142 (FIG. 108A). In addition, and after the previously mentioned "Ahrens Polarizing Analyzer" converts vertically traveling linearly polarized "E-ray" laser-light into vertically traveling (RHCP) "Right Hand Circular Polarized" laser-light 142 (FIG. 108A) the previously mentioned circularly polarized "E-ray" laser-light 132 (FIG. 108A), specifically the (RHCP) "Right Hand Circular Polarized" "E-ray" laser-light, will vertically strike, from a perpendicular direction, a disk-platter's perpendicular surface 13 (FIGS. 1, 2, 3, and 108A) containing a (MO) "Magneto-Optical" recording rare-earth medium 13 (FIGS. 1, 2, and 3). Moreover, the beforementioned (RHCP) "Right Hand Circular Polarized" "E-ray" laser-light 142 (FIG. 108A) is reflected 133 (FIG. 108A) into a perpendicular, but opposite direction 133 (FIG. 108A) from the previously mentioned disk-platter's perpendicular surface 13 (FIGS. 1, 2, 3, and 108A) towards a Magneto-Optical Microhead Array Chip's "Quarter Wave Plate" 94, 95 (FIG. 108A), 94 (FIG. 39), 95 (FIG. 40).

Furthermore, if the beforementioned (MO) "Magneto-Optical" recording rare-earth medium 13 (FIGS. 1, 2, and 3) reflecting the beforementioned (RHCP) "Right Hand Circular Polarized" "E-ray" laser-light 142 (FIG. 108A) has a downward (i.e., downward meaning, inward or away from the disk-platter's outer shell surface) magnetized direction the reflected (RHCP) "Right Hand Circular Polarized" "E-ray" laser-light 133 (FIG. 108A) will undergo a reversal of its circular polarization into a (LHCP) "Left Hand Circular Polarized" "O-ray" form of laser-light 133 (FIG. 108A) giving it a smaller "Circular Dichroism". Consequently, when the previously mentioned (LHCP) "Left Hand Circular Polarized" "O-ray" laser-light 133 (FIG. 108A) enters a Magneto-Optical Microhead Array Chip's "Quarter-Wave Plate" of calcite-crystal 94, 95 (FIG. 108A), 94 (FIG. 39), 95 (FIG. 40) it will be converted into linearly polarized and vertically traveling "O-ray" form of laser-light 141 (FIG. 108A).

Furthermore, the beforementioned linearly polarized and vertically traveling "O-ray" laser-light will continue its propagation direction into downward direction 141 (FIG. 108A) until it strikes the thin-layer di-electric half-mirror of the beforementioned "Ahrens Polarizing Analyzer" 131 (FIG. 108A), which is located in-between the top and bottom triangular shaped calcite-crystals'center hypotenuse 131 (FIG. 108A), causing the beforementioned vertically traveling "O-ray" laser-light's linear polarization 141 (FIG. 108A) to be reversed; moreover, from a vertically traveling "O-ray" form of low-intensity linearly polarized laser-light into a horizontal traveling "E-ray" 143 (FIG. 108A) form of low-intensity linearly polarized laser-light. Moreover, the previously mentioned horizontal traveling "E-ray" 143 (FIG. 108A) form of low-intensity linearly polarized laser-light is reflected "90%" 143 (FIG. 108A) upon contact with a Ahrens Polarizing Analyzer's 131 (FIG. 108A) beforementioned thin-layer di-electric half-mirror, which causes, upon reflection, a "90" degree right-angle projection, through a Ahrens Polarizing Analyzer's top calcite-crystal 129 (FIG. 108A), of the horizontal traveling "E-rays" 143 (FIG. 108A) of linearly polarized laser-light. In addition, the previously mentioned horizontally traveling "E-rays" 143 (FIG. 108A) of linearly polarized laser-light will be received by a reversed-biased "SPD Array 1" (FIGS. 64A and 64E) (SPD) "Semiconductor Photo-Diode" photocell-array read-element (FIG. 64G), which in-turn will generate a signal-voltage analog-signal, which in-turn is pre-amplified by a transimpedence-amplifier (FIGS. 64A and 64F), and sent to a read-channel's signal input (SPDAS1) "Semiconductor Photo-Diode Analog-signal 1" as a Magneto-Optical Microhead Array Chip's data-signal, as illustrated in FIGS. 64A, 64C, 79, 80, 81, 82, 83, 84, 85, and 86.

However, if the beforementioned (MO) "Magneto-Optical" recording rare-earth medium 13 (FIGS. 1, 2, and 3) that reflects the beforementioned (RHCP) "Right Hand Circular Polarized" laser-light has an upward magnetized direction, then the beforementioned (RHCP) "Right Hand Circular Polarized" laser-light will still undergo conversion into (LHCP) "Left Hand Circular Polarized" laser-light 133 (FIG. 108A), but will have a larger amount of "Circular Dichroism" present than the previously mentioned (LHCP) "Left Hand Circular Polarized" laser-light reflected from a disk-platter's domain-cell area having a downward magnetized direction. Consequently, when the beforementioned (LHCP) "Left Hand Circular Polarized" laser-light 133 (FIG. 108A) enters a Magneto-Optical Microhead Array Chip's "Quarter-Wave Plate" of calcite-crystal 94, 95 (FIG. 108A), 94 (FIG. 39), 95 (FIG. 40) it will be converted into linear polarized "O-ray" laser-light. In addition, the previously mentioned linearly polarized "O-ray" laser-light will strike a Ahrens Polarizing Analyzer's thin-film di-electric Half-Mirror, which is located at a Ahrens Polarizing Analyzer's center hypotenuse 131 (FIG. 108A), and causes the previously mentioned linearly polarized "O-ray" laser-light to become reversed from an "O-ray" into an "E-ray" form of high-intensity linearly polarized laser-light. Moreover, while reflecting it "90%" toward the reversed-biased "SPD Array 1" (FIGS. 64A and 64E) (SPD) or "Semiconductor Photo-Diode" photocell array (FIG. 64G), which in-turn will generate a signal-voltage analog-signal that is pre-amplified by a transimpedence-amplifier (FIGS. 64A and 64F), while sending it to the read-channel's signal input for (SPDAS1) "Semiconductor Photo-Diode Analog-signal 1", as illustrated in FIGS. 64A, 64C, 79, 80, 81, 82, 83, 84, 85, and 86.

To summarize this process, if "E-rays" of linearly polarized laser-light are reflected by a disk-platter's (MO) "Magneto-Optical" rare-earth recording medium with data-surface MO data-cells magnetized in a downward direction, a Magneto-Optical Microhead Array Chip's Ahrens Polarizing Analyzer converts them into a low-intensity laser-light beam, which generates a low-peak signal-voltage analog-signal when impacting a reversed-biased "SPD Array 1" (FIGS. 64A and 64E) (SPD) "Semiconductor Photo-Diode" photocell-array read-element; moreover, the previously mentioned low-peak signal-voltage analog-signal is compared to a divided reference-voltage analog-signal by a read-channel's first comparator; wherein, the previously mentioned comparator creates a digital logic-low data-bit, having a logic value of "0". However, if "E-rays" of linearly polarized laser-light are reflected by a disk-platter's (MO) "Magneto-Optical" rare-earth recording medium with data-surface MO data-cells magnetized in a upward direction, a Magneto-Optical Microhead Array Chip's Ahrens Polarizing Analyzer converts them into a high-intensity laser-light beam, which generates a high-peak signal-voltage analog-signal when it impacts a reversed-biased "SPD Array 1" (FIGS. 64A and 64E) (SPD) "Semiconductor Photo-Diode" photocell-array read-element; moreover, the previously mentioned high-peak signal-voltage analog-signal is compared to a divided reference-voltage analog-signal by a read-channel's first comparator; wherein, the previously mentioned comparator creates a digital logic-high data-bit, having a logic value of "1".

Moreover, the "5" milli-watts of electrical current will be shut-off from the VCSELs' (LVIN) "Laser Voltage Input" power-bus (FIGS. 107 and 111) by a Data Sequencer's "Bus Controller" (FIGS. 62A, 63A, 62B, 63B, 62C, and 63C) after host-requested data-sectors have been read from a disk-platter's cylinder/track data-surface location into a Data Sequencer's (DPLL) "Digital Phase-Locked Loop" circuit for signal processing. Consequently, powering up a selected VCSEL microhead (FIGS. 107 and 111) for only the amount of time it is actually used to read data greatly increases the beforementioned (MTBF) "Mean Time Before Failure" rating of every single VCSEL microhead in a Magneto-Optical Microhead Array Chip's microhead array.

However, lets take a closer look at the Magneto-Optical Microhead Array Chips conversion of analog-signals to a digital data-stream, which occurs during a host-requested read-data disk-operation. Moreover, the previously mentioned digital data-streams are created using a host-selected Magneto-Optical Microhead Array Chip's VCSEL microhead array, which, during a read-data disk-operation will generate the two analog-signals that are used to create the previously mentioned digital data-stream. Moreover, the first analog-signal "signal-one" is generated from a (SPD Array 1) Semiconductor Photo-Diode Array 1's output, as illustrated in FIGS. 64A, 64E, 64F, 64G, 79, 80, 81, and 82, which is sent to a Magneto-Optical Microhead Array Chip analog read-channel's (SPDAS1) "Semiconductor Photo-Diode Analog Signal 1" pre-amp input as a read-channel's signal-voltage analog-signal, as illustrated in FIGS. 64A, 64E, 64F, 64G, 79, 80, 81, and 82, while analog-signal "signal-two" is generated from a (SPD Array 2) Semiconductor Photo-Diode Array 2's output, as illustrated in FIGS. 64A, 64E, 64F, 64G, 79, 80, 81, and 82, which is sent to a Magneto-Optical Microhead Array Chip analog read-channel's (SPDAS2) "Semiconductor Photo-Diode Analog Signal 2" pre-amp input as a read-channel's reference-voltage analog-signal, as illustrated in FIGS. 64A, 64E, 64F, 64G, 79, 80, 81, and 82. Furthermore, during a host-requested read-data disk-operation the previously mentioned two analog-signals coming from the previously mentioned read channel's (SPDAS1) "Semiconductor Photo-Diode Analog Signal 1", and (SPDAS2) "Semiconductor Photo-Diode Analog Signal 2" are each pre-amplified by a transimpedence amplifier. Wherein, the beforementioned read-channel's signal-voltage analog-signal and the beforementioned reference-voltage analog-signal will enter a read-channel's "Read Preamp Circuit" (FIGS. 64A and 64C); wherein, the previously mentioned two analog-signals will begin to undergo an (ADC) "Analog to Digital Conversion" process. In addition, after receiving the beforementioned read channel's signal-voltage analog-signal and the beforementioned reference-voltage analog-signal (FIGS. 64A and 64C), using a "High Performance Comparator" circuit (FIGS. 79 and 80) located in a read-channel's "Read Preamp Circuit" (FIGS. 64A and 64C), the beforementioned read-channel will begin a comparison process of the aforesaid two analog signals. Moreover, the previously mentioned "High Performance Comparator" circuit's (FIGS. 79 and 80) digital output data-streams are based upon a logic formula, which states, (V1 positive)>(V0 negative)=(Logic 1)=(VDD) or "+5 Volts", while (V1 positive)<(V0 negative)=(Logic 0)=(VSS) or "0 Volts".

Therefore, if the signal-voltage received by the beforementioned "High Performance Comparator" SPDAS1's signal-voltage input comes from a SPDAS1's signal-voltage output, as illustrated in FIGS. 64A, 64E, 64F, and 64G, as a signal-voltage with a voltage level that is above a SPDAS2's voltage-divided reference-signal's voltage-threshold the previously mentioned "High Performance Comparator" will output a logic "1", as illustrated in FIGS. 79 and 80. However, if the signal-voltage received by the beforementioned "High Performance Comparator" SPDAS1's signal-voltage input comes from a SPDAS1's signal-voltage output, as illustrated in FIGS. 64A, 64E, 64F, and 64G, as a signal-voltage with a voltage level that is below a SPDAS2's voltage-divided reference-signal's voltage-threshold the previously mentioned "High Performance Comparator" will output a logic "0", as illustrated in FIGS. 79 and 80.

Furthermore, the circuit proceeding the beforementioned two analog-signal transimpedence amplifiers is the Magneto-Optical Microhead Array Chips read-channel "High Performance Comparator" circuit, as illustrated in FIGS. 79, 80, 81, 82, 83, 84, 85, and 86. Furthermore, the previously mentioned comparator circuit offers greater accuracy in its "analog-to-digital" signal conversions, while providing further amplification of the aforesaid comparators output digital-signals. Moreover, a read-channel's "High Performance Comparator" circuit, as illustrated in FIGS. 79, 80, 81, 82, 83, 84, 85, and 86, consists of three-stages:

(i) An input-preamplifier stage, as illustrated in FIGS. 81 and 82.

(ii) A positive-feedback or decision-stage, as illustrated in FIGS. 83 and 84.

(iii) An output-buffer stage, as illustrated in FIGS. 85 and 86.

Subsequently, the previously mentioned input preamplifier stage (FIGS. 81 and 82) amplifies input-signals to improve the aforesaid comparators sensitivity (i.e., increases the minimum input signal with which the previously mentioned comparator can make a precise conversion from analog to digital signal decision) and isolates input-signals from any switching noise that might come from the aforesaid positive-feedback stage (i.e., this stage is very important, because of the low signal-to-noise ratio the circuit provides to the read-channel's output signal). In addition, the previously mentioned positive-feedback, or decision-stage (FIGS. 83 and 84) is used to determine, by comparison, which of the input-signal voltages is larger than the other. In addition, the aforesaid output-buffer stage (FIGS. 85 and 86) amplifies the beforementioned positive-feedback information and outputs a digital-signal to a read-channel's "XOR Phase Detector" circuit (FIGS. 85, 86, and 106), while encoding a read-channel's output signals with a frequency-specific "Bi-Phase Data Encoding" code, as illustrated in FIGS. 91, 92, 93, 94, 95, and 106.

Moreover, the resulting output-signal is a "Bi-Phase Encoded Data Stream", as illustrated in FIGS. 91, 92, 93, 94, 95, and 106, is sent to its respective Magneto-Optical Microhead Array Chip's (Dout) "Data out" output-contact, pin-number "63". Contiguously, a "Bi-Phase Encoded Data Stream" output-signal will travel onto the aforesaid data-bus cable (FIGS. 15 and 16), where it is lead to a Disk Controller's "Data-Sequencer", as illustrated in FIGS. 62A, 63A, 62C, and 63C. Moreover, when the beforementioned read-channel's frequency-specific bi-phase data encoded output-signal enters the previously mentioned Data Sequencer's (DPLL) "Digital Phased-Locked Loop" (FIGS. 62A, 63A, 62B, and 63B) its data-stream signal is decoded and its clock-signal recovered (FIG. 106) (i.e., the following paragraphs will explain this process in greater detail).

Moreover, during a host requested read-data disk-operation a Data Sequencer's "Data Transfer Rate Frequency Analyzer" (FIGS. 62A, 63A, 62B, and 63B) calculates the optimal transfer frequency-rate for any data-zone needing to be read, and communicates that calculation to a Data Sequencer's "Multi-Frequency Clock Synthesizer" module, as illustrated in FIGS. 62A, 63A, 62B, and 63B. Moreover, a Data Sequencer's "Multi-Frequency Clock Synthesizer" will generate a clock-referencing voltage-signal from the previously mentioned calculations it received from a Data Sequencer's "Data Transfer Rate Frequency Analyzer", and send it to a Data Sequencer's (DPLL) "Digital Phased-Locked Loop" circuit for further signal processing. In addition, a (DPLL) "Digital Phased-Locked Loop" circuit's (FIGS. 62A, 63A, 62B, and 63B) (VCO) "Voltage Controlled Oscillator" circuit will generate a divided-by-two dclock-signal from the clock-referencing voltage-signal it received from a Data Sequencer's "Multi-Frequency Clock Synthesizer", while sending the aforesaid dclock-signal through a (MFCLK) "Multi-Frequency Clock" control-bus line (FIGS. 15 and 16) that is connected to all of the Magneto-Optical Microhead Array Chips (MFCLK) "Multi-Frequency Clock" input-contacts, pin-number "35", as illustrated in FIGS. 11, 12, 13, and 14. Furthermore, from the host-selected Magneto-Optical Microhead Array Chip number-5's input-contact, pin-number "35", the aforesaid (DCLOCK) "Divided Clock" dclock-signal will be rerouted to the second entrance clock-input portion of a read-channel's pre-dpll circuit (FIG. 106), while the first entrance to the previously mentioned read-channel's pre-dpll circuit (FIGS. 91, 92, and 106) is the data-stream input for its "XOR Phase Detector" circuit, as illustrated in FIGS. 85, 86, 91, and 92.

Moreover, a read-channel's buffered output of data-stream signals will enter the data-input (FIG. 106), or first entrance to a read-channel's "XOR Phase Detector" circuit, as illustrated in FIGS. 85, 86, 91, 92, and 106, where it will undergo bi-phase data encoding. Therefore, during a host requested read-data disk-operation any data read with Magneto-Optical Microhead Array Chip number: "5", from data-surface: "5", at cylinder/track number: "4562", at sector number: "43" is converted from a photo-generated electrical analog-signal to a digital-signal, which is passed on through the previously mentioned XOR phase-detector's "Bi-Phase Data Encoding Circuit (FIGS. 85, 86, 91, and 92); wherein, it is sent to the beforementioned Data Sequencer's (DPLL) "Digital Phase-Locked Loop" circuit (FIG. 106) for signal processing, decoding, buffer storage, and (ECC) "Error Correction Code" correction.

Furthermore, the beforementioned Disk Controller's "Data Sequencer" contains the reception side of a Magneto-Optical Microhead Array Chip's pre-dpll circuit in its (DPLL) "Digital Phase-Locked Loop", as illustrated in FIGS. 62A, 63A, 62B, and 63B. In addition, the previously mentioned Data Sequencer's (DPLL) "Digital Phase-Locked Loop" circuit, as illustrated in FIGS. 62A, 63A, 62C, 63C, recovers a clock-signal from the beforementioned "Bi-Phase Encoded Data Stream", which is used during a host requested read-data disk-operation to resolve any data-transfer frequency-rates for any disk-platter's data-zone needed to be read. Moreover, the beforementioned Disk Controller's "Data Sequencer" can make on-the-fly data-transfer frequency-rate comparisons, for on-the-fly adjustments of a Magneto-Optical Microhead Array Chip Hard Disk Drive's data-transfer frequency-rates and spindle motor control systems. Therefore, when the beforementioned "Data Sequencer" makes an on-the-fly comparison of these various signals, an on-the-fly data transferring frequency-rate optimization or correction can be made to the beforementioned DPLL's (VCO) "Voltage Controlled Oscillator" (FIG. 106) circuit. Moreover, on-the-fly adjustments to a Spindle-Motor's "constant angular velocity" can be accomplished by a Data Sequencer's "Disk Controller Interface"; moreover, by analyzing and controlling a Spindle-Motor's rate of revolutions per-minute, through the beforementioned Disk Controller's "Motor Controller" circuit, as illustrated in FIGS. 62A, 63A, 62B, 63B, 62C, and 63C. Consequently, this will offer a more responsive and faster Phased-Locked Loop for host selected Magneto-Optical Microhead Array Chip read-channel's data-stream outputs during read-data disk-operations.

Moreover, as illustrated in FIG. 106, the beforementioned Data Sequencer's (DPLL) "Digital Phase-Locked Loop" circuit will, after receiving the beforementioned read-channel's encoded data-stream signal, decode its "Bi-Phase Encoded Data Stream" and recover its clock-signal at its (VCO) "Voltage Controlled Oscillator" circuit (FIG. 106) for analysis. In addition, the beforementioned clock-signal is recovered by a DPLL's previously mentioned (VCO) "Voltage Controlled Oscillator" circuit and sent to a Data Sequencer's "Data Transfer Rate Frequency Analyzer" for further signal processing. Wherein, the previously mentioned "Data Transfer Rate Frequency Analyzer" will make an on-the-fly comparison between the DPLL recovered clock-signal's data-transfer frequency rate and the original data-transfer frequency rate calculation it made earlier to initialize the data-reading of a particular data-zone. Moreover, the previously mentioned "Data Transfer Rate Frequency Analyzer" will analyze the beforementioned on-the-fly comparison results and create an optimized data-transfer frequency rate calculation, which it will send to a Data Sequencer's (MFCS) "Multi-Frequency Clock Synthesizer" module, as illustrated in FIGS. 62A, 63A, 62B, and 63B. Wherein, the beforementioned (MFCS) "Multi-Frequency Clock Synthesizer" uses the beforementioned calculation to create a new clock-signal at the new frequency rate, and sends it back to a DPLL's "Voltage Controlled Oscillator" circuit were it is sent, as a divided or dclock-signal, back to the host selected Magneto-Optical Microhead Array Chip for read-data synchronization. In addition, the beforementioned decoded "Bi-Phase Encoded Data Stream" data-signal is re-encoded by the aforesaid (VCO) "Voltage Controlled Oscillator" circuit (FIG. 106) into a conventional (NRZ) "Non-Return to Zero" encoded data-stream data-signal, which is transferred to a Disk Controller's "PRML Controller" circuit, as illustrated in FIGS. 62A, 63A, 62B, and 63B, for additional signal processing.

In addition, the encoding of a read-channel's data-stream output with "Bi-Phase Data Encoding", which is done through an exclusive "XOR Phase Detector" circuit, as illustrated in FIGS. 91, 92, 93, 94, 95, and 106; moreover, will make possible the recovery of a clock-signal from the beforementioned read-channel's data-stream output, and the conversion of the remaining data-stream, from a "Bi-Phase Encoded Data Stream" into a regular (NRZ) "Non-Return to Zero" encoded data-stream, as illustrated in FIG. 106. Furthermore, the previously mentioned bi-phase data encoding of the beforementioned read-channel's data-stream output signals; moreover, make it possible to "Digitally Phase-Lock Loop" the beforementioned data-stream with much greater accuracy, while not having to place an odd-parity bit at the end of every eight-bit word to eliminate the possibility of all eight bits being high. Therefore, when we use "Bi-Phase Data Encoding" (FIG. 93) parity bits are not needed for data-streams to achieve full data transfer synchronization. Furthermore, the beforementioned (NRZ) "Non-Return to Zero" encoded serial data-stream is next sent to a Data Sequencer's "PRML Controller" circuit by the beforementioned DPLL's (VCO) "Voltage Controlled Oscillator" (FIG. 106) circuit for "Veterbi" signal-analysis, and the previously mentioned data-streams final conversion into a 16-bit double data-word, which is next sent to a Disk Controller's "Buffer Controller" for temporary storage, so the beforementioned Data Sequencer's "Disk Controller Interface" and "ECC" circuits, as illustrated in FIGS. 62A, 63A, 62B, 63B, 62C, and 63C, can identify the temporarily stored data as belonging to the host requested target sector Consequently, if the beforementioned Data Sequencer's "Disk Controller Interface" and "ECC" circuits, as illustrated in FIGS. 62A, 63A, 62B, 63B, 62C, and 63C, make a positive target-sector identification of sector "43", then the read-data the previously mentioned Disk Controller's "Buffer Controller" has temporarily stored, will be presented to the host-system, through a Disk Controller's "IDE or SCSI Interface Controller" in the form of 16-bit data-blocks. Furthermore, during a read-data disk-operation after a full data-sector is read (i.e., for example sector "43" being a full sector of "1024k") into the beforementioned Disk Controller's "Buffer Controller" for temporary storage, the beforementioned Disk Controller's (ECC) "Error Correction Control" circuit module checks to see if the firmware stored in a Disk Controller's "Serial EEPROM" needs to apply (ECC) "Error Correction Control" to the previously mentioned and just read-data. Moreover, the beforementioned Disk Controller's "Buffer Controller" stores the previously mentioned and just read-data into a temporary memory-cache while (ECC) "Error Correction Code", if needed, is applied, if not, it then transmits the previously mentioned read-data to the beforementioned Disk Controller's "IDE or SCSI Interface Controller", which transmits the read data-sector "43" to the host-system through the IDE or SCSI interface system's bus channels.

Another preferred embodiment of the present invention, as illustrated in drawing FIGS. 64A and 64D, shows a Magneto-Optical Microhead Array Chip's write-channel circuit configurations, and its connectivity to the operational control of the Magneto-Optical Microhead Array Chip Hard Disk Drive's SCSI or IDE interfaces, which are both used to connect a Magneto-Optical Microhead Array Chip Hard Disk Drive up to a host computer system. Furthermore, a write-channel's signal-path within the Magneto-Optical Microhead Array Chip Hard Disk Drive design follows a reversed order to that of the previously described read-channel's signal-path. Furthermore, during a write-data disk-operation the previously mentioned host-system will present a 16-bit data-word data-block to a Magneto-Optical Microhead Array Chip Hard Disk Drive's unit-assembly, through its bus-system's bus channels to the beforementioned Disk Controller's "IDE or SCSI Interface Controller". Moreover, the beforementioned Disk Controller's "Buffer Controller" will temporarily store, during a write-data disk-operation, the previously mentioned 16-bit data-word data-block in a Magneto-Optical Microhead Array Chip Hard Disk Drive's cache-memory. Furthermore, because data-blocks can be presented to a Magneto-Optical Microhead Array Chip Hard Disk Drive at transfer-rates that exceeds the transfer-rate at which a Magneto-Optical Microhead Array Chip Hard Disk Drive can write-data to a Magneto-Optical Microhead Array Chip Hard Disk Drive disk-platter's data-surface; therefore, data is stored temporarily in the previously mentioned Buffer Controller's cache-memory. Furthermore, the beforementioned host-system can present data to a Magneto-Optical Microhead Array Chip Hard Disk Drive at transfer-rates independent of the transfer-rate at which a Magneto-Optical Microhead Array Chip Hard Disk Drive can write-data to a Magneto-Optical Microhead Array Chip Hard Disk Drive disk-platter's data-surface.

Therefore, upon correct identification of a target-address, the beforementioned data-block is shifted to a Data Sequencer's "Disk Controller Interface" and "ECC" circuits, as illustrated in FIGS. 62A, 63A, 62B, 63B, 62C, and 63C; wherein, (ECC) "Error Correction Code" is generated and appended to the beforementioned data-block. In addition, a Data Sequencer's "Data Encoder" converts the temporarily stored data-blocks into a (NRZ) "Non-Return to Zero" encoded serial data-stream. Moreover, the previously mentioned data-stream will be encoded into a (RLL) "Runtime Length Limited" data-stream. Furthermore, the beforementioned (RLL) "Runtime Length Limited" encoded data-stream will be transferred at a calculated and optimal data-transfer frequency-rate for the host requested and particular Magneto-Optical Microhead Array Chip Hard Disk Drive's data-zone, its being transferred to, as illustrated in FIGS. 62A, 63A, 62B, 63B, 62C, and 63C.

Furthermore, during a write-data disk-operation a Disk Controller's "Asynchronous Optical Microhead Address Controller" must first select one VCSEL microhead from a VCSEL's microhead array located within a particular host selected Magneto-Optical Microhead Array Chip. Moreover, after a single VCSEL microhead has been address selected, will a Data Sequencer's "Data Bus Controller" switch a Magneto-Optical Microhead Array Chip's (R/-W) "Read or Write" chip-control bus-signal from a (RE) "Read Enable" to a (WE) "Write Enabled", which is a logic-low low-voltage control-signal sent down a (R/-W) "Read or Write" chip-control bus-line to every Magneto-Optical Microhead Array Chip connected to a Magneto-Optical Microhead Array Chip Hard Disk Drive's bus-system, as illustrated in FIGS. 60A, 61A, 60B, 61B, 60C, and 61C. Furthermore, at a Magneto-Optical Microhead Array Chip Hard Disk Drive's precise rotational moment, when the host-requested disk-sector's disk-wedge, to be written too, is directly underneath the host selected VCSEL microhead, an encoded (RLL) "Runtime Length Limited" data-stream signal is transmitted from the previously mentioned Data Sequencer's "Data Bus Controller", as illustrated in FIGS. 62A, 63A, 62B, 63B, 62C, and 63C, to a host selected Magneto-Optical Microhead Array Chip's (DIN) "Data In" input-contact pin-number "63" (FIGS. 64A and 64C); wherein, the previously mentioned data-stream signal is re-routed to a host selected Magneto-Optical Microhead Array Chip's Write Pre-amp Circuit's (DIN) "Data In" input, where the beforementioned (RLL) "Runtime Length Limited" data-stream signal is pre-amplified and sent to a Write Driver's (DMOD1) "Data Modulated Input 1" Magneto-Optical Microhead Array Chip's input.

Furthermore, a Magneto-Optical Microhead Array Chip's (WDC) "Write Driver Circuit", as illustrated in FIGS. 96, 97, 98, 99, 100, and 101, will use the previously mentioned encoded (RLL) "Runtime Length Limited" data-stream's alternating high and low-voltage signals to "Rotate Toggle" the Write Driver Circuit's four transmission-gates (FIGS. 100 and 101), which control the direction of current flow through the previously mentioned two (BIMPIC) "Bi-Metal Planar Induction Coils" from a single direct-current (VDD) "+5 Volts" electrical energy-source, as illustrated in FIGS. 100 and 101. Moreover, the beforementioned (WDC) "Write Driver Circuit" alternately switches the direction of the previously mentioned direct-current electrical energy-source (FIGS. 100 and 101), through the Magneto-Optical Microhead Array Chips beforementioned two (BIMPIC) "Bi-Metal Planar Induction Coils".

Furthermore, the modulated switching of the beforementioned direct-current electrical energy-source (FIGS. 100 and 101) is controlled by the first of two (DIN) "Data In" (RLL) "Runtime Length Limited" data-stream signals, which are sent by a Disk Controller's Data Sequencer and received by a host selected Magneto-Optical Microhead Array Chip's, input-contact pin-number "63". Moreover, this first signal is then rerouted to a Write Driver Circuit's (DMOD1) "Data Modulation 1" input; wherein, the previously mentioned direct-current electrical energy-source (FIGS. 100 and 101) is sent to a dual write-input bus-conduit, which is capable of transferring alternating electrical currents (FIGS. 64A and 64D) to a host selected Magneto-Optical Microhead Array Chip's (PICCC) "Planar Induction Coil Control Circuit's" beforementioned two (BIMPIC) "Bi-Metal Planar Induction Coils". Moreover, causing laser beam isolated and thermally confined domain-cells of magnetized Tb—Fe—Co or Gd—Tb—Fe crystals to have their magnetic fields vertically align themselves in opposition with the (BIMPIC) "Bi-Metal Planar Induction Coils" induced vertical magnetic fields. Moreover, the previously mentioned vertical magnetic fields are being produced above the host selected Magneto-Optical Microhead Array Chip Hard Disk Drive disk-platter's data-surface.

Therefore, a host selected Magneto-Optical Microhead Array Chip's two write-input bus-conduits (WDCI (A)) and (WDCI (B)), or Write Driver Circuit Input (A) and Write Driver Circuit Input (B), as illustrated in FIGS. 64A and 64E, will be used to pass on a (VDD) "+5 Volt" direct-current electrical energy-source (FIGS. 100 and 101) to a host selected Magneto-Optical Microhead Array Chip's beforementioned two "Rotate Toggled" (BIMPIC) "Bi-Metal Planar Induction Coils", which are labeled as the "Alpha" and the "Beta" induction coils. Furthermore, a second (RLL) "Runtime Length Limited" data-stream signal is branched off from the previously mentioned Write Pre-amp Circuit's (DMOD1) "Data Modulated 1" pre-amplified output-line and re-routed to a host selected Magneto-Optical Microhead Array Chip's (PICCC) "Planar Induction Coil Control Circuit's" (DMOD2) "Data Modulated 2" input. Wherein, the previously mentioned (DMOD2) "Data Modulated 2" input signal is used to control the beforementioned (BIMPIC) "Bi-Metal Planar Induction Coils" "Rotate Toggle" selection for access to electrical current data-modulation. However, during a write-data disk-operation the beforementioned data-write process actually begins when a Disk Controller has received a write-data disk-operation request from the host-system; moreover, to write-data to a particular disk-platter's cylinder/track location containing a disk-sector or disk-sectors marked as empty or as available. For example, the previously mentioned host-system will send a write-data request through its respective computer's IDE or SCSI communication interface. Wherein, the write-data request is received by a Magneto-Optical Microhead Array Chip Hard Disk Drive's Disk Controller, and might look like this - Requested write-data using disk id: "0", at head number: "5", at cylinder/track number: "4562", at sector number: "43". Moreover, the previously mentioned Disk Controller's "Asynchronous Optical Microhead Address Controller", as illustrated in FIGS. 62A, 63A, 62B, 63B, 62C, and 63C, would receive the previously mentioned write-data request from a Magneto-Optical Microhead Array Chip Hard Disk Drive's Disk Controller and place it into its "Disk Controller Interface Register" (FIGS. 62C and 63C), where it would be held until a different microhead address is requested by the beforementioned host-system, or the beforementioned write-data disk-operation has been completed. Moreover, an Asynchronous Optical Microhead Address Controller's, as illustrated in FIGS. 62A, 63A, 62B, 63B, 62C, and 63C, "Address Translator" reads the previously mentioned address information from within a "Disk Controller Interface Register" and translates it into control code. Furthermore, the previously mentioned control code is then stored into an Address Translator's "Address Translator Register", where it is utilized by the beforementioned Disk Controller's "Asynchronous Optical Microhead Address Controller" to activate the required Magneto-Optical Microhead Array Chip's microhead addressing and Chip-Selection chip-control bus-system signal-lines.

Furthermore, an Asynchronous Optical Microhead Address Controller's "Address Translator", as illustrated in FIGS. 62A, 63A, 62C, and 63C, first tells an Asynchronous Optical Microhead Address Controller's "Address Unit" that Magneto-Optical Microhead Array Chip Number-"5" is basically equivalent to a conventional flying head numbered as Head Number-"5"; moreover, the beforementioned Asynchronous Optical Microhead Address Controller's response would be to enable the point-to-point (-CS4) "Chip Select" line number "4" (i.e., the chip select lines available within the present design are CS0, CS1, CS2, CS3, CS4, CS5, CS6, CS7) with a logic-low control-signal, as illustrated in FIGS. 60A, 61A, 60B, 61B, 60C, and 61C. Moreover, enabling of the previously mentioned (-CS4) "Chip Select" line number "4" begins a process that executes the selection of a single Magneto-Optical Microhead Array Chip, which is chosen because of its stationary location above the host-requested data-sectors that are present on disk-platter "3" disk-surface number "5". In addition, the beforementioned (-CS) "Chip Select" logic-low control-signal makes the previously mentioned Magneto-Optical Microhead Array Chip number "5" the only Magneto-Optical Microhead Array Chip that is connected to a Magneto-Optical Microhead Array Chip Hard Disk Drive's 32-bit microhead addressing bus-system able to latch into its "Address Latch Circuit", as illustrated in FIGS. 64A, 64B, and 64E, a particular VCSEL microhead's 32-bit address number, which is sent down a Magneto-Optical Microhead Array Chip Hard Disk Drive's thirty-two address-lines to all of the installed Magneto-Optical Microhead Array Chips that are connected to a Magneto-Optical Microhead Array Chip Hard Disk Drive's 32-bit microhead addressing bus-system, as illustrated in FIGS. 62A, 63A, 62B, 63B, 62C, and 63C.

However, at the same time as the previously mentioned 32-bit microhead addressing bus-system sends a (cylinder/track) and microhead address number "4562" down its thirty-two address bus-lines, which are connected to all Magneto-Optical Microhead Array Chips installed into a Magneto-Optical Microhead Array Chip Hard Disk Drive's unit-assembly, a chip-control bus-system control-signal called an (-AS) "Address Strobe" control-signal is simultaneously sent down its own chip-control bus-system signal line, which is connected to every installed Magneto-Optical Microhead Array Chip's input-contact pin-number "37", as illustrated in FIGS. 11 and 12. Moreover, through a simultaneous and combined execution of two logic-low control-signals for (-CS4) "Chip Select 4" line-number "5" at input-contact pin-number "38" and for (-AS) "Address Strobe" at input-contact pin-number "37", as illustrated in FIGS. 65, 66, 67, and 68, can a particular, in this case, Magneto-Optical Microhead Array Chip number "5" be selected for a host-requested write-data disk-operation.

Conclusion, a Magneto-Optical Microhead Array Chip, which is numbered as chip number "5" in a bus-system's daisy-chain flex-cable line-up is selected to tri-state latch (FIGS. 70A and 70B) the (cylinder/track) address number "4562" into its "Address Latch And Chip Select Circuit", as illustrated in FIGS. 69, 70A, and 70B. Furthermore, the beforementioned 32-bit microhead address number "4562" will stay latched in a Magneto-Optical Microhead Array Chip's tri-stated "Address Latch And Chip Select Circuit" as long as the beforementioned (-CS4) and (-AS) control-signal bus-system signal lines continue to have logic-low control-signals present on their signal bus lines.

In addition, the address inputs of a Magneto-Optical Microhead Array Chip consists of thirty-two input contact-pins; moreover, a Magneto-Optical Microhead Array Chip's microhead addressing bus-system signal inputs comprise "A0" to "A31", as illustrated in FIGS. 11, 12, 13, and 14. Furthermore, during a write-data disk-operation the microhead address number "4562" is latched into an "Address Latch And Chip Select Circuit" and stored. In the mean time an (-ADACK) "Address Acknowledge", circuit will send a logic-low control-signal down an (-ADACK) "Address Acknowledge" circuit's control bus-line. Moreover, the (-ADACK) control-signal is generated when (-CS4) and (-AS) circuits (FIGS. 65, 66, 67, and 68) are simultaneously enabled. Moreover, the (-CS4) and (-AS) circuits, as illustrated in FIGS. 65, 66, 67, and 68, are located within a host selected Magneto-Optical Microhead Array Chip's "Address Latch And Chip Select Circuit", illustrated by drawing FIGS. 69, 70A, and 70B. Furthermore, the beforementioned (-ADACK) control-signal is sent from a host selected Magneto-Optical Microhead Array Chip's output-contact pin-number "39", as illustrated in FIGS. 11, 12, 13, and 14, to a (-ADACK) "Address Acknowledge" input-contact, which is located at a Disk Controller's "Asynchronous Optical Microhead Address Controller", as illustrated in FIGS. 60A, 61A, 60C, 61C, located at a Magneto-Optical Microhead Array Chip Hard Disk Drive's PCB 63 (FIG. 4), 80 (FIG. 5).

In addition, a logic-low control-signal received at an (-ADACK) input-contact of the aforesaid "Asynchronous Optical Microhead Address Controller" tells the aforesaid "Asynchronous Optical Microhead Address Controller" that microhead address, number "4562", has been successfully latched into the beforementioned "Address Latch And Chip Select Circuit", as illustrated in FIGS. 69, 70A, and 70B, that is located in the host selected Magneto-Optical Microhead Array Chip number "5". Furthermore, the previously mentioned and successfully latched address signal is now sent from a 32-bit "Address Latch And Chip Select Circuit" down to a host selected Magneto-Optical Microhead Array Chip's 32-bit "Address Decoder Circuit", as illustrated in FIGS. 64A, 64B, 71, and 72. Subsequently, when the previously mentioned Magneto-Optical Microhead Array Chip's "Address Decoder Circuit" receives the aforesaid 32-bit microhead address signal it will reroute it to its internal "address tree decoder" for decoding, as illustrated in FIGS. 64A, 64B, 72, and 73. In addition, the decoding process of the previously latched 32-bit microhead address signal, by the "address tree decoder" circuit (FIGS. 71 and 72), will result in the enabling of one particular VCSEL microhead selection-line with a logic-high control-signal. Moreover, the previously mentioned VCSEL microhead selection-line also has, for the physical circuit-line it represents, an address number of "4562", which is the same as the host requested microhead's number.

In addition, what is called "inverter body effect", which is normally associated with, and caused by, any semiconductor circuits that contain a large number of semiconductor inverters, like the number of inverters present in an "address tree decoder" circuit, will ultimately be the cause of poor signal strength. Consequently, an address tree decoder's singularly enabled VCSEL microhead selection-line will need its logic-high control-signal regenerated by a host selected Magneto-Optical Microhead Array Chip's "Address Buffer Circuit" (FIGS. 73 and 74), or the aforesaid microhead selection-line's signal will suffer signal-loss, causing a VCSEL microhead selection error to occur. Furthermore, when a host selected Magneto-Optical Microhead Array Chip's "Address Decoder Circuit" sends a VCSEL microhead selection-line's signal to a host selected Magneto-Optical Microhead Array Chip's "Address Buffer Circuit", as illustrated in FIGS. 64A, 64B, 73, and 74, two very important and simultaneous processes will occur:

(i) A signal regeneration of an address tree decoder's only enabled VCSEL microhead selection-line, by a Magneto-Optical Microhead Array Chip's "Address Buffer Circuit", will occur.

(ii) An address tree decoder's unsolicited VCSEL microhead selection-lines are pulled-down to a ground state through a microhead selection-line's internal Long-L inverters, as illustrated in FIGS. 64A, 64B, and 74, where the pulling-down of the unsolicited VCSEL microhead selection-lines, into a grounded state, will also put the unsolicited VCSEL microhead selection-lines into a (Hi-Z) "High Impedance Line State".

Furthermore, every VCSEL microhead selection-line within a Magneto-Optical Microhead Array Chip have their circuit beginnings in an "Address Decoder Circuit" and their circuit endings occurring at their respective VCSEL microhead. Wherein, each selection-line is terminated with a selection-line transmission-gate control-circuit that is attached to a selection-line's circuit ending, as illustrated in FIGS. 64A, 64B, 64E, 107, and 111. Moreover, a selection-line's transmission-gate (FIGS. 107 and 111) will independently control its respective VCSEL's access to a power-bus line, as illustrated in FIGS. 107 and 111. However, (RLV) "Read Laser Voltage" and (WLV) "Write Laser Voltage" power-bus power signals are inputted at a VCSEL microhead array's (FIGS. 107 and 111) (LVIN) "Laser Voltage In" input (FIGS. 64A and 64E), or to be more specific, switching between the (RLV) "Read Laser Voltage" and the (WLV) "Write Laser Voltage" power-bus power signals, occurs within a Magneto-Optical Microhead Array Chip's (VCSEL Microhead PCC) "Vertical Cavity Surface Emitting Laser Power Control Circuit", as illustrated in FIGS. 64A, 64D, 109, and 110, while the execution of the switching itself is controlled by a "R/W Control Circuit", as illustrated in FIGS. 87, 88, 89, and 90.

In addition, the actual switching on and off of electrical power and current to host selected VCSEL microhead array (RLV) "Read Laser Voltage" and (WLV) "Write Laser Voltage" power-bus power signal input-lines is executed by a Data Sequencer's "Data Bus Controller", as illustrated in FIGS. 62A, 63A, 62B, 63B, 62C, and 63C. Furthermore, during a write-data disk-operation a "R/W Control Circuit", as illustrated in FIGS. 87, 88, 89, and 90, must first enable a host selected Magneto-Optical Microhead Array Chip's write-channel with a (WE) "Write Enable" logic-low control-signal. Furthermore, in order for Magneto-Optical Microhead Array Chip Hard Disk Drives to commence disk-operations as quickly as possible the aforesaid R/W Control Circuit's default setting, after a "Power-On-Restart" or "Power-On-Initialization", is to have a host selected Magneto-Optical Microhead Array Chip's read-channel enabled. The purpose of enabling a host selected Magneto-Optical Microhead Array Chip's read-channel, after a "Power-On-Restart" or "Power-On-Initialization", is so (OP Code) "Operational Code", which is usually stored on cylinder/track "0", can be read from a particular disk-platter into a buffer's (SDRAM) "Synchronous Dynamic Random Access Memory" memory area, which is put aside for the execution of a Magneto-Optical Microhead Array Chip Hard Disk Drive's (OP Code) Operational Code's disk and system operating instructions.

In addition, a (R/-W) "Read or Write enable" control-signal bus-system, which enables or disables a write-channel, consists of three control logic circuits:

(i) A (R/-W) "Read or Write enable" control-bus signal-line, which is connected at input-contact pin-number "35".

(ii) A (+5) "VDD" control-bus signal-line, which is connected at input-contact pin-number "34".

(iii) An Asynchronous Optical Microhead Address Controller's (-CS) "Chip Select" point-to-point signal-line, which is connected at input-contact pin-number "38".

Moreover, the three logic circuits are located in every Magneto-Optical Microhead Array Chip, as illustrated in FIGS. 64A, 64C, 87, 88, 89, and 90, installed into a Magneto-Optical Microhead Array Chip Hard Disk Drive's unit-assembly. Furthermore, to enable a write-channel within a host selected Magneto-Optical Microhead Array Chip, during a write-data disk-operation, three logic conditions must simultaneously occur within the host requested Magneto-Optical Microhead Array Chip's "R/W Control Circuit":

(i) A logic-high control-signal received at a host selected Magneto-Optical Microhead Array Chip's input-contact pin-number "34" (+5V) "VDD".

(ii) A logic-low control-signal received at a host selected Magneto-Optical Microhead Array Chip's input-contact pin-number "38" (-CS) "Chip Select".

(iii) A logic-low control-signal received at a host selected Magneto-Optical Microhead Array Chip's input-contact pin-number "35" (R/-W) Read or Write enable".

Moreover, the three control-bus signal-lines must simultaneously have three logic signal-conditions present on their control-bus signal-lines in order for a host selected Magneto-Optical Microhead Array Chip's write-channel to become enabled for a write-data disk-operation. For example, to select an installed Magneto-Optical Microhead Array Chip labeled as number "5" a physical re-direction of an Asynchronous Optical Microhead Address Controller's point-to-point (CS4) "Chip Select" line-number "4" must occur. Moreover, this will occur at the fifth Magneto-Optical Microhead Array Chip's chip-positioning circuit board copper circuit-trace number "53" (FIG. 21), which is used for (-CS3) "Chip Select" line-number "4", which is cross-connected from the input-contact pin-number "53" of a chip-positioning circuit board's Polymer flex-cable spring-contact connector 67 (FIGS. 2, 3, and 10) to (-CS) "Chip Select" and null input-contact at pin-number "38" of a host-requested Magneto-Optical Microhead Array Chip's chip-positioning circuit board's surface mounted chip-socket 5 (FIGS. 7, 8, and 21).

Furthermore, every installed Magneto-Optical Microhead Array Chip is connected to a Magneto-Optical Microhead Array Chip Hard Disk Drive's three-bus system, which are labeled as:

i. The "Address Bus" bus-system.
ii. The "Data I/O Bus" bus-system.
iii. The "Chip Control Bus" bus-system.

Thereafter, the host selected Magneto-Optical Microhead Array Chip, which is labeled as Magneto-Optical Microhead Array Chip number "5", becomes the only Magneto-Optical Microhead Array Chip connected to a Magneto-Optical Microhead Array Chip Hard Disk Drive's bus-system to have its write-channel, during a write-data disk-operation, activated. While all of the other installed Magneto-Optical Microhead Array Chips connected to a Magneto-Optical Microhead Array Chip Hard Disk Drive's bus-system, would have their write-channels three-stated into a (Hi-Z) "High Impedance Line State".

Furthermore, the host selected Magneto-Optical Microhead Array Chip write-channel's I/O is enabled when a (WE) "Write Enable" logic-high control signal is sent to a host selected Magneto-Optical Microhead Array Chip's "R/W Control Circuit". In addition, a write-channel's two line-drivers, as illustrated in FIGS. 96, 97, 98, and 99, will receive a R/W Control Circuit's (WE) "Write Enable" logic-high control-signal; thereby, activating the aforesaid write-channel's I/O connectivity to a Magneto-Optical Microhead Array Chip Hard Disk Drive's bus-system and its Disk Controller as well. Moreover, two logic-high control-signals were also sent by the previously mentioned write-channel's two line-drivers, where they entered the (A) and (B) input-terminals of a write-channel's double NAND (-WDTACK) "Write Data Acknowledge" control-circuit. Moreover, if the previously mentioned two input-terminals (A) and (B) of a write-channel's double NAND (-WDTACK) "Write Data Acknowledge" control-circuit, as illustrated in FIGS. 102, 103, 104, and 105, were to receive logic-high control-signals, then the write-channel's double NAND (-WDTACK) "Write Data Acknowledge" control-circuit, would in response, output a (-WDTACK) "Write Data Acknowledge" logic-low control-signal out onto a (-WDTACK) "Write Data Acknowledge" control-bus signal line, which is connected to all output-contacts with a pin-number of "40" of every installed Magneto-Optical Microhead Array Chip, as illustrated in FIGS. 64A, 64C, and 64D. In addition, a Magneto-Optical Microhead Array Chip's (-WDTACK) "Write Data Acknowledge" logic-low control-signal, after being sent to pin-number "40", will travel through a Magneto-Optical Microhead Array Chip Hard Disk Drive's bus-system Polymer flex-cable's (-WDTACK) "Write Data Acknowledge" control-bus signal line 30, 36 (FIGS. 1 and 6) until it reaches a (-WDTACK) "Write Data Acknowledge" input, which is located at a Data Sequencer's "Data Bus Controller", as illustrated in FIGS. 62A, 63A, 62C, and 63C. Moreover, after the previously mentioned Data Sequencer's "Data Bus Controller" has received the beforementioned (-WDTACK) "Write Data Acknowledge" logic-low control-signal the aforesaid Data Sequencer's "Data Bus Controller", will know, that a host selected Magneto-Optical Microhead Array Chip's write-channel is open and ready to write host-requested data to data-sector "43", which is located on cylinder/track "4562", using address selected VCSEL microhead "4562".

Furthermore, a (VCSEL Microhead PCC) "Vertical Cavity Surface Emitting Laser Microhead Power Control Circuit" also receives a (WE) "Write Enable" logic-high control-signal from the beforementioned "R/W Control Circuit", which will cause the aforesaid VCSEL Microhead PCC's transmission-gate controller to switch its selection (FIGS. 109 and 110) of (WLV) "Write Laser Voltage" bus-line, over to the (RLV) "Read Laser Voltage" bus-line. Moreover, the switch selected (WLV) "Write Laser Voltage" bus-line can now channel a Write Laser Voltage to a (LVOUT) "Laser Voltage Output" circuit terminal (FIGS. 109 and 110), which leads to a host selected Magneto-Optical Microhead Array Chip VCSEL microhead array's input terminal (LVIN) "Laser Voltage Input" terminal (FIGS. 107 and 111), and although the previously mentioned (WLV) "Write Laser Voltage" power-line (FIGS. 107 and 111) has been selected for a host-requested write-data disk-operation no electrical-current will be sent to the host selected VCSEL microhead; at least, not until the host requested data-sector passes directly underneath the previously selected VCSEL's microhead. Moreover, when the host requested data-sector rotates directly underneath the previously selected VCSEL's microhead will a high-output of electrical current be sent down a (WLV) "Write Laser Voltage" power-line (FIGS. 107 and 111) turning on a host selected VCSEL microhead's high-powered write-data laser emission.

Furthermore, "Hall-Sensors" (i.e., not shown here) will provide the radial position of any data-sector, at all times, on-the-fly; moreover, through the permanent-magnetic rotary-elements located in the spindle motor's rotor, which are relative to the fixed windings and poles of the "Spindle-Motor" 59 (FIGS. 2 and 3) stator. Typically, the previously mentioned "Hall-Sensors" (i.e., not shown here) will provide response-control information to the beforementioned "Spindle And Power Controller" 60 (FIG. 4), 82 (FIG. 5); moreover, the beforementioned Spindle-Motor's driver-circuit. In addition, the aforesaid "Hall-Sensors" (i.e. not shown here) will also provide a Magneto-Optical Microhead Array Chip Hard Disk Drive's disk-platters rate of rotation, and positional information, which is necessary in an "ID-less Tracking Format", to the beforementioned "Spindle And Power Controller" 60 (FIG. 4), 82 (FIG. 5). In addition, during a host-requested write-data disk-operation, the beforementioned "Spindle And Power Controller" 60 (FIG. 4), 82 (FIG. 5), will, in-turn, send this information to the beforementioned Disk Controller's "Data Sequencer", which, in turn, will control the on and off switching of the previously mentioned (WLV) "Write Laser Voltage" power-line's electric current, which is based upon the rate of rotation, and positional information it receives.

In addition, a "Write Driver Circuit" has four transmission-gates, which it uses to control the directional-flow of the previously mentioned (VDD) "+5 Volt" direct-current; moreover, a (VDD) "+5 Volt" direct-current, which can be swiftly directed, or redirected, through a switch toggling of the beforementioned (VDD) "+5 Volt" direct-current's current, between Input (A) or Input (B) bus-conduits. Moreover, the Input (A) or Input (B) bus-conduits are in-turn connected to a host selected Magneto-Optical Microhead Array Chip's "Alpha" and/or "Beta" (BIMPIC) "Bi-Metal Planar Induction Coil", as illustrated in FIGS. 64A and 64D. Specifically, and to explain further, the beforementioned (VDD) "+5 Volt" direct-current's current (FIGS. 100 and 101) will travel through a Write Driver Circuit's Input (A) bus-conduit (FIGS. 100 and 101) to a Write Channel PICCC Bus For WDC Input (A)'s power-bus (FIGS. 77 and 78), which is connected to a host selected Magneto-Optical Microhead Array Chip's "Alpha" coil's (PIC1I) "Planar Induction Coil 1 input" 97 (FIGS. 41, 42, 77, and 78) of a "Rotate Toggle" selected (BIMPIC) "Bi-Metal Planar Induction Coil", as illustrated in FIGS. 77 and 78.

However, if reversed, a (VDD) "+5 Volt" direct-current's current (FIGS. 100 and 101) will travel through a Write Driver Circuit's Input (B) bus-conduit (FIGS. 100 and 101) to a Write Channel PICCC Bus For WDC Input (B)'s power-bus (FIGS. 77 and 78), which is connected to a host selected Magneto-Optical Microhead Array Chip's "Beta" coil's (PIC2I) "Planar Induction Coil 2 input" 99 (FIGS. 41, 42, 77, and 78) of a "Rotate Toggle" selected (BIMPIC) "Bi-Metal Planar Induction Coil", as illustrated in FIGS. 77 and 78. Whereby, data-storing magnetic-reversals and "Rotate Toggling" of a host selected Magnet-Optical Microhead Array Chip's two (BIMPIC) "Bi-Metal Planar Induction Alpha and Beta Coils" occurs according to a (RLL) "Runtime Length Limited" data-stream controlled (i.e., modulated) transmission-gate switching of a (VDD) "+5 Volt" direct-current's current-reversals, which are sent to the previously mentioned Write Driver Circuit's Input bus-conduits (A) and (B), as illustrated in FIGS. 64A, 64D, 100, and 101. For example, when the two transmission-gates that control a (VDD) "+5 Volt" direct-current's access to the previously mentioned Write Driver Circuit's Input (A) bus-conduit are switched on by a (RLL) "Runtime Length Limited" data-stream logic-high bit-input (FIGS. 100 and 101), or when the beforementioned two transmission-gates that control the (VDD) "+5 Volt" direct-current's access to the Write Driver Circuit's Input (B) bus-conduit are switched off, moreover, allowing the aforesaid Write Driver's beforementioned (VDD) "+5 Volt" direct-current to flow from the beforementioned Write Driver Circuit's Input (A) bus-conduit to an "Alpha" coil's (PIC1I) "Planar Induction Coil 1 Input" 97 (FIGS. 41, 42, 77, and 78) moving through the beforementioned "Alpha" coil causing magnetic induction, while exiting out through an "Alpha" coil's (PIC1O) "Planar Induction Coil 1 Output" 98 (FIGS. 41, 42, 77, and 78), and continuing on out to a Write Driver Circuit's Input (B) bus-conduit, which is switched off causing a re-routing of the Write Driver Circuit's (VDD) "+5 Volt" direct-current to be pulled to a Write Driver Circuit's ground; moreover, causing a host selected domain-cell's magnetic field to vertically align into an upward position, as illustrated in FIGS. 96, 97, 100, and 101.

However, when the beforementioned two transmission-gates that control the beforementioned (VDD) "+5 Volt" direct-current's access to the previously mentioned Write Driver Circuit's Input (A) bus-conduit are switched off by a (RLL) "Runtime Length Limited" data-stream logic-low bit-input (FIGS. 100 and 101), the beforementioned two transmission-gates that control the beforementioned (VDD) "+5 Volt" direct-current's access to the previously mentioned Write Driver Circuit's Input (B) bus-conduit are switched on; moreover, allowing the aforesaid Write Driver's beforementioned (VDD) "+5 Volt" direct-current to flow from a Write Driver Circuit's Input (B) bus-conduit to a "Beta" coil's (PIC2I) "Planar Induction Coil 2 Input" 99 (FIGS. 41, 42, 77, and 78) moving through a "Beta" coil causing magnetic induction, while exiting out through a "Beta" coil's (PIC2O) "Planar Induction Coil 2 Output" 96 (FIGS. 41, 42, 77, and 78), and continuing on out to a Write Driver Circuit's Input (A) bus-conduit, which is switched off, causing a re-routing of a Write Driver Circuit's (VDD) "+5 Volt" direct-current to be pulled to a Write Driver Circuit's ground; moreover, causing a host selected domain-cell's magnetic field to vertically align into an downward position, as illustrated in FIGS. 96, 97, 100, and 101.

In addition, each of the beforementioned Write Driver Circuit's (VDD) "+5 Volt" direct-current's current-pathways, which are illustrated as (WDCI (A)) and (WDCI (B)); moreover, will, each use a MOSFET device (FIGS. 100 and 101) to maintain current-load on its current-pathway; eliminating any jitter distortion that might be caused by a slow rising of electrical charge within each direct-current's pathway. In addition, every chip-positioning circuit board installed into a Magneto-Optical Microhead Array Chip Hard Disk Drive's unit-assembly comprising a surface mounted chip socket will also have a single surface mounted auxiliary component containing two induction-coils 117 (FIGS. 1, 2, 3, 29, 30, 31, 32, 33, 34, 35, 36, and 37). Moreover, the previously mentioned surface mounted auxiliary component containing two induction-coils is attached to the previously mentioned chip-positioning circuit board with two solder leads present on the beforementioned chip-positioning circuit board's outer-surface 116 (FIGS. 1, 2, 3, 29, 30, 31, 32, 33, 34, 35, 36, and 37). Furthermore, the previously mentioned surface mounted auxiliary component containing two induction-coils, while being connected to its respective Magneto-Optical Microhead Array Chip, through the beforementioned Magneto-Optical Microhead Array Chip's four metal contacts located at the bottom-edge bottom-surface of every Magneto-Optical Microhead Array Chip, and four other metal contacts located in the bottom-edge top-surface of every surface mounted chip-socket 119, 120 (FIGS. 30, 32, 35, and 37).

Furthermore, the first auxiliary induction-coil, which is located within the previously mentioned surface mounted auxiliary component is the second auxiliary induction-coil, and has an impedance rating larger than either of the two (BIMPIC) "Bi-Metal Planar Induction Alpha or Beta Coils". Moreover, the first auxiliary induction-coil has its (AIC1O) "Auxiliary Induction Coil One Out" output-line connected to its respective surface mounted chip socket's (AIC1O) "Auxiliary Induction Coil One Out" output-contact number "66", while its (AIC1I) "Auxiliary Induction Coil One In" input-line is connected to its respective surface mounted chip socket's (AIC1I) "Auxiliary Induction Coil One In" input-contact number "65".

Furthermore, the second auxiliary induction-coil is located within the previously mentioned surface mounted auxiliary component as is the first auxiliary induction-coil, and has an impedance rating larger than either of the two (BIMPIC) "Bi-Metal Planar Induction Alpha or Beta Coils". Moreover, the beforementioned second auxiliary induction-coil has its (AIC2O) "Auxiliary Induction Coil Two Out"

output-line connected to its respective surface mounted chip socket's (AIC2O) "Auxiliary Induction Coil Two Out" output-contact number "68", while its (AIC2I) "Auxiliary Induction Coil Two In" input-line is connected to its respective surface mounted chip socket's (AIC2I) "Auxiliary Induction Coil Two In" input-contact number "67".

Furthermore, the previously mentioned first and second load balancing MOSFET circuits also selectively balance the loads of the first and previously mentioned second auxiliary coils; wherein, the first load balancing MOSFET circuit will balance the load of the beforementioned first auxiliary coil when a selected (BIMPIC) "Bi-Metal Planar Induction Alpha or Beta Coil" (FIGS. 64A, 64D, 77, and 78) is driven by the beforementioned Write Driver Circuit's VDD direct-current. In addition, the second load balancing MOSFET circuit will balance the load of the beforementioned second auxiliary coil when a selected (BIMPIC) "Bi-Metal Planar Induction Alpha or Beta Coil" (FIGS. 64A, 64D, 77, and 78) is driven by the beforementioned Write Driver Circuit's VDD direct-current. Moreover, since a load impedance for each auxiliary coil are fixed at all times the charging currents of the respective auxiliary coils can be made equal to each other, at all times. Therefore, it is possible to set the value of a drive current for a selected (BIMPIC) "Bi-Metal Planar Induction Alpha or Beta Coil" (FIGS. 64A, 64D, 77, and 78) to be equal in one direction to that of a drive current in the opposite direction, so that distortion free recording of data during a write-data disk-operation can occur.

In addition, while no transmission-gate is provided between the respective auxiliary induction-coil and a selected (BIMPIC) "Bi-Metal Planar Induction Alpha or Beta Coil" (FIGS. 64A, 64D, 77, and 78) the drive current can be nominally inverted immediately after an inversion occurs in the recording signal; therein, allowing the beforementioned Write Driver Circuit's VDD direct-current to suddenly rise or fall. In addition, since the beforementioned load of a respective auxiliary induction-coil does not constantly attain "0" the circuits power consumption is significantly reduced. Furthermore, with the beforementioned Write Driver Circuit's VDD direct-current being supplied to each auxiliary induction-coil, the constant charging of an auxiliary induction-coil is made possible; therein, enabling an auxiliary induction-coil to be sufficiently charged, while enabling the beforementioned Write Driver Circuit's VDD direct-current, through a selected (BIMPIC) "Bi-Metal Planar Induction Alpha or Beta Coil" (FIGS. 64A, 64D, 77, and 78) to rise or fall.

Furthermore, during a host requested write-data disk-operation a host selected Magneto-Optical Microhead Array Chip's (BIMPIC) "Bi-Metal Planar Induction Alpha and Beta Coils" (FIGS. 64A, 64D, 77, and 78) are simultaneously switched on by a logic-high control-signal called the (WE) "Write Enable" control-signal. Moreover, the previously mentioned (WE) "Write Enable" logic-high control-signal will come from the beforementioned "R/W Control Circuit" (FIGS. 64A and 64D), and will enter the (WE) inputs of four write-channel I/O data circuits, including the beforementioned (PICCC) "Planar Induction Coil Control Circuit" (FIGS. 64A and 64D); thereby, enabling the connectivity of a host selected Magneto-Optical Microhead Array Chip's write-channel. Simultaneously, a (RE) "Read Disable" logic-low control-signal will come from the beforementioned "R/W Control Circuit" (FIGS. 64A and FIG. 64D), and will enter the (RE) inputs of four read-channel I/O data circuits; thereby, disabling the connectivity of a host selected Magneto-Optical Microhead Array Chip's read-channel.

In addition, a host selected Magneto-Optical Microhead Array Chip's (BIMPIC) "Bi-Metal Planar Induction Alpha and Beta Coils" (FIGS. 64A, 64D, 77, and 78) are simultaneously "Switch Toggled" on during read-data disk-operations, but are "Rotate Toggled" on and off during write-data disk-operations. Furthermore, during a host-requested write-data disk-operation a Data Sequencer's "Data Encoder" will send a (RLL) "Runtime Length Limited" data-stream signal, via the (WR DATA) "Write Data" data-bus, to all of the installed Magneto-Optical Microhead Array Chip's (DIN) "Data In" input-contact, pin-number "63", as illustrated in FIGS. 60A, 61A, 60B, 61B, 60C, and 61C. Moreover, the previously mentioned (RLL) "Runtime Length Limited" data-stream signal entering the host selected Magneto-Optical Microhead Array Chip's (DIN) "Data In" input contact pin-number "63" is internally re-routed to two different Magneto-Optical Microhead Array Chip's data modulating circuit areas, as illustrated in FIGS. 64A and 64D. Therefore, the first (RLL) "Runtime Length Limited" data-stream signal is re-routed to a (DMOD1) "Data Modulation 1" input of the beforementioned (WDC) "Write Driver Circuit" (FIGS. 64A and 64D), after being received from the beforementioned Write Preamp Circuit's pre-amplified signal output-line, as illustrated in FIGS. 98 and 99. In addition, the second (RLL) "Runtime Length Limited" data-stream signal is re-routed from a Write Preamp Circuit's pre-amplified signal output-line (FIGS. 98 and 99), by branching off an additional output-line from the beforementioned Write Preamp Circuit's pre-amplified signal output-line, and re-routing it to a (DMOD2) "Data Modulation 2" input of the beforementioned (PICCC) "Planar Induction Coil Control Circuit", as illustrated in FIGS. 64A, 64D, 75, 76, 77, and 78.

Furthermore, within the previously mentioned (PICCC) "Planar Induction Coil Control Circuit" the beforementioned second (RLL) "Runtime Length Limited" data-stream signal, after entering a (PICCC) Planar Induction Coil Control Circuit's Flip-Flop circuit, the data-stream signal is split into two overlapping and digitally opposing transmission-gate modulation control-signals (FIGS. 75, 76, 77, and 78), and placed onto two separate control-bus lines; Flip-Flop control-bus line-number "01", and Flip-Flop control-bus line-number "02", as illustrated in FIGS. 75 and 76. Furthermore, the previously mentioned Flip-Flop control-bus output-signals are used to "Switch Toggle" the beforementioned (BIMPIC) Bi-Metal Planar Induction Alpha and Beta Coil's (FIGS. 64A, 64D, 77, and 78) accessibility to the beforementioned "Write Channel PICCC Bus For WDC Input (A)" bus-circuit, which is connected to the beforementioned (WDCI (A)) Write Driver Circuit's Input (A) data-writing direct-current output-signal, or the beforementioned "Write Channel PICCC Bus For WDC Input (B)" bus-circuit, which is connected to the beforementioned (WDCI (B)) Write Driver Circuit's Input (B) data-writing direct-current output-signal.

Furthermore, the beforementioned Flip-Flop (FIG. 74 and FIG. 75) control-bus line-number "01" connects to four transmission-gates, which control the aforesaid "Alpha" coil's access to the beforementioned (WDCI (A)) Write Driver Circuit's Input (A) data-writing direct-current output-signal, while the beforementioned Flip-Flop control-bus line-number "02" connects to four transmission-gates, which control the aforesaid "Beta" coil's access to the beforementioned (WDCI (B)) Write Driver Circuit's Input (B) data-writing direct-current output-signal. For example, when the beforementioned Flip-Flop circuit's (DMOD2) "Data Modulation 2" input connection receives a logic-high data-bit modulation signal, the beforementioned flip-flop's control-bus line-number "01" receives from the beforementioned Flip-Flop circuit a logic-high control-signal; therein, opening the aforesaid "Alpha" coil's access to the beforementioned (WDCI (A)) Write Driver Circuit's Input (A) data-writing direct-current output-signal, as illustrated in FIGS. 64A, 64D, 77, and 78; thereby, causing a host selected data-surface's domain-cell to become vertically magnetized into an upward direction, which represents a binary "1" logic-high data-bit, as illustrated in FIGS. 96, 97, 100, and 101. Simultaneously, when the beforementioned flip-flop's control-bus line-number "02" receives from the beforementioned Flip-Flop circuit a logic-low control-signal; therein, closing the aforesaid "Beta" coil's access to the beforementioned (WDCI (B)) Write Driver Circuit's Input (B) data-writing direct-current output-signal, as illustrated in FIGS. 64A, 64D, 77, and 78. However, when the beforementioned Flip-Flop circuit's (DMOD2) "Data Modulation 2" input connection receives a logic-low data-bit modulation signal, the beforementioned flip-flop's control-bus line-number "01" receives from the beforementioned Flip-Flop circuit a logic-low control-signal; therein, closing the aforesaid "Alpha" coil's access to the beforementioned (WDCI (A)) Write Driver Circuit's Input (A) data-writing direct-current output-signal, as illustrated in FIGS. 64A, 64D, 77, and 78. Simultaneously, when the beforementioned flip-flop's control-bus line-number "02" receives from the beforementioned Flip-Flop circuit a logic-high control-signal; therein, opening the aforesaid "Beta" coil's access to the beforementioned (WDCI (B)) Write Driver Circuit's Input (B) data-writing direct-current output-signal, as illustrated in FIGS. 64A, 64D, 77, and 78; thereby, causing a host selected data-surface's domain-cell to become vertically magnetized into a downward direction, which represents a binary "0" logic-low data-bit, as illustrated in FIGS. 96, 97, 100, and 101. Therefore, during write-data disk-operations, when the beforementioned (BIMPIC) "Bi-Metal Planar Induction Alpha and Beta Coils" are used to transcribe data to a Magneto-Optical Microhead Array Chip Hard Disk Drive disk-platter's data-surface (FIGS. 64A, 64D, 77, and 78), the aforesaid "Alpha" coil will always be used to transcribe a binary "1" logic-high data-bit to a host selected Magneto-Optical Microhead Array Chip Hard Disk Drive disk-platter's data-surface, while the aforesaid "Beta" coil will always be used to transcribe a binary "0" logic-low data-bit to a host selected Magneto-Optical Microhead Array Chip Hard Disk Drive disk-platter's data-surface.

Furthermore, during a write-data disk-operation an address selected VCSEL microhead will activate its data-writing high-power output laser, while at the same time one of the beforementioned (BIMPIC) "Bi-Metal Planar Induction Alpha and Beta Coils" applies a vertical magnetic field to a host selected Magneto-Optical Microhead Array Chip Hard Disk Drive disk-platter's data-surface. Moreover, an address selected VCSEL microhead's data-writing high-power output laser emissions will raise the temperature of a "200" nanometers in diameter domain-cell containing a rare-earth recording material like (TMFeCo) "Terbium-Iron-Cobalt" or (GdTbFe) "Gadolinium-Terbium iron", to go, just beyond its curie-point, while at the same time one of the beforementioned two (BIMPIC) "Bi-Metal Planar Induction Alpha and Beta Coils" applies a vertical magnetic field to a host selected Magneto-Optical Microhead Array Chip Hard Disk Drive disk-platter's data-surface; moreover, a vertical magnetic field, which corresponds to either a vertically upward or a vertically downward magnetic direction. Moreover, if a host selected Magneto-Optical Microhead Array Chip Hard Disk Drive disk-platter's data-surface domain-cell contains (TbFeCo) "Terbium-Iron-Cobalt" or (GdTbFe) "Gadolinium-Terbium-Iron" crystals having an upward magnetic direction they represent a binary "1"; however, if a host selected Magneto-Optical Microhead Array Chip Hard Disk Drive disk-platter's data-surface domain-cell contains (TnFeCo) "Terbium-Iron-Cobalt" or (GdTbFe) "Gadolinium-Terbium-Iron", crystals having a downward magnetic direction they represent a binary "0".

What is claimed is:

1. A magneto-optical data-storage hard disk drive that stores digital information magneto-optically using stationary magneto-optical microhead array chips instead of conventional flying-heads and rotary voice-coil actuators, comprising:
   a) a hard disk drive enclosure,
   b) a hard disk drive controller,
   c) a spindle-motor,
   d) at least one statically positioned magneto-optical microhead array chip, and
   e) at least one disk-platter coated with a non-volatile memory medium and rotated at a substantially constant angular velocity,
   whereby, said magneto-optical microhead array chip hard disk drive successfully replaces a non-stationary flying-heads technology with a stationary technology, which is during catastrophic disk failure non-destructive to said digital information previously transcribed onto said data-platter.

2. The magneto-optical data-storage hard disk drive according to claim 1 further including a chip-positioning circuit board providing means for the installation of a top-installed bottom data-surface magneto-optical microhead array chip, comprising:
   a) a rigid material core,
   b) several layers of insulation,
   c) sixty-four circuit traces,
   d) a surface mounting chip-socket,
   e) two top-surface flex-cable connectors,
   f) two flex-cables,
   g) two bottom-surface flex-cable connectors,
   h) two bridge system flex-cables, and
   i) a top-installed bottom data-surface magneto-optical microhead array chip.

3. The magneto-optical data-storage hard disk drive according to claim 1 further including a chip-positioning circuit board providing means for installation of a bottom-installed top data-surface magneto-optical microhead array chips comprising:
   a) a rigid material core,
   b) several layers of insulation,
   c) sixty-four circuit traces,
   d) a surface mounting chip-socket,
   e) two flex-cable connector termination caps,
   f) two flex-cables,
   g) two bottom-surface flex-cable connectors, and
   h) a bottom-installed top data-surface magneto-optical microhead array chip.

4. The magneto-optical data-storage hard disk drive according to claim 1 further including a chip-positioning circuit board providing means for the installation and simultaneous positioning of one top-installed bottom data-surface magneto-optical microhead array chip and one bottom-installed top data-surface magneto-optical microhead array chip, comprising:

a) a rigid material core,
b) several layers of insulation
c) one hundred twenty-eight circuit traces,
d) two surface mounting chip-sockets,
e) two top-surface flex-cable connectors,
f) four flex-cables,
g) two bottom-surface flex-cable connectors,
h) a top-installed bottom data-surface magneto-optical microhead array chip, and
i) a bottom-installed top data-surface magneto-optical microhead array chip.

5. The magneto-optical data-storage hard disk drive according to claim 1 further including a scsi or an ide disk controller providing means for control-system, memory-system, and host-system interfacing electronics, which locate and give access to used or unused data-areas of said disk-platter, comprising:

a) a printed circuit board with circuit traces,
b) a fifty-pin scsi or a forty-pin ide interface connector,
c) a serial eprom memory,
d) a synchronous dynamic random access buffer memory,
e) an optical microhead and disk controller with scsi or ide interface,
f) a spindle and power controller,
g) an asynchronous optical microhead address controller, and
h) a synchronous optical microhead resource controller.

6. The magneto-optical data-storage hard disk drive according to claim 1 further including a cmos construction method providing means for creating fully integrated top-installed bottom data-surface magneto-optical microhead array chips and fully integrated bottom-installed top data-surface magneto-optical microhead array chips, comprising:

a) a vcsel microhead array,
b) a photo-detector array,
c) a bi-metal air-core induction coil,
d) a thirty-two bit address latch and chip select circuit,
e) a thirty-two bit address decoder circuit,
f) a thirty-two bit address buffer circuit,
g) a microhead selection and coil rotation circuit,
h) a read and write analog input and output signal bus,
i) a read pre-amplifier circuit,
j) a read decision circuit,
k) a read buffer circuit,
l) a writer driver circuit,
m) a write pre-amplifier circuit, and
n) a read and write control circuit.

7. A dedicated head-to-track magneto-optical data-storage fixed disk drive that uses a multitude of stationary micro-heads instead of conventional flying-heads, flying-head rotary voice-coil actuators, or flying-head rotary positioners to store or retrieve data magneto-optically to or from disk-platter data-surfaces, comprising:

a) an enclosure providing for the installation of magneto-optical micro-head array chip hard disk drive components,
b) at least one parallel circuit allowing transference of electrical impulses to or from at least one connected plurality of amplitude modulated vcsel microheads, and at least one connected plurality of photo-detectors, with at least one integrated circuit that comprises at least one central processing unit,
c) an arrangement of coils and magnets that converts electric current into mechanical power providing for a rotation of at least one non-volatile data-storage memory medium,
d) at least one rotatable non-volatile data-storage memory medium having at least one data-surface used in the transcription or retrieval of said digital information to or from said disk-platter data-surfaces, and
e) a circuit integrated plurality of amplitude modulated vcsel and photo-detector microheads, and a cordless induction coil, which is positioned into a stationary location above said disk-platter data-surfaces of said rotatable non-volatile data-storage memory medium, whereby, a stationary amplitude modulated vcsel microhead positioned above a host requested cylinder-track location is switched on, while a different stationary amplitude modulated vcsel microhead positioned above a previously requested cylinder-track location is simultaneously switched off, and whereby, the average-seek-times of said dedicated head-to-track magneto-optical data-storage fixed disk drive is greatly decreased over said average-seek-times of flying-head magnetic or flying-head optical hard disk drives.

8. The dedicated head-to-track magneto-optical data-storage fixed disk drive according to claim 7 further including a bi-phase data encoding providing means for resolving a data transfer-rate for any particular data-zone needing to be read during a read-data disk operation.

9. The dedicated head-to-track magneto-optical data-storage fixed disk drive according to claim 7 further including a data-sequencer providing means for calculating the optimal transfer-rate for said data-zone needing to be read during said read-data disk operation.

10. The dedicated head-to-track magneto-optical data-storage fixed disk drive according to claim 9 wherein said data-sequencer comprises means for communicating previously calculated transfer-rate calculations to a clock synthesizer, where said clock synthesizer will use said transfer-rate calculations to generate a frequency specific synthesized clock signal.

11. The dedicated head-to-track magneto-optical data-storage fixed disk drive according to claim 10 wherein said clock synthesizer comprises means for sending said frequency specific synthesized clock signal to a selected magneto-optical microhead array chip positioned over the disk-platter data-surface containing host-requested data said data-sequencer had made said data transfer-rate calculations for at the beginning of said read-data disk operation.

12. The dedicated head-to-track magneto-optical data-storage fixed disk drive according to claim 11 wherein said selected magneto-optical microhead array chip comprises means for simultaneously receiving said frequency specific synthesized clock signal and a post-amplified nrz data-stream signal at a xor circuit, where an average between these two input signals is calculated and used to create a bi-phase encoded data stream signal output, which is sent to the read-data input of said hard disk drive controller, where said signal output is re-routed to said data sequencer for further signal processing by a dpll circuit located therein.

13. A magneto-optical microhead array chip hard disk drive that stores data optically using stationary magneto-optical microhead array chips instead of conventional flying-heads and rotary positioners, comprising:

a) an enclosure comprising a casting-base, a gasket, and a cover,
b) a printed circuit board disk controller,
c) a spindle-motor unit assembly,
d) at least one stationary positioned magneto-optical microhead array chip comprising a multitude of stationary vcsel microheads, at least one stationary photodetector, and at least one induction coil, and
e) at least one disk-platter coated with a non-volatile memory medium that is rotated at a substantially constant angular velocity and comprises two data-surfaces having a multiplicity of concentric data-tracks that are used for data-storage, whereby, the advantages of a connected plurality of stationary vcsel microheads positioned above dedicated cylinder-track locations is clearly seen, and whereby, said average-seek-times occurring within said magneto-optical microhead array chip hard disk drive are so fast that they are measured in nanoseconds, a time-scale several orders of magnitude faster than the millisecond time-scale normally used to measure said average-seek-times occurring within flying-head hard disk drives.

14. The magneto-optical microhead array chip hard disk drive according to claim 13 further including said dpll circuit providing means for recovery of said frequency specific synthesized clock signal from said bi-phase encoded data stream output, where a recovered clock signal is used to resolve said data-transfer rate for said data-zone said data-sequencer had made said data transfer-rate calculations for at the beginning of said read-data disk operation.

15. The magneto-optical microhead array chip hard disk drive according to claim 13 further including said data-sequencer providing means for an on-the-fly frequency-rate comparison between said recovered clock signal and the original frequency specific synthesized clock signal sent to said xor circuit of said selected magneto-optical microhead array chip at the beginning of said read-data disk operation, where said data-sequencer will use said comparison to perform on-the-fly adjustments to said frequency specific synthesized clock signal, which in turn is used to provide data-signal synchronization between said selected magneto-optical microhead array chip and said dpll circuit, comprising:
a) an active pi loop filter circuit,
b) a vco circuit, and
c) a divider beta circuit.

16. The magneto-optical microhead array chip hard disk drive according to claim 13 further including the fully integrated top-installed bottom data-surface magneto-optical microhead array chip means or the fully integrated bottom-installed top data-surface magneto-optical microhead array chip means, comprising:
a) a photodetector array providing means for at least one photoconductive device having an electrical output that varies in response to incident photonic radiation,
b) a vcsel microhead array providing means for at least one microhead array comprising a plurality of independently addressable amplitude modulating vcsel lasers,
c) a microhead vcsel control circuitry providing means for at least one microhead vcsel laser addressing circuit that controls an addressable selection of the independently addressable amplitude modulated microhead vcsel lasers, and
d) a bi-metal coreless induction coil providing means for two air-core bi-metal induction coils used to modify the vertical magnetic fields of thermally isolated rare-earth data-cells located on said disk-platter data-surfaces.

17. The magneto-optical microhead array chip hard disk drive according to claim 13 further including a bi-metal planar induction coil providing means for a core-less or what is sometimes called an air-core induction coil, comprising:
a) means providing for a flat planar wire constructed from electron conducting material, while having deposited on one side of said flat planar wire a magnetic-field producing non-permanent magnetic material, and
b) means providing for two round pins constructed from an electron conducting material, while attaching at least one of the round pins to each end of said bi-metal planar induction coil and using them as circuit connections.

18. The magneto-optical microhead array chip hard disk drive according to claim 13 further including a bi-metal planar induction coil called the alpha coil providing means for a dedicated production of binary one data-bit domain-cells with an upward magnetized direction, while a bi-metal planar induction coil called the beta coil providing means for a dedicated production of binary zero data-bit domain-cells with a downward magnetized direction.

19. The magneto-optical microhead array chip hard disk drive according to claim 13 further including a coil switching and coil rotation method providing means for selective switching between said alpha bi-metal planar induction and said beta bi-metal planar induction within said selected magneto-optical microhead array chip, where said coil switching and rotation method is controlled and executed by a write driver circuit, a microhead selection, and a coil switch and rotate toggle flip-flop circuit.

20. An optical hard disk drive that uses a plurality of non-positional stationary amplitude-modulated lasers and photo-detectors to replace positional non-stationary amplitude-modulated lasers and photo-detectors to facilitate the transcription or the retrieval of said digital information to or from at least one data-surface coated with a non-volatile memory medium using an optical magnetic process to execute said transcription or said retrieval of said digital information to or from said data-surface, comprising:
a) an arrangement of coils and magnets that converts electric current into mechanical power providing for a rotation of at least one non-volatile memory medium,
b) at least one rotatable non-volatile memory medium having at least one data-surface used for said transcription or said retrieval of said digital information to or from said data-surface,
c) at least one connected plurality of amplitude-modulated lasers and at least one connected plurality of photo-detectors positioned into a stationary location above at least one data-surface of said rotatable non-volatile memory medium,
d) at least one conducting coil in which electromotive force is generated by electromagnetic induction and used to transcribe said digital information to at least one data-surface of said rotatable non-volatile memory medium, and
e) at least one parallel circuit allowing transfer of said electrical impulses to or from said connected plurality of amplitude-modulated lasers and said connected plurality of photo-detectors and at least one connected induction-coil, to or from at least one integrated circuit comprising at least one central processing unit used to control the system wide operation of said optical hard disk drive, whereby, said optical hard disk drive successfully replaces said positional non-stationary amplitude-modulated lasers with a new technology that is stationary and, therefore non-destructive during a catastrophic disk failure to said digital information previously transcribed onto said data-platter, and whereby, an amplitude-modulated laser positioned above a host requested cylinder-track location is switched on, while a different amplitude-modulated laser positioned above a previously requested cylinder-track location is simultaneously switched off, causing said average-seek-times of said optical hard disk drive, over flying-head magnetic or optical hard disk drives, to be decreased by at least two-thousand times.

21. The optical hard disk drive according to claim 20 further including a multi-layered construction of said fully integrated top-installed bottom data-surface microhead array chip or said fully integrated bottom-installed top data-surface microhead array chip, comprising:

a) a vcsel microhead array,
b) a photo-detector,
c) an induction coil,
d) a thirty-two bit address latch and chip select circuit,
e) a thirty-two bit address decoder circuit,
f) a thirty-two bit address buffer circuit,
g) a microhead selection and coil rotation circuit,
h) a read and write analog input and output signal bus,
i) a read pre-amplifier circuit,
j) a read decision circuit,
k) a read buffer circuit,
l) a write driver circuit,
m) a write pre-amplifier circuit, and
n) a read and write control circuit.

* * * * *